(12) United States Patent
Murakami et al.

(10) Patent No.: US 10,476,566 B2
(45) Date of Patent: *Nov. 12, 2019

(54) TRANSMISSION DEVICE AND TRANSMISSION METHOD

(71) Applicant: Sun Patent Trust, New York, NY (US)

(72) Inventors: Yutaka Murakami, Kanagawa (JP); Tomohiro Kimura, Osaka (JP); Mikihiro Ouchi, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,884

(22) Filed: Feb. 5, 2019

(65) Prior Publication Data
US 2019/0173536 A1    Jun. 6, 2019

Related U.S. Application Data

(63) Continuation of application No. 16/015,578, filed on Jun. 22, 2018, now Pat. No. 10,205,496, which is a
(Continued)

(30) Foreign Application Priority Data

Feb. 9, 2015    (JP) .................. 2015-023581

(51) Int. Cl.
*H04K 1/02* (2006.01)
*H04B 7/0456* (2017.01)
(Continued)

(52) U.S. Cl.
CPC ........... *H04B 7/0456* (2013.01); *H04B 7/046* (2013.01); *H04B 7/0615* (2013.01); *H04B 7/0682* (2013.01); *H04L 1/005* (2013.01)

(58) Field of Classification Search
CPC ................. H03F 1/3247; H03F 1/3294; H03F 2201/3233; H04L 27/368; H04L 25/03343;
(Continued)

(56) References Cited

U.S. PATENT DOCUMENTS 8,885,769 B2    11/2014   Murakami
2007/0140377 A1    6/2007   Murakami et al.
(Continued)

FOREIGN PATENT DOCUMENTS

JP    2012-034319    2/2012
WO    2005/050885    6/2005
WO    2012/176461    12/2012

OTHER PUBLICATIONS

Bertrand M. Hochwald et al., "Achieving near-capacity on a multiple-antenna channel", IEEE Transactions on communications, vol. 51, No. 3, pp. 389-399, Mar. 2003.
(Continued)

*Primary Examiner* — Zewdu A Kassa
(74) *Attorney, Agent, or Firm* — Wenderoth, Lind & Ponack, L.L.P.

(57) ABSTRACT

A transmission device comprising: a weighting circuity which, in operation, generates transmission signals of n streams (n is an integer of 3 or more) by weighting modulated signals of the n streams using a predetermined fixed precoding matrix; a phase changing circuity which, in operation, regularly changes each phase of a symbol series included in each of the transmission signals of the n streams; and a transmitter which, in operation, transmits the transmission signals of the n streams from different antennas, the phases of each of the transmission signals of the n streams being changed in each symbol, wherein the transmission signal of an i-th stream has an $m_i$ kind of phase change value $y_i(t)$ (i is an integer between 1 and n (inclusive), $0 \leq y_i < 2\pi$,
(Continued)

and $m_i$ is set in each stream, t is an integer of 0 or more, and indicates a symbol slot), and the phase changing circuity changes the phase in one or more u ($u=m_1 \times m_2 \times \ldots \times m_n$) symbol periods using all patterns of a set of phase change values $y_i(t)$ different from each other in each symbol.

12 Claims, 69 Drawing Sheets

Related U.S. Application Data continuation of application No. 15/450,396, filed on Mar. 6, 2017, now Pat. No. 10,033,445, which is a continuation of application No. 15/011,706, filed on Feb. 1, 2016, now Pat. No. 9,628,159.

(51) Int. Cl.
*H04B 7/06* (2006.01)
*H04L 1/00* (2006.01)

(58) Field of Classification Search
CPC ... H04L 1/0003; H04L 1/0071; H04L 5/0007; H04L 1/0009; H04L 27/0008; H04L 27/2601; H04L 1/0025; H04B 1/40; H04B 3/23; H04B 1/403
USPC ................... 375/296, 295, 316, 219
See application file for complete search history.

(56) References Cited

U.S. PATENT DOCUMENTS

| | | |
|---|---|---|
| 2013/0136208 A1 | 5/2013 | Murakami |
| 2014/0133589 A1 | 5/2014 | Ouchi et al. |

OTHER PUBLICATIONS

Ben Lu et al., "Performance analysis and design optimization of LDPC-coded MIMO OFDM systems", IEEE Transactions on signal processing, vol. 52, No. 2, pp. 348-361, Feb. 2004.

Yutaka Murakami et al., "BER performance evaluation in 2x2 MIMO spatial multiplexing systems under Rician fading channels", IEICE Trans. Fundamentals, vol. E91-A, No. 10, pp. 2798-2807, Oct. 2008.

David J. Love et al., "Limited feedback unitary precoding for spatial multiplexing systems" IEEE Transactions on Information Theory, vol. 51, No. 8, pp. 2967-2976, Aug. 2005.

Hangjun Chen et al., "Turbo space-time codes with time varying linear transformations", IEEE Transactions on wireless communications, vol. 6, No. 2, pp. 486-493, Feb. 2007.

DVB Document A122, "Frame structure channel coding and modulation for a second generation digital terrestrial television broadcasting system (DVB-T2)", Jun. 2008.

Lorenzo Vangelista et al., "Key technologies for next-generation terrestrial digital television standard DVB-T2", IEEE Commun. Magazine, pp. 146-153, Oct. 2009.

Xu Zhu et al., "Performance analysis of maximum likelihood detection in a MIMO antenna system", IEEE Trans. on Commun., vol. 50, No. 2, pp. 187-191, Feb. 2002.

Hiroyuki Kawai et al., "Likelihood function for QRM-MLD suitable for soft-decision turbo decoding and its performance for OFCMD MIMO multiplexing in multipath fading channel", IEICE Trans. Commun., vol. E88-B, No. 1, pp. 47-57, Jan. 2005.

Takeo Ohgane et al., "Applications of Space Division Multiplexing and Those Performance in a MIMO Channel", IEICE Trans. Commun., vol. E88-B, No. 5, pp. 1843-1851, May 2005.

S.Galli et al., "Advanced signal processing for PLCs: Wavelet-OFDM", Proc. of IEEE International symposium on ISPLC 2008, pp. 187-192, 2008.

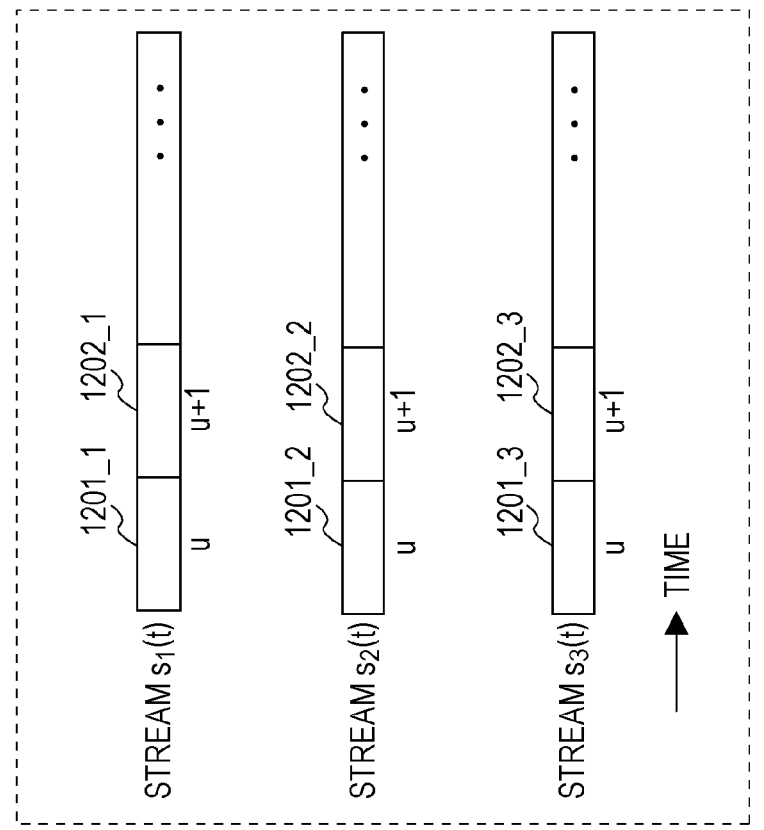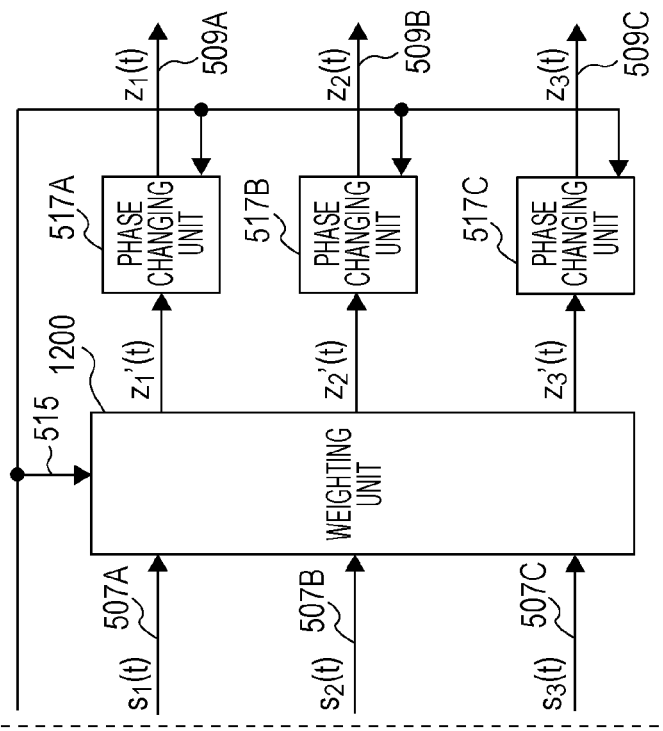

FIG. 17

| | t=0 | t=1 | t=2 | t=3 | t=4 | t=5 | |
|---|---|---|---|---|---|---|---|
| $y_1(t)$ | 0 | 0 | 0 | 0 | 0 | 0 | ⋮ |
| $y_2(t)$ | 0 | a | b | 0 | a | b | ⋮ |
| $y_3(t)$ | 0 | 0 | 0 | 0 | 0 | 0 | ⋮ |

ONE PERIOD

FIG. 18

| | t=0 | t=1 | t=2 | t=3 | t=4 | t=5 | t=6 | t=7 | t=8 | t=9 | ... |
|---|---|---|---|---|---|---|---|---|---|---|---|
| $y_1(t)$ | 0 | 0 | 0 | 0 | 0 | 0 | 0 | 0 | 0 | 0 | ... |
| $y_2(t)$ | 0 | a | b | 0 | 0 | a | a | b | b | 0 | ... |
| $y_3(t)$ | 0 | 0 | 0 | a | b | a | b | a | b | 0 | ... |

ONE PERIOD

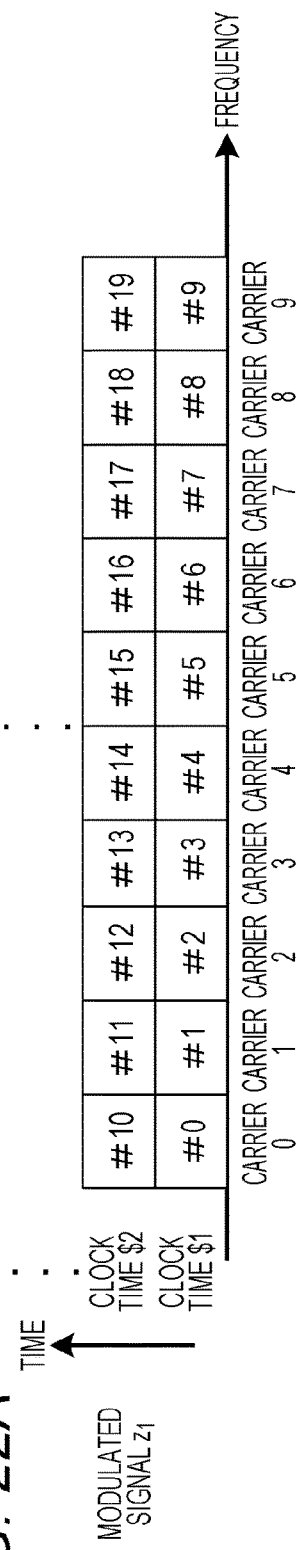
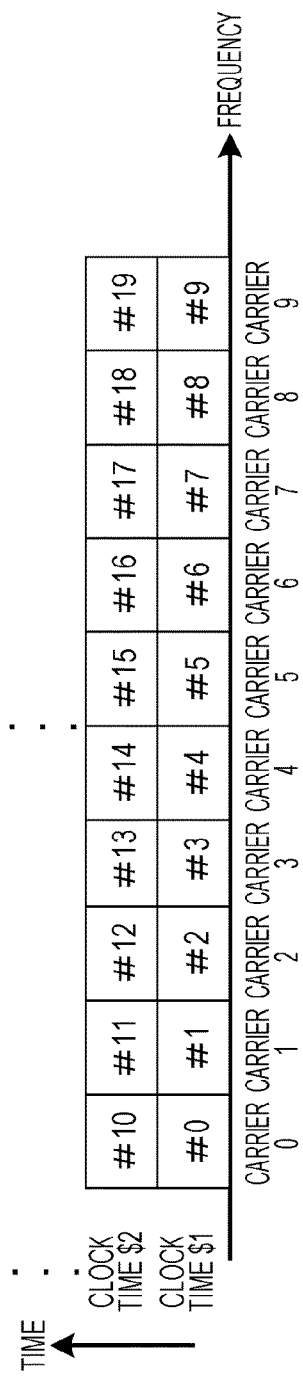
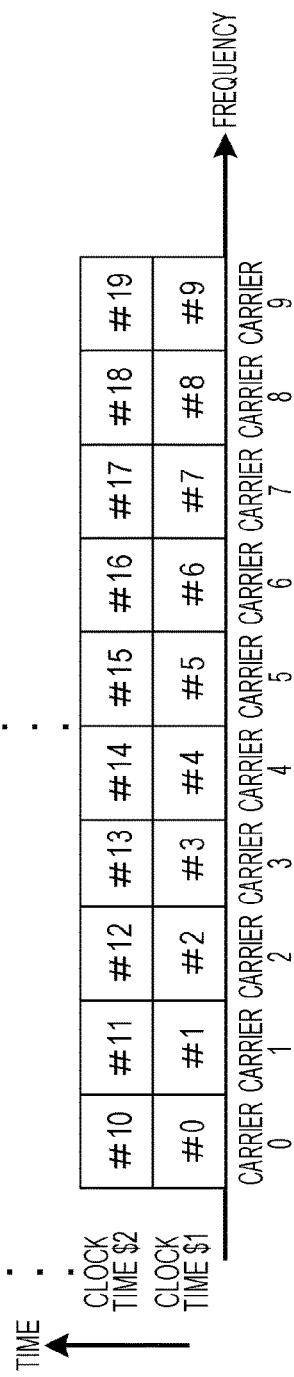
FIG. 22A
FIG. 22B
FIG. 22C

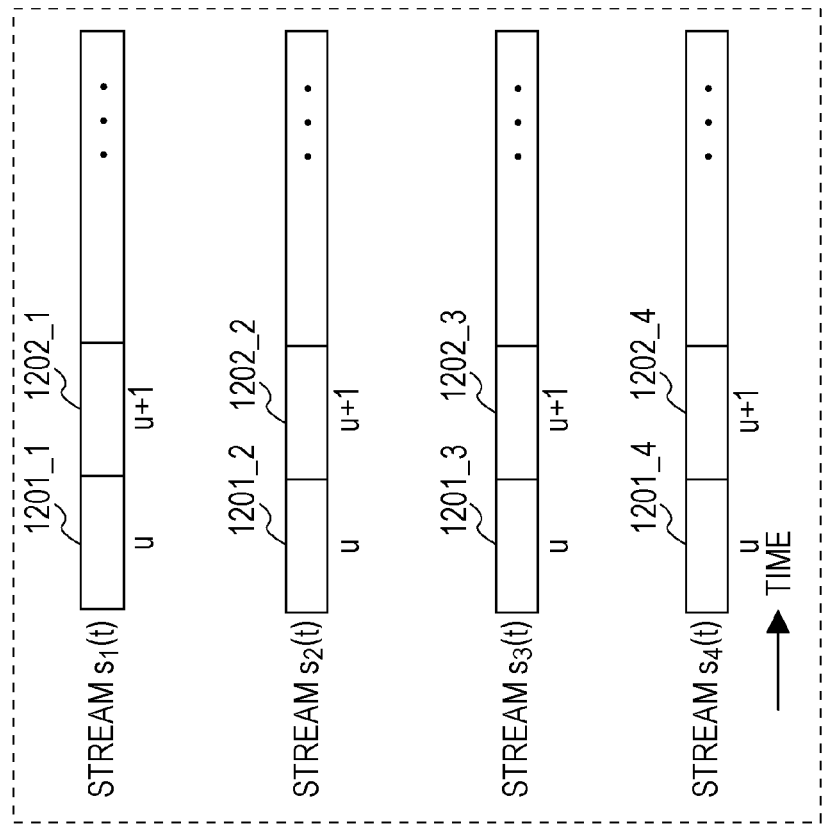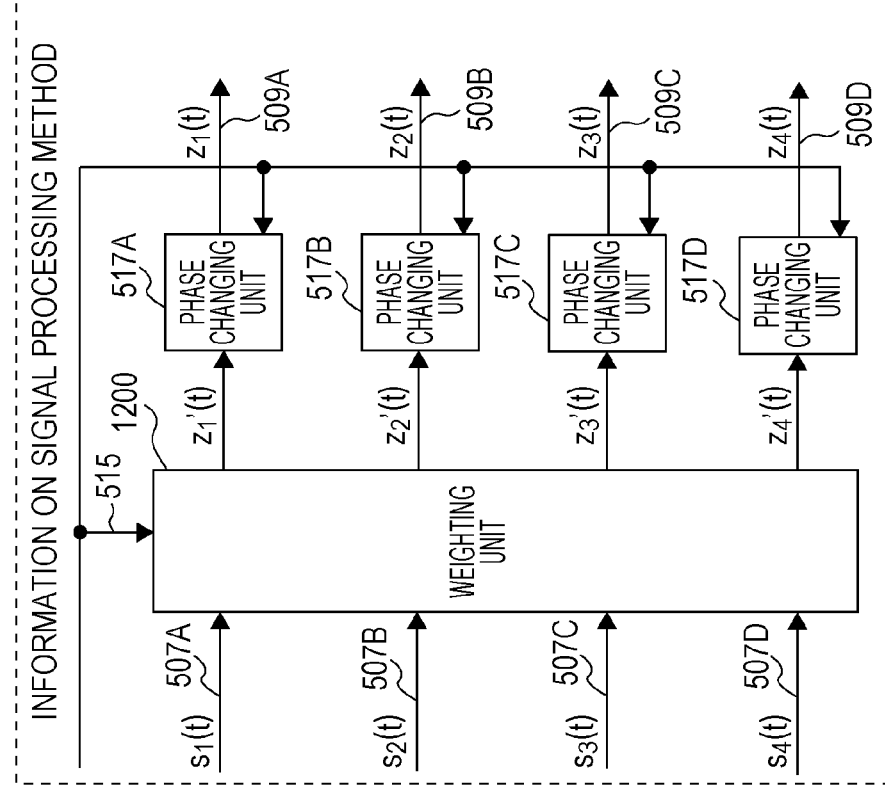

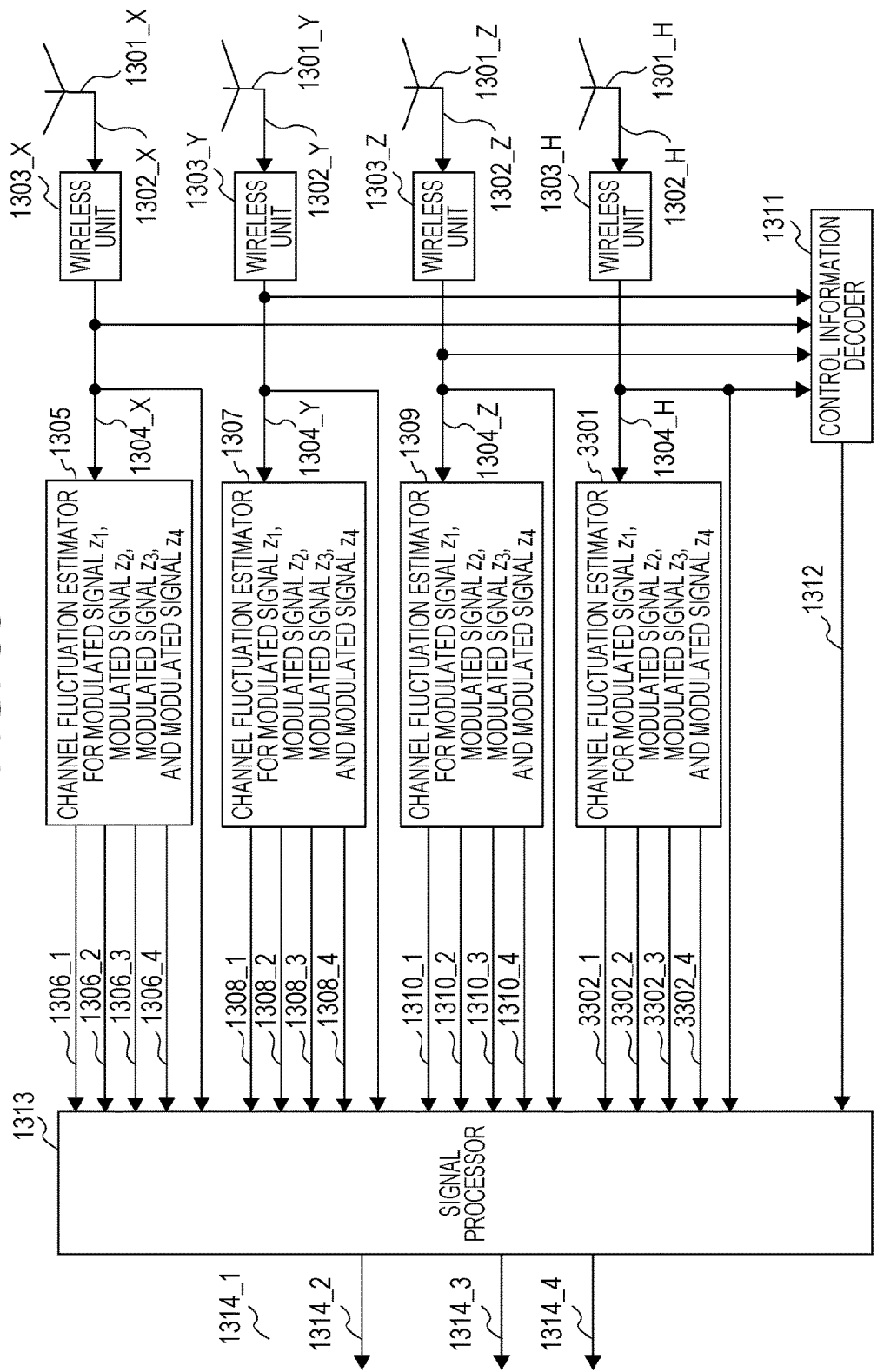

FIG. 37

| | t=0 | t=1 | t=2 | t=3 | t=4 | t=5 | |
|---|---|---|---|---|---|---|---|
| $y_1(t)$ | 0 | 0 | 0 | 0 | 0 | 0 | ... |
| $y_2(t)$ | 0 | a | b | 0 | a | b | ... |
| $y_3(t)$ | 0 | 0 | 0 | 0 | 0 | 0 | ... |
| $y_4(t)$ | 0 | 0 | 0 | 0 | 0 | 0 | ... |

ONE PERIOD (t=3 to t=5)

FIG. 38

| | t=0 | t=1 | t=2 | t=3 | t=4 | t=5 | t=6 | t=7 | t=8 | t=9 | t=10 | t=11 | t=12 | t=13 | t=14 |
|---|---|---|---|---|---|---|---|---|---|---|---|---|---|---|---|
| y₁(t) | 0 | 0 | 0 | 0 | 0 | 0 | 0 | 0 | 0 | 0 | 0 | 0 | 0 | 0 | 0 |
| y₂(t) | 0 | a | b | 0 | 0 | 0 | 0 | a | a | b | b | 0 | 0 | 0 | 0 |
| y₃(t) | 0 | 0 | 0 | a | b | 0 | 0 | 0 | 0 | 0 | 0 | a | a | b | b |
| y₄(t) | 0 | 0 | 0 | 0 | 0 | a | b | a | b | a | b | a | b | a | b |

| | t=15 | t=16 | t=17 | t=18 | t=19 | t=20 | t=21 | t=22 | t=23 | t=24 | t=25 | t=26 | t=27 | |
|---|---|---|---|---|---|---|---|---|---|---|---|---|---|---|
| y₁(t) | 0 | 0 | 0 | 0 | 0 | 0 | 0 | 0 | 0 | 0 | 0 | 0 | 0 | ⋮ |
| y₂(t) | a | a | a | a | a | a | b | b | b | b | b | b | 0 | ⋮ |
| y₃(t) | a | b | a | a | b | b | a | b | a | a | b | b | 0 | ⋮ |
| y₄(t) | 0 | 0 | a | b | a | b | 0 | 0 | a | b | a | b | 0 | ⋮ |

ONE PERIOD

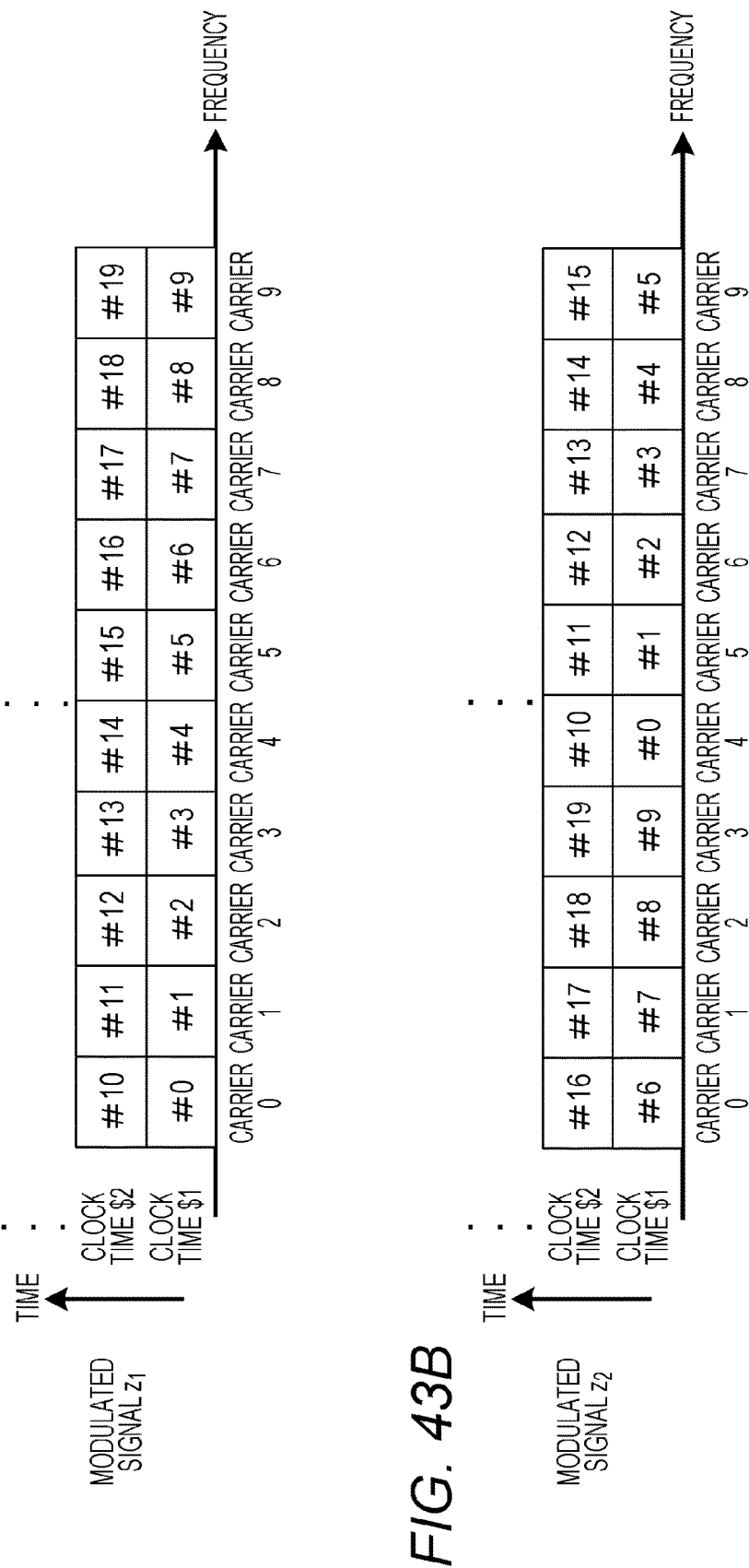

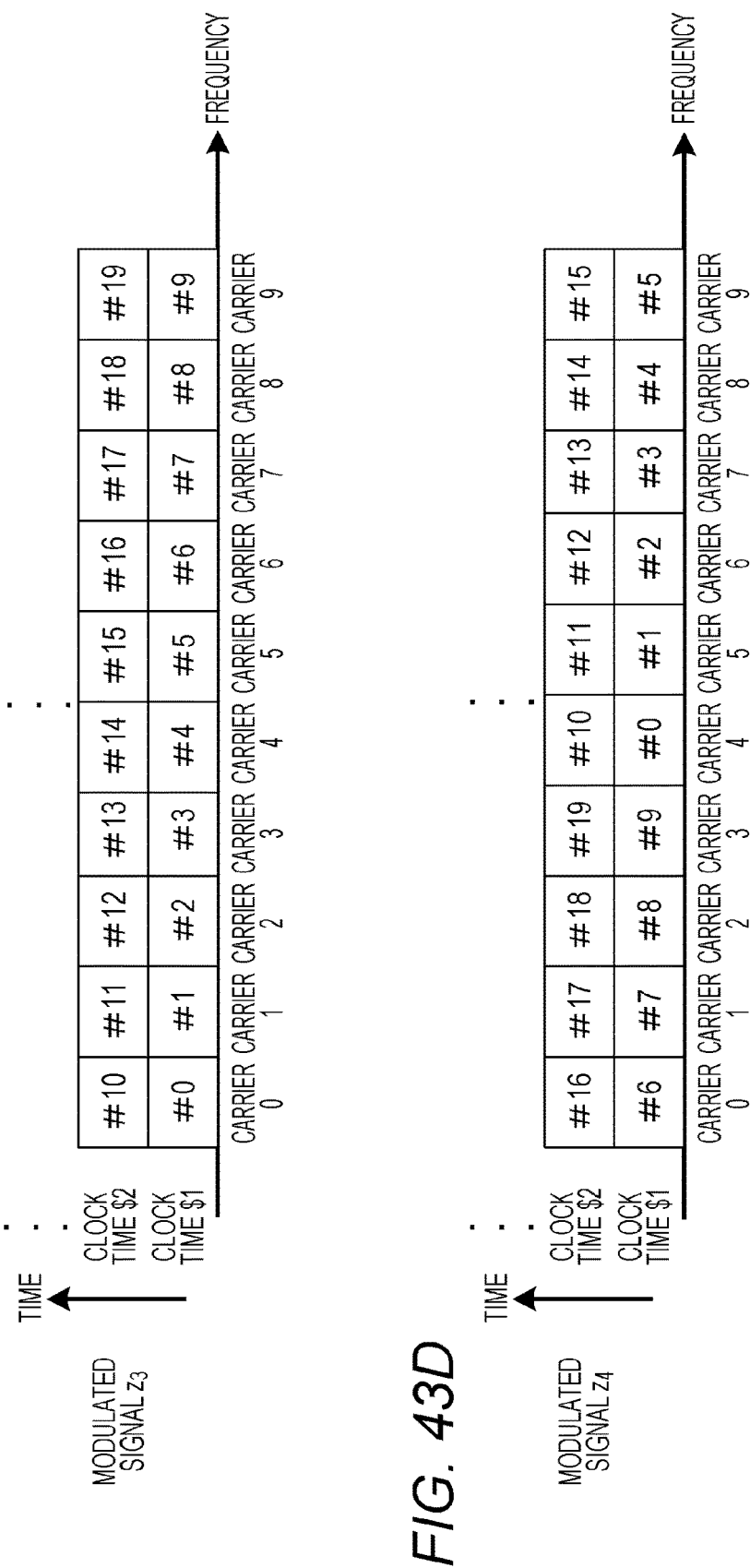

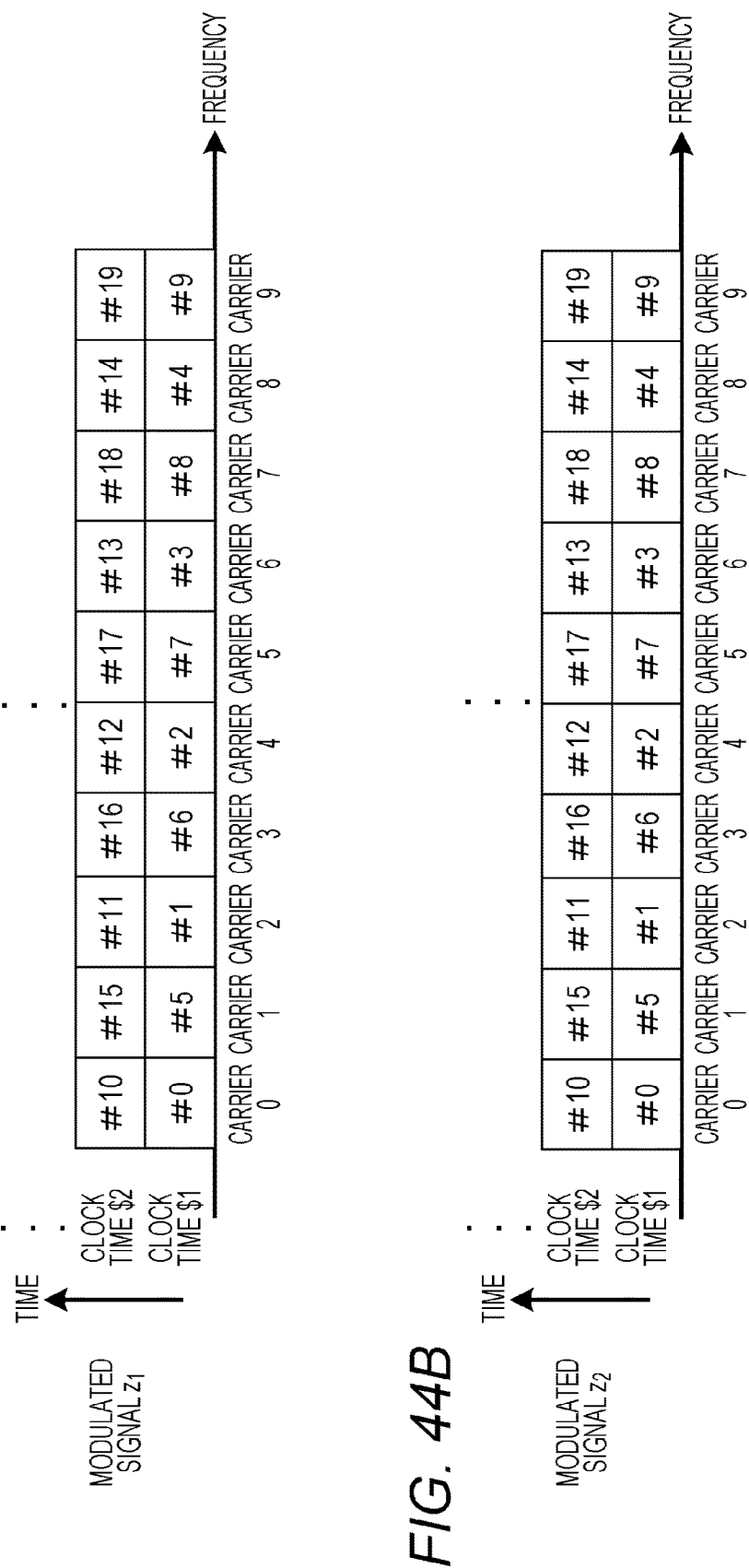

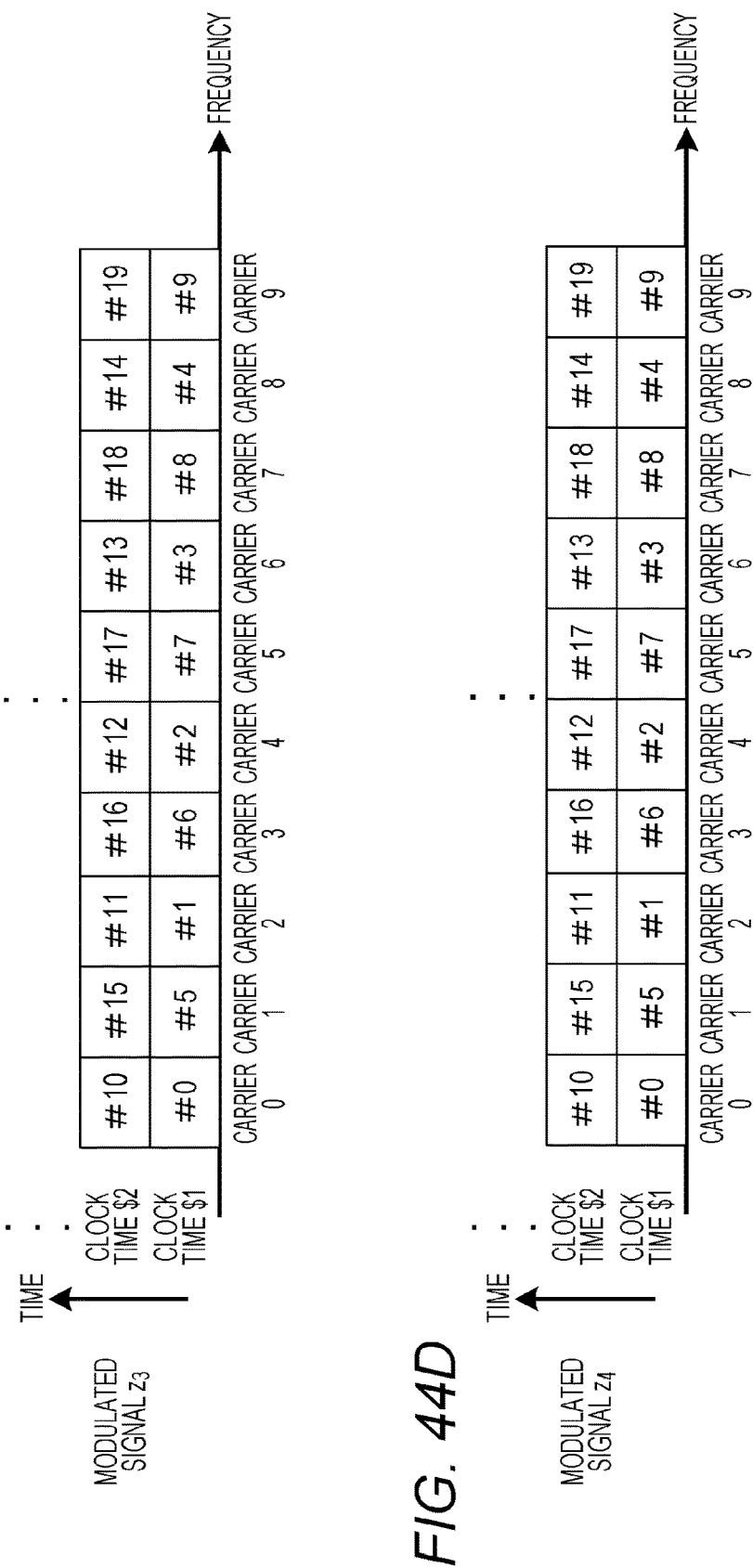

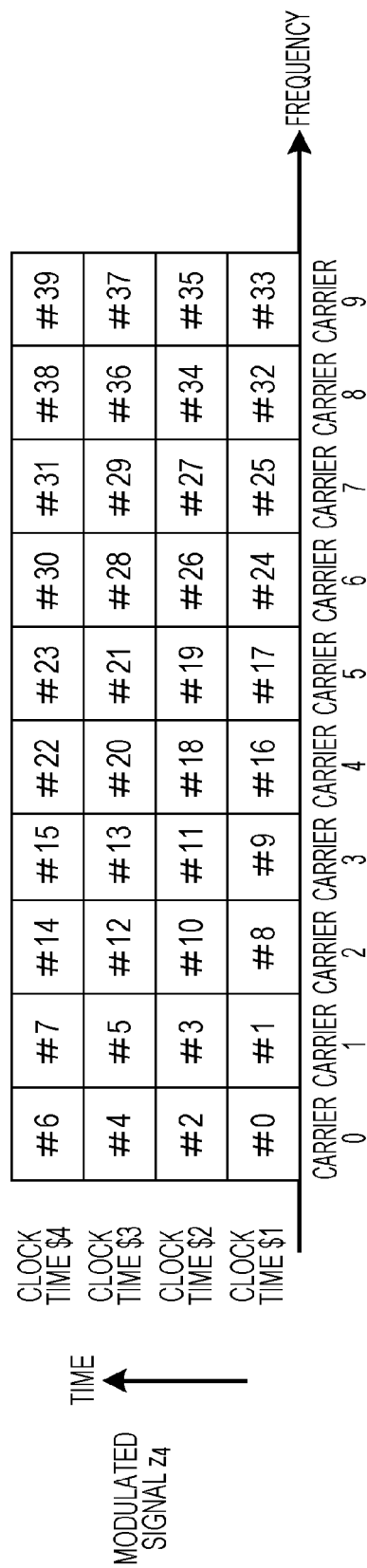

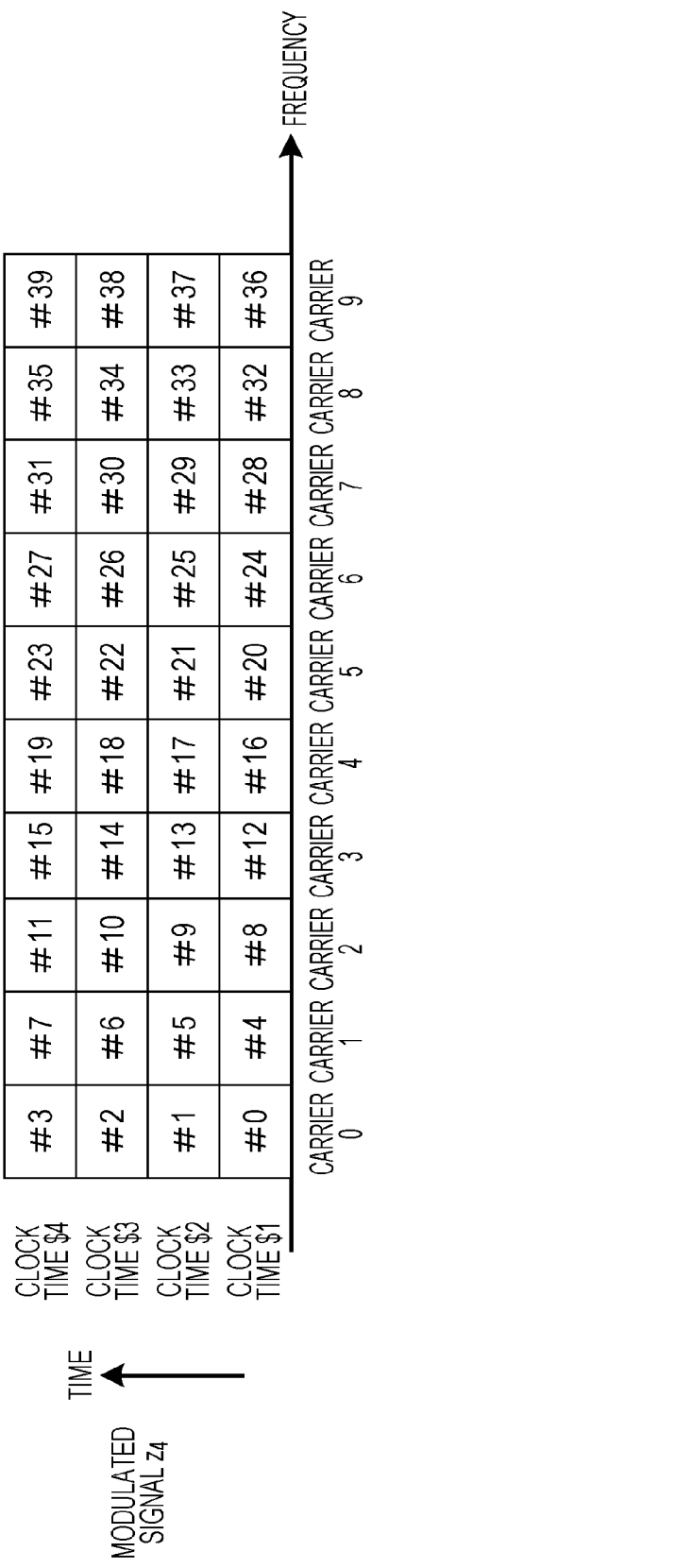

TRANSMISSION DEVICE AND TRANSMISSION METHOD

BACKGROUND

1. Technical Field

The present disclosure relates to a transmission device and a reception device for conducting communication using a multi-antenna.

2. Description of the Related Art

Conventionally, for example, MIMO (Multiple-Input Multiple-Output) is well known as a communication method using a multi-antenna. In multi-antenna communication typified by MIMO, pieces of transmission data of a plurality of series are modulated, and each modulated signal is transmitted from a different antenna simultaneously to increase the transmission speed of data.

FIG. 1 illustrates a configuration example of a transmission and reception device having two transmit antennas, two receive antennas, and two transmission modulated signals (two transmission streams). In the transmission device, encoded data is interleaved, the interleaved data is modulated, and frequency conversion and the like is performed to generate transmission signals, and the transmission signals are transmitted from antennas. A scheme simultaneously transmitting different modulated signals from different transmit antennas at an identical frequency is a spatial multiplexing MIMO scheme.

At this point, PTL 1 proposes a transmission device provided with a different interleave pattern for each transmit antenna. That is, the transmission device in FIG. 1 is provided with two different interleave patterns having two interleaves (πa and πb) different from each other. In the reception device, as described in NPLs 1 and 2, reception quality is improved by iteratively performing a detection method (a MIMO detector in FIG. 1) in which a soft value is used.

A models for an actual propagation environment in wireless communication includes an NLOS (non-line of sight) environment typified by a Rayleigh fading environment and an LOS (line of sight) environment typified by a Rician fading environment. The transmission device transmits a single modulated signal, and the reception device performs a maximal ratio combining on the signals received by a plurality of antennas and demodulates and decodes the signals obtained by the maximal ratio combining. Therefore, the excellent reception quality can be achieved in the LOS environment, particularly in the environment having a large Rician factor that indicates a ratio of received power of a direct wave to received power of a scattered wave. However, depending on a transmission scheme (for example, a spatial multiplexing MIMO system), there occurs a problem that the reception quality degrades when the Rician factor increases. (see NPL 3)

FIG. 2 illustrates an example of a simulation result of a BER (Bit Error Rate) characteristic (a vertical axis indicates BER while a horizontal axis indicates a SNR (Signal-to-Noise power Ratio)) when data encoded by LDPC (Low-Density Parity-Check) codes is transmitted through a 2×2 (two transmit antennas and two receive antennas) spatial multiplexing MIMO system in the Rayleigh fading environment and the Rician fading environment with the Rician factors K of 3, 10, and 16 dB. FIG. 2A illustrates the BER characteristic of Max-log-APP (A Posteriori Probability) without performing the iterative detection (see NPLs 1 and 2), and FIG. 2B illustrates the BER characteristic of Max-log-APP with the iterative detection (five iterations) (see NPLs 1 and 2). As is clear from FIG. 2, regardless of the iterative detection, the reception quality degrades in the spatial multiplexing MIMO system when the Rician factor increases. Thus, it is clear that the problem in that "the reception quality degrades when the propagation environment is stabilized in the spatial multiplexing MIMO system", which does not exist in the conventional single modulation signal transmission system, is generated in the spatial multiplexing MIMO system.

Broadcasting or multicast communication is service necessary to adapt to various propagation environments because a broadcasting station or a base station simultaneously transmits information to many terminals, and the LOS environment exists obviously in the radio propagation environment between a receiver owned by a user and the broadcasting station. When the spatial multiplexing MIMO system is used in the broadcasting or multicast communication, possibly the receiver generates a phenomenon in which the service can hardly be received due to the degradation of the reception quality although received field strength is high. That is, when the spatial multiplexing MIMO system is used in the broadcasting or multicast communication, there is a demand for development of the MIMO system in which a certain degree of reception quality is obtained in both the NLOS environment and the LOS environment.

NPL 4 describes a method for selecting a codebook (a precoding matrix (also referred to as a precoding weight matrix)) used in precoding from feedback information transmitted from a communication partner. However, NPL 4 does not disclose a method for performing the precoding in a situation in which the feedback information can hardly be acquired from the communication partner like the broadcasting or multicast communication.

On the other hand, NPL 5 discloses a method for switching the precoding matrix over time. The method can be applied even if no feedback information is available. NPL 5 discloses that a unitary matrix is used as the matrix used in the precoding and that the unitary matrix is switched at random. However, NPL 5 does not disclose a method applicable to the degradation of the reception quality in the LOS environment, but NPL 5 describes the simply random switching. NPL 5 describes neither a precoding method for improving the degradation of the reception quality in the LOS environment, nor a method for structuring the precoding matrix.

PTL 2 discloses a specific method for changing the precoding matrix in the case that two streams are subjected to the precoding to transmit the modulated signals from two antennas.

CITATION LIST

Patent Literatures

PTL 1: International Patent Publication No. 2005/050885
PTL 2: Japanese Patent Application No. 2010-177310

Non-Patent Literatures

NPL 1: "Achieving near-capacity on a multiple-antenna channel" IEEE Transaction on communications, vol. 51, no. 3, pp. 389-399, March 2003.

NPL 2: "Performance analysis and design optimization of LDPC-coded MIMO OFDM systems" IEEE Trans. Signal Processing., vol. 52, no. 2, pp. 348-361, February 2004.

NPL 3: "BER performance evaluation in 2×2 MIMO spatial multiplexing systems under Rician fading channels," IEICE Trans. Fundamentals, vol. E91-A, no. 10, pp. 2798-2807, October 2008.

NPL 4: D. J. Love, and R. W. heath, Jr., "Limited feedback unitary precoding for spatial multiplexing systems," IEEE Trans. Inf. Theory, vol. 51, no. 8, pp. 2967-2976, August 2005.

NPL 5: "Turbo space-time codes with time varying linear transformations," IEEE Trans. Wireless communications, vol. 6, no. 2, pp. 486-493, February 2007.

NPL 6: DVB Document A122, Framing structure, channel coding and modulation for a second generation digital terrestrial television broadcasting system (DVB-T2), June 2008.

NPL 7: L. Vangelista, N. Benvenuto, and S. Tomasin, "Key technologies for next-generation terrestrial digital television standard DVB-T2," IEEE Commun. Magazine, vo. 47, no. 10, pp. 146-153, October 2009.

NPL 8: X. Zhu and R. D. Murch, "Performance analysis of maximum likelihood detection in a MIMO antenna system," IEEE Trans. Commun., vo. 50, no. 2, pp. 187-191, February 2002.

NPL 9: "Likelihood function for QR-MLD suitable for soft-decision turbo decoding and its performance," IEICE Trans. Commun., vol. E88-B, no. 1, pp. 47-57, January 2004.

NPL 10: B. M. Hochwald and S. ten Brink, "Achieving near-capacity on a multiple-antenna channel," IEEE Trans. Commun., vo. 51, no. 3, pp. 389-399, March 2003.

NPL 11: T. Ohgane, T. Nishimura, and Y. Ogawa, "Application of space division multiplexing and those performance in a MIMO channel," IEICE Trans. Commun., vo. 88-B, no. 5, pp. 1843-1851, May 2005.

NPL 12: "Advanced signal processing for PLCs: Wavelet-OFDM," Proc. of IEEE International symposium on ISPLC 2008, pp. 187-192, 2008.

However, in the above cited documents, there is no description that the specific method for changing the precoding matrix in the case that at least three streams are subjected to the precoding to transmit the modulated signals from at least three antennas.

SUMMARY

One non-limiting and exemplary embodiment provides a transmission device that can improve the degradation of the reception quality in the LOS environment in the case that at least three streams are subjected to the precoding to transmit the modulated signals from at least three antennas.

In one general aspect, the techniques disclosed here feature: a transmission device that transmits transmission signals of n streams (n is an integer of 3 or more) from different antennas, the transmission device includes: a weighting circuitry which, in operation, generates the transmission signals of the n streams by weighting modulated signals of the n streams using a predetermined fixed precoding matrix; and a phase changing circuitry which, in operation, regularly changes each phase of the transmission signals of the n streams. At this point, when value $a_{ki}$ that can be taken by phase change value $y_i(t)$ in order of generating a symbol of i-th stream (i is an integer between 0 and n-1 (inclusive)) is an $m_i$ kind ($0 \le a_{ki} < 2\pi$, $k_i$ is an integer between 0 and $m_i$ (inclusive), and $m_i$ is set in each stream), the phase changing circuitry sets each of all patterns that can be taken by an n set of $a_{ki}$ [$a_{ki}$]n to one of symbol number u (u is an integer between 0 and M (inclusive), and $M = m_0 \times m_1 \times \ldots \times m_{n-1}$).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 12A illustrates an example of a weighting unit and a phase changing unit;

FIG. 12B illustrates an example of the frame structure;

FIG. 17 illustrates a specific example of a phase change value;

FIG. 18 illustrates a specific example of the phase change value;

FIG. 22A illustrates an example of a symbol rearranging method;

FIG. 22B illustrates an example of the symbol rearranging method;
FIG. 22C illustrates an example of the symbol rearranging method;
FIG. 32A illustrates an example of the weighting unit and phase changing unit;
FIG. 32B illustrates an example of the frame structure;
FIG. 33 illustrates a configuration example of the reception device;
FIG. 37 illustrates a specific example of the phase change value;
FIG. 38 illustrates a specific example of the phase change value;
FIG. 43A illustrates an example of the symbol rearranging method;
FIG. 43B illustrates an example of the symbol rearranging method;
FIG. 43C illustrates an example of the symbol rearranging method;
FIG. 43D illustrates an example of the symbol rearranging method;
FIG. 44A illustrates an example of the symbol rearranging method;
FIG. 44B illustrates an example of the symbol rearranging method;
FIG. 44C illustrates an example of the symbol rearranging method;
FIG. 44D illustrates an example of the symbol rearranging method;
FIG. 45D illustrates an example of the symbol rearranging method;
FIG. 46D illustrates an example of the symbol rearranging method.

DETAILED DESCRIPTION

Hereinafter, exemplary embodiments of the present disclosure will be described in detail with reference to the drawings.

First Exemplary Embodiment

A transmission method, a transmission device, a reception method, and a reception device according to a first exemplary embodiment will be described in detail.

Outlines of transmission and decoding methods in a conventional spatial multiplexing MIMO transmission system will be described prior to the description of the first exemplary embodiment.

Figure 3:
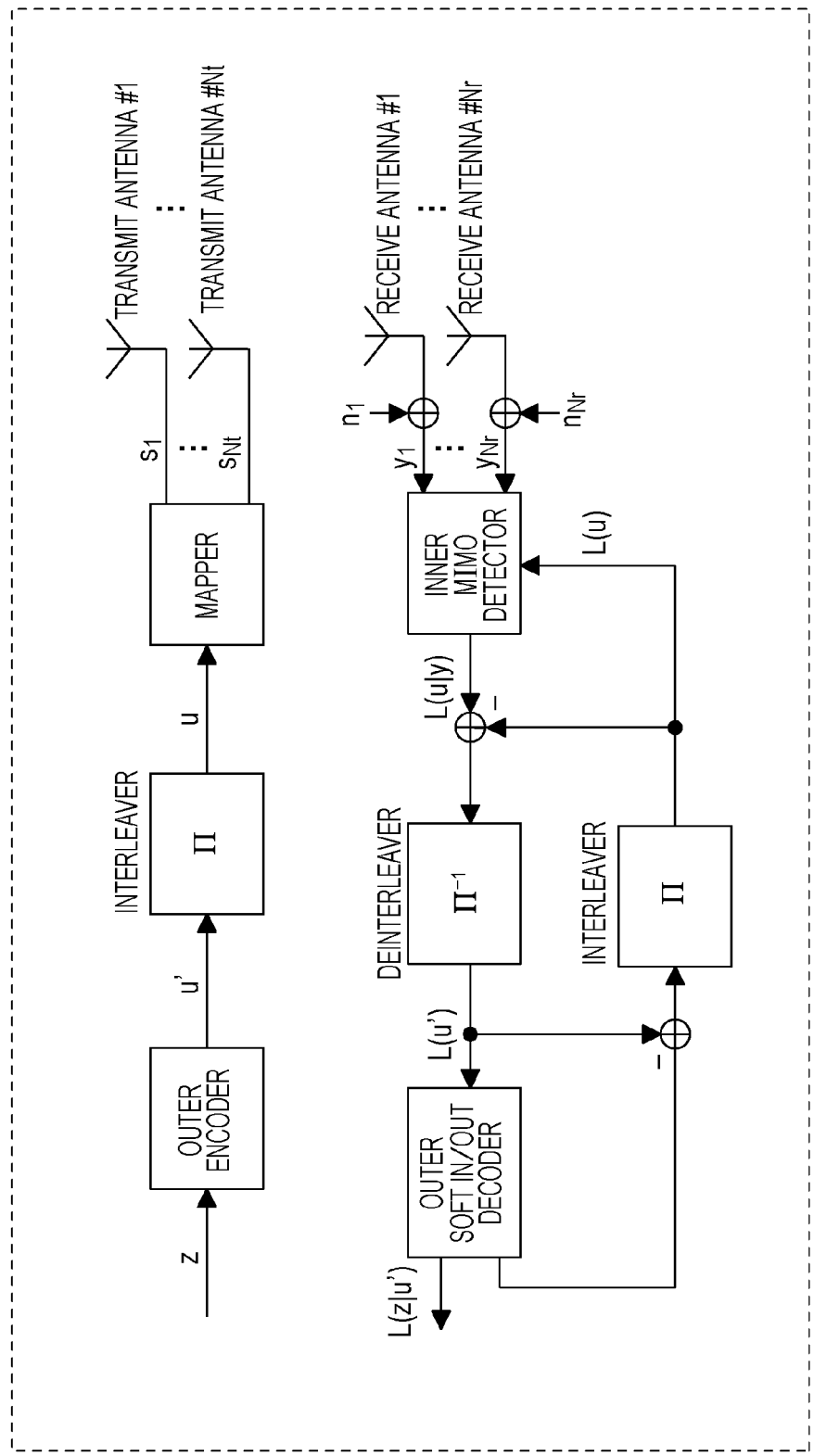
FIG. 3 illustrates a configuration example of the transmission and reception device in the spatial multiplexing MIMO transmission system.

FIG. 3 illustrates a configuration of an $N_t \times N_r$ spatial multiplexing MIMO system. Information vector z is subjected to encoding and interleaving. Encoded bit vector $u=(u_1, \ldots, u_{Nt})$ is acquired as interleaving output, where $u_i=(u_{i1}, \ldots, u_{iM})$ (M is the number of transmission bits per symbol). Letting transmission vector $s=(s_1, \ldots, s_{Nt})^T$ leads to transmission signal $s_i = \text{map}(u_i)$ from transmit antenna #i, and the normalized transmission energy is expressed by $E\{|s_i|^2\} = E_s/N_t$ ($E_s$ is total energy per channel). Letting $y=(y_1, \ldots, y_{Nr})^T$ expresses a received vector using Equation (1).

[Mathematical formula 1]

$$y = (y_1, \ldots, y_{Nr})^T \quad \text{Equation (1)}$$
$$= H_{NtNr} s + n$$

Where $H_{NtNr}$ is a channel matrix, $n=(n_1, \ldots, n_{Nr})^T$ is a noise vector, and $n_i$ is i.i.d. complex Gaussian random noise with an average value of 0 and variance of $\sigma^2$. From a relationship between transmission and reception symbols induced to the receiver, a probability for the received vector may be provided as a multi-dimensional Gaussian distribution as expressed by Equation (2).

[Mathematical formula 2]

$$p(y \mid u) = \frac{1}{(2\pi\sigma^2)^{N_r}} \exp\left(-\frac{1}{2\sigma^2} \|y - Hs(u)\|^2\right) \quad \text{Equation (2)}$$

Figure 1:
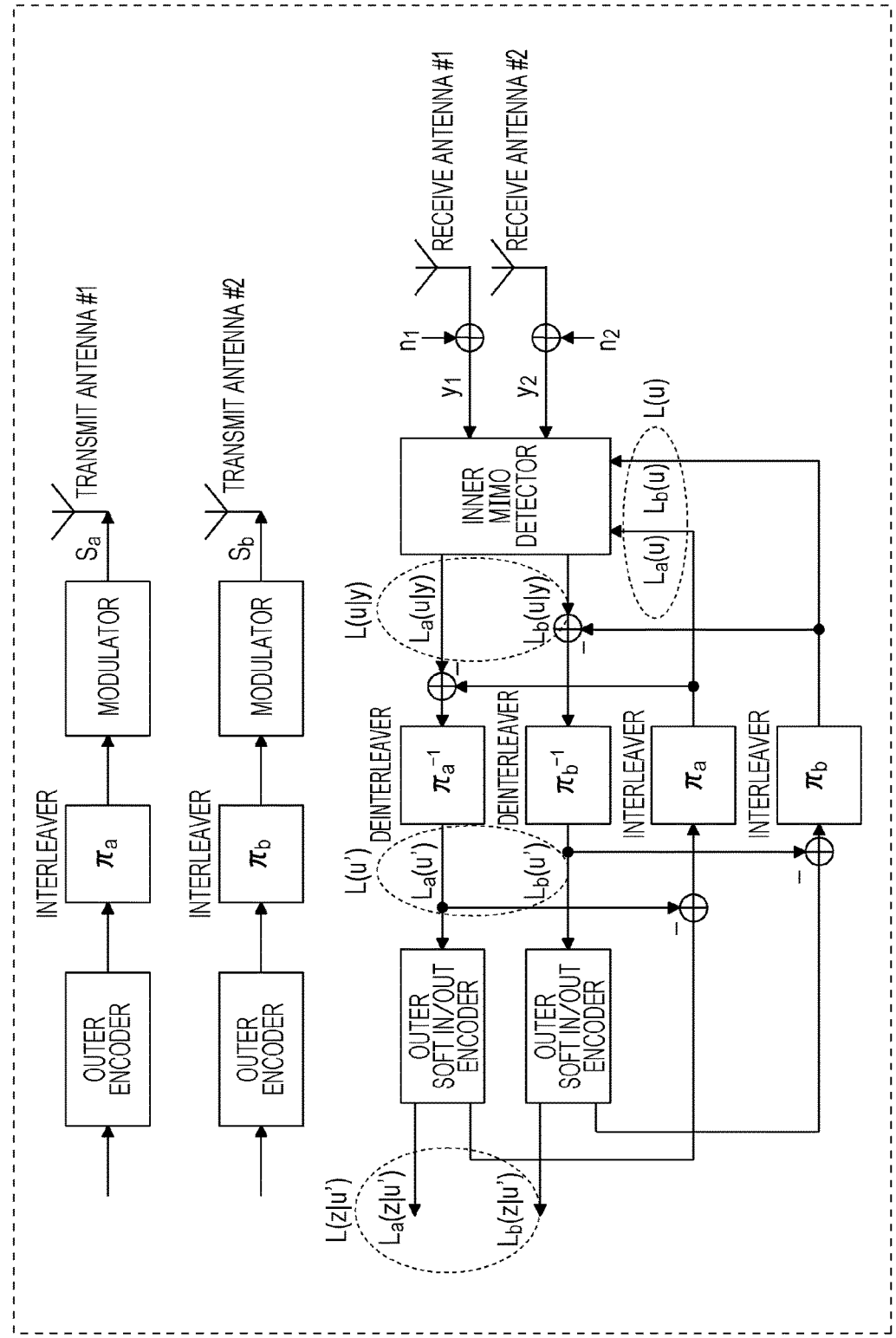
FIG. 1 illustrates a configuration example of a transmission and reception device in a spatial multiplexing MIMO transmission system.
Figure 2A:
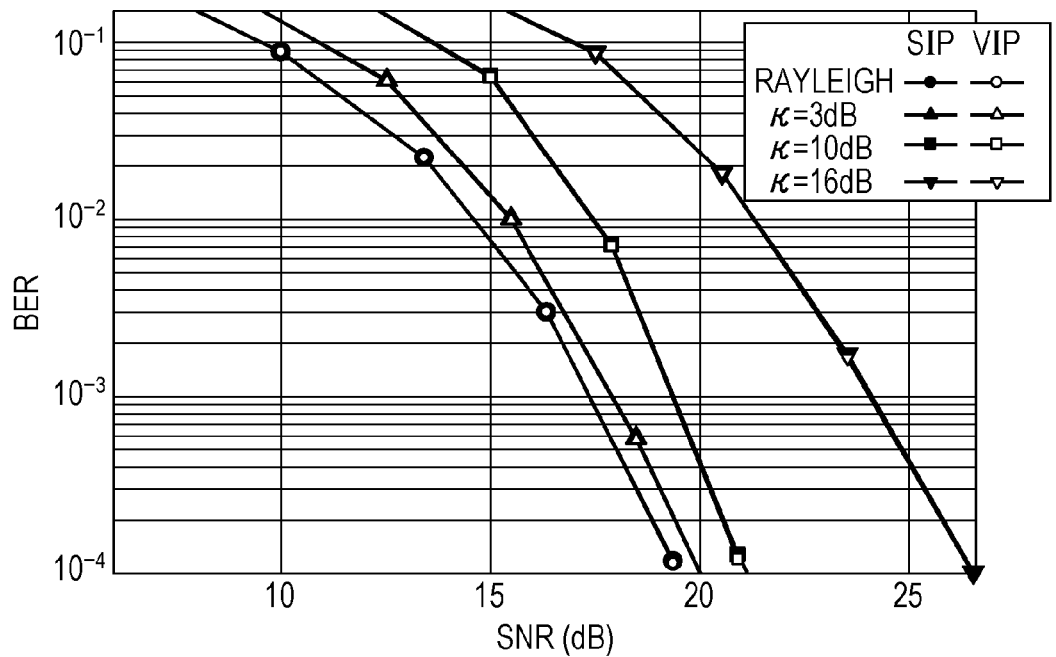
FIG. 2A illustrates an example of a BER characteristic.
Figure 2B:
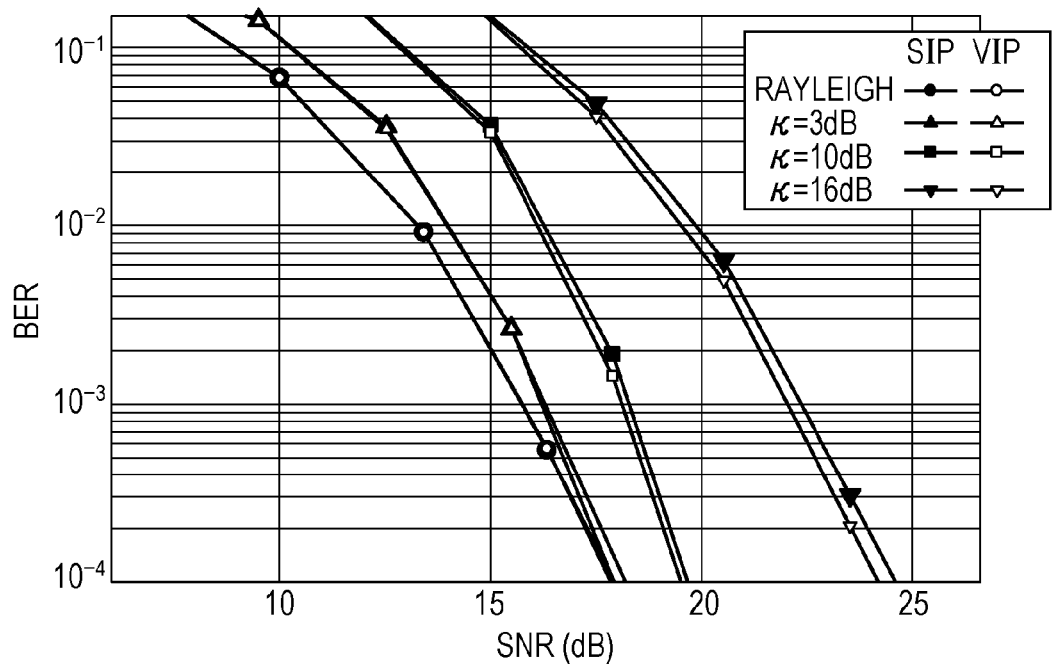
FIG. 2B illustrates an example of the BER characteristic.

At this point, a receiver that performs iterative decoding is considered as illustrated in FIG. 3. The receiver includes an outer soft-in/soft-out decoder and a MIMO detector. The vector of a logarithmic likelihood ratio (L-value) in FIG. 1 is expressed by Equations (3) to (5).

[Mathematical formula 3]

$$L(u) = (L(u_1), \ldots, L(u_{N_t}))^T \quad \text{Equation (3)}$$

[Mathematical formula 4]

$$L(u_i) = (L(u_{i1}), \ldots, L(u_{iM}))^T \quad \text{Equation (4)}$$

[Mathematical formula 5]

$$L(u_{ij}) = \ln \frac{P(u_{ij} = +1)}{P(u_{ij} = -1)} \quad \text{Equation (5)}$$

<Iterative Detection Method>

Iterative detection of a MIMO signal in the $N_t \times N_r$ spatial multiplexing MIMO system will be described below.

The logarithmic likelihood ratio of $xu_{mn}$ is defined by Equation (6).

[Mathematical formula 6]

$$L(u_{mn} \mid y) = \ln \frac{P(u_{mn} = +1 \mid y)}{P(u_{mn} = -1 \mid y)} \quad \text{Equation (6)}$$

From Bayes' theorem, Equation (6) can be expressed as Equation (7).

[Mathematical formula 7]

$$L(u_{mn} \mid y) = \ln \frac{p(y \mid u_{mn} = +1) P(u_{mn} = +1)/p(y)}{p(y \mid u_{mn} = -1) P(u_{mn} = -1)/p(y)} \quad \text{Equation (7)}$$
$$= \ln \frac{P(u_{mn} = +1)}{P(u_{mn} = -1)} + \ln \frac{p(y \mid u_{mn} = +1)}{p(y \mid u_{mn} = -1)}$$
$$= \ln \frac{P(u_{mn} = +1)}{P(u_{mn} = -1)} + \ln \frac{\sum_{U_{mn,+1}} p(y \mid u) p(u \mid u_{mn})}{\sum_{U_{mn,-1}} p(y \mid u) p(u \mid u_{mn})}$$

Where $U_{mn,\pm 1} = \{u \mid u_{mn} = \pm 1\}$. When approximating $\ln \sum a_j \sim \max \ln a_j$, Equation (7) can be approximated by Equation (8). The above symbol "~" means approximation.

[Mathematical formula 8]

$$L(u_{mn} \mid y) \approx \quad \text{Equation (8)}$$
$$\ln \frac{P(u_{mn} = +1)}{P(u_{mn} = -1)} + \max_{U_{mn,+1}} \{\ln p(y \mid u) + P(u \mid u_{mn})\} -$$
$$\max_{U_{mn,-1}} \{\ln p(y \mid u) + P(u \mid u_{mn})\}$$

$P(u \mid u_{mn})$ and $\ln P(u \mid u_{mn})$ in Equation (8) are expressed by Equations (9), (10), and (11).

[Mathematical formula 9]

$$P(u \mid u_{mn}) = \prod_{(ij) \neq (mn)} P(u_{ij}) \quad \text{Equation (9)}$$
$$= \prod_{(ij) \neq (mn)} \frac{\exp\left(\frac{u_{ij} L(u_{ij})}{2}\right)}{\exp\left(\frac{L(u_{ij})}{2}\right) + \exp\left(-\frac{L(u_{ij})}{2}\right)}$$

[Mathematical formula 10]

$$\ln P(u \mid u_{mn}) = \left(\sum_{ij} \ln P(u_{ij})\right) - \ln P(u_{mn}) \quad \text{Equation (10)}$$

[Mathematical formula 11]

$$\ln P(u_{ij}) = \frac{1}{2} u_{ij} P(u_{ij}) - \ln\left(\exp\left(\frac{L(u_{ij})}{2}\right) + \exp\left(-\frac{L(u_{ij})}{2}\right)\right) \quad \text{Equation (11)}$$
$$\approx \frac{1}{2} u_{ij} L(u_{ij}) - \frac{1}{2} |L(u_{ij})| \text{ for } |L(u_{ij})| > 2$$
$$= \left|\frac{L(u_{ij})}{2}\right| (u_{ij} \text{sign}(L(u_{ij})) - 1)$$

A logarithmic probability of the equation defined in Equation (2) is expressed by Equation (12).

[Mathematical formula 12]

$$\ln P(y\mid u) = -\frac{N_r}{2}\ln(2\pi\sigma^2) - \frac{1}{2\sigma^2}\|y - Hs(u)\|^2 \quad \text{Equation (12)}$$

Accordingly, from Equations (7) and (12), in MAP or APP (A Posteriori Probability), the a posteriori L-value is expressed by Equation (13).

[Mathematical formula 13]

$$L(u_{mn}\mid y) = \ln \frac{\sum_{U_{mn,+1}} \exp\left\{-\frac{1}{2\sigma^2}\|y - Hs(u)\|^2 + \sum_{ij}\ln P(u_{ij})\right\}}{\sum_{U_{mn,-1}} \exp\left\{-\frac{1}{2\sigma^2}\|y - Hs(u)\|^2 + \sum_{ij}\ln P(u_{ij})\right\}} \quad \text{Equation (13)}$$

Hereinafter, this is referred to as iterative APP decoding. From Equations (8) and (12), in the logarithmic likelihood ratio utilizing Max-Log approximation (Max-Log APP), the a posteriori L-value is expressed by Equation (14).

[Mathematical formula 14]

$$L(u_{mn}\mid y) \approx \max_{U_{mn,+1}}\{\Psi(u, y, L(u))\} - \max_{U_{mn,-1}}\{\Psi(u, y, L(u))\} \quad \text{Equation (14)}$$

[Mathematical formula 15]

$$\Psi(u, y, L(u)) = -\frac{1}{2\sigma^2}\|y - Hs(u)\|^2 + \sum_{ij}\ln P(u_{ij}) \quad \text{Equation (15)}$$

Hereinafter, this is referred to as iterative Max-log APP decoding. External information necessary for an iterative decoding system can be obtained by subtracting prior inputs from Equations (13) and (14).

<System Model>

FIG. 1 illustrates a basic configuration of a system related to the subsequent description. The system in FIG. 1 is a 2×2 spatial multiplexing MIMO system. There is an outer encoder for each of streams A and B, and the two outer encoders are an identical LDPC encoder. In this case, the configuration in which the LDPC encoder is used as the outer encoder by way of an example. However, the error correction coding used in the outer encoder is not limited to the LDPC coding. The present disclosure may similarly be embodied using other pieces of error correction coding such as turbo coding, convolutional coding, and LDPC convolutional coding. The outer encoder is provided in each transmit antenna, but the outer encoder is not limited to the configuration in FIG. 1. Alternatively, a plurality of transmit antennas may be used, and only one outer encoder may be used. Additionally, the outer encoders may be provided more than the transmit antenna in number. Streams A and B have interleavers ($\pi_a$ and $\pi_b$), respectively. In this case, the modulation scheme is set to $2^h$-QAM (h bits are transmitted by one symbol).

It is assumed that the receiver performs iterative detection of the MIMO signal (iterative APP (or iterative Max-log APP) decoding). For example, it is assumed that an LDPC code is decoded by sum-product decoding.

Figure 4:
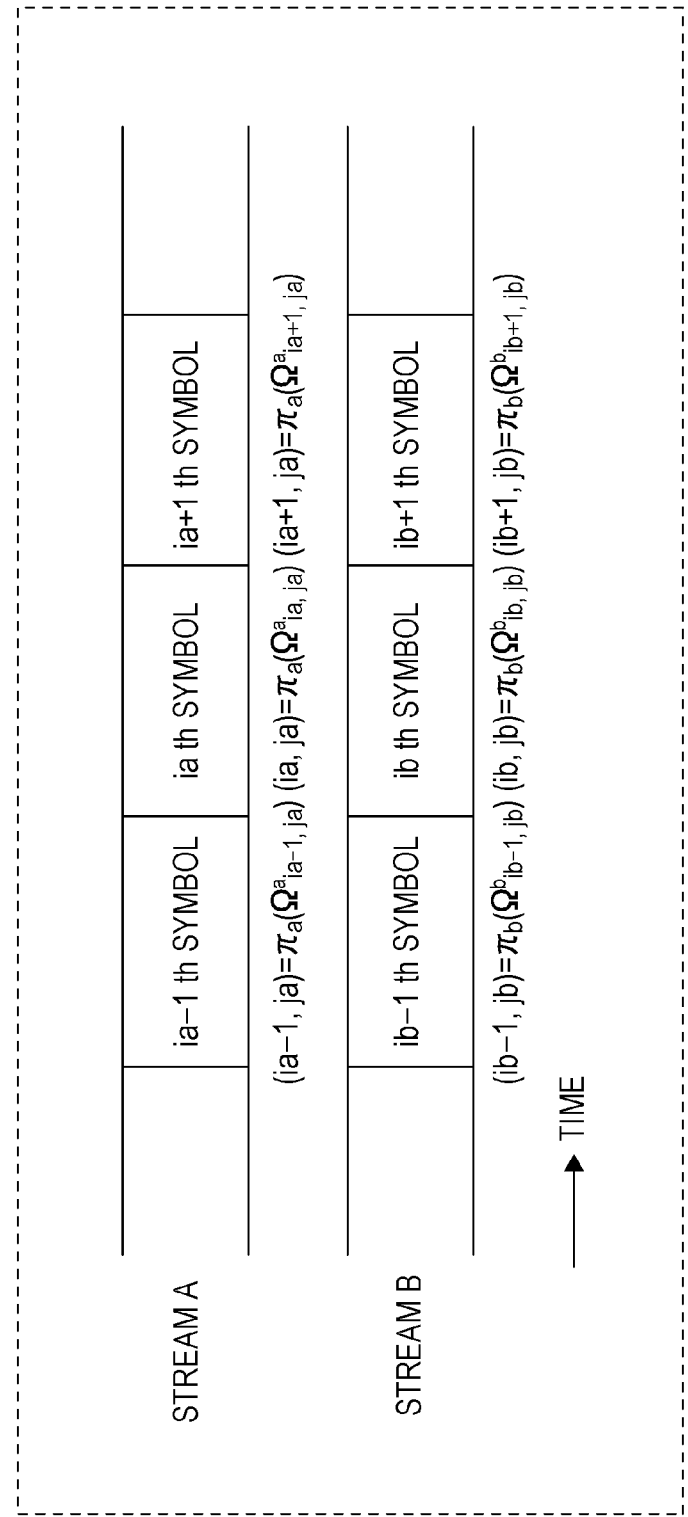
FIG. 4 illustrates an example of a frame structure.

FIG. 4 illustrates a frame structure, and the order of the interleaved symbols. At this point, it is assumed that $(i_a, j_a)$, $(i_b, j_b)$ are represented by Equations (16) and (17).

[Mathematical formula 16]

$$(i_a, j_a) = \pi_a(\Omega_{i_a, j_a}{}^a) \quad \text{Equation (16)}$$

[Mathematical formula 17]

$$(i_b, j_b) = \pi_b(\Omega_{i_b, j_b}{}^a) \quad \text{Equation (17)}$$

Where $i^a$ and $i^b$ indicate the order of the interleaved symbols, $j^a$ and $j^b$ indicate the bit positions ($j^a, j^b = 1, \ldots, h$) in the modulation scheme, $\pi^a$ and $\pi^b$ indicate the interleavers for streams A and B, and $\Omega_{i_a, j_a}{}^a$ and $\Omega_{i_b, j_b}{}^b$ indicate the order of pieces of pre-interleaving data in streams A and B. FIG. 4 illustrates the frame structure for $i_1 = i_b$.

<Iterative Decoding>

An iterative detection algorithms for sum-product decoding and MIMO signal, which are used to decode an LDPC code of the receiver, will be described in detail below.

Sum-Product Decoding

It is assumed that two-dimensional M×N matrix $H = \{H_{mn}\}$ is a check matrix for the LDPC code of a decoding target. Subsets A(m) and B(n) of the set $[1, N] = \{1, 2, \ldots, N\}$ are defined by Equations (18) and (19).

[Mathematical formula 18]

$$A(m) \equiv \{n: H_{mn} = 1\} \quad \text{Equation (18)}$$

[Mathematical formula 19]

$$B(n) \equiv \{m: H_{mn} = 1\} \quad \text{Equation (19)}$$

Where A(m) indicates a set of column indices of 1 in the m-th column of check matrix H, and B(n) represents a set of row indices of 1 in the n-th row of check matrix H. The sum-product decoding algorithm is as follows.

Step A·1 (initialization): A prior value logarithmic ratio $\beta_{mn}$ is set to 0 for all combinations (m, n) satisfying $H_{mn} = 1$. Loop variable (the number of iterations) $I_{sum} =$ is set to 1, and the maximum number of loops is set to $I_{sum,max}$.

Step A·2 (row processing): Using update Equations (20), (21), and (22), exterior value logarithmic ratio $\alpha_{mn}$ is updated for all combinations (m, n) satisfying $H_{mn} = 1$ in the order of $m = 1, 2, \ldots, M$.

[Mathematical formula 20]

$$\alpha_{mn} = \left(\prod_{n' \in A(m)\setminus n} \text{sign}(\lambda_{n'} + \beta_{mn'})\right) \times f\left(\sum_{n' \in A(m)\setminus n} f(\lambda_{n'} + \beta_{mn'})\right) \quad \text{Equation (20)}$$

[Mathematical formula 21]

$$\text{sign}(x) \equiv \begin{cases} 1 & x \geq 0 \\ -1 & x < 0 \end{cases} \quad \text{Equation (21)}$$

[Mathematical formula 22]

$$f(x) \equiv \ln\frac{\exp(x) + 1}{\exp(x) - 1} \quad \text{Equation (22)}$$

Where f indicates a Gallager function. A method for seeking $\lambda_n$ is described in detail later.

Step A·3 (column processing): Using Equation (23), exterior value logarithmic ratio $\beta_{mn}$ is updated for all combinations (m, n) satisfying $H_{mn}=1$ in the order of n=1, 2, ..., N.

[Mathematical formula 23]

$$\beta_{mn} = \sum_{m' \in B(n) \backslash m} \alpha_{m'n} \qquad \text{Equation (23)}$$

Step A·4 (calculation of logarithmic likelihood ratio): Logarithmic likelihood ratio $L_n$ for n ∈ [1,N] is obtained by Equation (24).

[Mathematical formula 24]

$$L_n = \sum_{m' \in B(n) \backslash m} \alpha_{m'n} + \lambda_n \qquad \text{Equation (24)}$$

Step A·5 (count of the number of iterations): if $I_{sum} < I_{sum,max}$, $I_{sum}$ is incremented, and processing returns to Step A·2. If $I_{sum} = I_{sum,max}$, the sum-product decoding in this round is finished.

The operation in one sum-product decoding is described above. Then the iterative detection of the MIMO signal is performed. In variables m, n, $\alpha_{mn}$, and $\beta_{mn}$, $\lambda_n$, and $L_n$ used in the above description for the operation of the sum-product decoding, it is assumed that the variables are indicated by $m_a$, $n_a$, $\alpha_{mana}$, $\beta_{mana}$, $\lambda_{na}$, and $L_{na}$ in stream A, and that the variables are indicated by $m_b$, $n_b$, $\alpha^{mbnb}$, $\beta^{mbnb}$, $\lambda_{nb}$, and $L_{nb}$ in stream B.

<Iterative Detection of MIMO Signal>

A method for seeking $\lambda_n$ in the iterative detection of the MIMO signal will be described in detail.

Equation (25) holds from Equation (1).

[Mathematical formula 25]

$$y(t) = (y_1(t), y_2(t))^T \qquad \text{Equation (25)}$$
$$= H_{22}(t)s(t) + n(t)$$

The following relational expressions hold from the frame structures in FIG. 4 and Equations (16) and (17).

[Mathematical formula 26]

$$n_a = \Omega_{ia,ja}^{a} \qquad \text{Equation (26)}$$

[Mathematical formula 27]

$$n_b = \Omega_{ib,jb}^{b} \qquad \text{Equation (27)}$$

Where $n_a, n_b \in [1, N]$. Hereinafter, $\lambda_{na}$, $L_{na}$, $\lambda_{nb}$, and $L_{nb}$, where the number of iterations of iterative MIMO signal detection is k, are indicated as $\lambda_{k,na}$, $L_{k,na}$, $\lambda_{k,nb}$, and $L_{k,nb}$.

Step B·1 (initial detection; k=0): In initial detection, $\lambda_{0,na}$ and $\lambda_{0,nb}$ are obtained by Equations (28), (29), and (30).

In iterative APP decoding:

[Mathematical formula 28]

$$\lambda_{0,n_X} = \ln \frac{\sum_{U_{0,n_X,+1}} \exp\left\{-\frac{1}{2\sigma^2} \|y(i_X) - H_{22}(i_X)s(u(i_X))\|^2\right\}}{\sum_{U_{0,n_X,-1}} \exp\left\{-\frac{1}{2\sigma^2} \|y(i_X) - H_{22}(i_X)s(u(i_X))\|^2\right\}} \qquad \text{Equation (28)}$$

In iterative Max-log APP decoding:

[Mathematical formula 29]

$$\lambda_{0,n_X} = \max_{U_{0,n_X,+1}} \{\Psi(u(i_X), y(i_X))\} - \max_{U_{0,n_X,-1}} \{\Psi(u(i_X), y(i_X))\} \qquad \text{Equation (29)}$$

[Mathematical formula 30]

$$\Psi(u(i_X), y(i_X)) = -\frac{1}{2\sigma^2} \|y(i_X) - H_{22}(i_X)s(u(i_X))\|^2 \qquad \text{Equation (30)}$$

Where X=a, b. The number of iterations of the iterative detection of the MIMO signal $I_{mimo}$ is set to 0, and the maximum number of iterations is set to $I_{mimo,max}$.

Step B·2 (iterative detection and the number of iterations k): When the number of iterations is k, $\lambda_{k,na}$ and $\lambda_{k,nb}$ are represented by Equations (31) to (34) from Equations (11), (13) to (15), (16), and (17). At this point, (X, Y)=(a, b), (b, a) is obtained.

In the iterative APP decoding:

[Mathematical formula 31]

$$\lambda_{k,n_X} = L_{k-1,\Omega_{iX,jX}^X}\left(u_{\Omega_{iX,jX}^X}\right) + \\ \ln \frac{\sum_{U_{k,n_X,+1}} \exp\left\{-\frac{1}{2\sigma^2} \|y(i_X) - H_{22}(i_X)s(u(i_X))\|^2 + \rho\left(u_{\Omega_{iX,jX}^X}\right)\right\}}{\sum_{U_{k,n_X,-1}} \exp\left\{-\frac{1}{2\sigma^2} \|y(i_X) - H_{22}(i_X)s(u(i_X))\|^2 + \rho\left(u_{\Omega_{iX,jX}^X}\right)\right\}} \qquad \text{Equation (31)}$$

[Mathematical formula 32]

$$\rho\left(u_{\Omega_{iX,jX}^X}\right) = \sum_{\substack{\gamma=1 \\ \gamma \neq jX}}^{h} \left| \frac{L_{k-1,\Omega_{iX,\gamma}^X}\left(u_{\Omega_{iX,\gamma}^X}\right)}{2} \right| \\ \left(u_{\Omega_{iX,\gamma}^X} \operatorname{sign}\left(L_{k-1,\Omega_{iX,\gamma}^X}\left(u_{\Omega_{iX,\gamma}^X}\right)\right) - 1\right) + \\ \sum_{\gamma=1}^{h} \left| \frac{L_{k-1,\Omega_{iX,\gamma}^Y}\left(u_{\Omega_{iX,\gamma}^Y}\right)}{2} \right| \\ \left(u_{\Omega_{iX,\gamma}^Y} \operatorname{sign}\left(L_{k-1,\Omega_{iX,\gamma}^Y}\left(u_{\Omega_{iX,\gamma}^Y}\right)\right) - 1\right) \qquad \text{Equation (32)}$$

In iterative Max-log APP decoding:

[Mathematical formula 33]

$$\lambda_{k,n_X} = L_{k-1,\Omega^X_{iX,jX}}(u_{\Omega^X_{iX,jX}}) + $$
$$\max_{U_{k,n_X,+1}} \{\Psi(u(i_X), y(i_X), \rho(u_{\Omega^X_{iX,jX}}))\} - $$
$$\max_{U_{k,n_X,+1}} \{\Psi(u(i_X), y(i_X), \rho(u_{\Omega^X_{iX,jX}}))\}$$

Equation (33)

[Mathematical formula 34]

$$\Psi(u(i_X), y(i_X), \rho(u_{\Omega^X_{iX,jX}})) = $$
$$-\frac{1}{2\sigma^2}\|y(i_X) - H_{22}(i_X)s(u(i_X))\|^2 + \rho(u_{\Omega^X_{iX,jX}})$$

Equation (34)

Step B•3 (counting of the number of iterations and codeword estimation):

If $I_{mimo} < I_{mimo,max}$, $I_{mimo}$ is incremented, and the processing returns to Step B•2. Letting $I_{mimo} = I_{mimo,max}$ leads to the estimated codeword using Equation (35).

[Mathematical formula 35]

$$\hat{u}_{n_X} = \begin{cases} 1 & L_{l_{mimo},n_X} \geq 0 \\ -1 & L_{l_{mimo},n_X} < 0 \end{cases}$$

Equation (35)

Where X=a, b.

Figure 5:
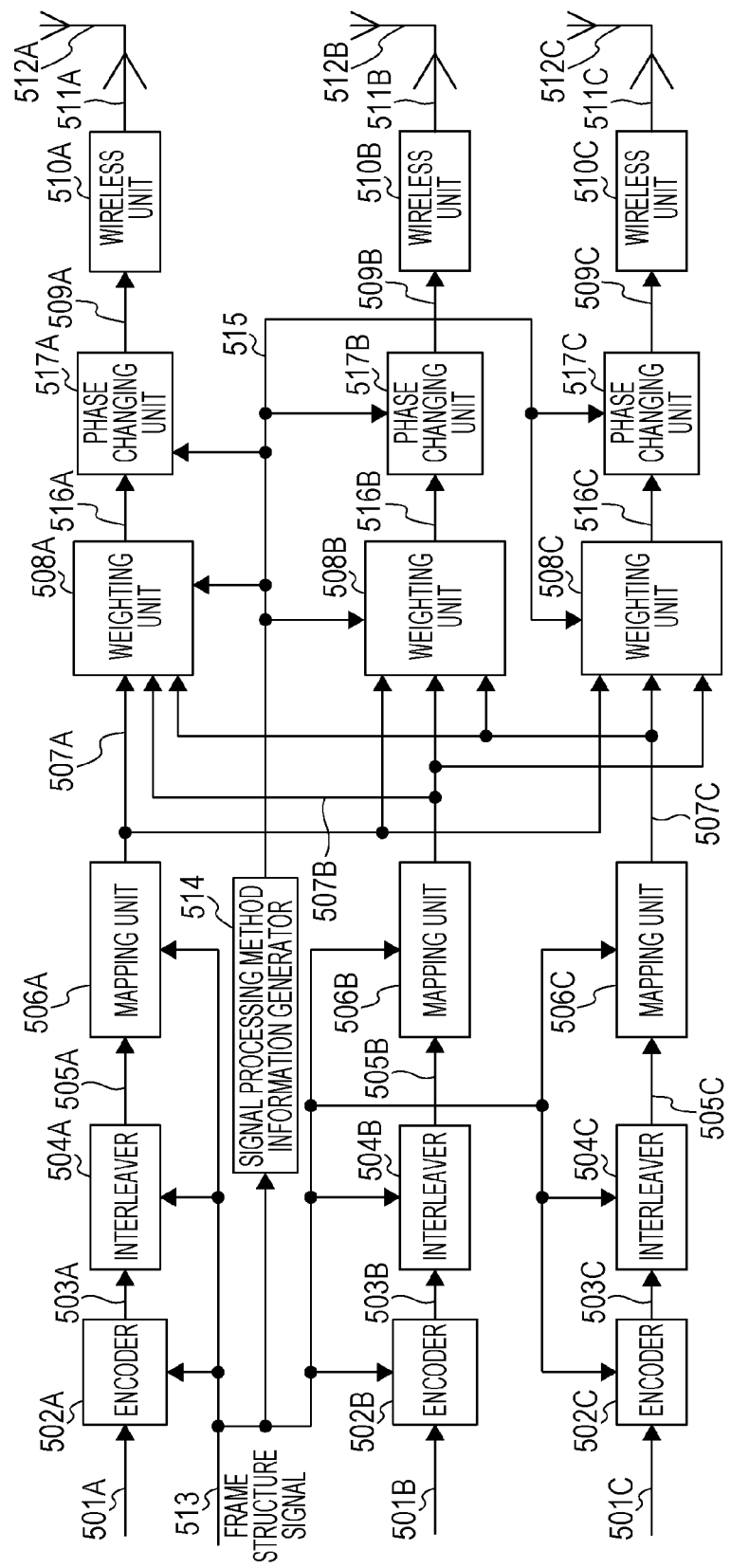
FIG. 5 illustrates a configuration example of a transmission device during application of a phase changing method.

FIG. 5 illustrates a configuration example of transmission device of the first exemplary embodiment. Encoder 502A receives information (data) 501A and frame structure signal 513 as input, performs the error correction coding such as the convolutional coding, the LDPC coding, and the turbo coding according to frame structure signal 513, and outputs encoded data 503A. Frame structure signal 513 includes information such as an error correction scheme used in the error correction coding of the data, a coding rate, a block length, and the like. Encoder 502A uses the error correction scheme indicated by frame structure signal 513. Additionally, the error correction scheme may be switched.

Interleaver 504A receives encoded data 503A and frame structure signal 513 as input, performs interleaving, namely, rearrangement of the order, and outputs interleaved data 505A. (The interleaving method may be switched based on frame structure signal 513.)

Mapping unit 506A receives interleaved data 505A and the frame structure signal 513 as input, performs modulation such as QPSK (Quadrature Phase Shift Keying), 16QAM (16 Quadrature Amplitude Modulation), and 64QAM (64 Quadrature Amplitude Modulation), and outputs baseband signal 507A. (The modulation scheme may be switched based on frame structure signal 513.) The modulation scheme is not limited to the QPSK, 16QAM, and 64QAM, but non-uniform mapping may be performed. That is, plural signal points may exist in an I-Q plane having in-phase component I and quadrature component Q.

Figure 7A:
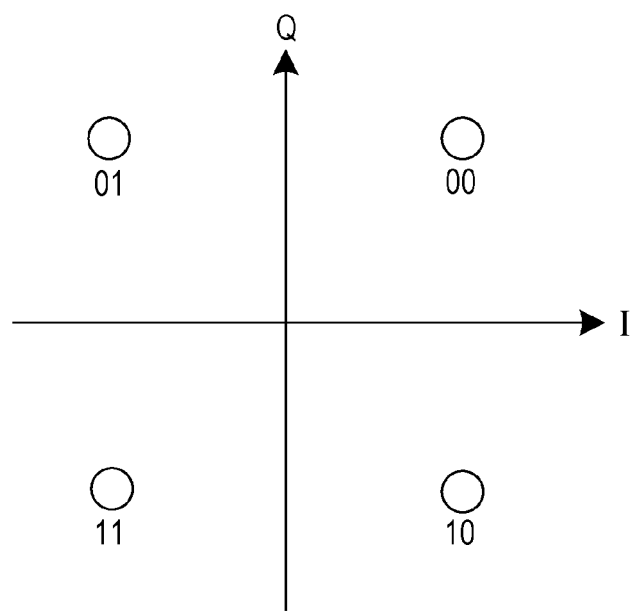
FIG. 7A illustrates an example of the frame structure.
Figure 7B:
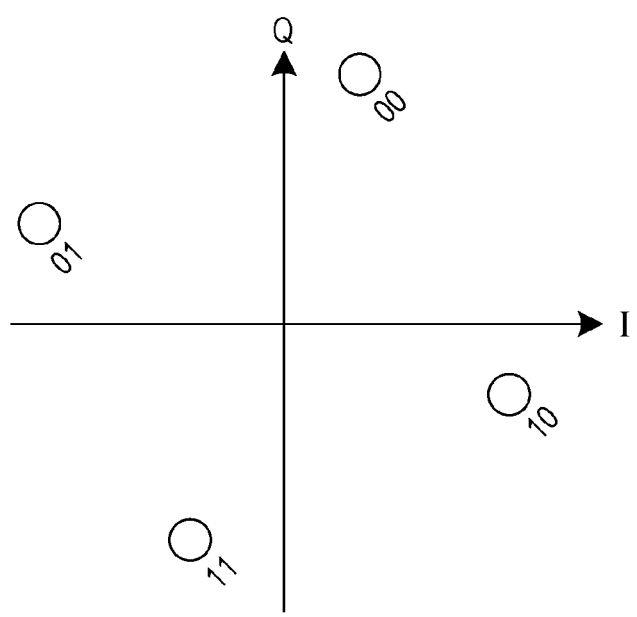
FIG. 7B illustrates an example of the frame structure.

FIG. 7 illustrates an example of a mapping method on the I-Q plane having in-phase component I and quadrature component Q. In-phase component I and quadrature component Q form the baseband signal in the QPSK modulation. For example, as illustrated in FIG. 7A, I=1.0 and Q=1.0 are output for the input data "00". Similarly, I=−1.0 and Q=1.0 are output for the input data "01". FIG. 7B is an example of a mapping method on the I-Q plane for the QPSK modulation different from that in FIG. 7A. The mapping method in FIG. 7B differs from the mapping method in FIG. 7A in that the signal point in FIG. 7A is rotated about an origin to obtain the signal point in FIG. 7B. NPLs 6 and 7 describe the method for rotating the constellation, and Cyclic Q Delay described in NPLs 6 and 7 may also be applied.

Figure 8A:
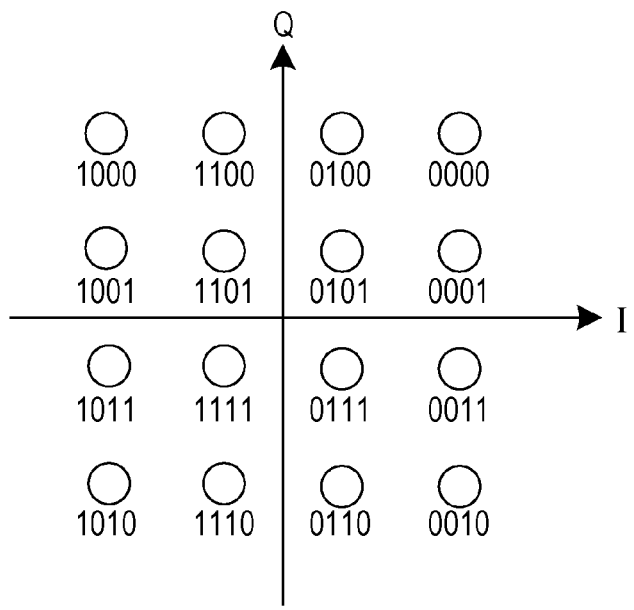
FIG. 8A illustrates an example of the phase changing method.
Figure 8B:
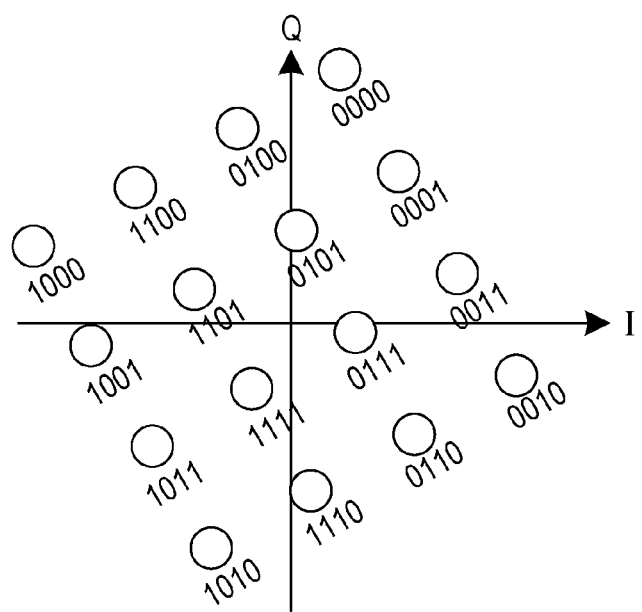
FIG. 8B illustrates an example of the phase changing method.

FIG. 8 illustrates a signal point disposition in the I-Q plane for the 16QAM as another example except for FIG. 7. FIG. 8A illustrates an example corresponding to FIG. 7A, and FIG. 8B illustrates an example corresponding to FIG. 7B.

Encoder 502B receives information (data) 501B and frame structure signal 513 as input and, performs the error correction coding such as the convolutional coding, the LDPC coding, and the turbo coding according to the frame structure signal 513, and outputs encoded data 503B. Frame structure signal 513 includes information such as the error correction scheme used, the coding rate, and the block length. The error correction scheme indicated by frame structure signal 513 is used. Additionally, the error correction scheme may be switched.

Interleaver 504B receives encoded data 503B and frame structure signal 513 as input, performs the interleaving, namely, the rearrangement of the order, and outputs interleaved data 505B. (The interleaving method may be switched based on frame structure signal 513.) The modulation scheme is not limited to the QPSK, 16QAM, and 64QAM, but non-uniform mapping may be performed. That is, plural signal points may exist in the I-Q plane.

Mapping unit 506B receives interleaved data 505B and frame structure signal 513 as input, performs the modulation such as QPSK (Quadrature Phase Shift Keying), 16QAM (16 Quadrature Amplitude Modulation), and 64QAM (64 Quadrature Amplitude Modulation), and outputs baseband signal 507B. (The modulation scheme may be switched based on frame structure signal 513.)

Encoder 502C receives information (data) 501C and frame structure signal 513 as input and, performs the error correction coding such as the convolutional coding, the LDPC coding, and the turbo coding according to the frame structure signal 513, and outputs encoded data 503C. Frame structure signal 513 includes information such as the error correction scheme used, the coding rate, and the block length. The error correction scheme indicated by frame structure signal 513 is used. Additionally, the error correction scheme may be switched.

Interleaver 504C receives encoded data 503C and frame structure signal 513 as input, performs the interleaving, namely, the rearrangement of the order, and outputs interleaved data 505C. (The interleaving method may be switched based on frame structure signal 513.) The modulation scheme is not limited to the QPSK, 16QAM, and 64QAM, but non-uniform mapping may be performed. That is, plural signal points may exist in the I-Q plane.

Mapping unit 506C receives interleaved data 505C and frame structure signal 513 as input, performs the modulation such as QPSK (Quadrature Phase Shift Keying), 16QAM (16 Quadrature Amplitude Modulation), and 64QAM (64 Quadrature Amplitude Modulation), and outputs baseband signal 507C. (The modulation scheme may be switched based on frame structure signal 513.)

Signal processing method information generator 514 receives frame structure signal 513 as input, and outputs information 515 on a signal processing method based on frame structure signal 513. Information 515 on the signal processing method includes information designating which one of precoding matrices is fixedly used and information on a phase changing pattern changing a phase.

Weighting unit 508A receives baseband signals 507A, 507B, and 507C and information 515 on the signal processing method as input, performs weighting on baseband signal 507A, baseband signal 507B, and baseband signal 507C based on information 515 on the signal processing method, and outputs weighted signal 516A. The weighting method is described in detail later.

Phase changing unit 517A receives weighted signal 516A and information 515 on the signal processing method as input, and regularly changes and outputs the phase of signal 516A. The term "regularly change" means that the phase is changed according to a predetermined phase changing pattern in a predetermined period (for example, every n symbol (n is an integer of 1 or more), every predetermined time, or every predetermined frequency). The detailed phase changing pattern is described later. (The phase change need not be performed.)

Wireless unit 510A receives post-phase change signal 509A as input, performs pieces of processing such as quadrature modulation, band limiting, frequency conversion, and amplification, and outputs transmission signal 511A. Transmission signal 511A is output as a radio wave from antenna 512A.

Weighting unit 508B receives baseband signal 507A, baseband signal 507B, baseband signal 507C, and information 515 on the signal processing method as input, performs the weighting on baseband signal 507A, baseband signal 507B, and baseband signal 507C based on information 515 on the signal processing method, and outputs weighted signal 512B. The weighting method is described in detail later.

Phase changing unit 517B receives weighted signal 516B and information 515 on the signal processing method as input, and regularly changes and outputs the phase of signal 516B. The term "regularly change" means that the phase is changed according to a predetermined phase changing pattern in a predetermined period (for example, every n symbol (n is an integer of 1 or more) or every predetermined time). The detailed phase changing pattern is described later. (The phase change need not be performed.)

Wireless unit 510B receives post-phase change signal 509B as input, performs pieces of processing such as the quadrature modulation, the band limiting, the frequency conversion, and the amplification, and outputs transmission signal 511B. Transmission signal 511B is output as a radio wave from antenna 512B.

Weighting unit 508C receives baseband signal 507A, baseband signal 507B, baseband signal 507C, and information 515 on the signal processing method as input, performs the weighting on baseband signal 507A, baseband signal 507B, and baseband signal 507C based on information 515 on the signal processing method, and outputs weighted signal 512C. The weighting method is described in detail later.

Phase changing unit 517C receives weighted signal 516C and information 515 on the signal processing method as input, and regularly changes and outputs the phase of signal 516C. The term "regularly change" means that the phase is changed according to a predetermined phase changing pattern in a predetermined period (for example, every n symbol (n is an integer of 1 or more) or every predetermined time). The detailed phase changing pattern is described later. (The phase change need not be performed.)

Wireless unit 510C receives post-phase change signal 509C as input, performs pieces of processing such as the quadrature modulation, the band limiting, the frequency conversion, and the amplification, and outputs transmission signal 511C. Transmission signal 511C is output as a radio wave from antenna 512C.

Figure 9:
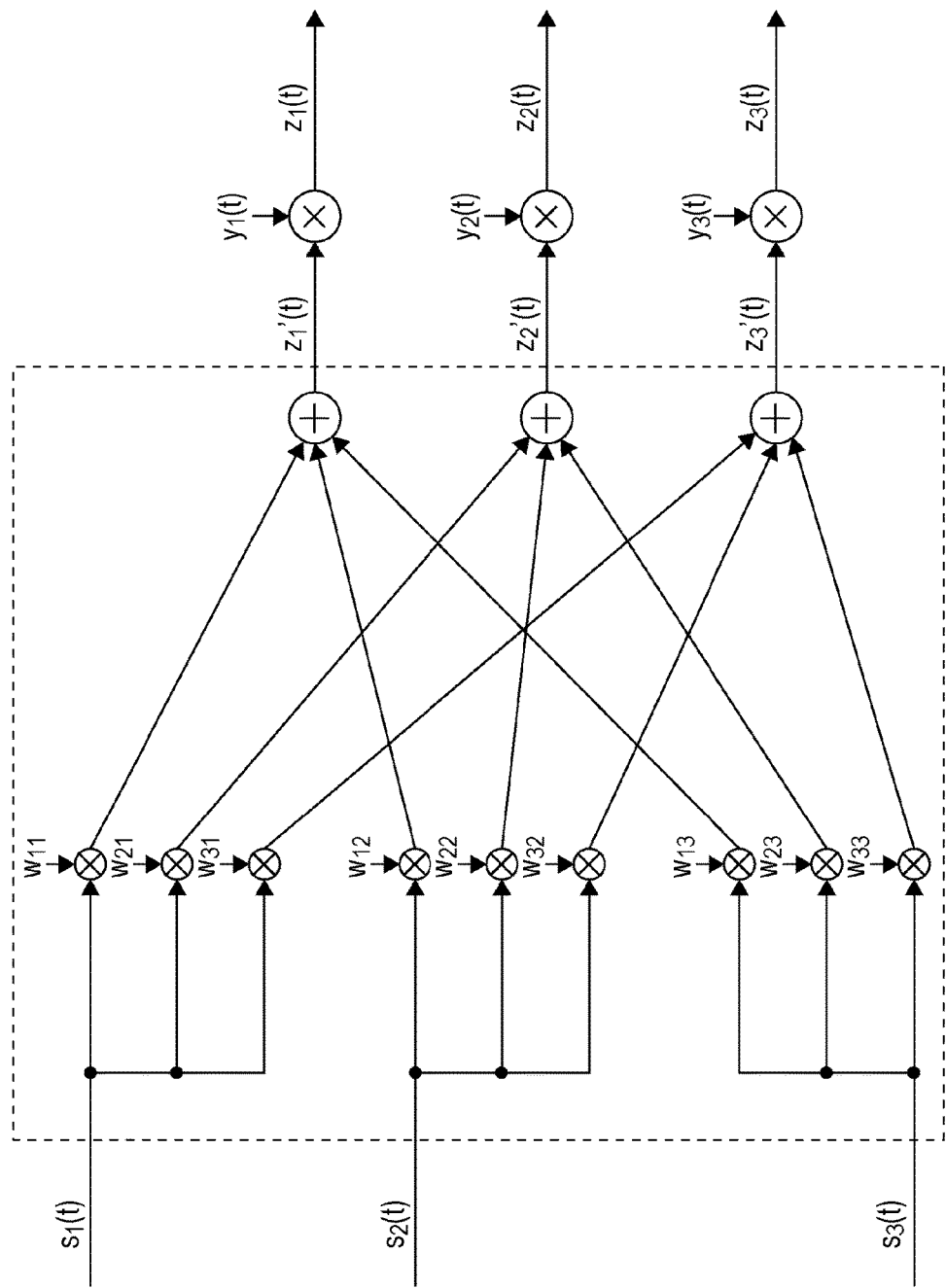
FIG. 9 illustrates a configuration example of a reception device.

FIG. 9 illustrates configurations of the weighting unit (508A, 508B, and 508C) and the phase changing unit (517A, 517B, and 517C). An area surrounded by a dotted line in FIG. 9 constitutes the weighting unit, and a subsequent stage of the weighting unit constitutes the phase changing unit. Weighting units 508A, 508B, and 508C in FIG. 5 are collectively illustrated as the weighting unit in FIG. 9. Phase changing units 517A, 517B, and 517C in FIG. 5 are collectively illustrated as the phase changing unit in FIG. 9.

Baseband signal 507A is multiplied by $w_{11}$ to generate $w_{11} \times s_1(t)$, baseband signal 507A is multiplied by $w_{21}$ to generate $w_{21} \times s_1(t)$, and baseband signal 507A is multiplied by $w_{31}$ to generate $w_{31} \times s_1(t)$.

Similarly, baseband signal 507B is multiplied by $w_{12}$ to generate $w_{12} \times s_2(t)$, baseband signal 507B is multiplied by $w_{22}$ to generate $w_{22} \times s_2(t)$, and baseband signal 507B is multiplied by $w_{32}$ to generate $w_{32} \times s_2(t)$.

Similarly, baseband signal 507C is multiplied by $w_{13}$ to generate $w_{13} \times s_3(t)$, baseband signal 507C is multiplied by $w_{23}$ to generate $w_{23} \times s_3(t)$, and baseband signal 507C is multiplied by $w_{33}$ to generate $w_{33} \times s_3(t)$.

At this point, as can be seen from the above description, $s_1(t)$, $s_2(t)$, and $s_3(t)$ constitute the baseband signal (post-mapping baseband signal) of the modulation scheme such as the BPSK (Binary Phase Shift Keying), the QPSK, the 8PSK (8 Phase Shift Keying), the 16QAM, the 32QAM (32 Quadrature Amplitude Modulation), the 64QAM, the 256QAM, and the 16APSK (16 Amplitude Phase Shift Keying).

For example, it is assumed that the weighting unit performs the weighting using the fixed precoding matrix. At this point, the precoding matrix is expressed by Equation (36).

[Mathematical formula 36]

$$\begin{pmatrix} w_{11} & w_{12} & w_{13} \\ w_{21} & w_{22} & w_{23} \\ w_{31} & w_{32} & w_{33} \end{pmatrix} = \begin{pmatrix} a_{11} & a_{12} & a_{13} \\ a_{21} & a_{22} & a_{23} \\ a_{31} & a_{32} & a_{33} \end{pmatrix} \qquad \text{Equation (36)}$$

Where $a_{11}$ is a complex number (may be a real number), $a_{12}$ is a complex number (may be a real number), $a_{13}$ is a complex number (may be a real number), $a_{21}$ is a complex number (may be a real number), $a_{22}$ is a complex number (may be a real number), $a_{23}$ is a complex number (may be a real number), $a_{31}$ is a complex number (may be a real number), $a_{32}$ is a complex number (may be a real number), and $a_{33}$ is a complex number (may be a real number). Accordingly, $a_{xy} = A_{xy} e^{j\delta_{xy}}$ is obtained. (Where j is an imaginary unit, $A_{xy}$ is a real number of 0 or more, and $\delta_{xy}$ is an argument. x may be one of values 1, 2, and 3 and y may be one of values 1, 2, and 3.)

All $a_{11}$, $a_{12}$, and $a_{13}$ do not become 0 (zero), all $a_{21}$, $a_{22}$, and $a_{23}$ do not become 0 (zero), and all $a_{31}$, $a_{32}$, and $a_{33}$ do not become 0 (zero). All $a_{11}$, $a_{21}$, and $a_{31}$ do not become 0 (zero), all $a_{12}$, $a_{22}$, and $a_{32}$ do not become 0 (zero), and all $a_{13}$, $a_{23}$, and $a_{33}$ do not become 0 (zero).

Accordingly, in FIG. 9, Equation (37) holds when the weighted (post-precoding) signals are set to $z_1'(t)$ (corresponding to 516A in FIG. 5), $z_2'(t)$ (corresponding to 516B in FIG. 5), and $z_3'(t)$ (corresponding to 516C in FIG. 5).

[Mathematical formula 37]

$$\begin{pmatrix} z_1'(t) \\ z_2'(t) \\ z_3'(t) \end{pmatrix} = \begin{pmatrix} w_{11} & w_{12} & w_{13} \\ w_{21} & w_{22} & w_{23} \\ w_{31} & w_{32} & w_{33} \end{pmatrix} \begin{pmatrix} s_1(t) \\ s_2(t) \\ s_3(t) \end{pmatrix}$$
$$= \begin{pmatrix} a_{11} & a_{12} & a_{13} \\ a_{21} & a_{22} & a_{23} \\ a_{31} & a_{32} & a_{33} \end{pmatrix} \begin{pmatrix} s_1(t) \\ s_2(t) \\ s_3(t) \end{pmatrix}$$

Equation (37)

For example, the precoding matrix may be switched by the modulation scheme (or a set of modulation schemes (in FIG. 5, a set of three modulation schemes)), the error correction coding scheme (for example, the error correction code used, or a code length (block length) of an error correction code, and a coding rate of the error correction code).

In the above example, the fixed precoding matrix is used as the precoding matrix by way of example. Alternatively, for example, the precoding matrix may be switched by time. At this point, the precoding matrix is expressed by Equation (38).

[Mathematical formula 38]

$$\begin{pmatrix} w_{11} & w_{12} & w_{13} \\ w_{21} & w_{22} & w_{23} \\ w_{31} & w_{32} & w_{33} \end{pmatrix} = \begin{pmatrix} a_{11}(t) & a_{12}(t) & a_{13}(t) \\ a_{21}(t) & a_{22}(t) & a_{23}(t) \\ a_{31}(t) & a_{32}(t) & a_{33}(t) \end{pmatrix}$$

Equation (38)

Where $a_{11}(t)$ is a complex number (may be a real number), $a_{12}(t)$ is a complex number (may be a real number), $a_{13}(t)$ is a complex number (may be a real number), $a_{21}(t)$ is a complex number (may be a real number), $a_{22}(t)$ is a complex number (may be a real number), $a_{23}(t)$ is a complex number (may be a real number), $a_{31}(t)$ is a complex number (may be a real number), $a_{32}(t)$ is a complex number (may be a real number), and $a_{33}(t)$ is a complex number (may be a real number). Accordingly, $a_{xy}(t) = A_{xy}(t)e^{j\delta_{xy}(t)}$ is obtained. (Where j is an imaginary unit, $A_{xy}(t)$ is a real number of 0 or more, and $\delta_{xy}(t)$ is an argument. x may be one of values 1, 2, and 3 and y may be one of values 1, 2, and 3.)

All $a_{11}(t)$, $a_{12}(t)$, and $a_{13}(t)$ do not become 0 (zero), all $a_{21}(t)$, $a_{22}(t)$, and $a_{23}(t)$ do not become 0 (zero), and all $a_{31}(t)$, $a_{32}(t)$, and $a_{33}(t)$ do not become 0 (zero). All $a_{11}(t)$, $a_{21}(t)$, and $a_{31}(t)$ do not become 0 (zero), all $a_{12}(t)$, $a_{22}(t)$, and $a_{32}(t)$ do not become 0 (zero), and all $a_{13}(t)$, $a_{23}(t)$, and $a_{33}(t)$ do not become 0 (zero).

Although the function of time t is used in Equation (38), a function of frequency (carrier) f or a function of both time t and frequency (carrier) f may be used. (The precoding matrix of Equation (38) is not limited to these functions.)

As illustrated in FIG. 9, weighted (post-precoding) signal $z_1'(t)$ (corresponding to 516A in FIG. 5) is subjected to the phase change to obtain post-phase change signal $z_1(t)$ (corresponding to 509A in FIG. 5). At this point, assuming that $y_1(t)$ is a phase change value, post-phase change signal $z_1(t)$ (corresponding to 509A in FIG. 5) is expressed by Equation (39).

[Mathematical formula 39]

$$z_1(t) = y_1(t) \times z_1'(t)$$

Equation (39)

Where $y_1(t)$ is expressed as $B_1 \times e^{j\theta_1(t)}$ or $e^{j\theta_1(t)}$. It is assumed that $B_1$ is a real number of 0 or more, and that $\theta_1(t)$ is an argument and is the function of time t. However, $\theta_1$ is not limited to the function of time t. For example, the function of frequency (carrier) f or the function of both time t and frequency (carrier) f may be used. ($\theta_1$ is not limited to these functions.)

$y_1(t)$ is regularly changed. The term "regularly change" means that the phase is changed according to a predetermined phase changing pattern in a predetermined period (for example, every n symbol (n is an integer of 1 or more) or every predetermined time). The detailed phase changing pattern is described later. (The phase change need not be performed.)

As illustrated in FIG. 9, weighted (post-precoding) signal $z_2'(t)$ (corresponding to 516B in FIG. 5) is subjected to the phase change to obtain post-phase change signal $z_2(t)$ (corresponding to 509B in FIG. 5). At this point, assuming that $y_2(t)$ is a phase change value, post-phase change signal $z_2(t)$ (corresponding to 509B in FIG. 5) is expressed by Equation (40).

[Mathematical formula 40]

$$z_2(t) = y_2(t) \times z_2'(t)$$

Equation (40)

Where $y_2(t)$ is expressed as $B_2 \times e^{j\theta_2(t)}$ or $e^{j\theta_2(t)}$. It is assumed that $B_2$ is a real number of 0 or more, and that $\theta_2(t)$ is an argument and is the function of time t. However, $\theta_2$ is not limited to the function of time t. For example, the function of frequency (carrier) f or the function of both time t and frequency (carrier) f may be used. ($\theta_2$ is not limited to these functions.)

$y_2(t)$ is regularly changed. The term "regularly change" means that the phase is changed according to a predetermined phase changing pattern in a predetermined period (for example, every n symbol (n is an integer of 1 or more) or every predetermined time). The detailed phase changing pattern is described later. (The phase change need not be performed.)

As illustrated in FIG. 9, weighted (post-precoding) signal $z_3'(t)$ (corresponding to 516C in FIG. 5) is subjected to the phase change to obtain post-phase change signal $z_3(t)$ (corresponding to 509C in FIG. 5). At this point, assuming that $y_3(t)$ is a phase changing value, post-phase change signal $z_3(t)$ (corresponding to 509C in FIG. 5) is expressed by Equation (41).

[Mathematical formula 41]

$$z_3(t) = y_3(t) \times z_3'(t)$$

Equation (41)

Where $y_3(t)$ is expressed as $B_3 \times e^{j\theta_3(t)}$ or $e^{j\theta_3(t)}$. It is assumed that $B_3$ is a real number of 0 or more, and that $\theta_3(t)$ is an argument and is the function of time t. However, $\theta_3$ is not limited to the function of time t. For example, the function of frequency (carrier) f or the function of both time t and frequency (carrier) f may be used. ($\theta_3$ is not limited to these functions.)

$y_3(t)$ is regularly changed. The term "regularly change" means that the phase is changed according to a predetermined phase changing pattern in a predetermined period (for example, every n symbol (n is an integer of 1 or more) or every predetermined time). The detailed phase changing pattern is described later. (The phase change need not be performed.)

Figure 6:
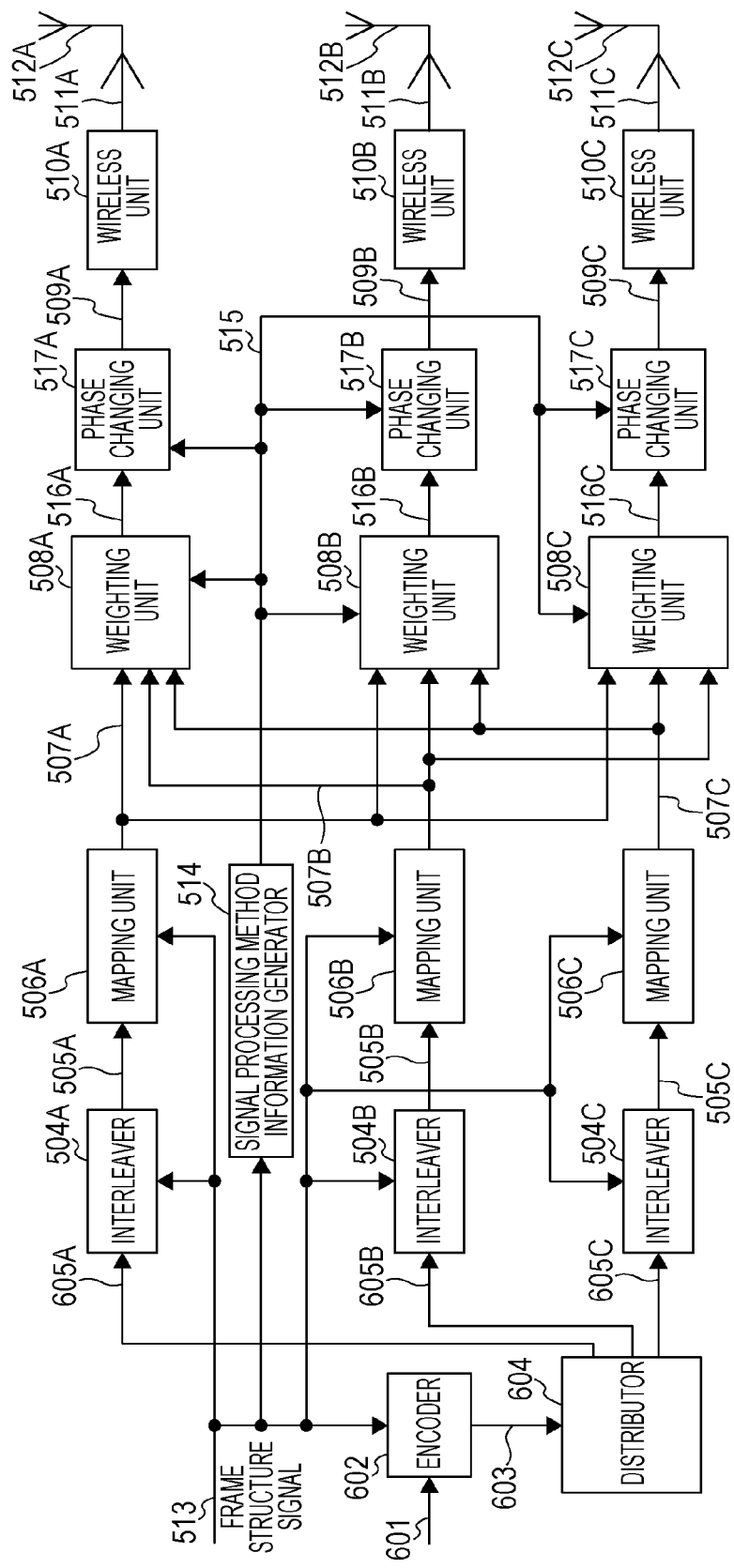
FIG. 6 illustrates a configuration example of the transmission device during the application of the phase changing method.

FIG. 6 illustrates a configuration example of a transmission device different from that in FIG. 5. In FIG. 6, a point different from that in FIG. 5 will be described below.

Encoder 602 receives information (data) 601 and frame structure signal 513 as input and, performs the error correction coding according to frame structure signal 513, and outputs encoded data 603.

Distributor 604 receives encoded data 603 as input, distributes data 603, and outputs pieces of data 605A, 605B, and 605C. One encoder is illustrated in FIG. 6, but is not limited to one. Alternatively, the present disclosure may similarly be embodied when the distributor divides the encoded data generated by each of the m (where m is an integer of 1 or more) encoders into pieces of data of three systems and outputs the divided data.

Figure 10:
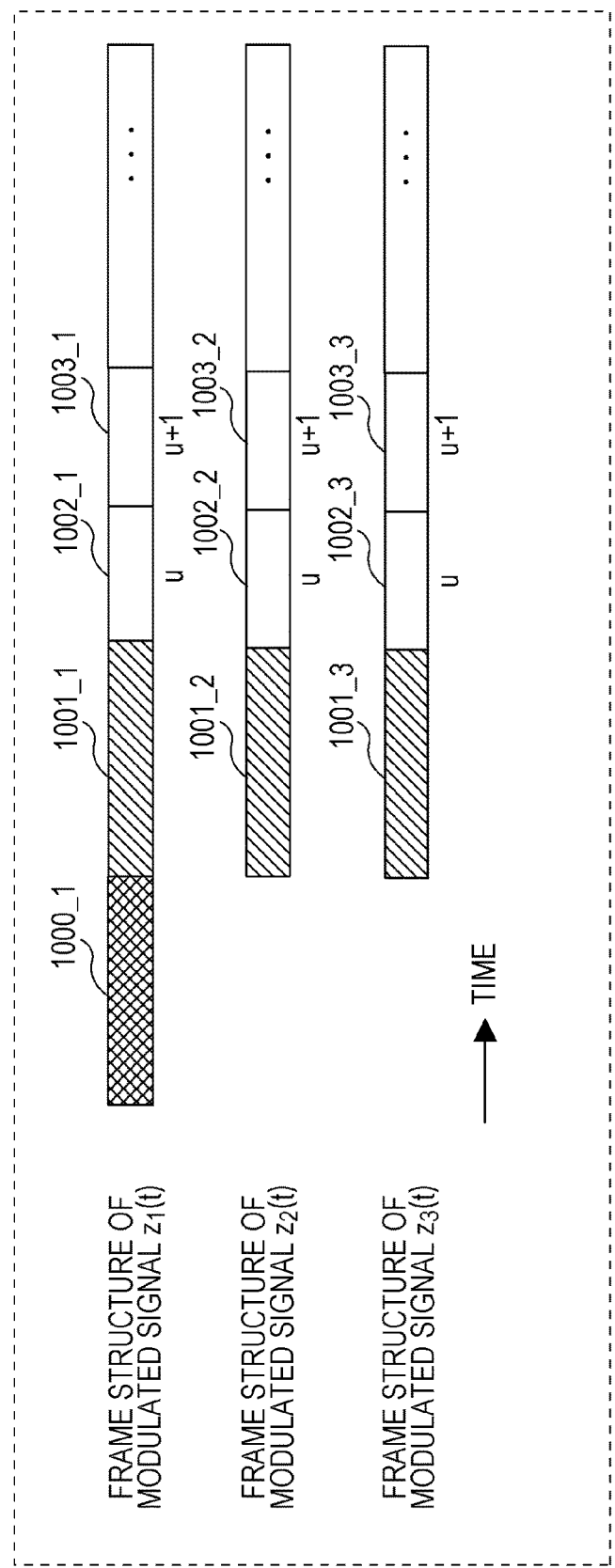
FIG. 10 illustrates an example of the frame structure on a time axis of the transmission device.

FIG. 10 illustrates an example of a frame structure in a time axis of the transmission device of the first exemplary embodiment. Symbol 1000_1 posts the reception device of the transmission method. For example, symbol 1000_1 transmits information such as the error correction scheme used to transmit a data symbol, the coding rate, and the modulation scheme used to transmit the data symbol.

Symbol 1001_1 estimates a channel fluctuation of modulated signal $z_1(t)$ (where t is time) transmitted by the transmission device. Symbol 1002_1 is a data symbol transmitted as symbol number u (on the time axis) by modulated signal $z_1(t)$, and symbol 1003_1 is a data symbol transmitted as symbol number u+1 by modulated signal $z_1(t)$.

Symbol 1001_2 estimates a channel fluctuation of modulated signal $z_2(t)$ (where t is time) transmitted by the transmission device. Symbol 1002_2 is a data symbol transmitted as symbol number u by modulated signal $z_2(t)$, and symbol 1003_2 is a data symbol transmitted as symbol number u+1 by modulated signal $z_2(t)$.

Symbol 1001_3 estimates a channel fluctuation of modulated signal $z_3(t)$ (where t is time) transmitted by the transmission device. Symbol 1002_3 is a data symbol transmitted as symbol number u by modulated signal $z_3(t)$, and symbol 1003_3 is a data symbol transmitted as symbol number u+1 by modulated signal $z_3(t)$.

At this point, in the symbol of $z_1(t)$, the symbol of $z_2(t)$, and the symbol of $z_3(t)$, the symbol of the identical clock time (identical time) is transmitted from the transmit antenna at the identical (common) frequency.

A relationships between modulated signals $z_1(t)$, $z_2(t)$, and $z_3(t)$ transmitted by the transmission device and received signals $r_1(t)$, $r_2(t)$, and $r_3(t)$ received by the reception device will be described below.

Figure 11:
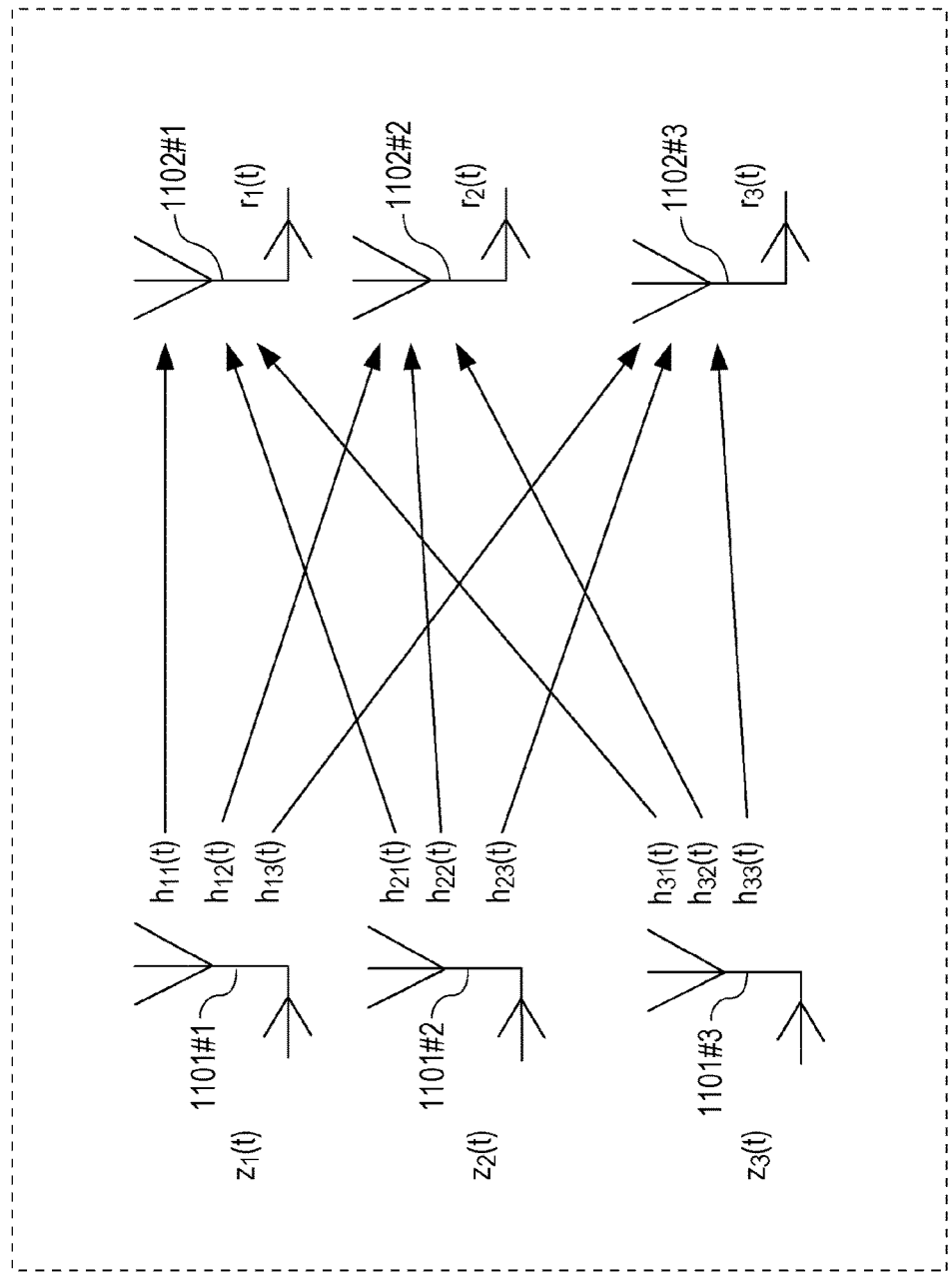
FIG. 11 illustrates an example of a transmit antenna and a receive antenna.

In FIG. 11, reference marks 1101#1, 1101#2, and 1101#3 designate the transmit antennas of the transmission device, and reference marks 1102#1, 1102#2, and 1102#3 designate the receive antennas of the reception device. The transmission device transmits the signal corresponding to modulated signal $z_1(t)$ from transmit antenna 1101#1, transmits the signal corresponding to modulated signal $z_2(t)$ from transmit antenna 1101#2, and transmits the signal corresponding to modulated signal $z_3(t)$ from transmit antenna 1101#3. In this case, it is assumed that modulated signals $z_1(t)$, $z_2(t)$, and $z_3(t)$ occupy the identical (common) frequency (band).

Assuming that the channel fluctuations of the transmit antennas of the transmission device and the receive antennas of the reception device are set to $h_{11}(t)$, $h_{12}(t)$, $h_{13}(t)$, $h_{21}(t)$, $h_{22}(t)$, $h_{23}(t)$, $h_{31}(t)$, $h_{32}(t)$, and $h_{33}(t)$, that $r_1(t)$ is the signal received by receive antenna 1102#1 of reception device, that $r_2(t)$ is the signal received by receive antenna 1102#2 of reception device, and that $r_3(t)$ is the signal received by receive antenna 1102#3 of reception device, Equation (42) holds.

[Mathematical formula 42]

$$\begin{pmatrix} r_1(t) \\ r_2(t) \\ r_3(t) \end{pmatrix} = \begin{pmatrix} h_{11}(t) & h_{12}(t) & h_{13}(t) \\ h_{21}(t) & h_{22}(t) & h_{23}(t) \\ h_{31}(t) & h_{32}(t) & h_{33}(t) \end{pmatrix} \begin{pmatrix} z_1(t) \\ z_2(t) \\ z_3(t) \end{pmatrix} \quad \text{Equation (42)}$$

FIG. 12A illustrates an example of the weighting unit (precoding method) and phase changing unit of the first exemplary embodiment. Weighting unit 1200 is one in which weighting units 508A, 508B, and 508C in FIG. 5 are integrated.

FIG. 12B illustrates an example of the frame structure of the first exemplary embodiment. Streams $s_1(t)$, $s_2(t)$, and $s_3(t)$ correspond to baseband signals 507A, 507B, and 507C in FIG. 5, namely, constitute the in-phase I component and quadrature Q component of the baseband signal according to the mapping of the modulation scheme such as the QPSK, the 16QAM, and the 64QAM.

As indicated by the frame structure in FIG. 12B, stream $s_1(t)$ indicates $s_1(u)$ of symbol number u, $s_1(u+1)$ of symbol number u+1, . . . . Similarly, the stream $s_2(t)$ indicates $s_2(u)$ of symbol number u, $s_2(u+1)$ of symbol number u+1, . . . . Similarly, the stream $s_3(t)$ indicates $s_3(u)$ of symbol number u, $s_3(u+1)$ of symbol number u+1, . . . .

Weighting unit 1200 receives baseband signals 507A ($s_1(t)$), 507B ($s_2(t)$), and 507C ($s_3(t)$) in FIG. 5 and information 515 on the signal processing method as input, performs the weighting according to information 515 on the signal processing method, and outputs weighted signals 516A ($z_1'(t)$), 516B ($z_2'(t)$), and 516C ($z_3'(t)$) in FIG. 5.

Phase changing unit 517A changes the phase of weighted signal 516A($z_1'(t)$), and outputs post-phase change signal 509A($z_1(t)$).

Phase changing unit 517B changes the phase of weighted signal 516B($z_2'(t)$), and outputs post-phase change signal 509B($z_2(t)$).

Phase changing unit 517C changes the phase of weighted signal 516C($z_3'(t)$), and outputs post-phase change signal 509C($z_3(t)$).

Assuming that $(w_{11},w_{12},w_{13})$ is vector $W_1$ of a first row in fixed precoding matrix F, that $(s_1(t),s_2(t),s_3(t))^T$ is S(t), and that $y_1(t)$ is a phase changing equation of the phase changing unit, $z_1(t)$ is expressed by Equation (43).

[Mathematical formula 43]

$$z_1(t)=y_1(t)W_1S(t) \quad \text{Equation (43)}$$

It is also assumed that $A^T$ is a transpose of matrix (or vector) A.

Assuming that $(w_{21},w_{22},w_{23})$ is vector $W_2$ of a second row in fixed precoding matrix F and that $y_2(t)$ is the phase changing equation of the phase changing unit, $z_2(t)$ is expressed by Equation (44).

[Mathematical formula 44]

$$z_2(t)=y_2(t)W_2S(t) \quad \text{Equation (44)}$$

Assuming that $(w_{31},w_{32},w_{33})$ is vector $W_3$ of a third row in fixed precoding matrix F and that $y_3(t)$ is the phase changing equation of the phase changing unit, $z_3(t)$ is expressed by Equation (45).

[Mathematical formula 45]

$$z_3(t)=y_3(t)W_3S(t) \quad \text{Equation (45)}$$

The phase changing method is described later.

Figure 13:
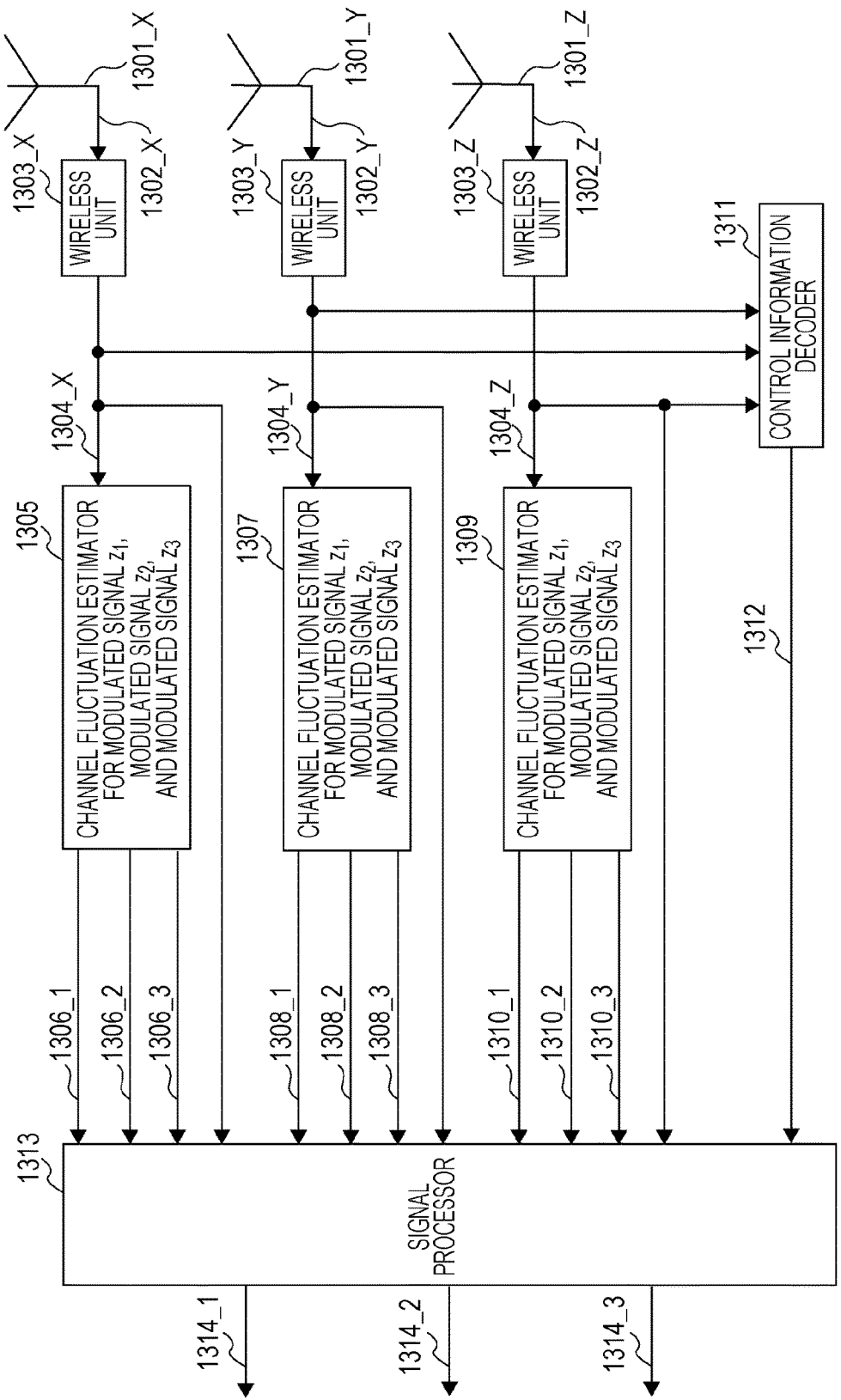
FIG. 13 illustrates a configuration example of the reception device.

FIG. 13 illustrates a configuration example of the transmission device of the first exemplary embodiment. Wireless unit 1303_X receives received signal 1302_X received by antenna 1301_X as input, performs pieces of processing such as the frequency conversion and the quadrature demodulation, and outputs baseband signal 1304_X.

Channel fluctuation estimator 1305 for modulated signals $z_1$, $z_2$, and $z_3$ transmitted by the transmission device receives baseband signal 1304_X as input, extracts channel estimating reference symbol 1201_1 in FIG. 12B, estimates the value corresponding to $h_{11}$ of Equation (42), and outputs channel estimation signal 1306_1.

Channel fluctuation estimator 1305 for modulated signals $z_1$, $z_2$, and $z_3$ transmitted by the transmission device receives baseband signal 1304_X as input, extracts channel estimating reference symbol 1201_2 in FIG. 12B, estimates the value corresponding to $h_{12}$ of Equation (42), and outputs channel estimation signal 1306_2.

Channel fluctuation estimator 1305 for modulated signals $z_1$, $z_2$, and $z_3$ transmitted by the transmission device receives baseband signal 1304_X as input, extracts channel estimating reference symbol 1201_3 in FIG. 12B, estimates the value corresponding to $h_{13}$ of Equation (42), and outputs channel estimation signal 1306_3.

Wireless unit 1303_Y receives received signal 1302_Y received by antenna 1301_Y as input, performs pieces of processing such as the frequency conversion and the quadrature demodulation, and outputs baseband signal 1304_Y.

Channel fluctuation estimator 1307 for modulated signals $z_1$, $z_2$, and $z_3$ transmitted by the transmission device receives baseband signal 1304_Y as input, extracts channel estimating reference symbol 1201_1 in FIG. 12B, estimates the value corresponding to $h_{21}$ of Equation (42), and outputs channel estimation signal 1308_1.

Channel fluctuation estimator 1307 for modulated signals $z_1$, $z_2$, and $z_3$ transmitted by the transmission device receives baseband signal 1304_Y as input, extracts channel estimating reference symbol 1201_2 in FIG. 12B, estimates the value corresponding to $h_{22}$ of Equation (42), and outputs channel estimation signal 1308_2.

Channel fluctuation estimator 1307 for modulated signals $z_1$, $z_2$, and $z_3$ transmitted by the transmission device receives baseband signal 1304_Y as input, extracts channel estimating reference symbol 1201_3 in FIG. 12B, estimates the value corresponding to $h_{23}$ of Equation (42), and outputs channel estimation signal 1308_3.

Wireless unit 1303_Z receives received signal 1302_Z received by antenna 1301_Z as input, performs pieces of processing such as the frequency conversion and the quadrature demodulation, and outputs baseband signal 1304_Z.

Channel fluctuation estimator 1309 for modulated signals $z_1$, $z_2$, and $z_3$ transmitted by the transmission device receives baseband signal 1304_Z as input, extracts channel estimating reference symbol 1201_1 in FIG. 12B, estimates the value corresponding to $h_{31}$ of Equation (42), and outputs channel estimation signal 1310_1.

Channel fluctuation estimator 1309 for modulated signals $z_1$, $z_2$, and $z_3$ transmitted by the transmission device receives baseband signal 1304_Z as input, extracts channel estimating reference symbol 1201_2 in FIG. 12B, estimates the value corresponding to $h_{32}$ of Equation (42), and outputs channel estimation signal 1310_2.

Channel fluctuation estimator 1309 for modulated signals $z_1$, $z_2$, and $z_3$ transmitted by the transmission device receives baseband signal 1304_Z as input, extracts channel estimating reference symbol 1201_3 in FIG. 12B, estimates the value corresponding to $h_{33}$ of Equation (42), and outputs channel estimation signal 1310_3.

Control information decoder 1311 receives baseband signals 1304_X, 1304_Y, and 1304_Z as input, detects symbol 1000_1 to post the transmission method in FIG. 10, and outputs signal 1312 related to the information on the transmission method posted by the transmission device.

Signal processor 1313 receives baseband signals 1304_X, 1304_Y, and 1304_Z, channel estimation signals 1306_1, 1306_2, 1306_3, 1308_1, 1308_2, 1308_3, 1310_1, 1310_2, and 1310_3, and signal 1312 related to the information on the transmission method posted by the transmission device, performs ML (Maximum Likelihood) detection, performs (error correction) decoding, and outputs received data 1314_1, and/or 1314_2, and/or 1314_3.

The operation of signal processor 1313 in FIG. 13 will be supplemented. For example, it is assumed that signal processor 1313 performs the MLD (Maximum Likelihood Detection) processing described in NPLs 8, 9, and 10.

The transmission method of the first exemplary embodiment is a MIMO transmission method, in which the signal phase is regularly changed together with the time while the precoding matrix is used.

Assuming that H(t) is the (channel) matrix in Equation (42), that F is the precoding weight matrix, that Y(t) (at this point, Y(t) depends on t) is the matrix of the phase changing equation of the phase changing unit in FIG. 12A, that $(r_1(t), r_2(t), r_3(t))^T$ is received vector R(t), and that $(s_1(t), s_2(t), s_3(t))^T$ is stream vector S(t), Equation (46) holds.

[Mathematical formula 46]

$$R(t) = H(t) \times Y(t) \times F \times S(t) \quad \text{Equation (46)}$$

Where $$Y(t) \begin{pmatrix} y_1(t) & 0 & 0 \\ 0 & y_2(t) & 0 \\ 0 & 0 & y_3(t) \end{pmatrix}$$

a noise component is not described in Equation (46).

At this point, the reception device can perform the MLD on received vector R(t) by obtaining H(t)×Y(t)×F.

The operation of the MLD will be described below. In the following description, it is assumed that the modulation schemes of modulated signals (streams) $s_1$, $s_2$, and $s_3$ are the QPSK.

Figure 14:
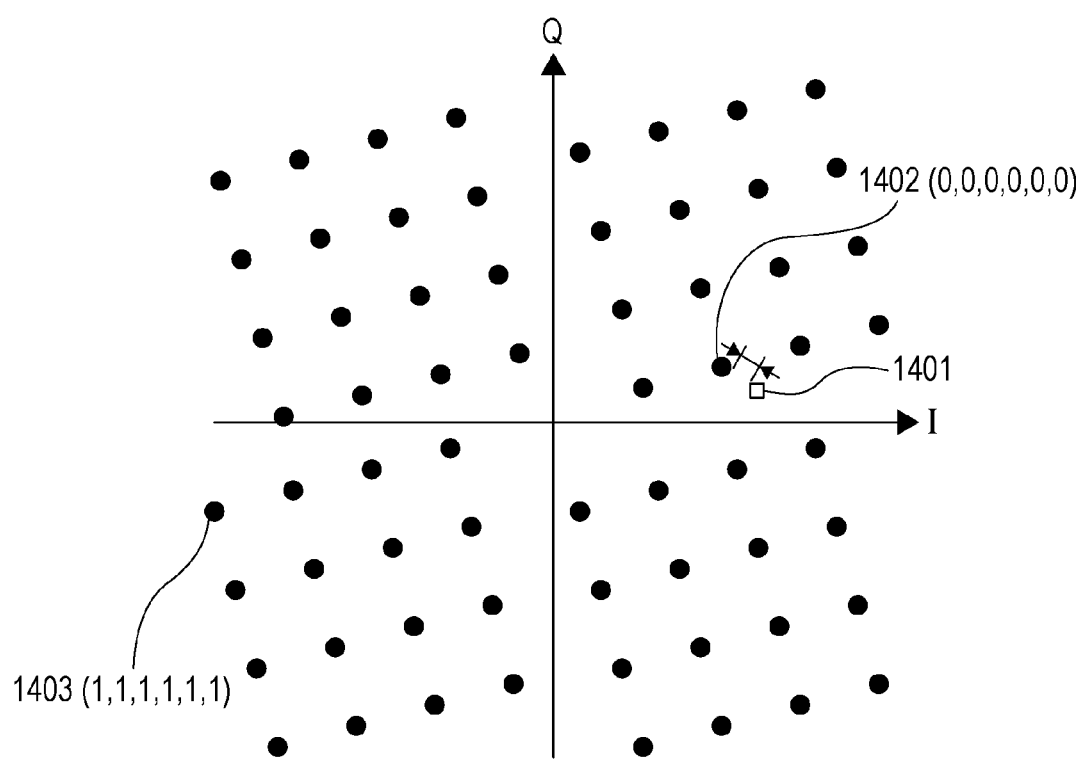
FIG. 14 illustrates an example of a state in which a candidate signal point is obtained.

First, ($2^6$=64) candidate signal points corresponding to baseband signal 1304_X are obtained from channel estimation signals 1306_1, 1306_2, and 1306_3. FIG. 14 illustrates the state at that time. In FIG. 14, a mark ● (black circle) indicates the candidate signal point in the I-Q plane, and the 64 candidate signal points exist because of three systems of QPSK. Assuming that b0 and b1 are 2 bits transmitted using modulated signal $s_1$, that b2 and b3 are 2 bits transmitted using modulated signal $s_2$, and that b4 and b5 are 2 bits transmitted using modulated signal $s_3$, the candidate signal points corresponding to (b0, b1, b2, b3, b4, b5) exist in FIG. 14.

A square Euclidean distance between received signal point 1401 (corresponding to baseband signal 1304_X) and each of the candidate signal points is obtained. Each square Euclidean distance is divided by noise variance $\sigma^2$. Accordingly, $E_X$(b0, b1, b2, b3, b4, b5) is obtained by dividing the square Euclidean distance between each of the candidate signal points corresponding to (b0, b1, b2, b3, b4, b5) and the received signal point by the noise variance, namely, $E_X(1,1,1,1,1,1)$ is obtained from $E_X(0,0,0,0,0,0)$. The baseband signals and modulated signals $s_1$, $s_2$, and $s_3$ are complex signals.

Similarly, ($2^6=64$) candidate signal points corresponding to baseband signal 1304_Y are obtained from channel estimation signals 1308_1, 1308_2, and 1308_3. FIG. 14 illustrates the state at that time. In FIG. 14, the mark ● (black circle) indicates the candidate signal point on the I-Q plane, and the 64 candidate signal points exist because of three systems of the QPSK. Assuming that b0 and b1 are 2 bits transmitted using modulated signal $s_1$, that b2 and b3 are 2 bits transmitted using modulated signal $s_2$, and that b4 and b5 are 2 bits transmitted using modulated signal $s_3$, the candidate signal points corresponding to (b0, b1, b2, b3, b4, b5) exist in FIG. 14. (However, the state in FIG. 14 is illustrated only by way of example.)

The square Euclidean distance between received signal point 1401 (corresponding to baseband signal 1304_Y) and each of the candidate signal points is obtained. Each square Euclidean distance is divided by noise variance $\sigma^2$. Accordingly, $E_Y(b0, b1, b2, b3, b4, b5)$ is obtained by dividing the square Euclidean distance between each of the candidate signal points corresponding to (b0, b1, b2, b3, b4, b5) and the received signal point by the noise variance, namely, $E_Y(1,1,1,1,1,1)$ is obtained from $E_Y(0,0,0,0,0,0)$. The baseband signals and modulated signals $s_1$, $s_2$, and $s_3$ are complex signals.

Similarly, ($2^6=64$) candidate signal points corresponding to baseband signal 1304_Z are obtained from channel estimation signals 1310_1, 1310_2, and 1310_3. FIG. 14 illustrates the state at that time. In FIG. 14, the mark ● (black circle) indicates the candidate signal point on the I-Q plane, and the 64 candidate signal points exist because of three systems of the QPSK. Assuming that b0 and b1 are 2 bits transmitted using modulated signal $s_1$, that b2 and b3 are 2 bits transmitted using modulated signal $s_2$, and that b4 and b5 are 2 bits transmitted using modulated signal $s_3$, the candidate signal points corresponding to (b0, b1, b2, b3, b4, b5) exist in FIG. 14. (However, the state in FIG. 14 is illustrated only by way of example.)

The square Euclidean distance between received signal point 1401 (corresponding to baseband signal 1304_Z) and each of the candidate signal points is obtained. Each square Euclidean distance is divided by noise variance $\sigma^2$. Accordingly, $E_Z(b0, b1, b2, b3, b4, b5)$ is obtained by dividing the square Euclidean distance between each of the candidate signal points corresponding to (b0, b1, b2, b3, b4, b5) and the received signal point by the noise variance, namely, $E_Z(1,1,1,1,1,1)$ is obtained from $E_Z(0,0,0,0,0,0)$. The baseband signals and modulated signals $s_1$, $s_2$, and $s_3$ are complex signals.

$E_X(b0, b1, b2, b3, b4, b5) + E_Y(b0, b1, b2, b3, b4, b5) + E_Z(b0, b1, b2, b3, b4, b5) = E(b0, b1, b2, b3, b4, b5)$ is obtained.

The value for ((b0,b1,b2,b3,b4,b5)=(0,0,0,0,0,0) constitutes $E_X(0,0,0,0,0,0)+E_Y(0,0,0,0,0,0)+E_Z(0,0,0,0,0,0)=E(0,0,0,0,0,0)$, the value for (b0,b1,b2,b3,b4,b5)=(0,0,0,0,0,1) constitutes $E_X(0,0,0,0,0,1)+E_Y(0,0,0,0,0,1)+E_Z(0,0,0,0,0,1)=E(0,0,0,0,0,1)$,

. . .

the value for (b0,b1,b2,b3,b4,b5)=(1,1,1,1,1,1) constitutes $E_X(1,1,1,1,1,1)+E_Y(1,1,1,1,1,1)+E_Z(1,1,1,1,1,1)=E(1,1,1,1,1,1)$.

For example, the logarithmic likelihood ratio of each bit is obtained from E(b0,b1,b2,b3,b4,b5), the logarithmic likelihood ratios are rearranged (interleaved), the error correction decoding is performed using the rearranged logarithmic likelihood ratio, and received data 1314_1, and/or 1314_2, and/or 1314_3 is output.

The degradation of the data reception quality in the present disclosure will be described below.

For convenience of explanation, it is assumed that baseband signal (post-mapping signal) $s_3(t)$ does not exist. That is, baseband signals (post-mapping signals) $s_1(t)$ and $s_2(t)$ exist.

At this point, it is considered that the reception device in FIG. 13 performs the reception. As described above, it is assumed that the modulation scheme of $s_1(t)$ is the QPSK scheme, and that bits b0 and b1 are transmitted. It is also assumed that the modulation scheme of $s_2(t)$ is the QPSK scheme, and that bits b2 and b3 are transmitted.

Figure 15:
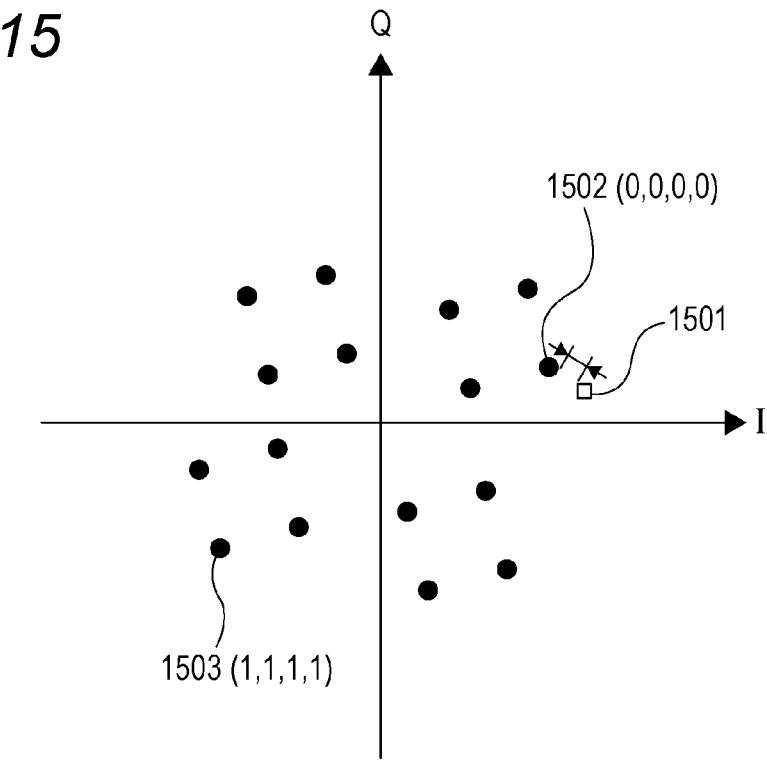
FIG. 15 illustrates an example of the state in which the candidate signal point is obtained.

FIG. 15 illustrates an example (the state of the candidate signal point) of the reception state of the I-Q plane in signal processor 1313 of FIG. 13. In FIG. 15, the mark ● (black circle) indicates the candidate signal point on the IQ plane, b0 and b1 are transmitted using $s_1(t)$, and b2 and b3 are transmitted using $s_2(t)$. Therefore, ideally the 16 candidate signal points exist as illustrated in FIG. 15. (The candidate signal points in which (b0,b1,b2,b3) corresponds to (0,0,0,0) to (1,1,1,1) exist.)

Figure 16:
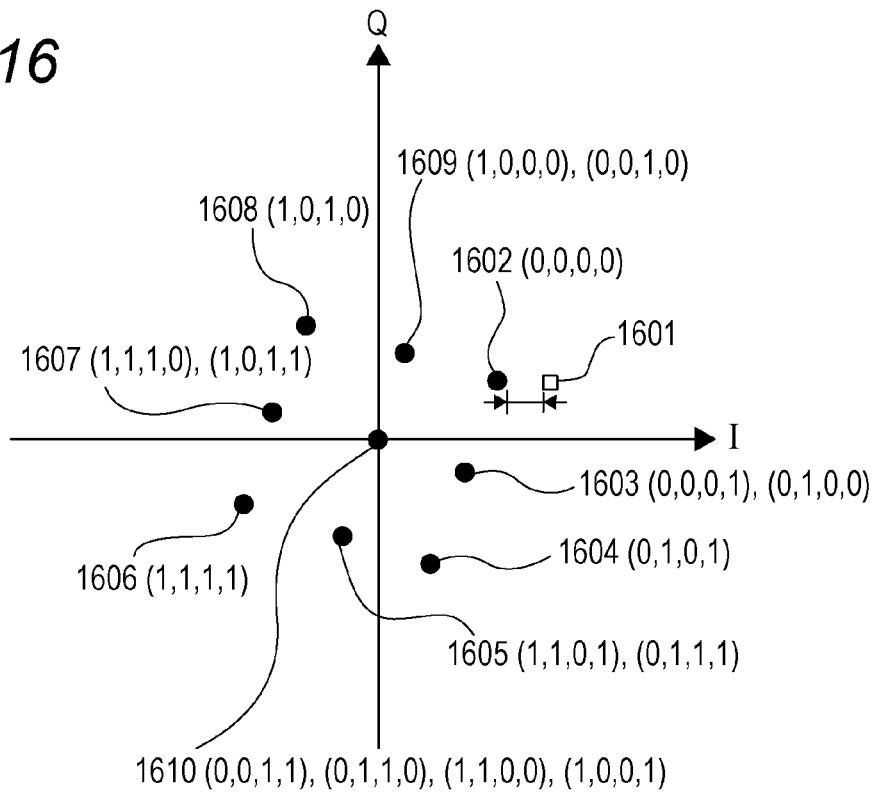
FIG. 16 illustrates an example of the state in which the candidate signal point is obtained.

FIG. 16 illustrates an example (the state of the candidate signal point) of the reception state of the I-Q plane in signal processor 1313 of FIG. 13. In FIG. 16, the mark ● (black circle) indicates the candidate signal point on the IQ plane.

Candidate signal point 1602 is the candidate signal point in which (b0,b1,b2,b3) corresponds to (0,0,0,0).

Candidate signal point 1603 is the candidate signal point in which (b0,b1,b2,b3) corresponds to (0,0,0,1) and (0,1,0,0).

Candidate signal point 1604 is the candidate signal point in which (b0,b1,b2,b3) corresponds to (0,1,0,1).

Candidate signal point 1605 is the candidate signal point in which (b0,b1,b2,b3) corresponds to (1,1,0,1) and (0,1,1,1).

Candidate signal point 1606 is the candidate signal point in which (b0,b1,b2,b3) corresponds to (1,1,1,1).

Candidate signal point 1607 is the candidate signal point in which (b0,b1,b2,b3) corresponds to (1,1,1,0) and (1,0,1,1).

Candidate signal point 1608 is the candidate signal point in which (b0,b1,b2,b3) corresponds to (1,0,1,0).

Candidate signal point 1609 is the candidate signal point in which (b0,b1,b2,b3) corresponds to (1,0,0,0) and (0,0,1,0).

Candidate signal point 1610 is the candidate signal point in which (b0,b1,b2,b3) corresponds to (0,0,1,1), (0,1,1,0), (1,1,0,0), and (1,0,0,1).

In FIG. 16, the number of candidate signal points decreases compared with the ideal state in FIG. 15. When the reception is performed in the state of FIG. 16, the data reception quality degrades in the reception device. Particularly, in an environment where a direct wave is dominant, a propagation environment is steady because of a strong influence of the direct wave, which results in a phenomenon in which the low data reception quality continues for a long time. In FIG. 16, by way of example, the candidate signal points overlap each other. For example, similarly the decreases of the minimum Euclidean distances of the 16 candidate signal points lead to the degradation of the data reception quality. (Particularly, there is a high possibility of generating the degradation of the data reception quality in the environment where the direct wave is dominant.)

The phenomenon in which the candidate signal points overlap each other is also generated in the case that the three baseband signals, namely, $s_1(t)$, $s_2(t)$, and $s_3(t)$ exist. A method for improving the data reception quality in the case that "particularly, in the environment where the direct wave is dominant, the propagation environment is steady because of the strong influence of the direct wave, which results in the phenomenon in which the low data reception quality continues for a long time" will be described below.

FIG. 17 illustrates specific examples of the phase change values in phase changing units 517A, 517B, and 517C of the transmission device in FIGS. 5 and 6. As described above, it is assumed that $y_1(t)$ is the phase change value of phase changing unit 517A, that $y_2(t)$ is the phase change value of phase changing unit 517B, and that $y_3(t)$ is the phase change value of phase changing unit 517C. In FIG. 17, t is the time (although $y_1(t)$, $y_2(t)$, and $y_3(t)$ are the function of the time in this case, the phase change value may be the function of the frequency or the frequency and time as described above), "0" means the 0 radian, "a" means the a radian, "b" means the b radian, where $0 \leq a < 2\pi$, $0 \leq b < 2\pi$, $a \neq 0$, $b \neq 0$, and $a \neq b$.

As illustrated in FIG. 17, it is assumed that at clock time t=0, $y_1(0)=0$ (radian), $y_2(0)=0$ (radian), $y_3(0)=0$ (radian)

at clock time t=1, $y_1(1)=0$ (radian), $y_2(1)=a$ (radian), $y_3(1)=0$ (radian)

at clock time t=2, $y_1(2)=0$ (radian), $y_2(2)=b$ (radian), $y_3(2)=0$ (radian)

at clock time t=3, $y_1(3)=0$ (radian), $y_2(3)=0$ (radian), $y_3(3)=0$ (radian)

at clock time t=4, $y_1(4)=0$ (radian), $y_2(4)=a$ (radian), $y_3(4)=0$ (radian)

at clock time t=5, $y_1(5)=0$ (radian), $y_2(5)=b$ (radian), $y_3(5)=0$ (radian)

. . . . .

In FIG. 17, it is assumed that there are three periods with respect to the phase change. Accordingly, at clock time t=3k, $y_1(3k)=0$ (radian), $y_2(3k)=0$ (radian), $y_3(3k)=0$ (radian)

at clock time t=3k+1, $y_1(3k+1)=0$ (radian), $y_2(3k+1)=a$ (radian), $y_3(3k+1)=0$ (radian)

at clock time t=3k+2, $y_1(3k+2)=0$ (radian), $y_2(3k+2)=b$ (radian), $y_3(3k+2)=0$ (radian)

are obtained. For example, k is an integer of 0 or more.

The degradation of the data reception quality in performing the phase change in FIG. 17 will be described below.

For example, it is considered that the reception device in FIG. 13 receives the modulated signal transmitted from antenna 512B with the low reception field strength when the reception device in FIG. 13 receives the modulated signal transmitted by the transmission device in FIGS. 5 and 6. In the following description, as described above, it is assumed that the modulation schemes of modulated signals (streams) $s_1$, $s_2$, and $s_3$ are the QPSK. Accordingly, in the case that the candidate signal points do not overlap each other in performing the MLD, the 64 candidate signal points emerge on the I-Q plane.

As described above, it is considered that the reception device in FIG. 13 receives the modulated signal transmitted from antenna 512B with the low reception field strength. It is considered that the minimum Euclidean distance is short at the 64 candidate signal points to degrade the data reception quality when the MLD is performed in the environment in which the direct wave is dominant. It is considered that the case phase change in FIG. 17 is performed under the environment.

In this case, the signal having an influence on the reception state of the reception device in FIG. 13 becomes the modulated signal transmitted from antenna 512A of the transmission device in FIGS. 5 and 6 and the modulated signal transmitted from antenna 512C.

In the case that the phase change in FIG. 17 is performed, the phase change is not performed on the modulated signal transmitted from antenna 512A of the transmission device in FIGS. 5 and 6, and the phase change is not performed on the modulated signal transmitted from antenna 512C of the transmission device in FIGS. 5 and 6. Accordingly, in FIG. 13, there is a high possibility that the state of the candidate signal point on the I-Q plane is not largely changed with respect to time t. (There is a high possibility of slightly changing the minimum Euclidean distance of the candidate signal point.) Therefore, there is a possibility of retaining the state in the case that the data reception quality degrades in the reception device of FIG. 13.

FIG. 18 illustrates an example of the phase changing method as a measure in the case that the data reception quality degrades in the reception device of FIG. 13.

FIG. 18 illustrates specific examples of the phase change values in phase changing units 517A, 517B, and 517C of the transmission device in FIGS. 5 and 6. As described above, it is assumed that $y_1(t)$ is the phase change value of phase changing unit 517A, that $y_2(t)$ is the phase change value of phase changing unit 517B, and that $y_3(t)$ is the phase change value of phase changing unit 517C. In FIG. 17, t is the time (although $y_1(t)$, $y_2(t)$, and $y_3(t)$ are the function of the time in this case, the phase change value may be the function of the frequency or the frequency and time as described above), "0" means the 0 radian, "a" means the a radian, "b" means the b radian, where $0 \leq a < 2\pi$, $0 \leq b < 2\pi$, $a \neq 0$, $b \neq 0$, and $a \neq b$.

As illustrated in FIG. 18, it is assumed that at clock time t=0, $y_1(0)=0$ (radian), $y_2(0)=0$ (radian), $y_3(0)=0$ (radian)

at clock time t=1, $y_1(1)=0$ (radian), $y_2(1)=a$ (radian), $y_3(1)=0$ (radian)

at clock time t=2, $y_1(2)=0$ (radian), $y_2(2)=b$ (radian), $y_3(2)=0$ (radian)

at clock time t=3, $y_1(3)=0$ (radian), $y_2(3)=0$ (radian), $y_3(3)=a$ (radian)

at clock time t=4, $y_1(4)=0$ (radian), $y_2(4)=0$ (radian), $y_3(4)=b$ (radian)

at clock time t=5, $y_1(5)=0$ (radian), $y_2(5)=a$ (radian), $y_3(5)=a$ (radian)

at clock time t=6, $y_1(6)=0$ (radian), $y_2(6)=a$ (radian), $y_3(6)=b$ (radian)

at clock time t=7, $y_1(7)=0$ (radian), $y_2(7)=b$ (radian), $y_3(7)=a$ (radian)

at clock time t=8, $y_1(8)=0$ (radian), $y_2(8)=b$ (radian), $y_3(8)=b$ (radian)

. . . .

In FIG. 18, it is assumed that there are nine periods with respect to the phase change. Accordingly, at clock time t=9k, $y_1(9k)=0$ (radian), $y_2(9k)=0$ (radian), $y_3(9k)=0$ (radian)

at clock time t=9k+1, $y_1(9k+1)=0$ (radian), $y_2(9k+1)=a$ (radian), $y_3(9k+1)=0$ (radian)

at clock time t=9k+2, $y_1(9k+2)=0$ (radian), $y_2(9k+2)=b$ (radian), $y_3(9k+2)=0$ (radian)

at clock time t=9k+3, $y_1(9k+3)=0$ (radian), $y_2(9k+3)=0$ (radian), $y_3(9k+3)=a$ (radian)

at clock time t=9k+4, $y_1(9k+4)=0$ (radian), $y_2(9k+4)=0$ (radian), $y_3(9k+4)=b$ (radian)

at clock time t=9k+5, $y_1(9k+5)=0$ (radian), $y_2(9k+5)=a$ (radian), $y_3(9k+5)=a$ (radian)

at clock time t=9k+6, $y_1(9k+6)$=0 (radian), $y_2(9k+6)$=a (radian), $y_3(9k+6)$=b (radian)

at clock time t=9k+7, $y_1(9k+7)$=0 (radian), $y_2(9k+7)$=b (radian), $y_3(9k+7)$=a (radian)

at clock time t=9k+8, $y_1(9k+8)$=0 (radian), $y_2(9k+8)$=b (radian), $y_3(9k+8)$=b (radian)

are obtained. For example, k is an integer of 0 or more.

An advantage of the phase change in FIG. 18 will be described below.

Similarly to the description in FIG. 17, for example, it is considered that the reception device in FIG. 13 receives the modulated signal transmitted from antenna 512B with the low reception field strength when the reception device in FIG. 13 receives the modulated signal transmitted by the transmission device in FIGS. 5 and 6. In the following description, as described above, it is assumed that the modulation schemes of modulated signals (streams) $s_1$, $s_2$, and $s_3$ are the QPSK. Accordingly, in the case that the candidate signal points do not overlap each other in performing the MLD, the 64 candidate signal points emerge on the I-Q plane.

As described above, it is considered that the reception device in FIG. 13 receives the modulated signal transmitted from antenna 512B with the low reception field strength. It is considered that the minimum Euclidean distance is short at the 64 candidate signal points to degrade the data reception quality when the MLD is performed in the environment in which the direct wave is dominant. It is considered that the case phase change in FIG. 18 is performed under the environment.

In this case, the signal having an influence on the reception state of the reception device in FIG. 13 becomes the modulated signal transmitted from antenna 512A and the modulated signal transmitted from antenna 512C of the transmission device in FIGS. 5 and 6.

In the case that the phase change in FIG. 18 is performed, the phase change is not performed on the modulated signal transmitted from antenna 512A of the transmission device in FIGS. 5 and 6 at times t=0, t=1, and t=2, and the phase change is not performed on the modulated signal transmitted from antenna 512C of the transmission device in FIGS. 5 and 6 at times t=0, t=1, and t=2. Accordingly, in FIG. 13, there is a high possibility that the state of the candidate signal point on the I-Q plane is not largely changed at times t=0, t=1, and t=2. (There is a high possibility of slightly changing the minimum Euclidean distance of the candidate signal point.)

At times t=3 to t=8, because the phase except for 0 (zero) radian is provided in the modulated signal transmitted from antenna 512C of the transmission device in FIGS. 5 and 6, there is a possibility of improving the state of the candidate signal point on the I-Q plane (the minimum Euclidean distance of the candidate signal point increases).

When compared with the phase change in FIG. 17, the time for which the candidate signal point is in good state (the candidate signal point has the large minimum Euclidean distance) increases to obtain an advantageous effect that the reception quality is improved by applying the error correction code.

It is considered that the reception device in FIG. 13 receives the modulated signal transmitted from antenna 512C with the low reception field strength. It is considered that the minimum Euclidean distance is short at the 64 candidate signal points to degrade the data reception quality when the MLD is performed in the environment in which the direct wave is dominant. It is considered that the case phase change in FIG. 18 is performed under the environment.

In this case, the signal having an influence on the reception state of the reception device in FIG. 13 becomes the modulated signal transmitted from antenna 512A and the modulated signal transmitted from antenna 512B of the transmission device in FIGS. 5 and 6.

In the case that the phase change in FIG. 18 is performed, the phase change is not performed on the modulated signal transmitted from antenna 512A of the transmission device in FIGS. 5 and 6 at times t=0, t=3, and t=4, and the phase change is not performed on the modulated signal transmitted from antenna 512B of the transmission device in FIGS. 5 and 6 at times t=0, t=3, and t=4. Accordingly, in FIG. 13, there is a high possibility that the state of the candidate signal point on the I-Q plane is not largely changed at times t=0, t=3, and t=4. (There is a high possibility of slightly changing the minimum Euclidean distance of the candidate signal point.)

However, at times t=1, t=2, t=5, t=6, t=7, and t=8, because the phase except for 0 (zero) radian is provided in the modulated signal transmitted from antenna 512B of the transmission device in FIGS. 5 and 6, there is a possibility of improving the state of the candidate signal point on the I-Q plane (the minimum Euclidean distance of the candidate signal point increases).

When compared with the phase change in FIG. 17, the time for which the candidate signal point is in good state (the candidate signal point has the large minimum Euclidean distance) increases to obtain an advantageous effect that the reception quality is improved by applying the error correction code.

It is considered that the reception device in FIG. 13 receives the modulated signal transmitted from antenna 512A with the low reception field strength. It is considered that the minimum Euclidean distance is short at the 64 candidate signal points to degrade the data reception quality when the MLD is performed in the environment in which the direct wave is dominant. It is considered that the case phase change in FIG. 18 is performed under the environment.

In this case, the signal having an influence on the reception state of the reception device in FIG. 13 becomes the modulated signal transmitted from antenna 512B and the modulated signal transmitted from antenna 512C of the transmission device in FIGS. 5 and 6.

A relative phase relationship between the modulated signal transmitted from antenna 512B of the transmission device in FIGS. 5 and 6 and the modulated signal transmitted from antenna 512C of the transmission device in FIGS. 5 and 6 does not change at times t=0, t=5, and t=8 in the case that the phase change in FIG. 18 is performed. (A phase difference between the modulated signal transmitted from antenna 512B of the transmission device in FIGS. 5 and 6 and the modulated signal transmitted from antenna 512C of the transmission device in FIGS. 5 and 6 becomes an identical value at times t=0, t=5, and t=8.) Accordingly, in FIG. 13, there is a high possibility that the state of the candidate signal point on the I-Q plane is not largely changed at times t=0, t=5, and t=8. (There is a high possibility of slightly changing the minimum Euclidean distance of the candidate signal point.) (The state of the candidate signal point does not change in the case that the relative phase relationship does not change.)

However, the relative phase relationship between the modulated signal transmitted from antenna 512B of the transmission device in FIGS. 5 and 6 and the modulated signal transmitted from antenna 512C of the transmission device in FIGS. 5 and 6 changes at times t=1, t=2, t=3, t=4, t=6, and t=7, the plurality of phases are provided in the modulated signal transmitted from antenna 512B of the transmission device in FIGS. 5 and 6, and the plurality of phases are provided in the modulated signal transmitted from antenna 512C of the transmission device in FIGS. 5 and 6. Therefore, there is a possibility of improving the state of the candidate signal point on the I-Q plane (the minimum Euclidean distance of the candidate signal point increases) at times t=1, t=2, t=3, t=4, t=6, and t=7.

When compared with the phase change in FIG. 17, the time for which the candidate signal point is in good state (the candidate signal point has the large minimum Euclidean distance) increases to obtain an advantageous effect that the reception quality is improved by applying the error correction code.

Thus, even if any one of the states of transmit antennas 512A, 512B, and 512C in FIGS. 5 and 6 degrades, an advantageous effect that a possibility of degrading the data reception quality is lowered can be obtained.

The example of the phase change and the advantageous effect in performing the phase change in FIG. 18 are described above. Another example of the phase changing method in which the similar advantageous effect is obtained will be described below.

It is assumed that $a_1$ is a value that can be taken by phase change value $y_1(t)$ of phase changing unit 517A in FIGS. 5 and 6. In FIG. 18, $y_1(t)=a_1=0$ holds.

It is assumed that m (m is an integer of 2 or more) kinds of values can be taken by phase change value $y_2(t)$ of phase changing unit 517B in FIGS. 5 and 6, and $b_i$ (radian) is the value that can be expressed by phase change value $y_2(t)$ (i is an integer between 1 and m (inclusive), and $0 \leq b_i < 2\pi$). At this point, i and j are integers between 1 and m (inclusive), i≠j, and $b_i \neq b_j$ is satisfied for any i and j. In FIG. 18, $y_2(t)=b_j=0$, a, b holds.

It is assumed that n (n is an integer of 2 or more) kinds of values can be taken by phase change value $y_3(t)$ of phase changing unit 517C in FIGS. 5 and 6, and $c_i$ (radian) is the value that can be taken by phase change value $y_3(t)$ (i is an integer between 1 and n (inclusive), and $0 \leq c_i < 2\pi$). At this point, i and j are integers between 1 and n (inclusive), i≠j, and $c_i \neq c_j$ is satisfied for any i and j. In FIG. 18, $y_3(t)=c_i=0$, a, b holds.

Assuming that $(a_1, b_i, c_j)$ is a value taken by a set of $(y_1(u), y_2(u), y_3(u))$ in symbol number u (u is an integer of 0 or more), the following conditions are satisfied.

(Condition 1)

It is assumed that i=β holds. (β is an integer between 1 and m (inclusive).) At this point, that $y_1(u), y_2(u), y_3(u))=(a_1, b_\beta, c_j)$ holds $((y_1(u), y_2(u), y_3(u))=(a_1, b_\beta, c_j)$ means $y_1(u)=a_1$, $y_2(u)=b_\beta$, and $y_3(u)=c_j$). When i=β is satisfied in integer u of 0 or more, j takes all the values of the integer between 1 and n (inclusive) in $c_j$.

(Condition 2)

The condition that "j takes all the values of the integers between 0 and n (inclusive) in $c_j$ when i=β is satisfied in integer u of 0 or more" is satisfied in β of all the integers between 1 and m (inclusive).

The advantageous effect can be obtained by satisfying (Condition 1) and (Condition 2) when the phase change is performed as illustrated in FIG. 18. Although m×n is the minimum value of the period of the phase change satisfying (Condition 1) and (Condition 2), the period of the phase change may be greater than or equal to m×n. (In this case, the identical set of phase changes is used at least twice, and the period of the phase change is set under that condition.)

The phase changing method in the case that phase change value $y_1(t)$ of the phase changing unit 517A in FIGS. 5 and 6 is set to a constant value is described in the example of FIG. 18 and the above example. The phase changing method in the case that phase change value $y_1(t)$ of the phase changing unit 517A in FIGS. 5 and 6 is changed according to the time (frequency) (frequency and time) will be described below.

It is assumed that p (p is an integer of 2 or more) kinds of values can be taken by phase change value $y_1(t)$ of phase changing unit 517A in FIGS. 5 and 6, and $a_i$ (radian) is the value that can be taken by phase change value $y_1(t)$ (i is an integer between 1 and p (inclusive), and $0 \leq a_i < 2\pi$). At this point, i and j are integers between 1 and p (inclusive), i≠j, and $a_i \neq a_j$ is satisfied for any i and j.

It is assumed that m (m is an integer of 2 or more) kinds of values can be taken by phase change value $y_2(t)$ of phase changing unit 517B in FIGS. 5 and 6, and $b_i$ (radian) is the value that can be taken by phase change value $y_2(t)$ (i is an integer between 1 and m (inclusive), and $0 \leq b_i < 2\pi$). At this point, i and j are integers between 1 and m (inclusive), i≠j, and $b_i \neq b_j$ is satisfied for any i and j.

It is assumed that n (n is an integer of 2 or more) kinds of values can be taken by phase change value $y_3(t)$ of phase changing unit 517C in FIGS. 5 and 6, and $c_i$ (radian) is the value that can be taken by phase change value $y_3(t)$ (i is an integer between 1 and n (inclusive), and $0 \leq c_i < 2\pi$). At this point, i and j are integers between 1 and n (inclusive), i≠j, and $c_i \neq c_j$ is satisfied for any i and j.

Assuming that $(a_i, b_j, c_k)$ is a value taken by the set of $(y_1(u), y_2(u), y_3(u))$ in symbol number u (u is an integer of 0 or more), the following conditions are satisfied.

(Condition 3)

It is assumed that i=β holds. (β is an integer between 1 and p (inclusive).) At this point, that $(y_1(u), y_2(u), y_3(u))=(a_\beta, b_j, c_k)$ holds $((y_1(u), y_2(u), y_3(u))=(a_\beta, b_j, c_k)$ means $y_1(u)=a_\beta$, $y_2(u)=b_j$, and $y_3(u)=c_k$). When i=β is satisfied in integer u of 0 or more, in $(a_\beta, b_j, c_k)$, j is an integer between 0 and m (inclusive), k is an integer between 0 and n (inclusive), and a set (j,k) that can be taken by (j,k) exists.

(Condition 4)

A condition that, "when i=β is satisfied in integer u of 0 or more, in $(a_\beta, b_j, c_k)$, j is an integer between 0 and m (inclusive), k is an integer between 0 and n (inclusive), and a set (j,k) that can be taken by (j,k) exists" is satisfied in β of all the integers between 1 and p (inclusive).

The advantageous effect can be obtained by satisfying (Condition 3) and (Condition 4) when the phase change is performed as illustrated in FIG. 18. Although p×m×n is the minimum value of the period of the phase change satisfying (Condition 3) and (Condition 4), the period of the phase change may be greater than or equal to p×m×n. (In this case, the identical set of phase changes is used at least twice, and the period of the phase change is set under that condition.)

The example in which H(t)×Y(t)×F is obtained to perform the MLD in the reception device is described above. Alternatively, the detection may be performed using QR decomposition as described in NPL 9.

As described in NPL 11, based on H(t)×Y(t)×F, MMSE (Minimum Mean Square Error) and ZF (Zero Forcing) are linearly calculated to perform the detection.

Additionally, in the first exemplary embodiment, the single carrier scheme is described by way of example. However, the present disclosure is not limited the single carrier scheme, but may be similarly embodied for multi-carrier transmission. Accordingly, for example, when a spread spectrum communication scheme, an OFDM (Orthogonal Frequency-Division Multiplexing) scheme, SC-FDMA (Single Carrier Frequency Division Multiple Access)

scheme, SC-OFDM (Single Carrier Orthogonal Frequency-Division Multiplexing) scheme, or a wavelet OFDM scheme described in NPL 12 is used, the present disclosure may be similarly embodied. In the first exemplary embodiment, such a symbol other than the data symbol as a pilot symbols (a preamble, a unique word, and the like) and a symbol transmitting control information may arbitrarily be arranged in the frame.

An example in the OFDM scheme is used will be described as an example of a multi-carrier scheme.

Figure 19:
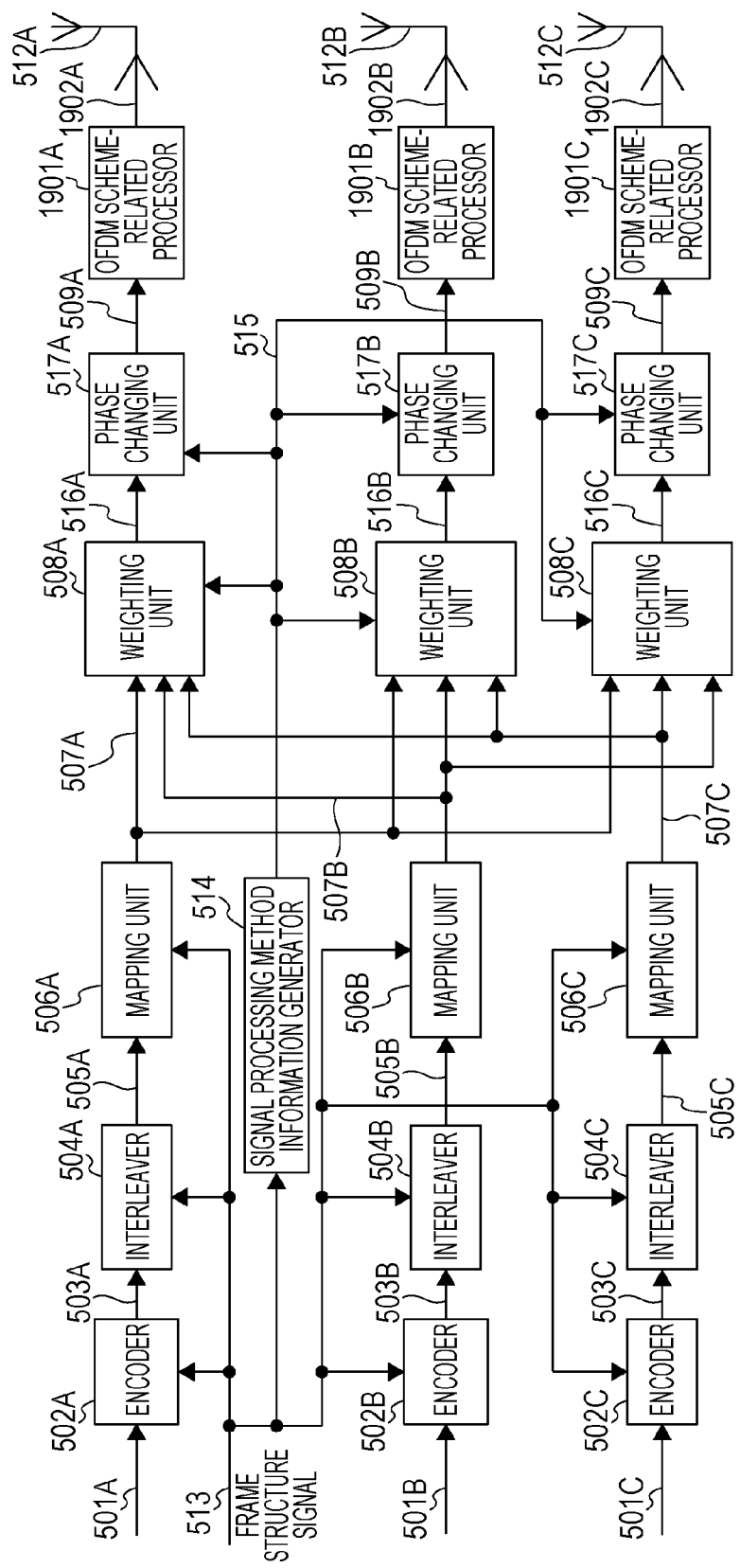
FIG. 19 illustrates a configuration example of the transmission device when an OFDM scheme is used.
Figure 20:
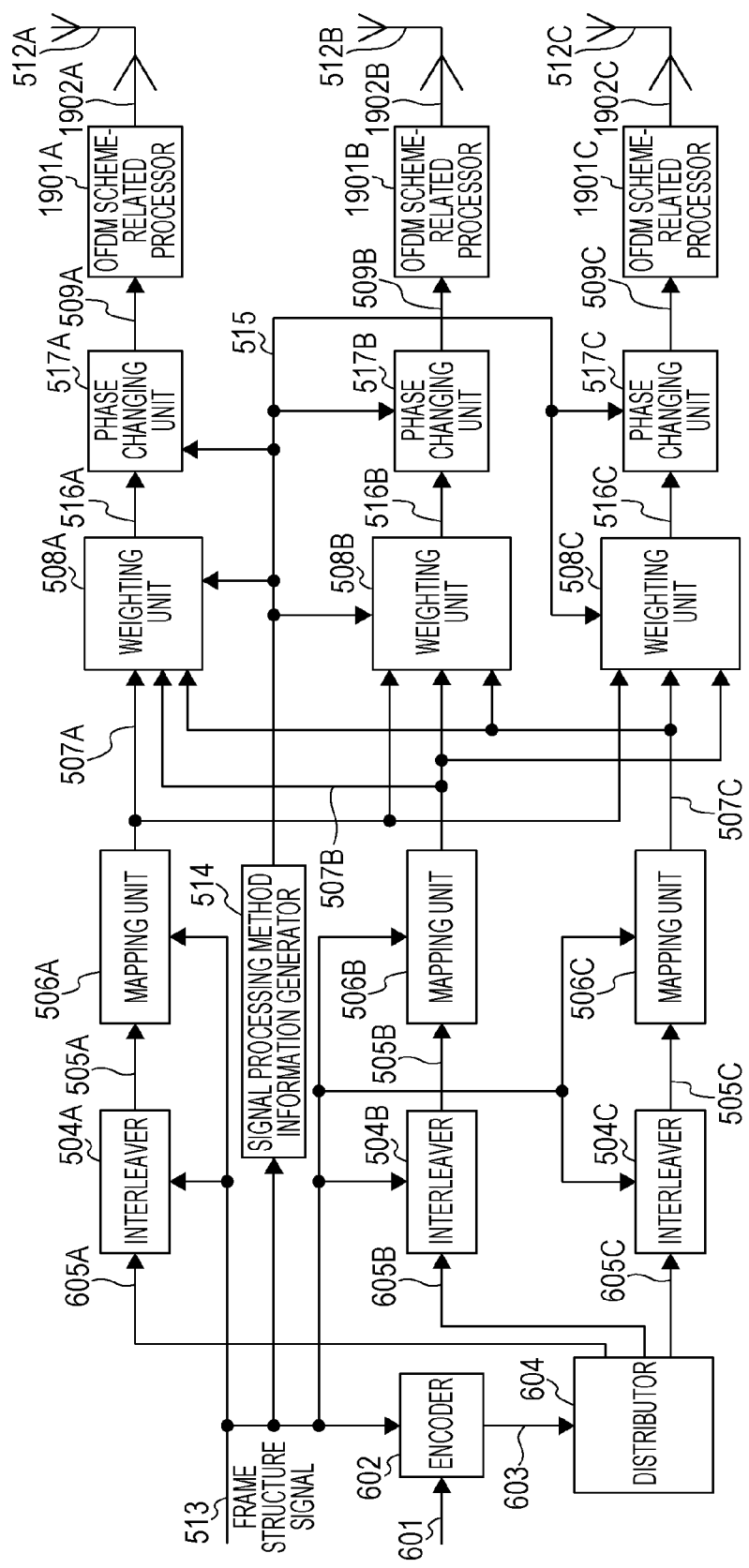
FIG. 20 illustrates a configuration example of the transmission device when the OFDM scheme is used.

FIGS. 19 and 20 illustrate a configuration of a transmission device when the OFDM scheme is used. In FIG. 19, the component operating similarly to FIGS. 5 and 6 is designated by the identical reference mark.

OFDM scheme-related processor 1901A receives post-phase change signal 509A as input, performs processing related to the OFDM scheme, and outputs transmission signal 1902A. Similarly, OFDM scheme-related processor 1901B receives post-phase change signal 509B as input and outputs transmission signal 1902B, and OFDM scheme-related processor 1901C receives post-phase change signal 509C as input and outputs transmission signal 1902C.

Figure 21:
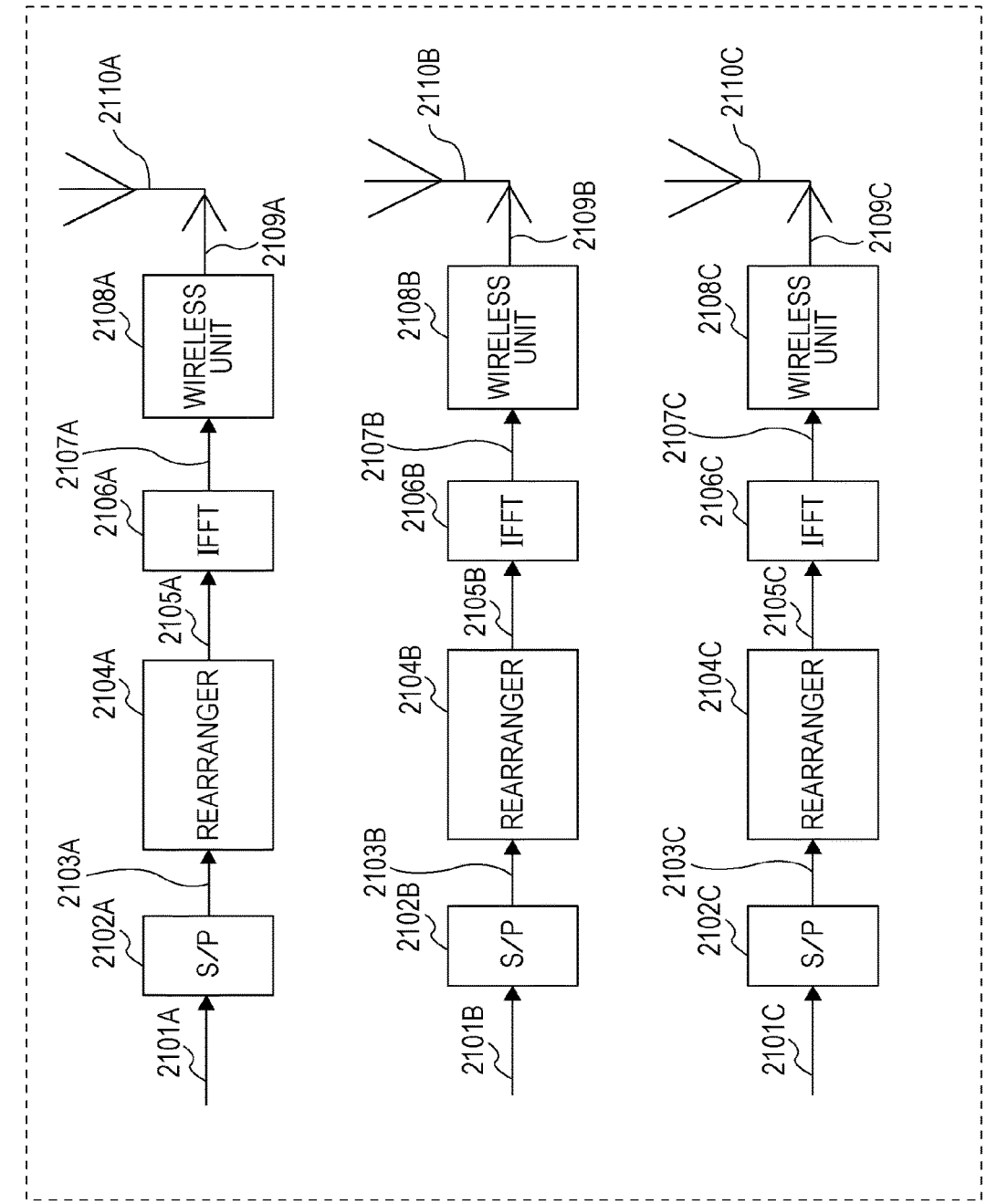
FIG. 21 illustrates a configuration example of the transmission device when the OFDM scheme is used.

FIG. 21 illustrates a configuration example subsequent to OFDM scheme-related processors 1901A, 1901B, and 1901C in FIGS. 19 and 20. Components 2101A to 2110A correspond to components 1901A to 512A in FIGS. 19 and 20, components 2101B to 2110B correspond to components 1901B to 512B, and components 2101C to 2110C correspond to components 1901C to 512C.

Serial-parallel converter 2102A performs the serial-parallel conversion on weighted signal 2101A (corresponding to weighted signal 509A in FIGS. 19 and 20) and outputs parallel signal 2103A.

Rearranger 2104A receives parallel signal 2103A as input, performs the rearrangement, and outputs rearranged signal 2105A. The rearrangement is described in detail later.

Inverse fast Fourier transformer 2106A receives rearranged signal 2105A as input, performs the inverse fast Fourier transform, and outputs post-inverse fast Fourier transform signal 2107A.

Wireless unit 2108A receives post-inverse fast Fourier transform signal 2107A as input, performs the pieces of processing such as the frequency conversion and the amplification, and outputs modulated signal 2109A. Modulated signal 2109A is output as a radio wave from antenna 2110A.

Serial-parallel converter 2102B performs serial-parallel conversion on weighted signal 2101B (corresponding to weighted signal 509B in FIGS. 19 and 20) and outputs parallel signal 2103B.

Rearranger 2104B receives parallel signal 2103B as input, performs the rearrangement, and outputs rearranged signal 2105B. The rearrangement is described in detail later.

Inverse fast Fourier transformer 2106B receives the rearranged signal 2105B as input, performs the inverse fast Fourier transform, and outputs post-inverse fast Fourier transform signal 2107B.

Wireless unit 2108B receives post-inverse fast Fourier transform signal 2107B as input, performs the pieces of processing such as the frequency conversion and the amplification, and outputs modulated signal 2109B. Modulated signal 2109B is output as a radio wave from antenna 2110B.

Serial-parallel converter 2102C performs the serial-parallel conversion on weighted signal 2101C (corresponding to weighted signal 509C in FIGS. 19 and 20) and outputs parallel signal 2103C.

Rearranger 2104C receives parallel signal 2103C as input, performs the rearrangement, and outputs rearranged signal 2105C. The rearrangement is described in detail later.

Inverse fast Fourier transformer 2106C receives rearranged signal 2105C as input, performs the inverse fast Fourier transform, and outputs post-inverse fast Fourier transform signal 2107C.

Wireless unit 2108C receives post-inverse fast Fourier transform signal 2107C as input, performs the pieces of processing such as the frequency conversion and the amplification, and outputs modulated signal 2109C. Modulated signal 2109C is output as a radio wave from antenna 2110C.

Because the transmission scheme in which the multi-carrier is used is not adopted in the transmission device in FIGS. 5 and 6, the post-phase change symbol is disposed in a time axis direction. When such the multi-carrier transmission method as the OFDM scheme in FIGS. 19 and 20 is adopted, it is conceivable that, for each (sub) carrier, the symbol that is subjected to the precoding and phase change is disposed in the time axis direction as illustrated in FIGS. 5 and 6. For the multi-carrier transmission scheme, it is also conceivable that the symbol is disposed in the frequency axis direction, or both the frequency axis and time axis directions. This point will be described below.

FIG. 22 illustrates an example of the symbol rearranging method on a horizontal axis indicating the frequency and a vertical axis indicating the time in rearrangers 2104A, 2104B, and 2104C in FIG. 21. In FIG. 22, the frequency axis is constructed with (sub) carrier 0 to (sub) carrier 9. Modulated signals $z_1$, $z_2$, and $z_3$ use the identical frequency band at the same clock time (time). FIG. 22A illustrates a method for rearranging the symbol of modulated signal $z_1$, FIG. 22B illustrates the method for rearranging the symbol of modulated signal $z_2$, and FIG. 22C illustrates the method for rearranging the symbol of modulated signal $z_3$. Numbers #0, #1, #2, #3, . . . are sequentially assigned to the symbol of weighted and post phase change signal 2101A input to serial-parallel converter 2102A.

At this point, as illustrated in FIG. 22A, symbols #0, #1, #2, #3, . . . are regularly disposed from carrier 0 such that symbols #0 to #9 are sequentially disposed at clock time $1, and such that symbols #10 to #19 are sequentially disposed at clock time $2. Modulated signals $z_1$, $z_2$, and $z_3$ are complex signals.

Similarly, numbers #0, #1, #2, #3, . . . are assigned to the symbols of weighted and post phase change signal 2101B which is input to serial-parallel converter 2102B.

At this point, as illustrated in FIG. 22B, symbols #0, #1, #2, #3, . . . are regularly disposed from carrier 0 such that symbols #0 to #9 are sequentially disposed at clock time $1, and such that symbols #10 to #19 are sequentially disposed at clock time $2.

Similarly, numbers #0, #1, #2, #3, . . . are sequentially assigned to the symbol of weighted and post phase change signal 2101C which is input to serial-parallel converter 2102C.

At this point, as illustrated in FIG. 22C, symbols #0, #1, #2, #3, . . . are regularly disposed from carrier 0 such that symbols #0 to #9 are sequentially disposed at clock time $1, and such that symbols #10 to #19 are sequentially disposed at clock time $2.

Thus, when such the multi-carrier transmission method as OFDM scheme is used, the symbols can be disposed in the frequency axis direction unlike the single carrier transmission. The disposition of the symbols is not limited to that in FIG. 22. Other examples will be described with reference to FIGS. 23 and 24.

Figure 23A:
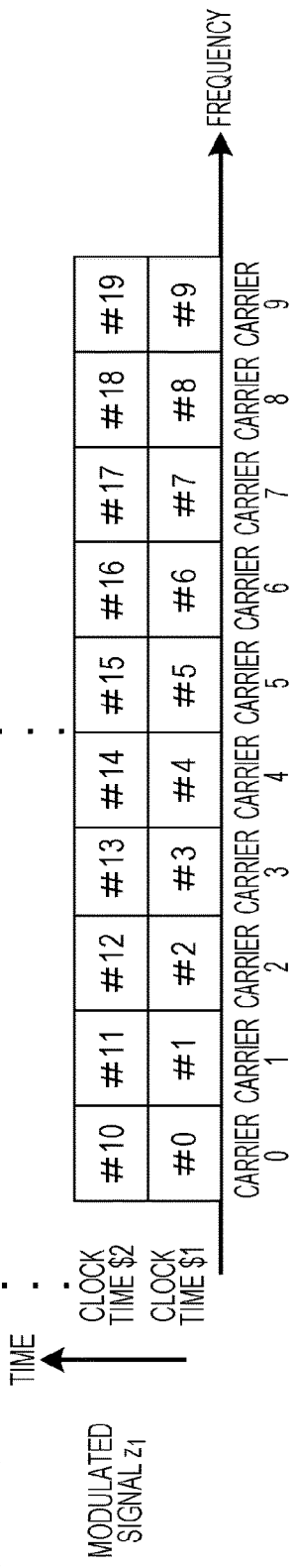
FIG. 23A illustrates an example of the symbol rearranging method.
Figure 23B:
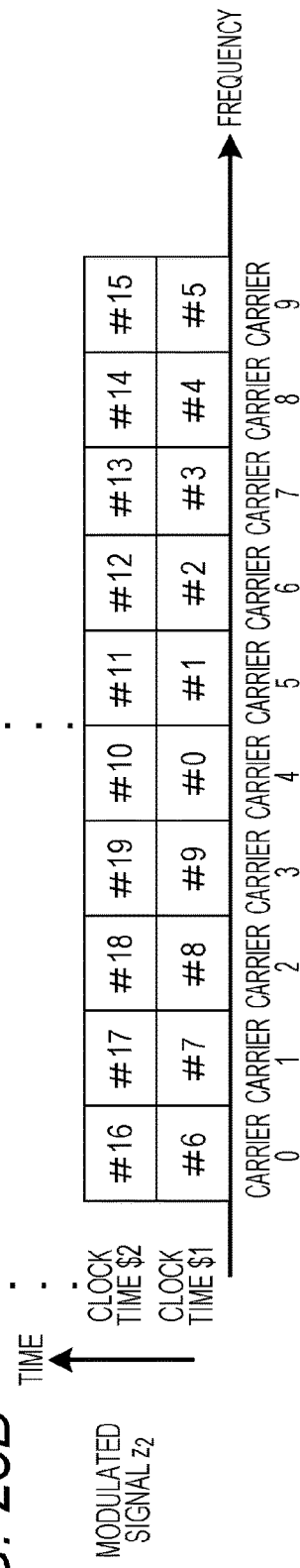
FIG. 23B illustrates an example of the symbol rearranging method.
Figure 23C:
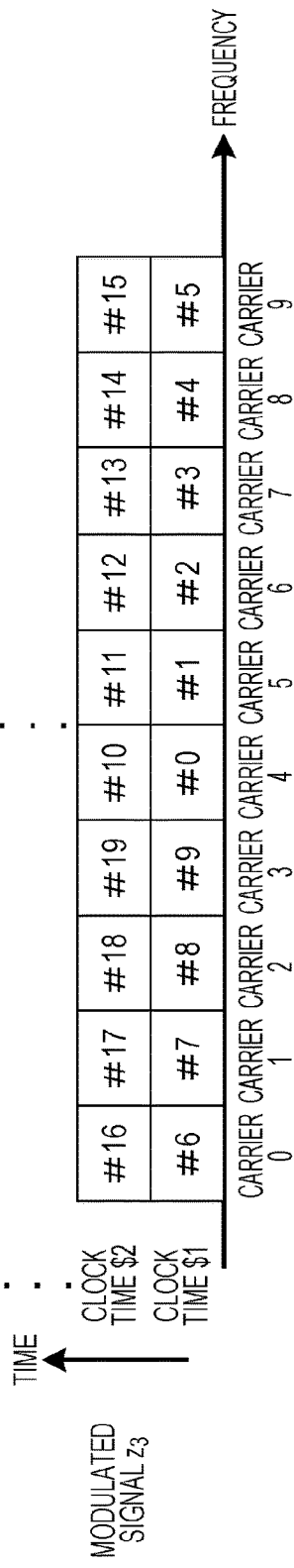
FIG. 23C illustrates an example of the symbol rearranging method.

FIG. 23 illustrates another example, which is different from FIG. 22, of the symbol rearranging method on the horizontal axis indicating the frequency and the vertical axis indicating the time in rearrangers 2104A, 2104B, and 2104C in FIG. 21. FIG. 23A illustrates the method for rearranging the symbol of modulated signal $z_1$, FIG. 23B illustrates the method for rearranging the symbol of modulated signal $z_2$, and FIG. 23C illustrates the method for rearranging the symbol of modulated signal $z_3$. The symbol rearranging method in FIG. 23 differs from the symbol rearranging method in FIG. 22 in the method for rearranging the symbols of the modulated signals $z_1$, $z_2$, and $z_3$. In FIG. 23B, symbols #0 to #5 are disposed in carriers 4 to 9, symbols #6 to #9 are disposed in carriers 0 to 3, and symbols #10 to #19 are disposed in each of the carriers in the similar way. In FIG. 23C, symbols #0 to #5 are disposed in carriers 4 to 9, symbols #6 to #9 are disposed in carriers 0 to 3, and symbols #10 to #19 are disposed in each of the carriers in the similar way.

Figure 24A:
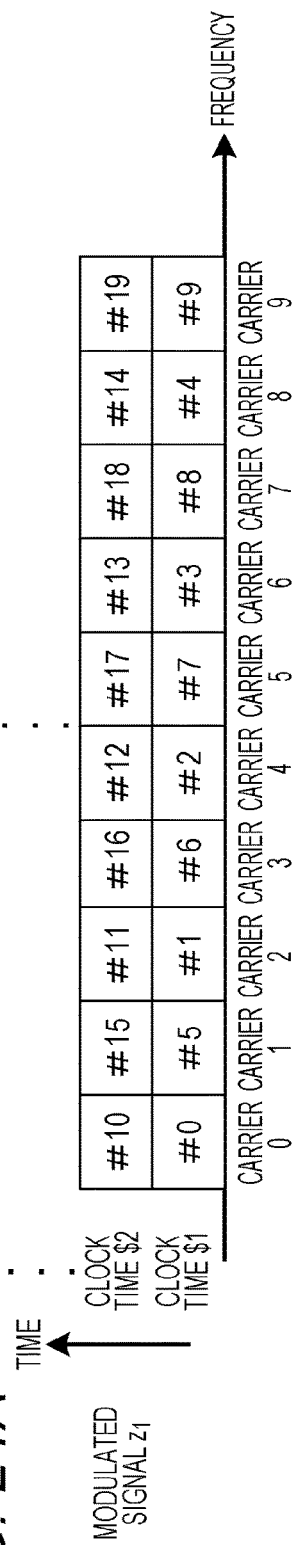
FIG. 24A illustrates an example of the symbol rearranging method.
Figure 24B:
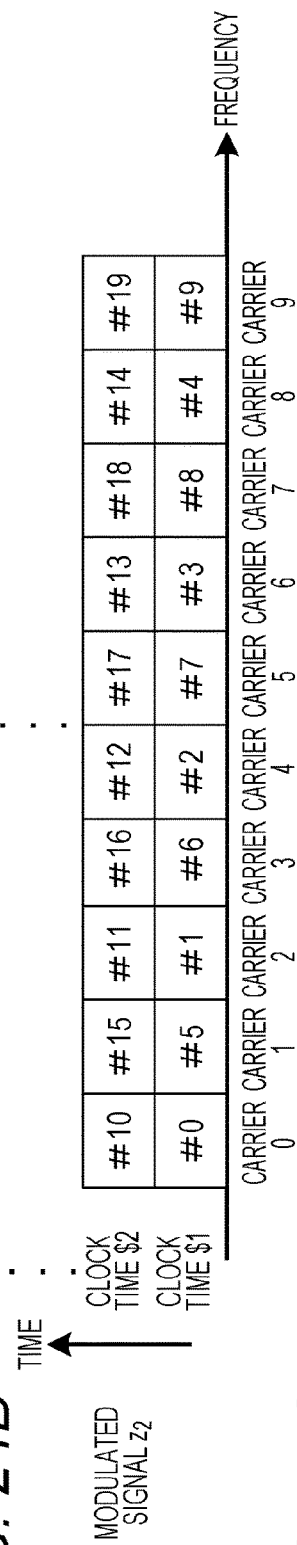
FIG. 24B illustrates an example of the symbol rearranging method.
Figure 24C:
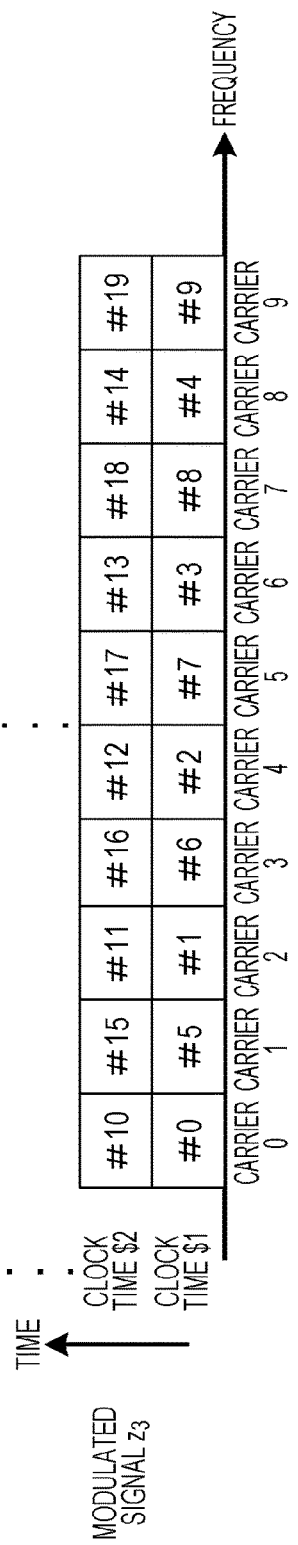
FIG. 24C illustrates an example of the symbol rearranging method.

FIG. 24 illustrates another example, which is different from FIG. 22, of the symbol rearranging method on the horizontal axis indicating the frequency and the vertical axis indicating the time in rearrangers 2104A, 2104B, and 2104C in FIG. 21. FIG. 24A illustrates the method for rearranging the symbol of modulated signal $z_1$, FIG. 24B illustrates the method for rearranging the symbol of modulated signal $z_2$, and FIG. 24C illustrates the method for rearranging the symbol of modulated signal $z_3$. The symbol rearranging method in FIG. 24 differs from the symbol rearranging method in FIG. 22 in that the symbols are not sequentially disposed in FIG. 24 while the symbols are sequentially disposed in FIG. 22. In FIG. 24, similarly to FIG. 23, the methods for rearranging the symbols of the modulated signals $z_1$, $z_2$, and $z_3$ may differ from one another.

Figure 25A:
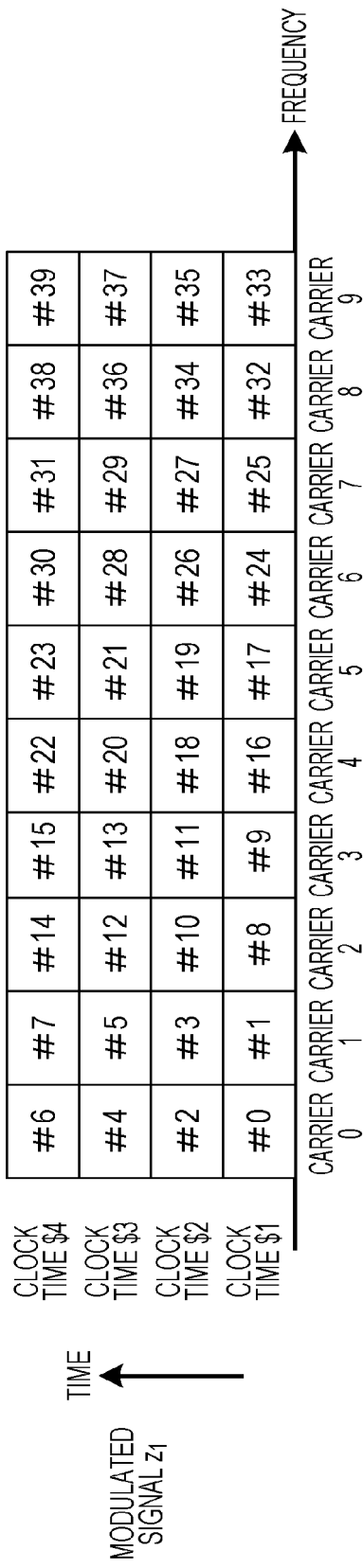
FIG. 25A illustrates an example of the symbol rearranging method.
Figure 25B:
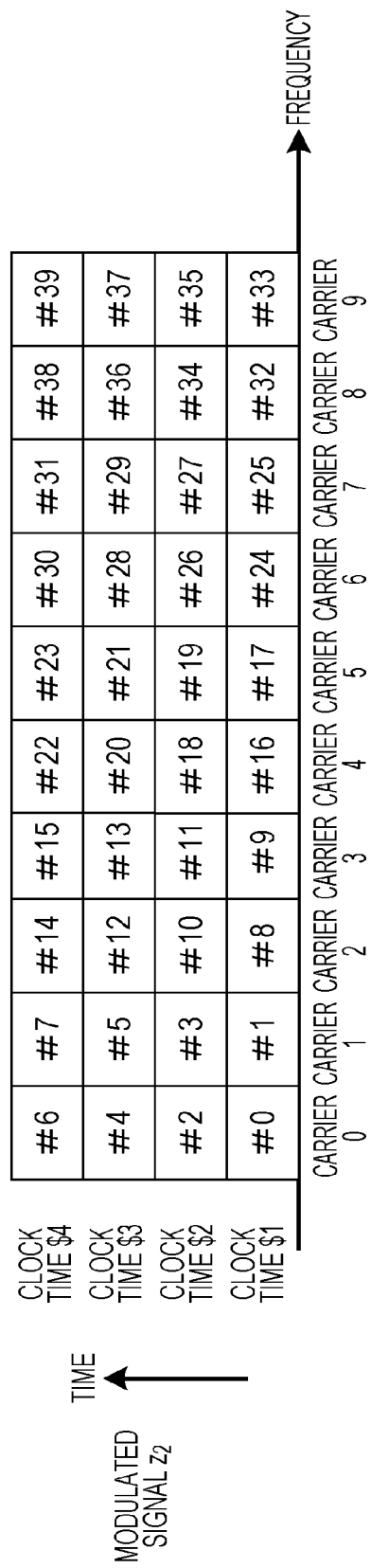
FIG. 25B illustrates an example of the symbol rearranging method.
Figure 25C:
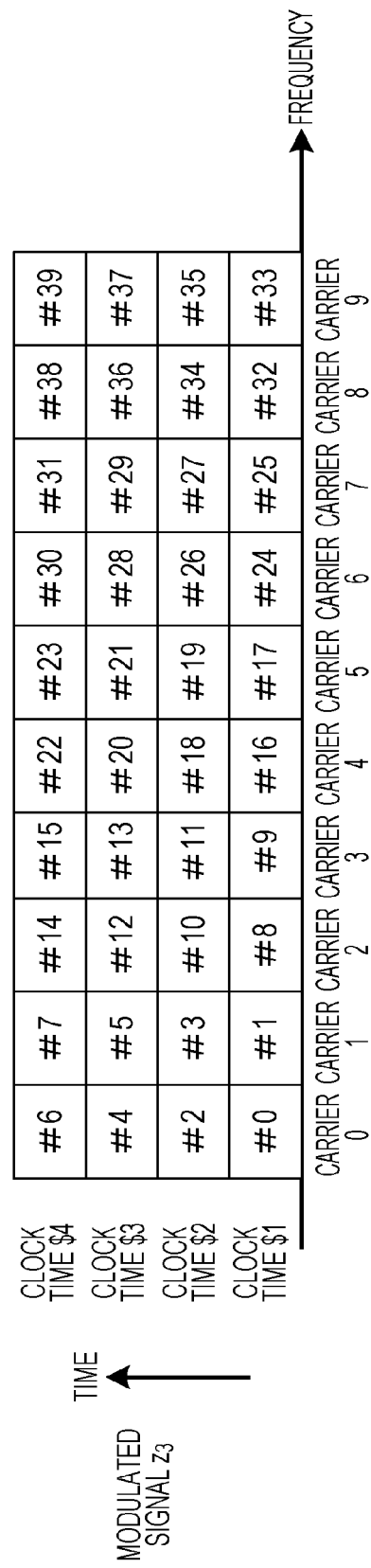
FIG. 25C illustrates an example of the symbol rearranging method.

FIG. 25 illustrates another example, which is different from FIG. 22 to FIG. 24, of the symbol rearranging method on the horizontal axis indicating the frequency and the vertical axis indicating the time in rearrangers 2104A, 2104B, and 2104C in FIG. 21. FIG. 25A illustrates the method for rearranging the symbol of modulated signal $z_1$, FIG. 25B illustrates the method for rearranging the symbol of modulated signal $z_2$, and FIG. 25C illustrates the method for rearranging the symbol of modulated signal $z_3$. The symbols are arranged in both the frequency axis and time axis directions in FIG. 25, while the symbols are arranged in the frequency axis direction in FIGS. 22 to 24.

Figure 26A:
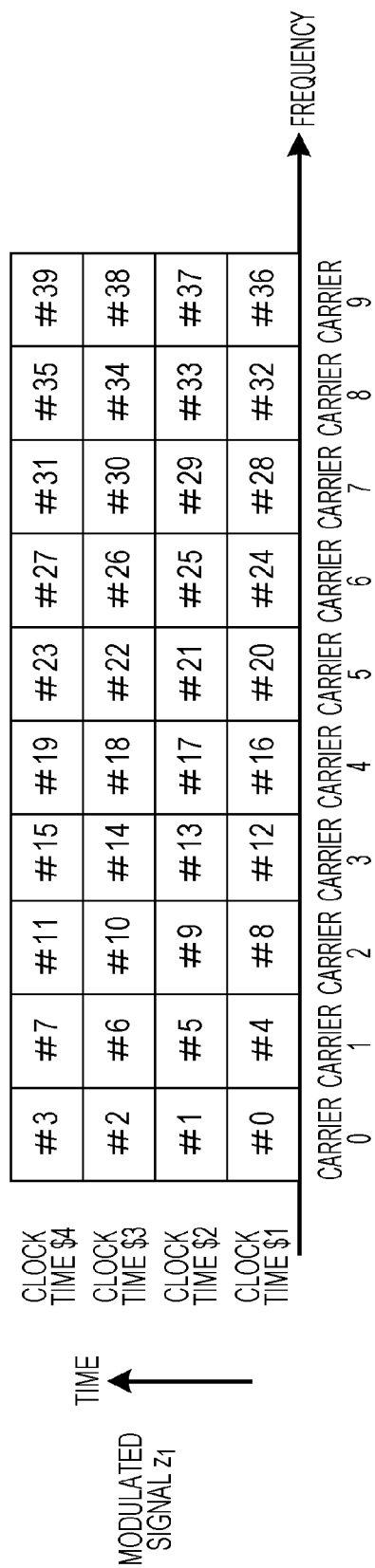
FIG. 26A illustrates an example of the symbol rearranging method.
Figure 26B:
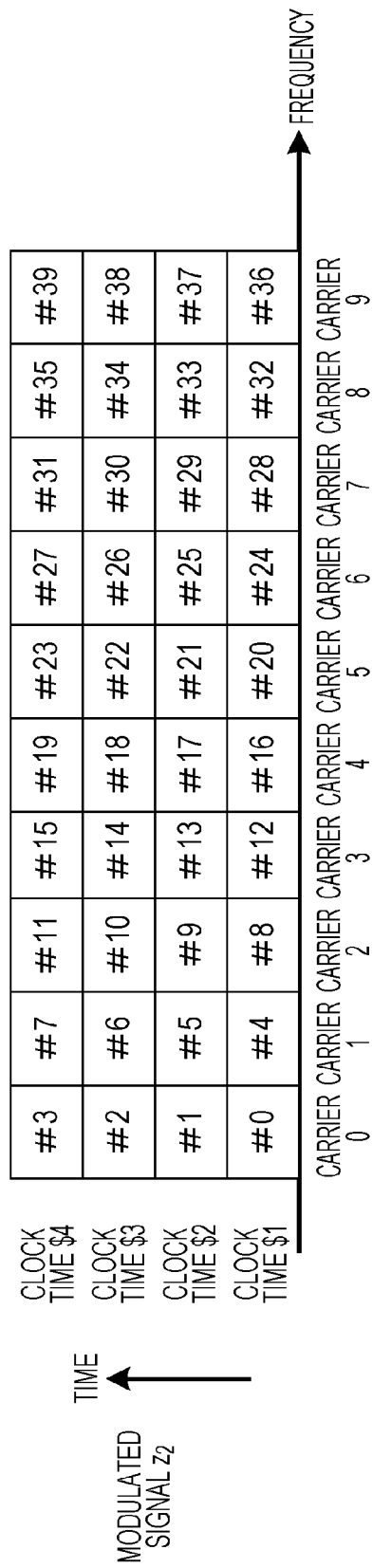
FIG. 26B illustrates an example of the symbol rearranging method.
Figure 26C:
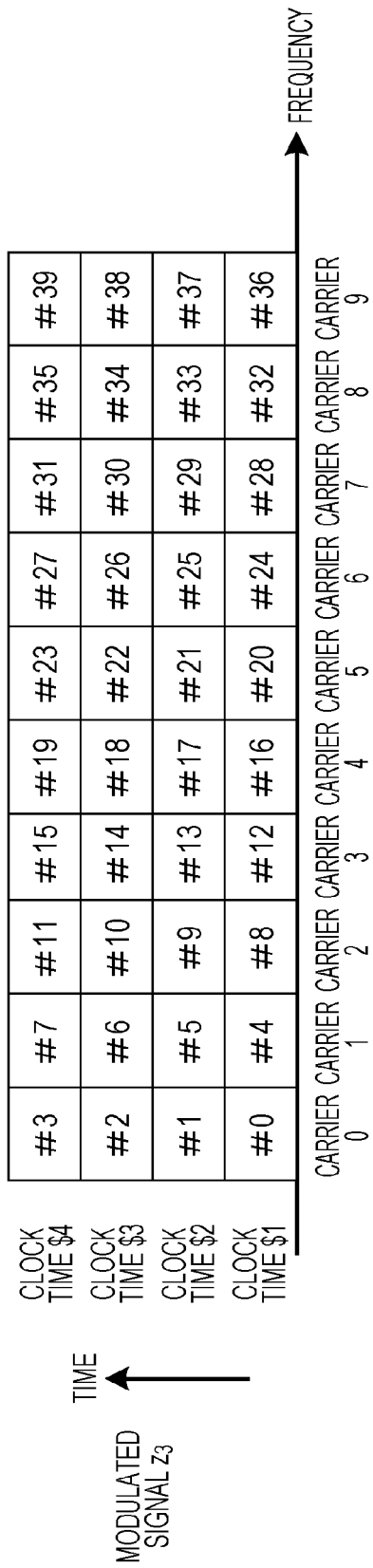
FIG. 26C illustrates an example of the symbol rearranging method.

FIG. 26 illustrates another example, which is different from FIG. 25, of the symbol rearranging method on the horizontal axis indicating the frequency and the vertical axis indicating the time in rearrangers 2104A, 2104B, and 2104C in FIG. 21. FIG. 26A illustrates the method for rearranging the symbol of modulated signal $z_1$, FIG. 26B illustrates the method for rearranging the symbol of modulated signal $z_2$, and FIG. 26C illustrates the method for rearranging the symbol of modulated signal $z_3$. In FIG. 26, similarly to FIG. 25, the symbols are disposed on both the frequency and time axes. The symbol rearranging method in FIG. 26 differs from the symbol rearranging method in FIG. 25 in the following point. That is, in FIG. 25, high priority is given to the frequency axis direction and then the symbols are disposed on the time axis direction. On the other hand, in FIG. 26, high priority is given to the time axis direction and then the symbols are disposed on the frequency axis direction.

Although the symbol disposing methods are described in some drawings, the symbol disposing method is not limited to the above methods. The symbol may randomly be disposed on the time-frequency axis, or dispose according to a certain rule.

Accordingly, the first exemplary embodiment leads to the following advantageous effect. That is, there is a high possibility of improving the data reception quality, and particularly there is a high possibility of largely improving the data reception quality in the LOS environment in which the direct wave is dominant.

For example, the precoding matrix may be switched when the set of modulation schemes of the three streams is switched. The phase changing method may be switched when the set of modulation schemes of the three streams is switched. The precoding matrix and the phase changing method may be switched when the set of modulation schemes of the three streams is switched. (The precoding matrix and the phase changing need not be switched even if the set of modulation schemes of the three streams is switched).

For the interleaver, the data need not be rearranged.

Second Exemplary Embodiment

The transmission method, reception method, transmission device, and reception device in the case that the three streams are transmitted using the three antennas are described in the first exemplary embodiment.

A transmission method, a reception method, a transmission device, and a reception device in the case that four streams that can obtain the advantageous effect similar to that of the first exemplary embodiment are transmitted using four antennas will be described in a second exemplary embodiment.

Figure 27:
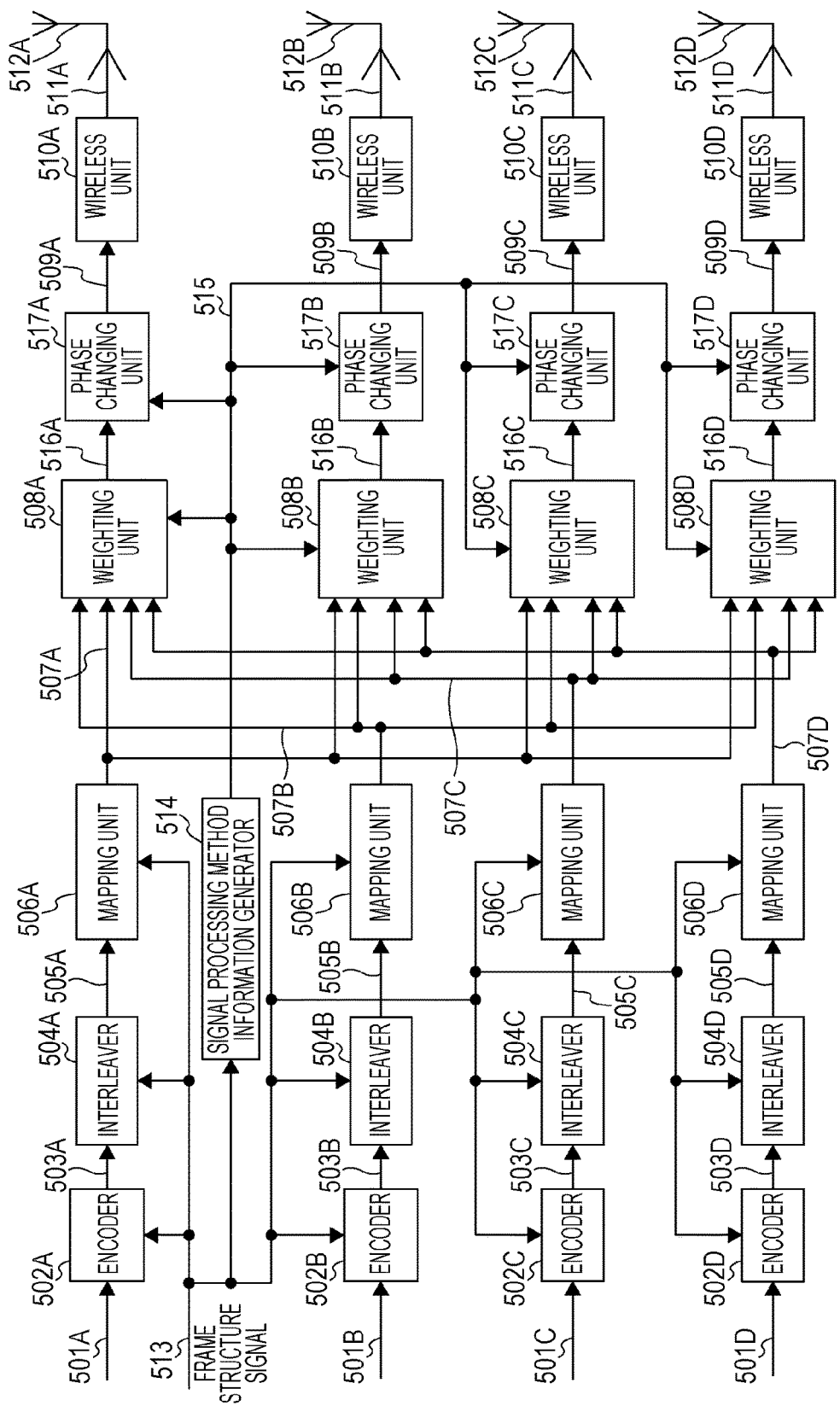
FIG. 27 illustrates a configuration example of the transmission device.

FIG. 27 illustrates a configuration example of the transmission device of the second exemplary embodiment. In FIG. 27, the component operating similarly to FIG. 5 is designated by the identical reference mark. The transmission device in FIG. 27 differs from the transmission device in FIG. 5 in that fourth coded data exists. The operation of the component associated with the fourth coded data will be described below. (The operations of other component are similar to those in FIG. 5 of the first exemplary embodiment.)

Encoder 502D receives information (data) 501D and frame structure signal 513 as input, performs the error correction coding such as the convolutional coding, the LDPC coding, and the turbo coding according to frame structure signal 513, and outputs encoded data 503D. Frame structure signal 513 includes information such as an error correction scheme used in the error correction coding of the data, a coding rate, a block length, and the like. Encoder 502D uses the error correction scheme indicated by frame structure signal 513. Additionally, the error correction scheme may be switched.

Interleaver 504D receives encoded data 503D and frame structure signal 513 as input, performs the interleaving, namely, the rearrangement, and outputs interleaved data 505D. (The interleaving method may be switched based on frame structure signal 513.)

Mapping unit 506D receives interleaved data 505D and frame structure signal 513 as input, performs the modulation such as QPSK (Quadrature Phase Shift Keying), 16QAM (16 Quadrature Amplitude Modulation), and 64QAM (64 Quadrature Amplitude Modulation), and outputs baseband signal 507D. (The modulation scheme may be switched based on frame structure signal 513.) The modulation scheme is not limited to the QPSK, 16QAM, and 64QAM, but non-uniform mapping may be performed. That is, plural signal points may exist in the I-Q plane.

Weighting unit 508A receives baseband signals 507A, 507B, 507C, and 507D and information 515 on the signal processing method as input, performs the weighting on baseband signals 507A, 507B, 507C, and 507D based on information 515 on the signal processing method, and outputs weighted signal 516A. The weighting method is described in detail later.

Weighting unit 508B receives baseband signals 507A, 507B, 507C, and 507D and information 515 on the signal processing method as input, performs the weighting on baseband signals 507A, 507B, 507C, and 507D based on information 515 on the signal processing method, and outputs weighted signal 5166. The weighting method is described in detail later.

Weighting unit 508C receives baseband signals 507A, 507B, 507C, and 507D and information 515 on the signal processing method as input, performs the weighting on baseband signals 507A, 507B, 507C, and 507D based on information 515 on the signal processing method, and outputs weighted signal 516C. The weighting method is described in detail later.

Weighting unit 508D receives baseband signals 507A, 507B, 507C, and 507D and information 515 on the signal processing method as input, performs the weighting on baseband signals 507A, 507B, 507C, and 507D based on information 515 on the signal processing method, and outputs weighted signal 516D. The weighting method is described in detail later.

Phase changing unit 517D receives weighted signal 516D and information 515 on the signal processing method as input, and regularly changes and outputs the phase of signal 516D. The term "regularly change" means that the phase is changed according to a predetermined phase changing pattern in a predetermined period (for example, every n symbol (n is an integer of 1 or more) or every predetermined time). The detailed phase changing pattern is described later. (The phase change need not be performed.)

Figure 29:
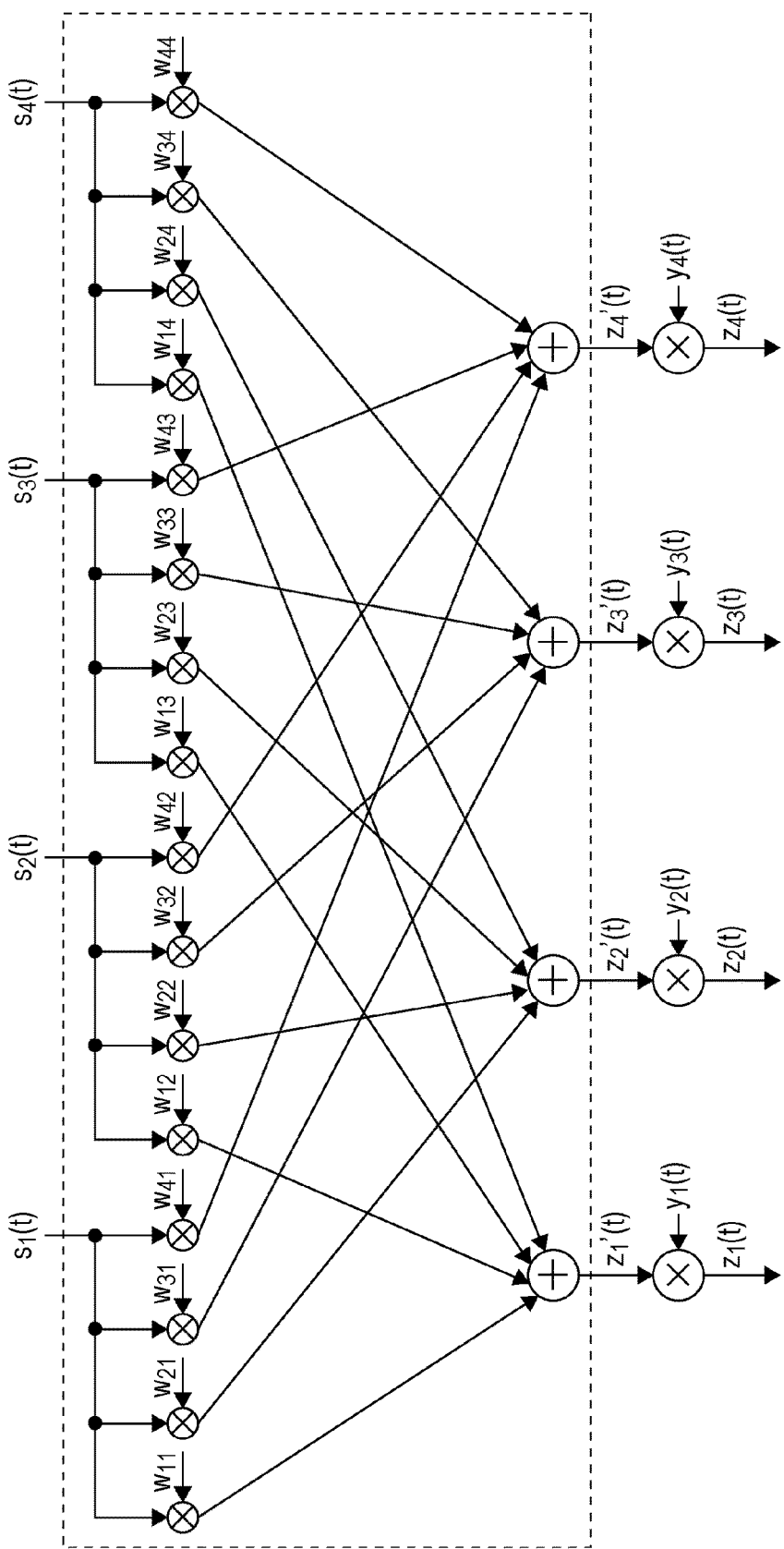
FIG. 29 illustrates configuration examples of the weighting unit and the phase changing unit.

FIG. 29 illustrates configurations of the weighting unit (508A, 508B, 508C, and 508D) and the phase changing unit (517A, 517B, 517C, and 517D). An area surrounded by a dotted line in FIG. 29 constitutes the weighting unit, and a subsequent stage of the weighting unit constitutes the phase changing unit. Weighting units 508A, 508B, 508C, and 508D in FIG. 27 are collectively illustrated as the weighting unit in FIG. 29. Phase changing units 517A, 517B, 517C, and 517D in FIG. 27 are collectively illustrated as the phase changing unit in FIG. 29.

Baseband signal 507A is multiplied by $w_{11}$ to generate $w_{11} \times s_1(t)$, baseband signal 507A is multiplied by $w_{21}$ to generate $w_{21} \times s_1(t)$, baseband signal 507A is multiplied by $w_{31}$ to generate $w_{31} \times s_1(t)$, and baseband signal 507A is multiplied by $w_{41}$ to generate $w_{41} \times s_1(t)$.

Similarly, baseband signal 507B is multiplied by $w_{12}$ to generate $w_{12} \times s_2(t)$, baseband signal 507B is multiplied by $w_{22}$ to generate $w_{22} \times s_2(t)$, baseband signal 507B is multiplied by $w_{32}$ to generate $w_{32} \times s_2(t)$, and baseband signal 507B is multiplied by $w_{42}$ to generate $w_{42} \times s_2(t)$.

Similarly, baseband signal 507C is multiplied by $w_{13}$ to generate $w_{13} \times s_3(t)$, baseband signal 507C is multiplied by $w_{23}$ to generate $w_{23} \times s_3(t)$, baseband signal 507C is multiplied by $w_{33}$ to generate $w_{33} \times s_3(t)$, and baseband signal 507C is multiplied by $w_{43}$ to generate $w_{43} \times s_3(t)$.

Similarly, baseband signal 507D is multiplied by $w_{14}$ to generate $w_{14} \times s_4(t)$, baseband signal 507D is multiplied by $w_{24}$ to generate $w_{24} \times s_4(t)$, baseband signal 507D is multiplied by $w_{34}$ to generate $w_{34} \times s_4(t)$, and baseband signal 507D is multiplied by $w_{44}$ to generate $w_{44} \times s_4(t)$.

At this point, as can be seen from the above description, $s_1(t)$, $s_2(t)$, $s_3(t)$, and $s_4(t)$ constitute the baseband signal (post-mapping baseband signal) of the modulation scheme such as the BPSK (Binary Phase Shift Keying), the QPSK, the 8PSK (8 Phase Shift Keying), the 16QAM, the 32QAM (32 Quadrature Amplitude Modulation), the 64QAM, the 256QAM, and the 16APSK (16 Amplitude Phase Shift Keying).

For example, it is assumed that the weighting unit performs the weighting using the fixed precoding matrix. At this point, the precoding matrix is expressed by Equation (47).

[Mathematical formula 47]

$$\begin{pmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \quad \text{Equation (47)}$$

Where $a_{11}$ is a complex number (may be a real number), $a_{12}$ is a complex number (may be a real number), $a_{13}$ is a complex number (may be a real number), $a_{14}$ is a complex number (may be a real number), $a_{21}$ is a complex number (may be a real number), $a_{22}$ is a complex number (may be a real number), $a_{23}$ is a complex number (may be a real number), $a_{24}$ is a complex number (may be a real number), $a_{31}$ is a complex number (may be a real number), $a_{32}$ is a complex number (may be a real number), $a_{33}$ is a complex number (may be a real number), $a_{34}$ is a complex number (may be a real number), $a_{41}$ is a complex number (may be a real number), $a_{42}$ is a complex number (may be a real number), $a_{43}$ is a complex number (may be a real number), and $a_{44}$ is a complex number (may be a real number). Accordingly, $a_{xy}=A_{xy}e^{j\delta_{xy}}$ is obtained. (Where j is an imaginary unit, $A_{xy}$ is a real number of 0 or more, and $\delta_{xy}$ is an argument. x may be one of values 1, 2, 3, and 4 and y may be one of values 1, 2, 3, and 4.)

All $a_{11}$, $a_{12}$, $a_{13}$, and $a_{14}$ do not become 0 (zero), all $a_{21}$, $a_{22}$, $a_{23}$, and $a_{24}$ do not become 0 (zero), all $a_{31}$, $a_{32}$, $a_{33}$, and $a_{34}$ do not become 0 (zero), and all $a_{41}$, $a_{42}$, $a_{43}$, and $a_{44}$ do not become 0 (zero). All $a_{11}$, $a_{21}$, $a_{31}$, and $a_{41}$ do not become 0 (zero), all $a_{12}$, $a_{22}$, $a_{32}$, and $a_{42}$ do not become 0 (zero), all $a_{13}$, $a_{23}$, $a_{33}$, and $a_{43}$ do not become 0 (zero), and all $a_{14}$, $a_{24}$, $a_{34}$, and $a_{44}$ do not become 0 (zero).

Accordingly, in FIG. 27, Equation (48) holds when the weighted (post-precoding) signals are set to $z_1'(t)$ (corresponding to 516A in FIG. 27), $z_2'(t)$ (corresponding to 516B in FIG. 27), $z_3'(t)$ (corresponding to 516C in FIG. 27), and $z_4'(t)$ (corresponding to 516D in FIG. 27).

[Mathematical formula 48]

$$\begin{pmatrix} z_1'(t) \\ z_2'(t) \\ z_3'(t) \\ z_4'(t) \end{pmatrix} = \begin{pmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{pmatrix} \begin{pmatrix} s_1(t) \\ s_2(t) \\ s_3(t) \\ s_4(t) \end{pmatrix} \quad \text{Equation (48)}$$

$$= \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} s_1(t) \\ s_2(t) \\ s_3(t) \\ s_4(t) \end{pmatrix}$$

For example, the precoding matrix may be switched by the modulation scheme (or a set of modulation schemes (in FIG. 27, a set of four modulation schemes)), the error correction coding scheme (for example, the error correction code used, or a code length (block length) of an error correction code, and a coding rate of the error correction code).

In the above example, the fixed precoding matrix is used as the precoding matrix by way of example. Alternatively, for example, the precoding matrix may be switched by time. At this point, the precoding matrix is expressed by Equation (49).

[Mathematical formula 49]

$$\begin{pmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{pmatrix} = \begin{pmatrix} a_{11}(t) & a_{12}(t) & a_{13}(t) & a_{14}(t) \\ a_{21}(t) & a_{22}(t) & a_{23}(t) & a_{24}(t) \\ a_{31}(t) & a_{32}(t) & a_{33}(t) & a_{34}(t) \\ a_{41}(t) & a_{42}(t) & a_{43}(t) & a_{44}(t) \end{pmatrix} \quad \text{Equation (49)}$$

Where $a_{11}(t)$ is a complex number (may be a real number), $a_{12}(t)$ is a complex number (may be a real number), $a_{13}(t)$ is a complex number (may be a real number), $a_{14}(t)$ is a complex number (may be a real number), $a_{21}(t)$ is a complex number (may be a real number), $a_{22}(t)$ is a complex number (may be a real number), $a_{23}(t)$ is a complex number (may be a real number), $a_{24}(t)$ is a complex number (may be a real number), $a_{31}(t)$ is a complex number (may be a real number), $a_{32}(t)$ is a complex number (may be a real number), $a_{33}(t)$ is a complex number (may be a real number), $a_{34}(t)$ is a complex number (may be a real number), $a_{41}(t)$ is a complex number (may be a real number), $a_{42}(t)$ is a complex number (may be a real number), $a_{43}(t)$ is a complex number (may be a real number), and $a_{44}(t)$ is a complex number (may be a real number). Accordingly, $a_{xy}(t) = A_{xy}(t)e^{j\delta_{xy}(t)}$ is obtained. (Where j is an imaginary unit, $A_{xy}(t)$ is a real number of 0 or more, and $\delta_{xy}(t)$ is an argument. x may be one of values 1, 2, 3, and 4 and y may be one of values 1, 2, 3, and 4.)

All $a_{11}(t)$, $a_{12}(t)$, $a_{13}(t)$, and $a_{14}(t)$ do not become 0 (zero), all $a_{21}(t)$, $a_{22}(t)$, $a_{23}(t)$, and $a_{24}(t)$ do not become 0 (zero), all $a_{31}(t)$, $a_{32}(t)$, $a_{33}(t)$, and $a_{34}(t)$ do not become 0 (zero), and all $a_{41}(t)$, $a_{42}(t)$, $a_{43}(t)$, and $a_{44}(t)$ do not become 0 (zero). All $a_{11}(t)$, $a_{21}(t)$, $a_{31}(t)$, and $a_{41}(t)$ do not become 0 (zero), all $a_{12}(t)$, $a_{22}(t)$, $a_{32}(t)$, and $a_{42}(t)$ do not become 0 (zero), all $a_{13}(t)$, $a_{23}(t)$, $a_{33}(t)$, and $a_{43}(t)$ do not become 0 (zero), and all $a_{14}(t)$, $a_{24}(t)$, $a_{34}(t)$, and $a_{44}(t)$ do not become 0 (zero).

Although the function of time t is used in Equation (49), a function of frequency (carrier) f or a function of both time t and frequency (carrier) f may be used. (The precoding matrix of Equation (49) is not limited to these functions.)

As illustrated in FIG. 29, weighted (post-precoding) signal $z_1'(t)$ (corresponding to 516A in FIG. 27) is subjected to the phase change to obtain post-phase change signal (corresponding to 509A in FIG. 27) $z_1(t)$. At this point, assuming that $y_1(t)$ is a phase changing value, post-phase change signal (corresponding to 509A in FIG. 27) $z_1(t)$ is expressed by Equation (50).

[Mathematical formula 50]

$$z_1(t) = y_1(t) \times z_1'(t) \quad \text{Equation (50)}$$

Where $y_1(t)$ is expressed as $B_1 \times e^{j\Theta 1(t)}$ or $e^{j\Theta 1(t)}$. It is assumed that $B_1$ is a real number of 0 or more, and that $\theta_1(t)$ is an argument and is the function of time t. However, $\theta_1$ is not limited to the function of time t. For example, the function of frequency (carrier) f or the function of both time t and frequency (carrier) f may be used. ($\theta_1$ is not limited to these functions.)

$y_1(t)$ is regularly changed. The term "regularly change" means that the phase is changed according to a predetermined phase changing pattern in a predetermined period (for example, every n symbol (n is an integer of 1 or more) or every predetermined time). The detailed phase changing pattern is described later. (The phase change need not be performed.)

As illustrated in FIG. 29, weighted (post-precoding) signal $z_2'(t)$ (corresponding to 516B in FIG. 27) is subjected to the phase change to obtain post-phase change signal (corresponding to 509B in FIG. 27) $z_2(t)$. At this point, assuming that $y_2(t)$ is a phase changing value, post-phase change signal (corresponding to 509B in FIG. 27) $z_2(t)$ is expressed by Equation (51).

[Mathematical formula 51]

$$z_2(t) = y_2(t) \times z_2'(t) \quad \text{Equation (51)}$$

Where $y_2(t)$ is expressed as $B_2 \times e^{j\Theta 2(t)}$ or $e^{j\Theta 2(t)}$. It is assumed that $B_2$ is a real number of 0 or more, and that $\theta_2(t)$ is an argument and is the function of time t. However, $\theta_2$ is not limited to the function of time t. For example, the function of frequency (carrier) f or the function of both time t and frequency (carrier) f may be used. ($\theta_2$ is not limited to these functions.)

$y_2(t)$ is regularly changed. The term "regularly change" means that the phase is changed according to a predetermined phase changing pattern in a predetermined period (for example, every n symbol (n is an integer of 1 or more) or every predetermined time). The detailed phase changing pattern is described later. (The phase change need not be performed.)

As illustrated in FIG. 29, weighted (post-precoding) signal $z_3'(t)$ (corresponding to 516C in FIG. 27) is subjected to the phase change to obtain post-phase change signal (corresponding to 509C in FIG. 27) $z_3(t)$. At this point, assuming that $y_3(t)$ is a phase changing value, post-phase change signal (corresponding to 509C in FIG. 27) $z_3(t)$ is expressed by Equation (52).

[Mathematical formula 52]

$$z_3(t) = y_3(t) \times z_3'(t) \quad \text{Equation (52)}$$

Where $y_3(t)$ is expressed as $B_3 \times e^{j\Theta 3(t)}$ or $e^{j\Theta 3(t)}$. It is assumed that $B_3$ is a real number of 0 or more, and that $\theta_3(t)$ is an argument and is the function of time t. However, $\theta_3$ is not limited to the function of time t. For example, the function of frequency (carrier) f or the function of both time t and frequency (carrier) f may be used. ($\theta_3$ is not limited to these functions.)

$y_3(t)$ is regularly changed. The term "regularly change" means that the phase is changed according to a predetermined phase changing pattern in a predetermined period (for example, every n symbol (n is an integer of 1 or more) or every predetermined time). The detailed phase changing pattern is described later. (The phase change need not be performed.)

As illustrated in FIG. 29, weighted (post-precoding) signal $z_4'(t)$ (corresponding to 516D in FIG. 27) is subjected to the phase change to obtain post-phase change signal (corresponding to 509D in FIG. 27) $z_4(t)$. At this point, assuming that $y_4(t)$ is a phase changing value, post-phase change signal (corresponding to 509D in FIG. 27) $z_4(t)$ is expressed by Equation (53).

[Mathematical formula 53]

$$z_4(t)=y_4(t)\times z_4'(t)$$  Equation (53)

Where $y_4(t)$ is expressed as $B_4 \times e^{j\theta4(t)}$ or $e^{j\theta4(t)}$. It is assumed that $B_4$ is a real number of 0 or more, and that $\theta_4(t)$ is an argument and is the function of time t. However, $\theta_4$ is not limited to the function of time t. For example, the function of frequency (carrier) f or the function of both time t and frequency (carrier) f may be used. ($\theta_4$ is not limited to these functions.)

$y_4(t)$ is regularly changed. The term "regularly change" means that the phase is changed according to a predetermined phase changing pattern in a predetermined period (for example, every n symbol (n is an integer of 1 or more) or every predetermined time). The detailed phase changing pattern is described later. (The phase change need not be performed.)

Figure 28:
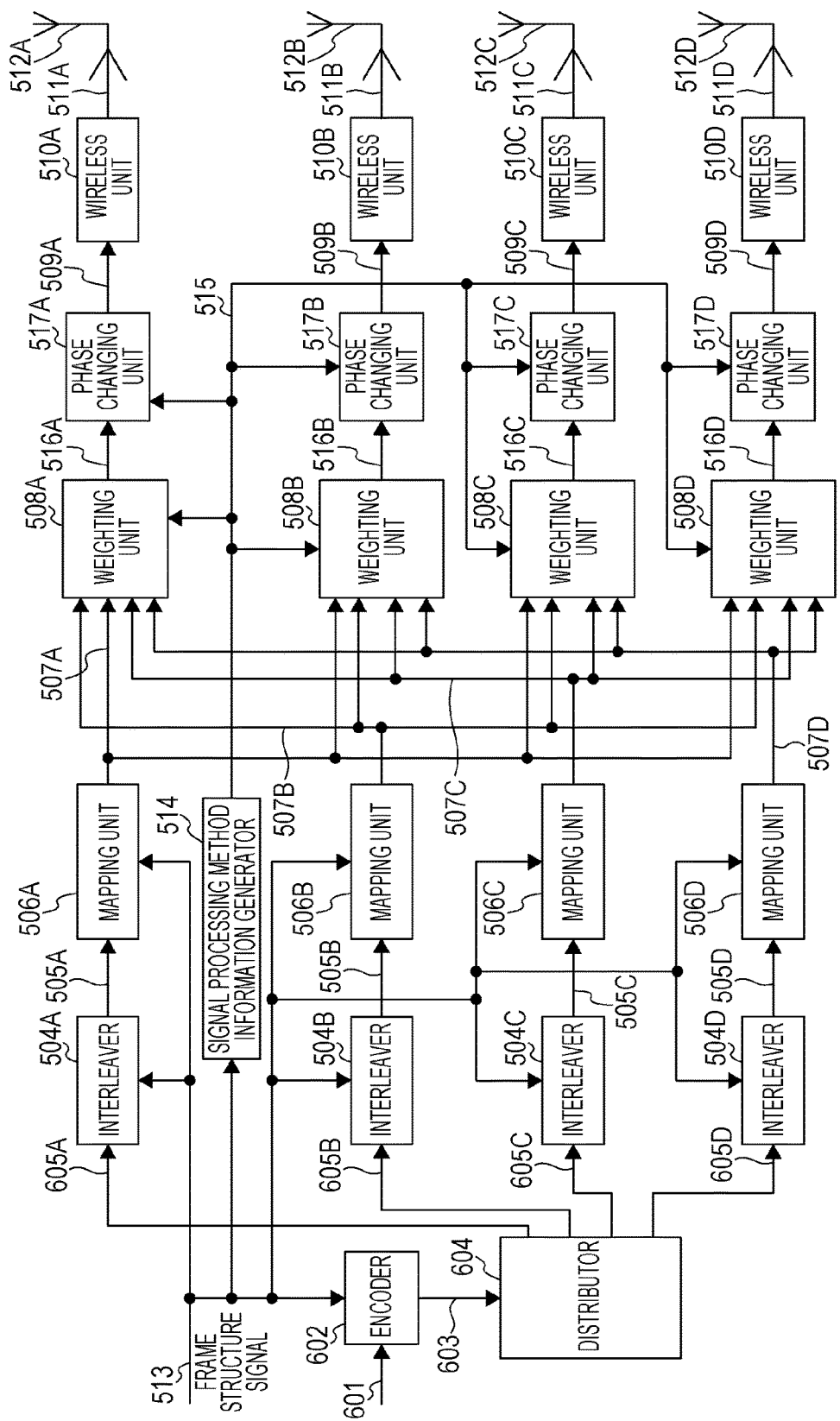
FIG. 28 illustrates a configuration example of the transmission device.

FIG. 28 illustrates a configuration example of a transmission device different from that in FIG. 27. In FIG. 28, a point different from that in FIG. 27 will be described below.

Encoder 602 receives information (data) 601 and frame structure signal 513 as input and, performs the error correction coding according to frame structure signal 513, and outputs encoded data 603.

Distributor 604 receives encoded data 603 as input, distributes data 603, and outputs pieces of data 605A, 605B, 605C, and 605D.

For the coded data of 64800 bits, 64800 bits are divided into four to obtain group A of 16200 bits, group B of 16200 bits, group C of 16200 bits, and group D of 16200 bits. A method for allocating group A of 16200 bits to data 605A, allocating group B of 16200 bits to data 605B, allocating group C of 16200 bits to data 605C, and allocating group D of 16200 bits to data 605D is considered. (64800 bits may be divided in any way. Therefore, the numbers of bits of group A, group B, group C, and group D may different from one another.) (The same holds true for FIG. 6 of the first exemplary embodiment.)

One encoder is illustrated in FIG. 28. Alternatively, the present disclosure may similarly be embodied when the distributor divides the encoded data generated by each of the m (where m is an integer of 1 or more) encoders into pieces of data of four systems and outputs the divided data.

Figure 30:
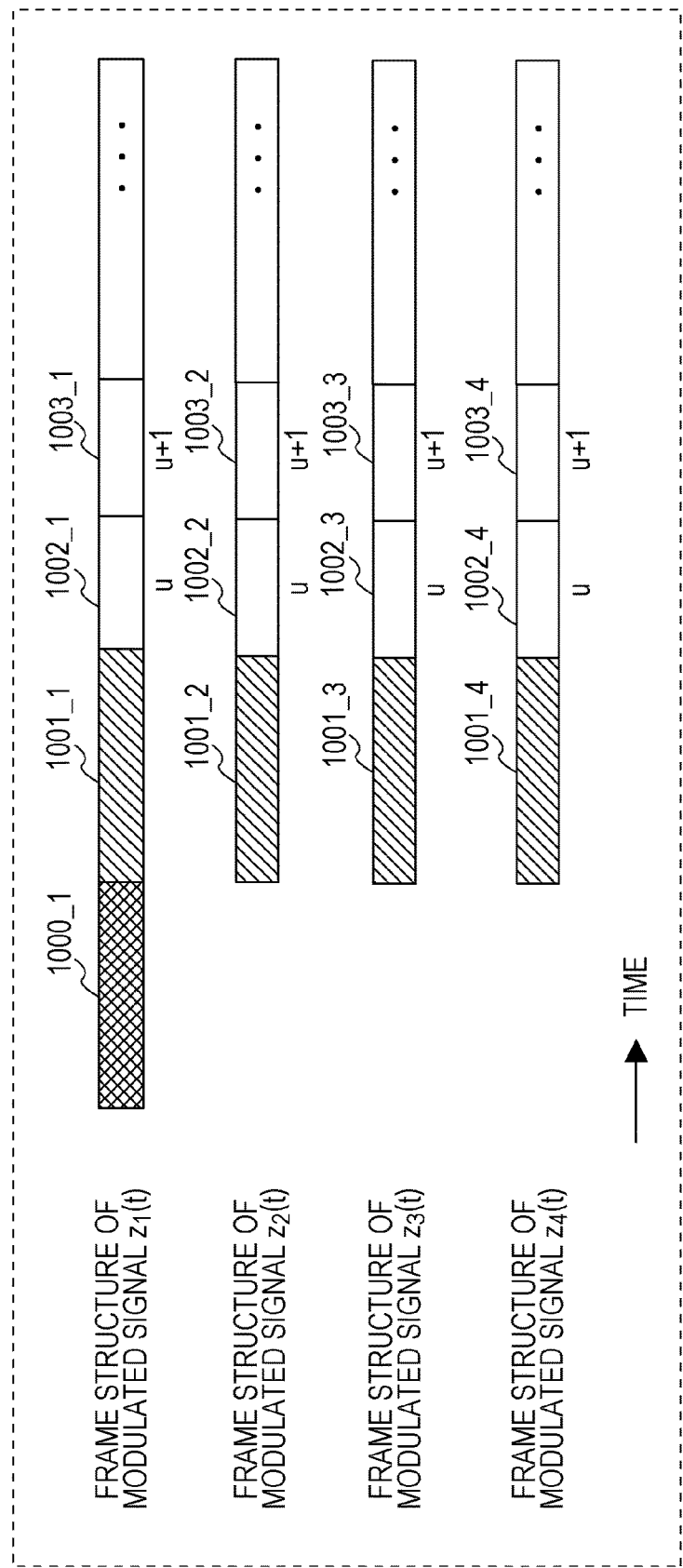
FIG. 30 illustrates an example of the frame structure on the time axis of the transmission device.

FIG. 30 illustrates an example of a frame structure in a time axis of the transmission device of the second exemplary embodiment. Symbol 1000_1 posts the reception device of the transmission method. For example, symbol 1000_1 transmits information such as the error correction scheme used to transmit a data symbol, the coding rate, and the modulation scheme used to transmit the data symbol.

Symbol 1001_1 estimates a channel fluctuation of modulated signal $z_1(t)$ (where t is time) transmitted by the transmission device. Symbol 1002_1 is a data symbol transmitted as symbol number u (on the time axis) by modulated signal $z_1(t)$, and symbol 1003_1 is a data symbol transmitted as symbol number u+1 by modulated signal $z_1(t)$.

Symbol 1001_2 estimates a channel fluctuation of modulated signal $z_2(t)$ (where t is time) transmitted by the transmission device. Symbol 1002_2 is a data symbol transmitted as symbol number u by modulated signal $z_2(t)$, and symbol 1003_2 is a data symbol transmitted as symbol number u+1 by modulated signal $z_2(t)$.

Symbol 1001_3 estimates a channel fluctuation of modulated signal $z_3(t)$ (where t is time) transmitted by the transmission device. Symbol 1002_3 is a data symbol transmitted as symbol number u by modulated signal $z_3(t)$, and symbol 1003_3 is a data symbol transmitted as symbol number u+1 by modulated signal $z_3(t)$.

Symbol 1001_4 estimates a channel fluctuation of modulated signal $z_4(t)$ (where t is time) transmitted by the transmission device. Symbol 1002_4 is a data symbol transmitted as symbol number u by modulated signal $z_4(t)$, and symbol 1003_4 is a data symbol transmitted as symbol number u+1 by modulated signal $z_4(t)$.

At this point, in the symbol of $z_1(t)$, the symbol of $z_2(t)$, the symbol of $z_3(t)$, and the symbol of $z_4(t)$, the symbol of the identical clock time (identical time) is transmitted from the transmit antenna at the identical (common) frequency.

A relationships between modulated signals $z_1(t)$, $z_2(t)$, $z_3(t)$, and $z_4(t)$ transmitted by the transmission device and received signals $r_1(t)$, $r_2(t)$, $r_3(t)$, and $r_4(t)$ received by the reception device will be described below.

Figure 31:
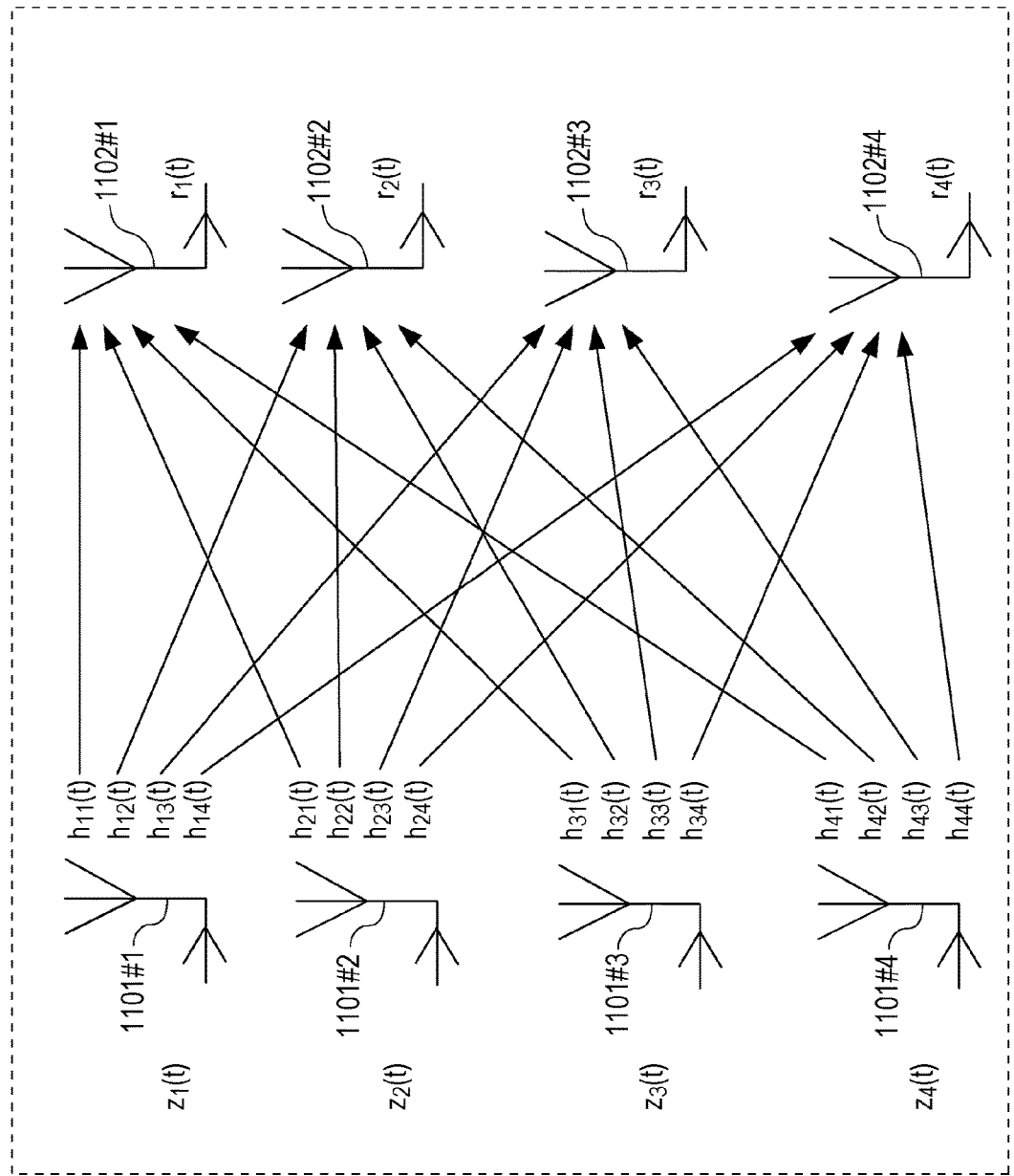
FIG. 31 illustrates examples of the transmit antenna and receive antenna.

In FIG. 31, reference marks 1101#1, 1101#2, 1101#3, and 1101#4 designate the transmit antennas of the transmission device, and reference marks 1102#1, 1102#2, 1102#3, and 1102#4 designate the receive antennas of the reception device. The transmission device transmits the signal corresponding to modulated signal $z_1(t)$ from transmit antenna 1101#1, transmits the signal corresponding to modulated signal $z_2(t)$ from transmit antenna 1101#2, transmits the signal corresponding to modulated signal $z_3(t)$ from transmit antenna 1101#3, and transmits the signal corresponding to modulated signal $z_4(t)$ from transmit antenna 1101#4. In this case, it is assumed that modulated signals $z_1(t)$, $z_2(t)$, and $z_3(t)$, and $z_4(t)$ occupy the identical (common) frequency (band).

The channel fluctuations of each transmit antenna of the transmission device and each antenna of the reception device are set to $h_{11}(t)$, $h_{12}(t)$, $h_{13}(t)$, $h_{14}(t)$, $h_{21}(t)$, $h_{22}(t)$, $h_{23}(t)$, $h_{24}(t)$, $h_{31}(t)$, $h_{32}(t)$, $h_{33}(t)$, $h_{34}(t)$, $h_{41}(t)$, $h_{42}(t)$, $h_{43}(t)$, and $h_{44}(t)$.

Assuming that $r_1(t)$ is the signal received by receive antenna 1102#1 of reception device, that $r_2(t)$ is the signal received by receive antenna 1102#2 of reception device, that $r_3(t)$ is the signal received by receive antenna 1102#3 of reception device, and that $r_4(t)$ is the signal received by receive antenna 1102#4 of reception device, Equation (54) holds.

[Mathematical formula 54]

$$\begin{pmatrix} r_1(t) \\ r_2(t) \\ r_3(t) \\ r_4(t) \end{pmatrix} = \begin{pmatrix} h_{11}(t) & h_{12}(t) & h_{13}(t) & h_{14}(t) \\ h_{21}(t) & h_{22}(t) & h_{23}(t) & h_{24}(t) \\ h_{31}(t) & h_{32}(t) & h_{33}(t) & h_{34}(t) \\ h_{41}(t) & h_{42}(t) & h_{43}(t) & h_{44}(t) \end{pmatrix} \begin{pmatrix} z_1(t) \\ z_2(t) \\ z_3(t) \\ z_4(t) \end{pmatrix}$$  Equation (54)

FIG. 32A illustrates an example of the weighting unit (precoding method) and phase changing unit of the second exemplary embodiment. Weighting unit 1200 is one in which weighting units 508A, 508B, 508C, and 508D in FIG. 27 are integrated.

FIG. 32B illustrates an example of the frame structure. Streams $s_1(t)$, $s_2(t)$, $s_3(t)$, and $s_4(t)$ correspond to baseband signals 507A, 507B, 507C, and 507D in FIG. 27, namely, constitute the in-phase I component and quadrature Q component of the baseband signal according to the mapping of the modulation scheme such as the QPSK, the 16QAM, and the 64QAM.

As indicated by the frame structure in FIG. 32B, stream $s_1(t)$ indicates $s_1(u)$ of symbol number u, $s_1(u+1)$ of symbol number u+1, . . . . Similarly, the stream $s_2(t)$ indicates $s_2(u)$ of symbol number u, $s_2(u+1)$ of symbol number u+1, .... Similarly, the stream $s_3(t)$ indicates $s_3(u)$ of symbol number u, $s_3(u+1)$ of symbol number u+1, .... Similarly, the stream $s_4(t)$ indicates $s_4(u)$ of symbol number u, $s_4(u+1)$ at symbol number u+1, ....

Weighting unit 1200 receives baseband signals 507A ($s_1(t)$), 507B ($s_2(t)$), 507C ($s_3(t)$), and 507D ($s_4(t)$) in FIG. 27 and information 515 on the signal processing method as input, performs the weighting according to information 515 on the signal processing method, and outputs weighted signals 516A ($z_1'(t)$), 516B ($z_2'(t)$), 516C ($z_3'(t)$), and 516D ($z_4'(t)$) in FIG. 27.

Phase changing unit 517A changes the phase of weighted signal 516A($z_1'(t)$), and outputs post-phase change signal 509A($z_1(t)$).

Phase changing unit 517B changes the phase of weighted signal 516B($z_2'(t)$), and outputs post-phase change signal 509B($z_2(t)$).

Phase changing unit 517C changes the phase of weighted signal 516C($z_3'(t)$), and outputs post-phase change signal 509C($z_3(t)$).

Phase changing unit 517D changes the phase of weighted signal 516D($z_4'(t)$) and outputs post-phase change signal 509D($z_4(t)$).

Assuming that $(w_{11},w_{12},w_{13},w_{14})$ is vector $W_1$ of a first row in fixed precoding matrix F, that $(s_1(t),s_2(t),s_3(t),s_4(t))^T$ is S(t), and that $y_1(t)$ is a phase changing equation of the phase changing unit, $z_1(t)$ is expressed by Equation (55).

[Mathematical formula 55]

$$z_1(t)=y_1(t)W_1S(t) \quad \text{Equation (55)}$$

It is also assumed that $A^T$ is a transpose of matrix (or vector) A.

Assuming that $(w_{21},w_{22},w_{23},w_{24})$ is vector $W_2$ of a second row in fixed precoding matrix F and that $y_2(t)$ is the phase changing equation of the phase changing unit, $z_2(t)$ is expressed by Equation (56).

[Mathematical formula 56]

$$z_2(t)=y_2(t)W_2S(t) \quad \text{Equation (56)}$$

Assuming that $(w_{31},w_{32},w_{33},w_{34})$ is vector $W_3$ of a third row in fixed precoding matrix F and that $y_3(t)$ is the phase changing equation of the phase changing unit, $z_3(t)$ is expressed by Equation (57).

[Mathematical formula 57]

$$z_3(t)=y_3(t)W_3S(t) \quad \text{Equation (57)}$$

Assuming that $(w_{41},w_{42},w_{43},w_{44})$ is vector W of a fourth row in fixed precoding matrix F and that $y_4(t)$ is the phase changing equation of the phase changing unit, $z_4(t)$ is expressed by Equation (58).

[Mathematical formula 58]

$$z_4(t)=y_4(t)W_4S(t) \quad \text{Equation (58)}$$

The phase changing method is described later.

FIG. 33 illustrates a configuration example of the transmission device of the second exemplary embodiment. Wireless unit 1303_X receives received signal 1302_X received by antenna 1301_X as input, performs pieces of processing such as the frequency conversion and the quadrature demodulation, and outputs baseband signal 1304_X.

Channel fluctuation estimator 1305 for modulated signals $z_1$, $z_2$, $z_3$, and $z_4$ transmitted by the transmission device receives baseband signal 1304_X as input, extracts channel estimating reference symbol 1201_1 in FIG. 32B, estimates the value corresponding to $h_{11}$ of Equation (53), and outputs channel estimation signal 1306_1.

Channel fluctuation estimator 1305 for modulated signals $z_1$, $z_2$, $z_3$, and $z_4$ transmitted by the transmission device receives baseband signal 1304_X as input, extracts channel estimating reference symbol 1201_2 in FIG. 32B, estimates the value corresponding to $h_{12}$ of Equation (53), and outputs channel estimation signal 1306_2.

Channel fluctuation estimator 1305 for modulated signals $z_1$, $z_2$, $z_3$, and $z_4$ transmitted by the transmission device receives baseband signal 1304_X as input, extracts channel estimating reference symbol 1201_3 in FIG. 32B, estimates the value corresponding to $h_{13}$ of Equation (53), and outputs channel estimation signal 1306_3.

Channel fluctuation estimator 1305 for modulated signals $z_1$, $z_2$, $z_3$, and $z_4$ transmitted by the transmission device receives baseband signal 1304_X as input, extracts channel estimating reference symbol 1201_4 in FIG. 32B, estimates the value corresponding to $h_{14}$ of Equation (53), and outputs channel estimation signal 1306_4.

Wireless unit 1303_Y receives received signal 1302_Y received by antenna 1301_Y as input, performs pieces of processing such as the frequency conversion and the quadrature demodulation, and outputs baseband signal 1304_Y.

Channel fluctuation estimator 1307 for modulated signals $z_1$, $z_2$, $z_3$, and $z_4$ transmitted by the transmission device receives baseband signal 1304_Y as input, extracts channel estimating reference symbol 1201_1 in FIG. 32B, estimates the value corresponding to $h_{21}$ of Equation (53), and outputs channel estimation signal 1308_1.

Channel fluctuation estimator 1307 for modulated signals $z_1$, $z_2$, $z_3$, and $z_4$ transmitted by the transmission device receives baseband signal 1304_Y as input, extracts channel estimating reference symbol 1201_2 in FIG. 32B, estimates the value corresponding to $h_{22}$ of Equation (53), and outputs channel estimation signal 1308_2.

Channel fluctuation estimator 1307 for modulated signals $z_1$, $z_2$, $z_3$, and $z_4$ transmitted by the transmission device receives baseband signal 1304_Y as input, extracts channel estimating reference symbol 1201_3 in FIG. 32B, estimates the value corresponding to $h_{23}$ of Equation (53), and outputs channel estimation signal 1308_3.

Channel fluctuation estimator 1307 for modulated signals $z_1$, $z_2$, $z_3$, and $z_4$ transmitted by the transmission device receives baseband signal 1304_Y as input, extracts channel estimating reference symbol 1201_4 in FIG. 32B, estimates the value corresponding to $h_{24}$ of Equation (53), and outputs channel estimation signal 1308_4.

Wireless unit 1303_Z receives received signal 1302_Z received by antenna 1301_Z as input, performs pieces of processing such as the frequency conversion and the quadrature demodulation, and outputs baseband signal 1304_Z.

Channel fluctuation estimator 1309 for modulated signals $z_1$, $z_2$, $z_3$, and $z_4$ transmitted by the transmission device receives baseband signal 1304_Z as input, extracts channel estimating reference symbol 1201_1 in FIG. 32B, estimates the value corresponding to $h_{31}$ of Equation (53), and outputs channel estimation signal 1310_1.

Channel fluctuation estimator 1309 for modulated signals $z_1$, $z_2$, $z_3$, and $z_4$ transmitted by the transmission device receives baseband signal 1304_Z as input, extracts channel estimating reference symbol 1201_2 in FIG. 32B, estimates the value corresponding to $h_{32}$ of Equation (53), and outputs channel estimation signal 1310_2.

Channel fluctuation estimator 1309 for modulated signals $z_1$, $z_2$, $z_3$, and $z_4$ transmitted by the transmission device receives baseband signal 1304_Z as input, extracts channel estimating reference symbol 1201_3 in FIG. 32B, estimates the value corresponding to $h_{33}$ of Equation (53), and outputs channel estimation signal 1310_3.

Channel fluctuation estimator 1309 for modulated signals $z_1$, $z_2$, $z_3$, and $z_4$ transmitted by the transmission device receives baseband signal 1304_Z as input, extracts channel estimating reference symbol 1201_4 in FIG. 32B, estimates the value corresponding to $h_{34}$ of Equation (53), and outputs channel estimation signal 1310_4.

Wireless unit 1303_H receives received signal 1302_H received by antenna 1301_H as input, performs pieces of processing such as the frequency conversion and the quadrature demodulation, and outputs baseband signal 1304_H.

Channel fluctuation estimator 3301 for modulated signals $z_1$, $z_2$, $z_3$, and $z_4$ transmitted by the transmission device receives baseband signal 1304_H as input, extracts channel estimating reference symbol 1201_1 in FIG. 32B, estimates the value corresponding to $h_{41}$ of Equation (53), and outputs channel estimation signal 3302_1.

Channel fluctuation estimator 3301 for modulated signals $z_1$, $z_2$, $z_3$, and $z_4$ transmitted by the transmission device receives baseband signal 1304_H as input, extracts channel estimating reference symbol 1201_2 in FIG. 32B, estimates the value corresponding to $h_{42}$ of Equation (53), and outputs channel estimation signal 3302_2.

Channel fluctuation estimator 3301 for modulated signals $z_1$, $z_2$, $z_3$, and $z_4$ transmitted by the transmission device receives baseband signal 1304_H as input, extracts channel estimating reference symbol 1201_3 in FIG. 32B, estimates the value corresponding to $h_{43}$ of Equation (53), and outputs channel estimation signal 3302_3.

Channel fluctuation estimator 3301 for modulated signals $z_1$, $z_2$, $z_3$, and $z_4$ transmitted by the transmission device receives baseband signal 1304_H as input, extracts channel estimating reference symbol 1201_4 in FIG. 32B, estimates the value corresponding to $h_{44}$ of Equation (53), and outputs channel estimation signal 3302_4.

Control information decoder 1311 receives baseband signals 1304_X, 1304_Y, 1304_Z, and 1304_H as input, detects symbol 1000_1 posting the transmission method in FIG. 30, and outputs signal 1312 related to the information on the transmission method posted by the transmission device.

Signal processor 1313 receives baseband signals 1304_X, 1304_Y, 1304_Z, and 1304_H, channel estimation signals 1306_1, 1306_2, 1306_3, 1306_4, 1308_1, 1308_2, 1308_3, 1308_4, 1310_1, 1310_2, 1310_3, 1310_4, 3302_1, 3302_2, 3302_3, and 1310_4, and signal 1312 related to the information on the transmission method posted by the transmission device, performs ML (Maximum Likelihood) detection, performs (error correction) decoding, and outputs received data 1314_1, and/or 1314_2, and/or 1314_3, and/or 1314_4.

The operation of signal processor 1313 in FIG. 33 will be supplemented. For example, it is assumed that signal processor 1313 performs the MLD (Maximum Likelihood Detection) processing described in NPLs 8, 9, and 10.

The transmission method of the present exemplary embodiment is a MIMO transmission method, in which the signal phase is regularly changed together with the time while the precoding matrix is used.

Assuming that H(t) is the (channel) matrix in Equation (53), that F is the precoding weight matrix, that Y(t) (at this point, Y(t) depends on t) is the matrix of the phase changing equation of the phase changing unit in FIG. 32A, that $(r_1(t), r_2(t), r_3(t), r_4(t))^T$ is received vector R(t), and that $(s_1(t), s_2(t), s_3(t), s_4(t))^T$ is stream vector S(t), Equation (59) holds.

[Mathematical formula 59]

$$R(t) = H(t) \times Y(t) \times F \times S(t) \qquad \text{Equation (59)}$$

Where $$Y(t) = \begin{pmatrix} y_1(t) & 0 & 0 & 0 \\ 0 & y_2(t) & 0 & 0 \\ 0 & 0 & y_3(t) & 0 \\ 0 & 0 & 0 & y_4(t) \end{pmatrix}$$

a noise component is not described in Equation (59).

At this point, the reception device can perform the MLD on received vector R(t) by obtaining H(t)×Y(t)×F.

The operation of the MLD will be described below. In the following description, it is assumed that the modulation schemes of modulated signals (streams) $s_1$, $s_2$, $s_3$, and $s_4$ are the BPSK.

Figure 34:
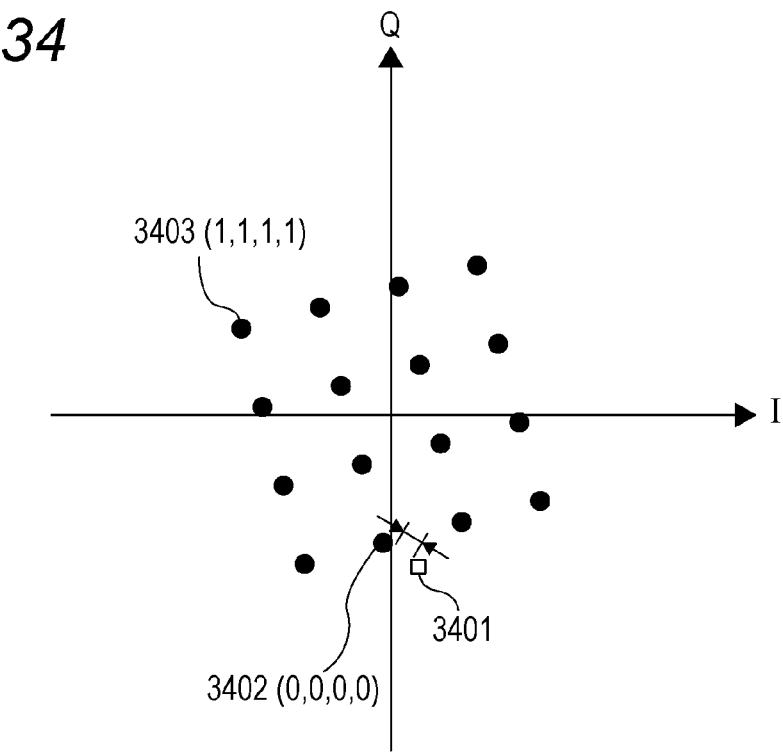
FIG. 34 illustrates an example of the state in which the candidate signal point is obtained.

First, ($2^4$=16) candidate signal points corresponding to baseband signal 1304_X are obtained from channel estimation signals 1306_1, 1306_2, 1306_3, and 1306_4. FIG. 34 illustrates the state at that time. In FIG. 34, the mark ● (black circle) indicates the candidate signal point on the I-Q plane, and the 16 candidate signal points exist because of four systems of the BPSK. Assuming that b0 is 1 bit transmitted using modulated signal $s_1$, that b1 is 1 bit transmitted using modulated signal $s_2$, that b2 is 1 bit transmitted using modulated signal $s_3$, and that b3 is 1 bit transmitted using modulated signal $s_4$, the candidate signal points corresponding to (b0,b1,b2,b3) exist in FIG. 34.

A square Euclidean distance between received signal point 3401 (corresponding to baseband signal 1304_X) and each of the candidate signal points is obtained. Each square Euclidean distance is divided by noise variance $\sigma^2$. Accordingly, $E_X(b0,b1,b2,b3)$ is obtained by dividing the square Euclidean distance between each of the candidate signal points corresponding to (b0,b1,b2,b3) and the received signal point by the noise variance, namely, $E_X(1,1,1,1)$ is obtained from $E_X(0,0,0,0)$. The baseband signals and modulated signals $s_1$, $s_2$, $s_3$, and $s_4$ are complex signals.

Similarly, ($2^4$=16) candidate signal points corresponding to baseband signal 1304_Y are obtained from channel estimation signals 1308_1, 1308_2, 1308_3, and 1308_4. FIG. 34 illustrates the state at that time. In FIG. 34, the mark ● (black circle) indicates the candidate signal point on the I-Q plane, and the 16 candidate signal points exist because of four systems of the BPSK. Assuming that b0 is 1 bit transmitted using modulated signal $s_1$, that b1 is 1 bit transmitted using modulated signal $s_2$, that b2 is 1 bit transmitted using modulated signal $s_3$, and that b3 is 1 bit transmitted using modulated signal $s_4$, the candidate signal points corresponding to (b0,b1,b2,b3) exist in FIG. 34. (However, the state in FIG. 34 is illustrated only by way of example.)

The square Euclidean distance between received signal point 3401 (corresponding to baseband signal 1304_Y) and each of the candidate signal points is obtained. Each square Euclidean distance is divided by noise variance $\sigma^2$. Accordingly, $E_Y(b0,b1,b2,b3)$ is obtained by dividing the square Euclidean distance between each of the candidate signal points corresponding to (b0,b1,b2,b3) and the received signal point by the noise variance, namely, $E_Y(1,1,1,1)$ is obtained from $E_Y(0,0,0,0)$. The baseband signals and modulated signals $s_1$, $s_2$, $s_3$, and $s_4$ are complex signals.

Similarly, ($2^4$=16) candidate signal points corresponding to baseband signal 1304_Z are obtained from channel estimation signals 1310_1, 1310_2, 1310_3, and 1310_4. FIG. 34 illustrates the state at that time. In FIG. 34, the mark ● (black circle) indicates the candidate signal point on the I-Q plane, and the 16 candidate signal points exist because of four systems of the BPSK. Assuming that b0 is 1 bit transmitted using modulated signal $s_1$, that b1 is 1 bit transmitted using modulated signal $s_2$, that b2 is 1 bit transmitted using modulated signal $s_3$, and that b3 is 1 bit transmitted using modulated signal $s_4$, the candidate signal points corresponding to (b0,b1,b2,b3) exist in FIG. 34. (However, the state in FIG. 34 is illustrated only by way of example.)

The square Euclidean distance between received signal point 3401 (corresponding to baseband signal 1304_Z) and each of the candidate signal points is obtained. Each square Euclidean distance is divided by noise variance $\sigma^2$. Accordingly, $E_Z(b0,b1,b2,b3)$ is obtained by dividing the square Euclidean distance between each of the candidate signal points corresponding to (b0,b1,b2,b3) and the received signal point by the noise variance, namely, $E_Z(1,1,1,1)$ is obtained from $E_Z(0,0,0,0)$. The baseband signals and modulated signals $s_1$, $s_2$, $s_3$, and $s_4$ are complex signals.

Similarly, ($2^4=16$) candidate signal points corresponding to baseband signal 1304_H are obtained from channel estimation signals 3302_1, 3302_2, 3302_3, and 3302_4. FIG. 34 illustrates the state at that time. In FIG. 34, the mark ● (black circle) indicates the candidate signal point on the I-Q plane, and the 16 candidate signal points exist because of four systems of the BPSK. Assuming that b0 is 1 bit transmitted using modulated signal $s_1$, that b1 is 1 bit transmitted using modulated signal $s_2$, that b2 is 1 bit transmitted using modulated signal $s_3$, and that b3 is 1 bit transmitted using modulated signal $s_4$, the candidate signal points corresponding to (b0,b1,b2,b3) exist in FIG. 34. (However, the state in FIG. 34 is illustrated only by way of example.)

The square Euclidean distance between received signal point 3401 (corresponding to baseband signal 1304_H) and each of the candidate signal points is obtained. Each square Euclidean distance is divided by noise variance $\sigma^2$. Accordingly, $E_H(b0,b1,b2,b3)$ is obtained by dividing the square Euclidean distance between each of the candidate signal points corresponding to (b0,b1,b2,b3) and the received signal point by the noise variance, namely, $E_H(1,1,1,1)$ is obtained from $E_H(0,0,0,0)$. The baseband signals and modulated signals $s_1$, $s_2$, $s_3$, and $s_4$ are complex signals.

$E_X(b0,b1,b2,b3)+E_Y(b0,b1,b2,b3)+E_Z(b0,b1,b2,b3)+E_H(b0,b1,b2,b3)=E(b0,b1,b2,b3)$ is obtained.

(The value for (b0,b1,b2,b3)=(0,0,0,0) constitutes $E_X(0,0,0,0)+E_Y(0,0,0,0)+E_Z(0,0,0,0)+E_H(0,0,0,0)=E(0,0,0,0)$,
the value for (b0,b1,b2,b3)=(0,0,0,1) constitutes $E_X(0,0,0,1)+E_Y(0,0,0,1)+E_Z(0,0,0,1)+E_H(0,0,0,1)=E(0,0,0,1)$,
. . .
the value for (b0,b1,b2,b3)=(1,1,1,1) constitutes $E_X(1,1,1,1)+E_Y(1,1,1,1)+E_Z(1,1,1,1)+E_H(1,1,1,1)=E(1,1,1,1)$).

For example, the logarithmic likelihood ratio of each bit is obtained from E(b0,b1,b2,b3), the logarithmic likelihood ratios are rearranged (interleaved), the error correction decoding is performed using the rearranged logarithmic likelihood ratio, and received data 1314_1, and/or 1314_2, and/or 1314_3, and/or 1314_4 is output.

Figure 35:
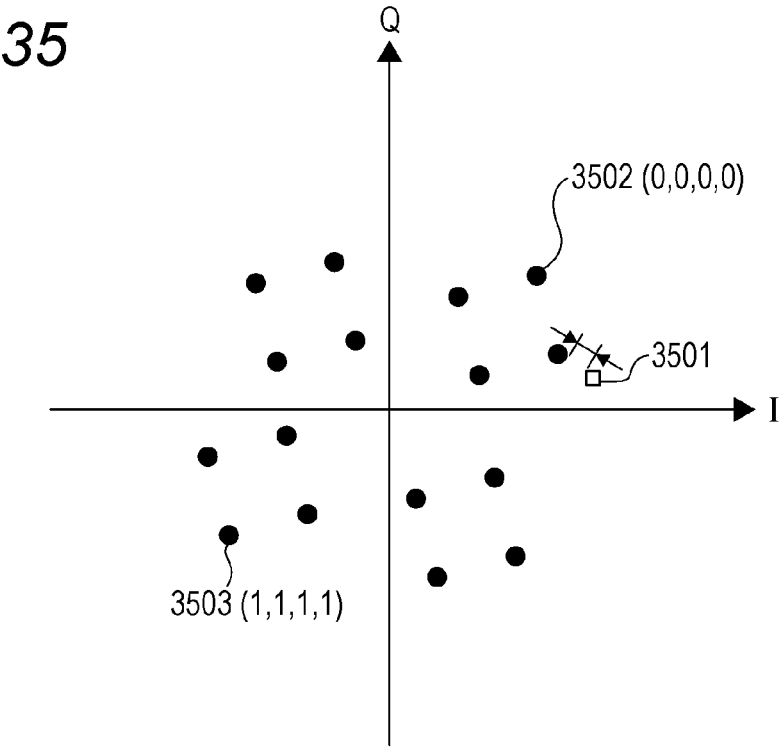
FIG. 35 illustrates an example of the state in which the candidate signal point is obtained.

The degradation of the reception quality in the present disclosure will be described below. It is considered that the reception device in FIG. 33 performs the reception. FIG. 35 illustrates an example (the state of the candidate signal point) of the reception state of the I-Q plane in signal processor 1313 of FIG. 33. In FIG. 35, the mark ● (black circle) indicates the candidate signal point on the IQ plane, b0 is transmitted using $s_1(t)$, b1 is transmitted using $s_2(t)$, b2 is transmitted using $s_3(t)$, and b3 is transmitted using $s_4(t)$. Therefore, ideally the 16 candidate signal points exist as illustrated in FIG. 35. (The candidate signal points in which (b0,b1,b2,b3) corresponds to (0,0,0,0) to (1,1,1,1) exist.)

Figure 36:
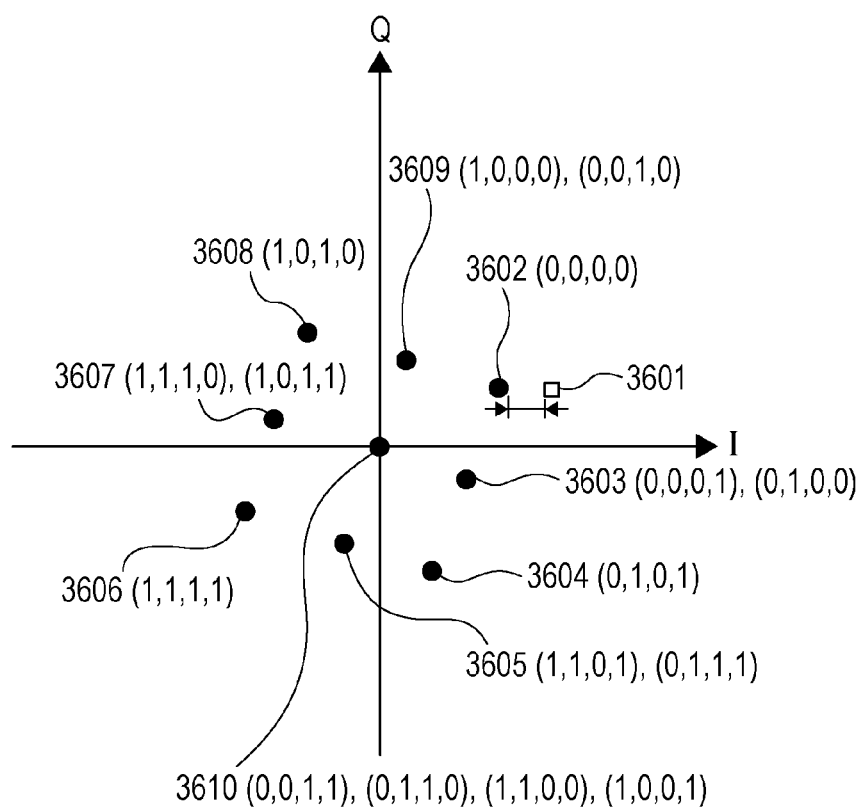
FIG. 36 illustrates an example of the state in which the candidate signal point is obtained.

FIG. 36 illustrates an example (the state of the candidate signal point) of the reception state of the I-Q plane in signal processor 1313 of FIG. 33. In FIG. 36, the mark ● (black circle) indicates the candidate signal point on the IQ plane.

Candidate signal point 3602 is the candidate signal point in which (b0,b1,b2,b3) corresponds to (0,0,0,0).

Candidate signal point 3603 is the candidate signal point in which (b0,b1,b2,b3) corresponds to (0,0,0,1) and (0,1,0,0).

Candidate signal point 3604 is the candidate signal point in which (b0,b1,b2,b3) corresponds to (0,1,0,1).

Candidate signal point 3605 is the candidate signal point in which (b0,b1,b2,b3) corresponds to (1,1,0,1) and (0,1,1,1).

Candidate signal point 3606 is the candidate signal point in which (b0,b1,b2,b3) corresponds to (1,1,1,1).

Candidate signal point 3607 is the candidate signal point in which (b0,b1,b2,b3) corresponds to (1,1,1,0) and (1,0,1,1).

Candidate signal point 3608 is the candidate signal point in which (b0,b1,b2,b3) corresponds to (1,0,1,0).

Candidate signal point 3609 is the candidate signal point in which (b0,b1,b2,b3) corresponds to (1,0,0,0) and (0,0,1,0).

Candidate signal point 3610 is the candidate signal point in which (b0,b1,b2,b3) corresponds to (0,0,1,1), (0,1,1,0), (1,1,0,0), and (1,0,0,1).

In FIG. 36, the number of candidate signal points decreases compared with the ideal state in FIG. 35. When the reception is performed in the state of FIG. 36, the data reception quality degrades in the reception device. Particularly, in an environment where a direct wave is dominant, a propagation environment is steady because of a strong influence of the direct wave, which results in a phenomenon in which the low data reception quality continues for a long time. In FIG. 36, by way of example, the candidate signal points overlap each other. For example, similarly the decreases of the minimum Euclidean distances of the 16 candidate signal points lead to the degradation of the data reception quality. (Particularly, there is a high possibility of generating the degradation of the data reception quality in the environment where the direct wave is dominant).

The phenomenon in which the candidate signal points overlap each other is also generated in the case that the four baseband signals, namely, $s_1(t)$, $s_2(t)$, $s_3(t)$, and $s_4(t)$ exist. The method for improving the data reception quality in the case that "particularly, in the environment where the direct wave is dominant, the propagation environment is steady because of the strong influence of the direct wave, which results in the phenomenon in which the low data reception quality continues for a long time" will be described below.

FIG. 37 illustrates specific examples of the phase change values in phase changing units 517A, 517B, 517C, and 517D of the transmission device in FIGS. 27 and 28. As described above, it is assumed that $y_1(t)$ is the phase change value of phase changing unit 517A, that $y_2(t)$ is the phase change value of phase changing unit 517B, that $y_3(t)$ is the phase change value of phase changing unit 517C, and that $y_4(t)$ is the phase change value of phase changing unit 517D. In FIG. 37, t is the time (although $y_1(t)$, $y_2(t)$, $y_3(t)$, and $y_4(t)$ are the function of the time in this case, the phase change value may be the function of the frequency or the frequency and time as described above), "0" means the 0 radian, "a" means the a radian, "b" means the b radian. It is assumed that where $0 \leq a < 2\pi$, $0 \leq b < 2\pi$, $a \neq 0$, $b \neq 0$, and $a \neq b$.

As illustrated in FIG. 37, it is assumed that at clock time t=0, $y_1(0)=0$ (radian), $y_2(0)=0$ (radian), $y_3(0)=0$ (radian), $y_4(0)=0$ (radian)

at clock time t=1, $y_1(1)=0$ (radian), $y_2(1)=a$ (radian), $y_3(1)=0$ (radian), $y_4(1)=0$ (radian)

at clock time t=2, $y_1(2)=0$ (radian), $y_2(2)=b$ (radian), $y_3(2)=0$ (radian), $y_4(2)=0$ (radian)

at clock time t=3, $y_1(3)=0$ (radian), $y_2(3)=0$ (radian), $y_3(3)=0$ (radian), $y_4(3)=0$ (radian)

at clock time t=4, $y_1(4)=0$ (radian), $y_2(4)=a$ (radian), $y_3(4)=0$ (radian), $y_4(4)=0$ (radian)

at clock time t=5, $y_1(5)=0$ (radian), $y_2(5)=b$ (radian), $y_3(5)=0$ (radian), $y_4(0)=0$ (radian).

In FIG. 37, it is assumed that there are three periods with respect to the phase change. Accordingly, at clock time t=3k, $y_1(3k)=0$ (radian), $y_2(3k)=0$ (radian), $y_3(3k)=0$ (radian), $y_4(3k)=0$ (radian)

at clock time t=3k+1, $y_1(3k+1)=0$ (radian), $y_2(3k+1)=a$ (radian), $y_3(3k+1)=0$ (radian), $y_4(3k+1)=0$ (radian)

at clock time t=3k+2, $y_1(3k+2)=0$ (radian), $y_2(3k+2)=b$ (radian), $y_3(3k+2)=0$ (radian), $y_4(3k+2)=0$ (radian)

are obtained. For example, k is an integer of 0 or more.

The degradation of the data reception quality in performing the phase change in FIG. 37 will be described below.

For example, it is considered that the reception device in FIG. 33 receives the modulated signal transmitted from antenna 512B with the low reception field strength when the reception device in FIG. 33 receives the modulated signal transmitted by the transmission device in FIGS. 27 and 28. In the following description, it is assumed that the modulation schemes of modulated signals (streams) $s_1$, $s_2$, $s_3$, and $s_4$ are the BPSK. Accordingly, in the case that the candidate signal points do not overlap each other in performing the MLD, the 16 candidate signal points emerge on the I-Q plane.

As described above, it is considered that the reception device in FIG. 33 receives the modulated signal transmitted from antenna 512B with the low reception field strength. It is considered that the minimum Euclidean distance is short at the 16 candidate signal points to degrade the data reception quality when the MLD is performed in the environment in which the direct wave is dominant. It is considered that the case phase change in FIG. 37 is performed under the environment.

In this case, the signal having an influence on the reception state of the reception device in FIG. 33 becomes the modulated signals transmitted from antennas 512A, 512C, and 512D of the transmission device in FIGS. 27 and 28.

In the case that the phase change in FIG. 37 is performed, the phase change is not performed on the modulated signal transmitted from antenna 512A of the transmission device in FIGS. 27 and 28, and the phase change is not performed on the modulated signal transmitted from antenna 512C of the transmission device in FIGS. 27 and 28. The phase change is not performed on the modulated signal transmitted from antenna 512D of the transmission device in FIGS. 27 and 28. Accordingly, in FIG. 33, there is a high possibility that the state of the candidate signal point on the I-Q plane is not largely changed with respect to time t. (There is a high possibility of slightly changing the minimum Euclidean distance of the candidate signal point.) Therefore, there is a possibility of retaining the state in the case that the data reception quality degrades in the reception device of FIG. 33.

FIG. 38 illustrates an example of the phase changing method with respect to the above state. FIG. 38 illustrates specific examples of the phase change values in phase changing units 517A, 517B, 517C, and 517D of the transmission device in FIGS. 27 and 28. As described above, it is assumed that $y_1(t)$ is the phase change value of phase changing unit 517A, that $y_2(t)$ is the phase change value of phase changing unit 517B, that $y_3(t)$ is the phase change value of phase changing unit 517C, and that $y_4(t)$ is the phase change value of phase changing unit 517D. In FIG. 37, t is the time (although $y_1(t)$, $y_2(t)$, $y_3(t)$, and $y_4(t)$ are the function of the time in this case, the phase change value may be the function of the frequency or the frequency and time as described above), "0" means the 0 radian, "a" means the a radian, "b" means the b radian. It is assumed that where $0 \leq a < 2\pi$, $0 \leq b < 2\pi$, $a \neq 0$, $b \neq 0$, and $a \neq b$.

As illustrated in FIG. 18, it is assumed that at clock time t=0, $y_1(0)=0$ (radian), $y_2(0)=0$ (radian), $y_3(0)=0$ (radian), $y_4(0)=0$ (radian)

at clock time t=1, $y_1(1)=0$ (radian), $y_2(1)=a$ (radian), $y_3(1)=0$ (radian), $y_4(1)=0$ (radian)

at clock time t=2, $y_1(2)=0$ (radian), $y_2(2)=b$ (radian), $y_3(2)=0$ (radian), $y_4(2)=0$ (radian)

at clock time t=3, $y_1(3)=0$ (radian), $y_2(3)=0$ (radian), $y_3(3)=a$ (radian), $y_4(3)=0$ (radian)

at clock time t=4, $y_1(4)=0$ (radian), $y_2(4)=0$ (radian), $y_3(4)=b$ (radian), $y_4(4)=0$ (radian)

at clock time t=5, $y_1(5)=0$ (radian), $y_2(5)=0$ (radian), $y_3(5)=0$ (radian), $y_4(5)=a$ (radian)

at clock time t=6, $y_1(6)=0$ (radian), $y_2(6)=0$ (radian), $y_3(6)=0$ (radian), $y_4(6)=b$ (radian)

at clock time t=7, $y_1(7)=0$ (radian), $y_2(7)=a$ (radian), $y_3(7)=0$ (radian), $y_4(7)=a$ (radian)

at clock time t=8, $y_1(8)=0$ (radian), $y_2(8)=a$ (radian), $y_3(8)=0$ (radian), $y_4(8)=b$ (radian)

at clock time t=9, $y_1(9)=0$ (radian), $y_2(9)=b$ (radian), $y_3(9)=0$ (radian), $y_4(9)=a$ (radian)

at clock time t=10, $y_1(10)=0$ (radian), $y_2(10)=b$ (radian), $y_3(10)=0$ (radian), $y_4(10)=b$ (radian)

at clock time t=11, $y_1(11)=0$ (radian), $y_2(11)=0$ (radian), $y_3(11)=a$ (radian), $y_4(11)=a$ (radian)

at clock time t=12, $y_1(12)=0$ (radian), $y_2(12)=0$ (radian), $y_3(12)=a$ (radian), $y_4(12)=b$ (radian)

at clock time t=13, $y_1(13)=0$ (radian), $y_2(13)=0$ (radian), $y_3(13)=b$ (radian), $y_4(13)=a$ (radian)

at clock time t=14, $y_1(14)=0$ (radian), $y_2(14)=0$ (radian), $y_3(14)=b$ (radian), $y_4(14)=b$ (radian)

at clock time t=15, $y_1(15)=0$ (radian), $y_2(15)=a$ (radian), $y_3(15)=a$ (radian), $y_4(15)=0$ (radian)

at clock time t=16, $y_1(16)=0$ (radian), $y_2(16)=a$ (radian), $y_3(16)=b$ (radian), $y_4(16)=0$ (radian)

at clock time t=17, $y_1(17)=0$ (radian), $y_2(17)=a$ (radian), $y_3(17)=a$ (radian), $y_4(17)=a$ (radian)

at clock time t=18, $y_1(18)=0$ (radian), $y_2(18)=a$ (radian), $y_3(18)=a$ (radian), $y_4(18)=b$ (radian)

at clock time t=19, $y_1(19)=0$ (radian), $y_2(19)=a$ (radian), $y_3(19)=b$ (radian), $y_4(19)=a$ (radian)

at clock time t=20, $y_1(20)=0$ (radian), $y_2(20)=a$ (radian), $y_3(20)=b$ (radian), $y_4(20)=b$ (radian)

at clock time t=21, $y_1(21)=0$ (radian), $y_2(21)=b$ (radian), $y_3(21)=a$ (radian), $y_4(21)=0$ (radian)

at clock time t=22, $y_1(22)=0$ (radian), $y_2(22)=b$ (radian), $y_3(22)=b$ (radian), $y_4(22)=0$ (radian)

at clock time t=23, $y_1(23)=0$ (radian), $y_2(23)=b$ (radian), $y_3(23)=a$ (radian), $y_4(23)=a$ (radian)

at clock time t=24, $y_1(24)=0$ (radian), $y_2(24)=b$ (radian), $y_3(24)=a$ (radian), $y_4(24)=b$ (radian)

at clock time t=25, $y_1(25)=0$ (radian), $y_2(25)=b$ (radian), $y_3(25)=b$ (radian), $y_4(25)=a$ (radian)

at clock time t=26, $y_1(26)=0$ (radian), $y_2(26)=b$ (radian), $y_3(26)=b$ (radian), $y_4(26)=b$ (radian)

at clock time t=27, $y_1(27)=0$ (radian), $y_2(27)=0$ (radian), $y_3(27)=0$ (radian), $y_4(27)=0$ (radian), . . . .

In FIG. 38, it is assumed that there are 27 periods with respect to the phase change. Accordingly, at clock time t=27×k, $y_1(27×k)=0$ (radian), $y_2(27×k)=0$ (radian), $y_3(27×k)=0$ (radian), $y_4(27×k)=0$ (radian)

at clock time t=27×k+1, $y_1(27×k+1)=0$ (radian), $y_2(27×k+1)=a$ (radian), $y_3(27×k+1)=0$ (radian), $y_4(27×k+1)=0$ (radian)

at clock time t=27×k+2, $y_1(27×k+2)=0$ (radian), $y_2(27×k+2)=b$ (radian), $y_3(27×k+2)=0$ (radian), $y_4(27×k+2)=0$ (radian)

at clock time t=27×k+3, $y_1(27×k+3)=0$ (radian), $y_2(27×k+3)=0$ (radian), $y_3(27×k+3)=a$ (radian), $y_4(27×k+3)=0$ (radian)

at clock time t=27×k+4, $y_1(27×k+4)=0$ (radian), $y_2(27×k+4)=0$ (radian), $y_3(27×k+4)=b$ (radian), $y_4(27×k+4)=0$ (radian)

at clock time t=27×k+5, $y_1(27×k+5)=0$ (radian), $y_2(27×k+5)=0$ (radian), $y_3(27×k+5)=0$ (radian), $y_4(27×k+5)=a$ (radian)

at clock time t=27×k+6, $y_1(27×k+6)=0$ (radian), $y_2(27×k+6)=0$ (radian), $y_3(27×k+6)=0$ (radian), $y_4(27×k+6)=b$ (radian)

at clock time t=27×k+7, $y_1(27×k+7)=0$ (radian), $y_2(27×k+7)=a$ (radian), $y_3(27×k+7)=0$ (radian), $y_4(27×k+7)=a$ (radian)

at clock time t=27×k+8, $y_1(27×k+8)=0$ (radian), $y_2(27×k+8)=a$ (radian), $y_3(27×k+8)=0$ (radian), $y_4(27×k+8)=b$ (radian)

at clock time t=27×k+9, $y_1(27×k+9)=0$ (radian), $y_2(27×k+9)=b$ (radian), $y_3(27×k+9)=0$ (radian), $y_4(27×k+9)=a$ (radian)

at clock time t=27×k+10, $y_1(27×k+10)=0$ (radian), $y_2(27×k+10)=b$ (radian), $y_3(27×k+10)=0$ (radian), $y_4(27×k+10)=b$ (radian)

at clock time t=27×k+11, $y_1(27×k+11)=0$ (radian), $y_2(27×k+11)=0$ (radian), $y_3(27×k+11)=a$ (radian), $y_4(27×k+11)=a$ (radian)

at clock time t=27×k+12, $y_1(27×k+12)=0$ (radian), $y_2(27×k+12)=0$ (radian), $y_3(27×k+12)=a$ (radian), $y_4(27×k+12)=b$ (radian)

at clock time t=27×k+13, $y_1(27×k+13)=0$ (radian), $y_2(27×k+13)=0$ (radian), $y_3(27×k+13)=b$ (radian), $y_4(27×k+13)=a$ (radian)

at clock time t=27×k+14, $y_1(27×k+14)=0$ (radian), $y_2(27×k+14)=0$ (radian), $y_3(27×k+14)=b$ (radian), $y_4(27×k+14)=b$ (radian)

at clock time t=27×k+15, $y_1(27×k+15)=0$ (radian), $y_2(27×k+15)=a$ (radian), $y_3(27×k+15)=a$ (radian), $y_4(27×k+15)=0$ (radian)

at clock time t=27×k+16, $y_1(27×k+16)=0$ (radian), $y_2(27×k+16)=a$ (radian), $y_3(27×k+16)=b$ (radian), $y_4(27×k+16)=0$ (radian)

at clock time t=27×k+17, $y_1(27×k+17)=0$ (radian), $y_2(27×k+17)=a$ (radian), $y_3(27×k+17)=a$ (radian), $y_4(27×k+17)=a$ (radian)

at clock time t=27×k+18, $y_1(27×k+18)=0$ (radian), $y_2(27×k+18)=a$ (radian), $y_3(27×k+18)=a$ (radian), $y_4(27×k+18)=b$ (radian)

at clock time t=27×k+19, $y_1(27×k+19)=0$ (radian), $y_2(27×k+19)=a$ (radian), $y_3(27×k+19)=b$ (radian), $y_4(27×k+19)=a$ (radian)

at clock time t=27×k+20, $y_1(27×k+20)=0$ (radian), $y_2(27×k+20)=a$ (radian), $y_3(27×k+20)=b$ (radian), $y_4(27×k+20)=b$ (radian)

at clock time t=27×k+21, $y_1(27×k+21)=0$ (radian), $y_2(27×k+21)=b$ (radian), $y_3(27×k+21)=a$ (radian), $y_4(27×k+21)=0$ (radian)

at clock time t=27×k+22, $y_1(27×k+22)=0$ (radian), $y_2(27×k+22)=b$ (radian), $y_3(27×k+22)=b$ (radian), $y_4(27×k+22)=0$ (radian)

at clock time t=27×k+23, $y_1(27×k+23)=0$ (radian), $y_2(27×k+23)=b$ (radian), $y_3(27×k+23)=a$ (radian), $y_4(27×k+23)=a$ (radian)

at clock time t=27×k+24, $y_1(27×k+24)=0$ (radian), $y_2(27×k+24)=b$ (radian), $y_3(27×k+24)=a$ (radian), $y_4(27×k+24)=b$ (radian)

at clock time t=27×k+25, $y_1(27×k+25)=0$ (radian), $y_2(27×k+25)=b$ (radian), $y_3(27×k+25)=b$ (radian), $y_4(27×k+25)=a$ (radian)

at clock time t=27×k+26, $y_1(27×k+26)=0$ (radian), $y_2(27×k+26)=b$ (radian), $y_3(27×k+26)=b$ (radian), $y_4(27×k+26)=b$ (radian)

are obtained. For example, k is an integer of 0 or more.

An advantage of the phase change in FIG. 38 will be described below.

Similarly to the description in FIG. 37, for example, it is considered that the reception device in FIG. 33 receives the modulated signal transmitted from antenna 512B with the low reception field strength when the reception device in FIG. 33 receives the modulated signal transmitted by the transmission device in FIGS. 27 and 28. In the following description, it is assumed that the modulation schemes of modulated signals (streams) $s_1$, $s_2$, $s_3$, and $s_4$ are the BPSK. Accordingly, in the case that the candidate signal points do not overlap each other in performing the MLD, the 16 candidate signal points emerge on the I-Q plane.

As described above, it is considered that the reception device in FIG. 33 receives the modulated signal transmitted from antenna 512B with the low reception field strength. It is considered that the minimum Euclidean distance is short at the 16 candidate signal points to degrade the data reception quality when the MLD is performed in the environment in which the direct wave is dominant. It is considered that the case phase change in FIG. 38 is performed under the environment.

In this case, the signal having an influence on the reception state of the reception device in FIG. 33 becomes the modulated signals transmitted from antennas 512A, 512C, and 512D of the transmission device in FIGS. 27 and 28.

In the case that the phase change in FIG. 38 is performed, the phase change is not performed on the modulated signal transmitted from antenna 512A of the transmission device in FIGS. 27 and 28 at times t=0, t=1, and t=2, and the phase change is not performed on the modulated signal transmitted from antenna 512C of the transmission device in FIGS. 27 and 28 at times t=0, t=1, and t=2. The phase change is not performed on the modulated signal transmitted from antenna 512D of the transmission device in FIGS. 27 and 28.

Accordingly, in FIG. 33, there is a high possibility that the state of the candidate signal point on the I-Q plane is not largely changed at times t=0, t=1, and t=2. (There is a high possibility of slightly changing the minimum Euclidean distance of the candidate signal point.)

At times t=3 to t=26, the phase except for 0 (zero) radian is provided in the modulated signal transmitted from antenna 512C of the transmission device in FIGS. 27 and 28, and the phase except for 0 (zero) radian is provided in the modulated signal transmitted from antenna 512D. Therefore, at times t=3 to t=26, there is a possibility of improving the state of the candidate signal point on the I-Q plane (the minimum Euclidean distance of the candidate signal point increases).

When compared with the phase change in FIG. 37, the time for which the candidate signal point is in good state (the candidate signal point has the large minimum Euclidean distance) increases to obtain an advantageous effect that the reception quality is improved by applying the error correction code.

It is considered that the reception device in FIG. 33 receives the modulated signal transmitted from antenna 512C with the low reception field strength. It is considered that the minimum Euclidean distance is short at the 16 candidate signal points to degrade the data reception quality when the MLD is performed in the environment in which the direct wave is dominant. It is considered that the case phase change in FIG. 38 is performed under the environment.

In this case, the signal having an influence on the reception state of the reception device in FIG. 33 becomes the modulated signals transmitted from antennas 512A, 512B, and 512D of the transmission device in FIGS. 27 and 28.

In the case that the phase change in FIG. 38 is performed, the phase change is not performed on the modulated signal transmitted from antenna 512A of the transmission device in FIGS. 27 and 28 at times t=0, t=3, and t=4, and the phase change is not performed on the modulated signal transmitted from antenna 512B of the transmission device in FIGS. 27 and 28 at times t=0, t=3, and t=4. The phase change is not performed on the modulated signal transmitted from antenna 512D of the transmission device in FIGS. 27 and 28.

Accordingly, in FIG. 33, there is a high possibility that the state of the candidate signal point on the I-Q plane is not largely changed at times t=0, t=3, and t=4. (There is a high possibility of slightly changing the minimum Euclidean distance of the candidate signal point.)

However, at times t=1, t=2, t=5 to t=26, the phase except for 0 (zero) radian is provided in the modulated signal transmitted from antenna 512B of the transmission device in FIGS. 27 and 28, and the phase except for 0 (zero) radian is provided in the modulated signal transmitted from antenna 512D. Therefore, at times t=1, t=2, t=5 to t=26, there is a possibility of improving the state of the candidate signal point on the I-Q plane (the minimum Euclidean distance of the candidate signal point increases).

When compared with the phase change in FIG. 37, the time for which the candidate signal point is in good state (the candidate signal point has the large minimum Euclidean distance) increases to obtain an advantageous effect that the reception quality is improved by applying the error correction code.

It is considered that the reception device in FIG. 33 receives the modulated signal transmitted from antenna 512D with the low reception field strength. It is considered that the minimum Euclidean distance is short at the 16 candidate signal points to degrade the data reception quality when the MLD is performed in the environment in which the direct wave is dominant. It is considered that the case phase change in FIG. 38 is performed under the environment.

In this case, the signal having an influence on the reception state of the reception device in FIG. 33 becomes the modulated signals transmitted from antennas 512A, 512B, and 512C of the transmission device in FIGS. 27 and 28.

In the case that the phase change in FIG. 38 is performed, the phase change is not performed on the modulated signal transmitted from antenna 512A of the transmission device in FIGS. 27 and 28 at times t=0, t=5, and t=6, and the phase change is not performed on the modulated signal transmitted from antenna 512B of the transmission device in FIGS. 27 and 28 at times t=0, t=5, and t=6. The phase change is not performed on the modulated signal transmitted from antenna 512C of the transmission device in FIGS. 27 and 28.

Accordingly, in FIG. 33, there is a high possibility that the state of the candidate signal point on the I-Q plane is not largely changed at times t=0, t=5, and t=6. (There is a high possibility of slightly changing the minimum Euclidean distance of the candidate signal point.)

However, at times t=1 to t=4, t=7 to t=26, the phase except for 0 (zero) radian is provided in the modulated signal transmitted from antenna 512B of the transmission device in FIGS. 27 and 28, and the phase except for 0 (zero) radian is provided in the modulated signal transmitted from antenna 512C. Therefore, at times t=1 to t=4, t=7 to t=26, there is a possibility of improving the state of the candidate signal point on the I-Q plane (the minimum Euclidean distance of the candidate signal point increases).

When compared with the phase change in FIG. 37, the time for which the candidate signal point is in good state (the candidate signal point has the large minimum Euclidean distance) increases to obtain an advantageous effect that the reception quality is improved by applying the error correction code.

It is considered that the reception device in FIG. 33 receives the modulated signal transmitted from antenna 512A with the low reception field strength. It is considered that the minimum Euclidean distance is short at the 16 candidate signal points to degrade the data reception quality when the MLD is performed in the environment in which the direct wave is dominant. It is considered that the case phase change in FIG. 38 is performed under the environment.

In this case, the signal having an influence on the reception state of the reception device in FIG. 33 becomes the modulated signals transmitted from antennas 512B, 512C, and 512D of the transmission device in FIGS. 27 and 28.

The relative phase relationship among the modulated signal transmitted from antenna 512B of the transmission device in FIGS. 27 and 28, the modulated signal transmitted from antenna 512C of the transmission device in FIGS. 27 and 28, the modulated signal transmitted from antenna 512D of the transmission device in FIGS. 27 and 28 does not change at times t=0, t=17, and t=26 in the case that the phase change in FIG. 38 is performed. (The phase difference between the modulated signal transmitted from antenna 512B of the transmission device in FIGS. 27 and 28 and the modulated signal transmitted from antenna 512C of the transmission device in FIGS. 27 and 28 becomes the identical value at times t=0, t=17, and t=26. The phase difference between the modulated signal transmitted from antenna 512B of the transmission device in FIGS. 27 and 28 and the modulated signal transmitted from antenna 512D of the transmission device in FIGS. 27 and 28 becomes the identical value at times t=0, t=17, and t=26. The phase difference between the modulated signal transmitted from antenna 512C of the transmission device in FIGS. 27 and 28 and the modulated signal transmitted from antenna 512D of the transmission device in FIGS. 27 and 28 becomes the identical value at times t=0, t=17, and t=26.) Accordingly, in FIG. 33, there is a high possibility that the state of the candidate signal point on the I-Q plane is not largely changed at times t=0, t=17, and t=26. (There is a high possibility of slightly changing the minimum Euclidean distance of the candidate signal point.) (The state of the candidate signal point does not change in the case that the relative phase relationship does not change.)

However, the relative phase relationship among the modulated signal transmitted from antenna 512B of the transmission device in FIGS. 27 and 28, the modulated signal transmitted from antenna 512C of the transmission device in FIGS. 27 and 28, and the modulated signal transmitted from antenna 512D of the transmission device in FIGS. 27 and 28 changes at times t=1 to t=16, and t=18 to t=25, the plurality of phases are provided in the modulated signal transmitted from antenna 512B of the transmission device in FIGS. 27 and 28, the plurality of phases are provided in the modulated signal transmitted from antenna 512C of the transmission device in FIGS. 27 and 28, and the plurality of phases are provided in the modulated signal transmitted from antenna 512D of the transmission device in FIGS. 27 and 28. Therefore, there is a possibility of improving the state of the candidate signal point on the I-Q plane (the minimum Euclidean distance of the candidate signal point increases) at times t=1 to t=16, and t=18 to t=25.

When compared with the phase change in FIG. 37, the time for which the candidate signal point is in good state (the candidate signal point has the large minimum Euclidean distance) increases to obtain an advantageous effect that the reception quality is improved by applying the error correction code.

Thus, even if any one of the states of transmit antennas 512A, 512B, 512C, and 512D in FIGS. 27 and 28 degrades, an advantageous effect that a possibility of degrading the data reception quality is lowered can be obtained.

The example of the phase change and the advantageous effect in performing the phase change in FIG. 38 are described above. Another example of the phase changing method in which the similar advantageous effect is obtained will be described below.

It is assumed that $a_1$ is a value that can be taken by phase change value $y_1(t)$ of phase changing unit 517A in FIGS. 27 and 28.

It is assumed that m (m is an integer of 2 or more) kinds of values can be taken by phase change value $y_2(t)$ of phase changing unit 517B in FIGS. 27 and 28, and $b_i$ (radian) is the value that can be taken by phase change value $y_2(t)$ (i is an integer between 1 and m (inclusive), and $0 \leq b_i < 2\pi$). At this point, i and j are integers between 1 and m (inclusive), i≠j, and $b_i \neq b_j$ is satisfied for any i and j.

It is assumed that n (n is an integer of 2 or more) kinds of values can be taken by phase change value $y_3(t)$ of phase changing unit 517C in FIGS. 27 and 28, and $c_i$ (radian) is the value that can be taken by phase change value $y_3(t)$ (i is an integer between 1 and n (inclusive), and $0 \leq c_i < 2\pi$). At this point, i and j are integers between 1 and n (inclusive), i≠j, and $c_i \neq c_j$ is satisfied for any i and j.

It is assumed that q (q is an integer of 2 or more) kinds of values can be taken by phase change value $y_4(t)$ of phase changing unit 517D in FIGS. 27 and 28, and $d_i$ (radian) is the value that can be taken by phase change value $y_4(t)$ (i is an integer between 1 and q (inclusive), and $0 \leq d_i < 2\pi$). At this point, i and j are integers between 1 and q (inclusive), i≠j, and $d_i \neq d_j$ is satisfied for any i and j.

Assuming that $(a_1, b_i, c_j, d_k)$ is a value taken by a set of $(y_1(u), y_2(u), y_3(u), y_4(u))$ in symbol number u (u is an integer of 0 or more), the following conditions are satisfied.

(Condition 5)

It is assumed that i=β (β is an integer between 1 and m (inclusive)), and j=γ (γ is an integer between 1 and n (inclusive)) hold. At this point, that $(y_1(u), y_2(u), y_3(u), y_4(u)) = (a_1, b_\beta, c_\gamma, d_k)$ holds $((y_1(u), y_2(u), y_3(u), y_4(u)) = (a_1, b_\beta, c_\gamma, d_k))$ means $y_1(u) = a_1$, $y_2(u) = b_\beta$, $y_3(u) = c_\gamma$, and $y_4(u) = d_k$). When i=β and j=γ are satisfied in integer u of 0 or more, k takes all the values of the integer between 0 and q (inclusive) in $d_k$.

(Condition 6)

The condition that "k takes all the values of the integers between 0 and q (inclusive) in $d_k$ when i=β and j=γ are satisfied in integer u of 0 or more" is satisfied in β of all the integers between 1 and m (inclusive) and γ of all the integers between 1 and n (inclusive).

(Condition 7)

It is assumed that i=β (β is an integer between 1 and m (inclusive)), and k=δ (δ is an integer between 1 and q(inclusive)) hold. At this point, that $(y_1(u), y_2(u), y_3(u), y_4(u)) = (a_1, b_\beta, c_j, d_\delta)$ holds $((y_1(u), y_2(u), y_3(u), y_4(u)) = (a_1, b_\beta, c_j, d_\delta))$ means $y_1(u) = a_1$, $y_2(u) = b_\beta$, $y_3(u) = c_j$, and $y_4(u) = d_\delta$). When i=β and k=δ are satisfied in integer u of 0 or more, j takes all the values of the integer between 0 and n (inclusive) in $c_j$.

(Condition 8)

The condition that "j takes all the values of the integers between 0 and n (inclusive) in $c_j$ when i=β and k=δ are satisfied in integer u of 0 or more" is satisfied in β of all the integers between 1 and m (inclusive) and δ of all the integers between 1 and q (inclusive).

(Condition 9)

It is assumed that j=γ (γ is an integer between 1 and n (inclusive)), and k=δ (δ is an integer between 1 and q (inclusive)) hold. At this point, that $(y_1(u), y_2(u), y_3(u), y_4(u)) = (a_1, b_i, c_\gamma, d_\delta)$ holds $((y_1(u), y_2(u), y_3(u), y_4(u)) = (a_1, b_i, c_\gamma, d_\delta))$ means $y_1(u) = a_1$, $y_2(u) = b_i$, $y_3(u) = c_\gamma$, and $y_4(u) = d_\delta$). When j=γ and k=δ are satisfied in integer u of 0 or more, i takes all the values of the integer between 0 and m (inclusive) in $b_i$.

(Condition 10)

The condition that "i takes all the values of the integers between 0 and m (inclusive) in $b_i$ when j=γ and k=δ are satisfied in integer u of 0 or more" is satisfied in γ of all the integers between 1 and n (inclusive) and δ of all the integers between 1 and q (inclusive).

The advantageous effect can be obtained by satisfying (Condition 1) to (Condition 10) when the phase change is performed as illustrated in FIG. 38. Although m×n×q is the minimum value of the period of the phase change satisfying (Condition 1) to (Condition 10), the period of the phase change may be greater than or equal to m×n×q. (In this case, the identical set of phase changes is used at least twice, and the period of the phase change is set under that condition.)

The phase changing method in the case that phase change value $y_1(t)$ of the phase changing unit 517A in FIGS. 27 and 28 is set to a constant value is described in the example of FIG. 38 and the above example. The phase changing method in the case that phase change value $y_1(t)$ of the phase changing unit 517A in FIGS. 27 and 28 is changed according to the time (frequency) (frequency and time) will be described below.

It is assumed that p (p is an integer of 2 or more) kinds of values can be taken by phase change value $y_1(t)$ of phase changing unit 517A in FIGS. 27 and 28, and $a_i$ (radian) is the value that can be taken by phase change value $y_1(t)$ (i is an integer between 1 and p (inclusive), and $0 \leq a_i < 2\pi$). At this point, i and j are integers between 1 and p (inclusive), i≠j, and $a_i \neq a_j$ is satisfied for any i and j.

It is assumed that m (m is an integer of 2 or more) kinds of values can be taken by phase change value $y_2(t)$ of phase changing unit 517B in FIGS. 27 and 28, and $b_i$ (radian) is the value that can be taken by phase change value $y_2(t)$ (i is an integer between 1 and m (inclusive), and $0 \leq b_i < 2\pi$). At this point, i and j are integers between 1 and m (inclusive), i≠j, and $b_i \neq b_j$ is satisfied for any i and j.

It is assumed that n (n is an integer of 2 or more) kinds of values can be taken by phase change value $y_3(t)$ of phase changing unit 517C in FIGS. 27 and 28, and $c_i$ (radian) is the value that can be taken by phase change value $y_3(t)$ (i is an integer between 1 and n (inclusive), and $0 \leq c_i < 2\pi$). At this point, i and j are integers between 1 and n (inclusive), i≠j, and $c_i \neq c_j$ is satisfied for any i and j.

It is assumed that q (q is an integer of 2 or more) kinds of values can be taken by phase change value $y_1(t)$ of phase changing unit 517D in FIGS. 27 and 28, and $d_i$ (radian) is the value that can be taken by phase change value $y_1(t)$ (i is an integer between 1 and q (inclusive), and $0 \leq d_i < 2\pi$). At this point, i and j are integers between 1 and q (inclusive), i≠j, and $d_i \neq d_j$ is satisfied for any i and j.

Assuming that $(a_i, b_j, c_k, d_h)$ is a value taken by a set of $(y_1(u), y_2(u), y_3(u), y_4(u))$ in symbol number u (u is an integer of 0 or more), the following conditions are satisfied.

(Condition 11)

It is assumed that i=β holds. (β is an integer between 1 and p (inclusive).) At this point, that $(y_1(u), y_2(u), y_3(u), y_4(u)) = (a_\beta, b_j, c_k, d_h)$ holds $((y_1(u), y_2(u), y_3(u), y_4(u)) = (a_\beta, b_j, c_k, d_h)$ means $y_1(u) = a_\beta$, $y_2(u) = b_j$, $y_3(u) = c_k$, and $y_4(u) = d_h$). When i=β is satisfied in integer u of 0 or more, in $(a_\beta, b_j, c_k, d_h)$, j is an integer between 0 and m (inclusive), k is an integer between 0 and n (inclusive), h is an integer between 0 and q (inclusive), and a set (j,k,h) that can be taken by (j,k,h) exists.

(Condition 12)

A condition that, "when i=β is satisfied in integer u of 0 or more, in $(a_\beta, b_j, c_k, d_h)$, j is an integer between 0 and m (inclusive), k is an integer between 0 and n (inclusive), h is an integer between 0 and q (inclusive), and a set (j,k,h) that can be taken by (j,k,h) exists" is satisfied in β of all the integers between 1 and p (inclusive).

The advantageous effect can be obtained by satisfying (Condition 11) and (Condition 12) when the phase change is performed as illustrated in FIG. 38. Although p×q×m×n is the minimum value of the period of the phase change satisfying (Condition 11) and (Condition 12), the period of the phase change may be greater than or equal to p×q×m×n. (In this case, the identical set of phase changes is used twice, and the period of the phase change is set under that condition.)

The example in which H(t)×Y(t)×F is obtained to perform the MLD in the reception device is described above. Alternatively, the detection may be performed using QR decomposition as described in NPL 9.

As described in NPL 11, based on H(t)×Y(t)×F, MMSE (Minimum Mean Square Error) and ZF (Zero Forcing) are linearly calculated to perform the detection.

Additionally, in the present exemplary embodiment, the single carrier scheme is described by way of example. However, the present disclosure is not limited the single carrier scheme, but may be similarly embodied for multi-carrier transmission. Accordingly, for example, when a spread spectrum communication scheme, an OFDM (Orthogonal Frequency-Division Multiplexing) scheme, an SC-FDMA (Single Carrier Frequency Division Multiple Access), an SC-OFDM (Single Carrier Orthogonal Frequency-Division Multiplexing) scheme, or a wavelet OFDM scheme described in NPL 12 is used, the present disclosure may be similarly embodied. In the present exemplary embodiment, such a symbol other than the data symbol as a pilot symbols (a preamble, a unique word, and the like) and a symbol transmitting control information may arbitrarily be arranged in the frame.

An example in which the OFDM scheme is used will be described as an example of a multi-carrier scheme.

Figure 39:
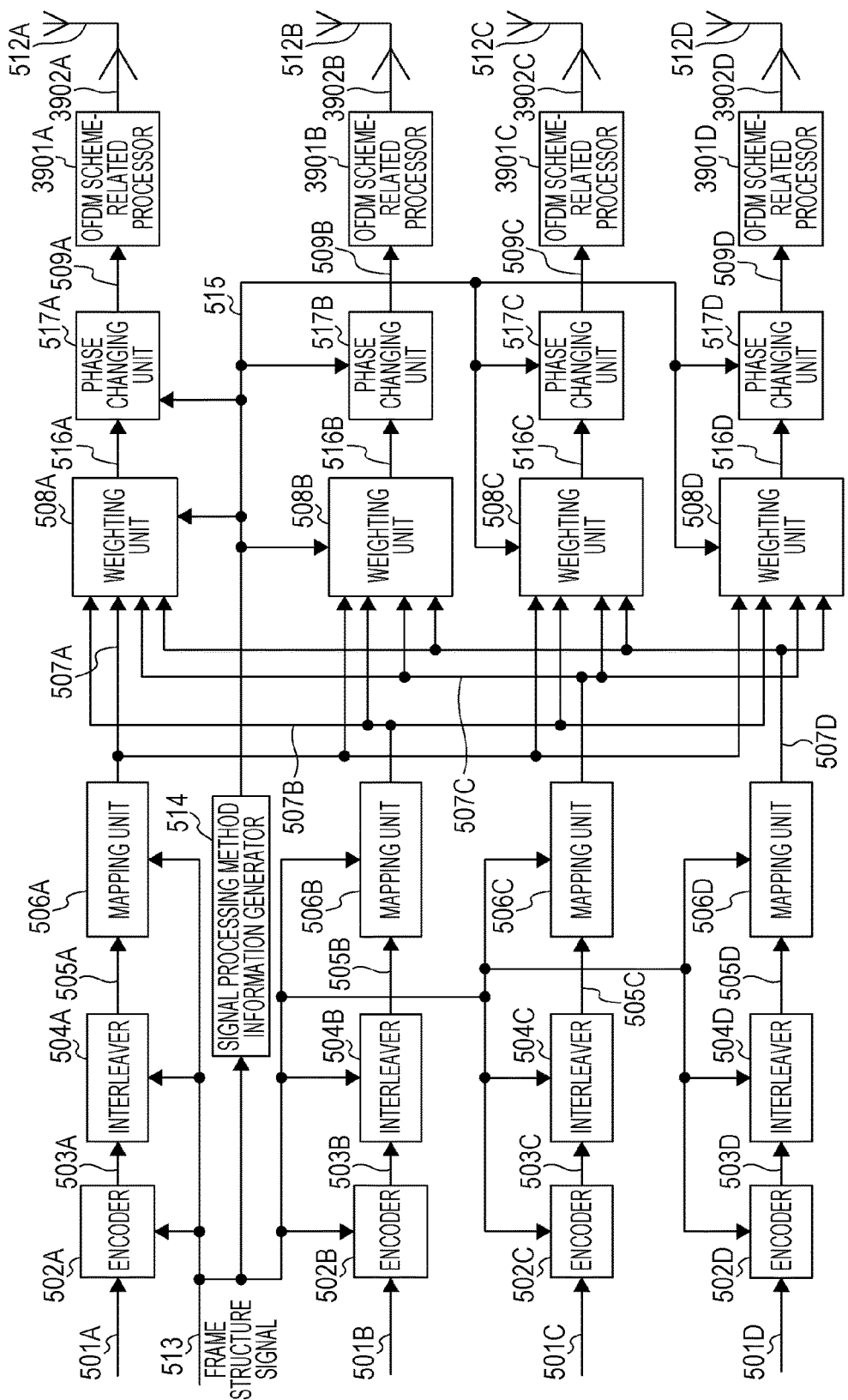
FIG. 39 illustrates a configuration example of the transmission device when the OFDM scheme is used.
Figure 40:
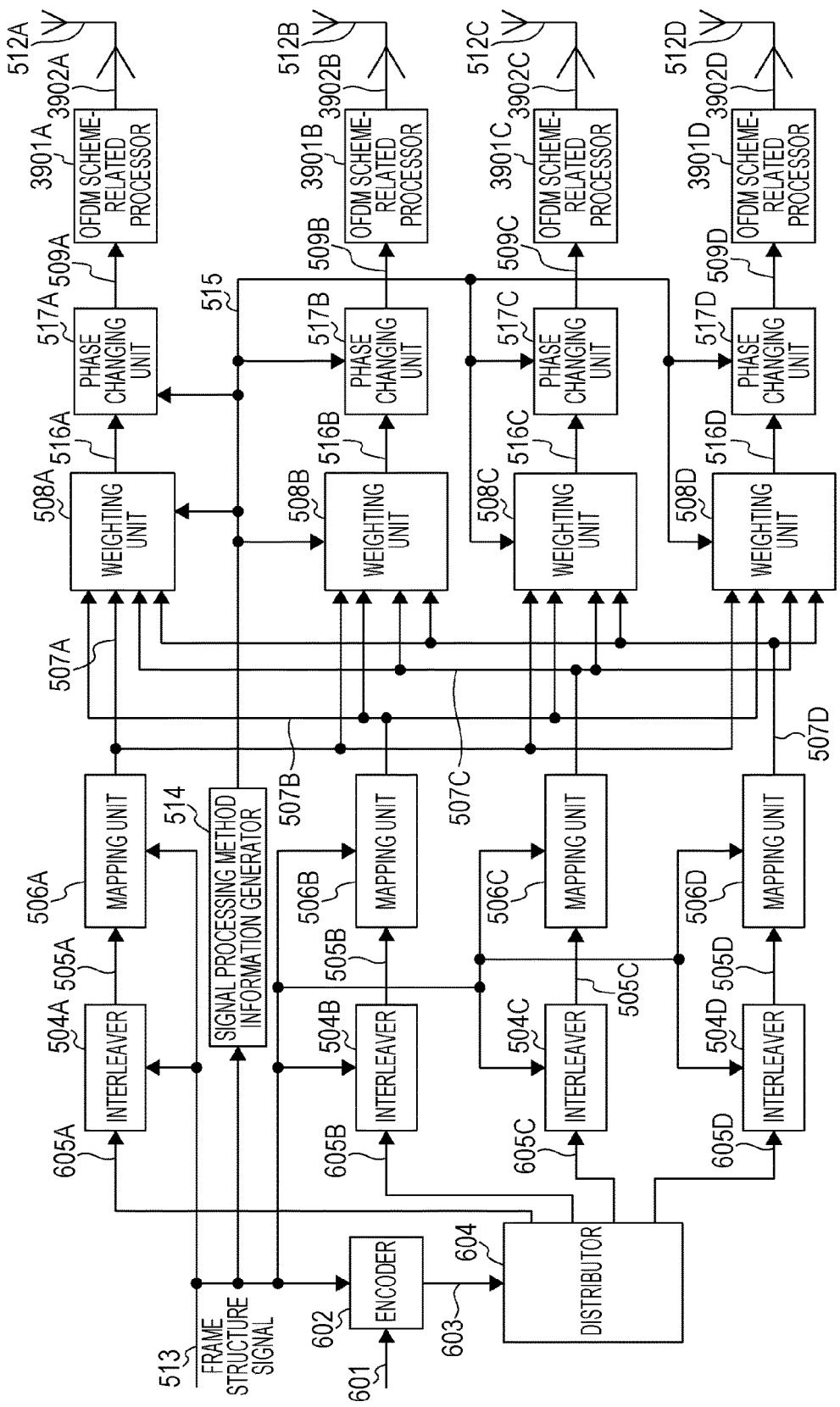
FIG. 40 illustrates a configuration example of the transmission device when the OFDM scheme is used.

FIGS. 39 and 40 illustrate a configuration of the transmission device when the OFDM scheme is used. In FIG. 39, elements operating similarly to FIGS. 27 and 28 is designated by the identical reference marks.

OFDM scheme-related processor 3901A receives post-phase change signal 509A as input, performs processing related to the OFDM scheme, and outputs transmission signal 3902A. Similarly, OFDM scheme-related processor 3901B receives post-phase change signal 509B as input and outputs transmission signal 3902B, OFDM scheme-related processor 3901C receives post-phase change signal 509C as input and outputs transmission signal 3902C, and OFDM scheme-related processor 3901D receives post-phase change signal 509D as input and outputs transmission signal 3902D.

Figure 41:
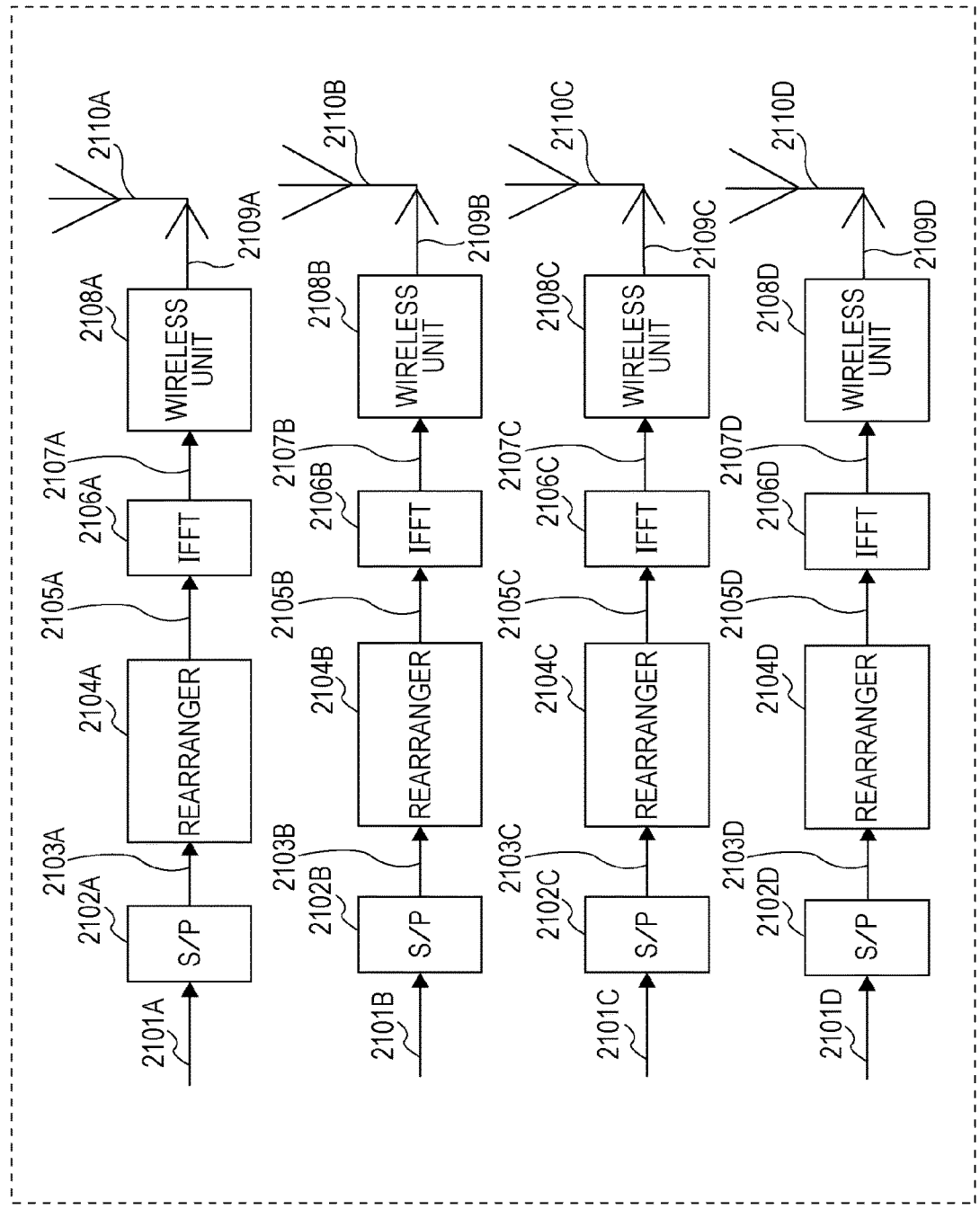
FIG. 41 illustrates a configuration example of the transmission device when the OFDM scheme is used.

FIG. 41 illustrates a configuration example subsequent to OFDM scheme-related processors 3901A, 3901B, 3901C, and 3901D in FIGS. 39 and 40. Components 2101A to 2110A correspond to components 3901A to 512A in FIGS. 39 and 40, components 2101B to 2110B correspond to components 3901B to 512B, components 2101C to 2110C correspond to components 3901C to 512C, and components 2101D to 2110D correspond to components 3901D to 512D.

Serial-parallel converter 2102A performs the serial-parallel conversion on weighted signal 2101A (corresponding to weighted signal 509A in FIGS. 39 and 40) and outputs parallel signal 2103A.

Rearranger 2104A receives parallel signal 2103A as input, performs the rearrangement, and outputs rearranged signal 2105A. The rearrangement is described in detail later.

Inverse fast Fourier transformer 2106A receives rearranged signal 2105A as input, performs the inverse fast Fourier transform, and outputs post-inverse fast Fourier transform signal 2107A.

Wireless unit 2108A receives post-inverse fast Fourier transform signal 2107A as input, performs the pieces of processing such as the frequency conversion and the amplification, and outputs modulated signal 2109A. Modulated signal 2109A is output as a radio wave from antenna 2110A.

Serial-parallel converter 2102B performs serial-parallel conversion on weighted signal 2101B (corresponding to weighted signal 509B in FIGS. 39 and 40) and outputs parallel signal 2103B.

Rearranger 2104B receives parallel signal 2103B as input, performs the rearrangement, and outputs rearranged signal 2105B. The rearrangement is described in detail later.

Inverse fast Fourier transformer 2106B receives the rearranged signal 2105B as input, performs the inverse fast Fourier transform, and outputs post-inverse fast Fourier transform signal 2107B.

Wireless unit 2108B receives post-inverse fast Fourier transform signal 2107B as input, performs the pieces of processing such as the frequency conversion and the amplification, and outputs modulated signal 2109B. Modulated signal 2109B is output as a radio wave from antenna 2110B.

Serial-parallel converter 2102C performs the serial-parallel conversion on weighted signal 2101C (corresponding to weighted signal 509C in FIGS. 39 and 40) and outputs parallel signal 2103C.

Rearranger 2104C receives parallel signal 2103C as input, performs the rearrangement, and outputs rearranged signal 2105C. The rearrangement is described in detail later.

Inverse fast Fourier transformer 2106C receives rearranged signal 2105C as input, performs the inverse fast Fourier transform, and outputs post-inverse fast Fourier transform signal 2107C.

Wireless unit 2108C receives post-inverse fast Fourier transform signal 2107C as input, performs the pieces of processing such as the frequency conversion and the amplification, and outputs modulated signal 2109C. Modulated signal 2109C is output as a radio wave from antenna 2110C.

Serial-parallel converter 2102D performs the serial-parallel conversion on weighted signal 2101D (corresponding to weighted signal 509D in FIGS. 39 and 40) and outputs parallel signal 2103D.

Rearranger 2104D receives parallel signal 2103D as input, performs the rearrangement, and outputs rearranged signal 2105D. The rearrangement is described in detail later.

Inverse fast Fourier transformer 2106D receives rearranged signal 2105D as input, performs the inverse fast Fourier transform, and outputs post-inverse fast Fourier transform signal 2107D.

Wireless unit 2108D receives post-inverse fast Fourier transform signal 2107D as input, performs the pieces of processing such as the frequency conversion and the amplification, and outputs modulated signal 2109D. Modulated signal 2109D is output as a radio wave from antenna 2110D.

Because the transmission scheme in which the multi-carrier is used is not adopted in the transmission device in FIGS. 27 and 28, the post-phase change symbol is disposed in a time axis direction. When such the multi-carrier transmission method as the OFDM scheme in FIGS. 39 and 40 is adopted, it is conceivable that, for each (sub) carrier, the symbol that is subjected to the precoding and phase change is disposed in the time axis direction as illustrated in FIGS. 27 and 28. For the multi-carrier transmission scheme, it is also conceivable that the symbol is disposed in the frequency axis direction, or both the frequency axis and time axis directions. This point will be described below.

Figures 42A, 42B:
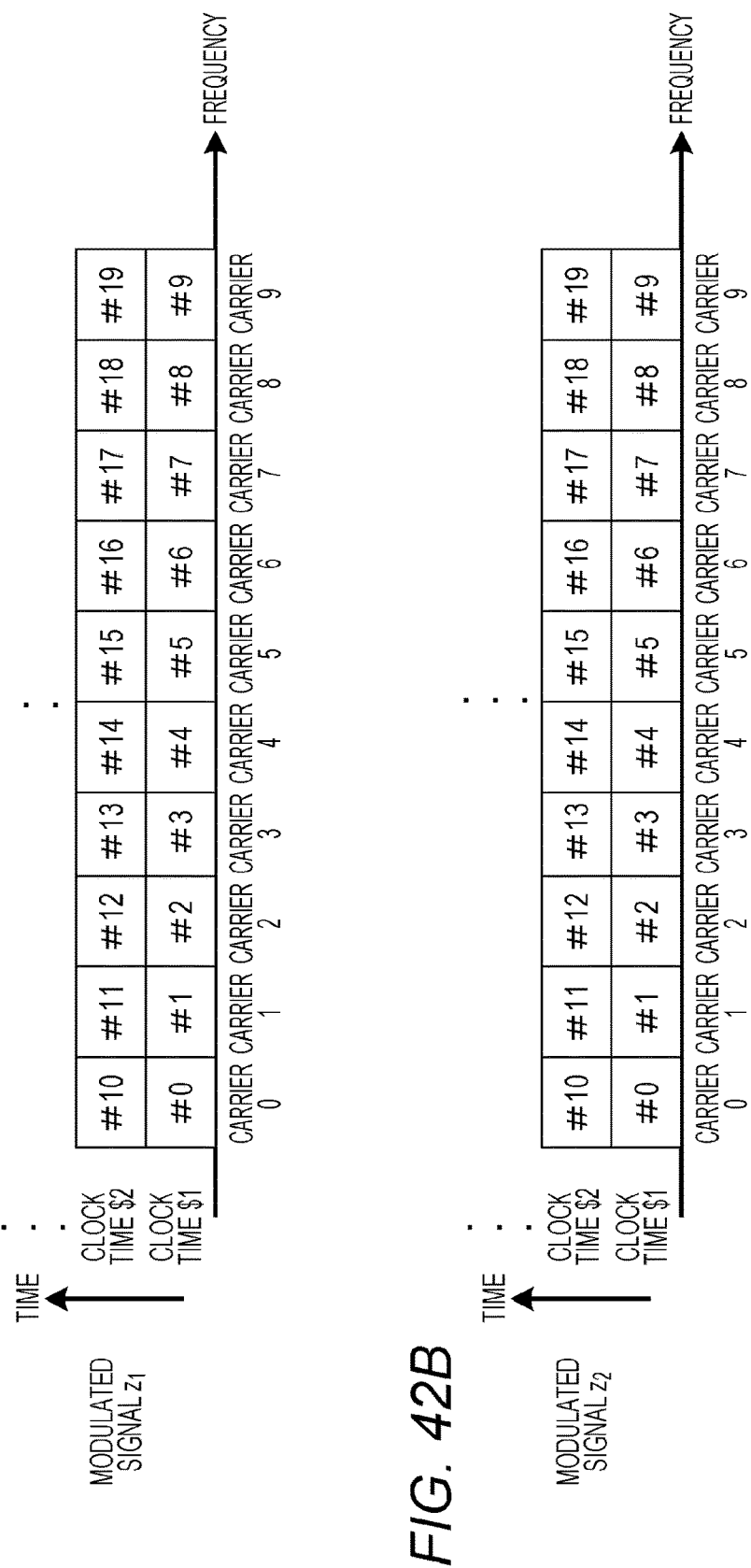
FIG. 42A illustrates an example of the symbol rearranging method.
FIG. 42B illustrates an example of the symbol rearranging method.
Figure 42C:
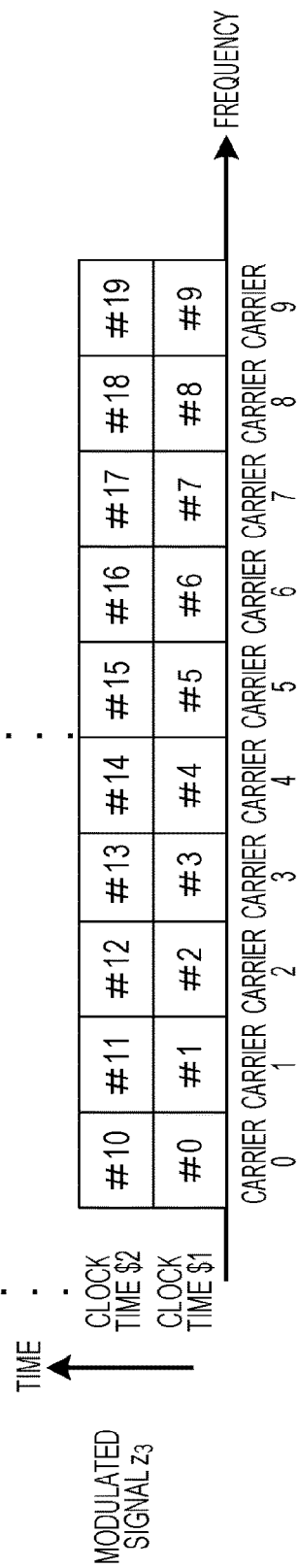
FIG. 42C illustrates an example of the symbol rearranging method.
Figure 42D:
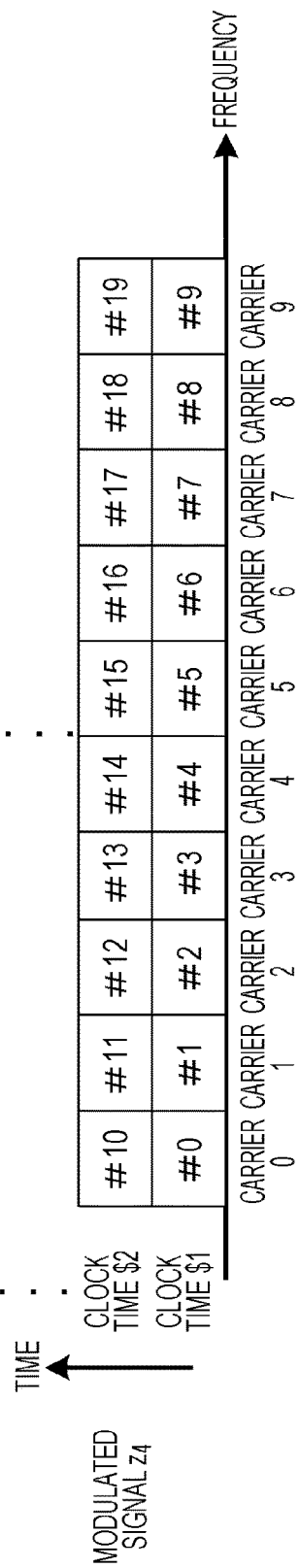
FIG. 42D illustrates an example of the symbol rearranging method.

FIG. 42 illustrates an example of the symbol rearranging method on a horizontal axis indicating the frequency and a vertical axis indicating the time in rearrangers 2104A, 2104B, 2104C, and 2104D in FIG. 41. In FIG. 42, the frequency axis is constructed with (sub) carrier 0 to (sub) carrier 9. Modulated signals $z_1$, $z_2$, $z_3$, and $z_4$ use the identical frequency band at the clock time (time). FIG. 42A illustrates a method for rearranging the symbol of modulated signal $z_1$, FIG. 42B illustrates the method for rearranging the symbol of modulated signal $z_2$, FIG. 42C illustrates the method for rearranging the symbol of modulated signal $z_3$, and FIG. 42D illustrates the method for rearranging the symbol of modulated signal $z_4$.

Numbers #0, #1, #2, #3, . . . are sequentially assigned to the symbol of weighted and post phase change signal 2101A input to serial-parallel converter 2102A.

At this point, as illustrated in FIG. 42A, symbols #0, #1, #2, #3, . . . are regularly disposed from carrier 0 such that symbols #0 to #9 are sequentially disposed at clock time $1, and such that symbols #10 to #19 are sequentially disposed at clock time $2. Modulated signals $z_1$, $z_2$, $z_3$, and $z_4$ are complex signals.

Similarly, numbers #0, #1, #2, #3, . . . are assigned to the symbols of weighted and post phase change signal 2101B which is input to serial-parallel converter 2102B.

At this point, as illustrated in FIG. 42B, symbols #0, #1, #2, #3, . . . are regularly disposed from carrier 0 such that symbols #0 to #9 are sequentially disposed at clock time $1, and such that symbols #10 to #19 are sequentially disposed at clock time $2.

Similarly, numbers #0, #1, #2, #3, . . . are sequentially assigned to the symbol of weighted and post phase change signal 2101C which is input to serial-parallel converter 2102C.

At this point, as illustrated in FIG. 42C, symbols #0, #1, #2, #3, . . . are regularly disposed from carrier 0 such that symbols #0 to #9 are sequentially disposed at clock time $1, and such that symbols #10 to #19 are sequentially disposed at clock time $2.

Similarly, numbers #0, #1, #2, #3, . . . are sequentially assigned to the symbol of weighted and post phase change signal 2101D which is input to serial-parallel converter 2102D.

At this point, as illustrated in FIG. 42D, symbols #0, #1, #2, #3, . . . are regularly disposed from carrier 0 such that symbols #0 to #9 are sequentially disposed at clock time $1, and such that symbols #10 to #19 are sequentially disposed at clock time $2.

Thus, when such the multi-carrier transmission method as OFDM scheme is used, the symbols can be disposed in the frequency axis direction unlike the single carrier transmission. The disposition of the symbols is not limited to that in FIG. 42. Other examples will be described with reference to FIGS. 43 and 44.

FIG. 43 illustrates another example, different from FIG. 42, of the symbol rearranging method on the horizontal axis indicating the frequency and the vertical axis indicating the time in rearrangers 2104A, 2104B, 2104C, and 2104D in FIG. 41. FIG. 43A illustrates the method for rearranging the symbol of modulated signal $z_1$, FIG. 43B illustrates the method for rearranging the symbol of modulated signal $z_2$, FIG. 43C illustrates the method for rearranging the symbol of modulated signal $z_3$, and FIG. 43D illustrates the method for rearranging the symbol of modulated signal $z_4$. The symbol rearranging method in FIG. 43 differs from the symbol rearranging method in FIG. 42 in the method for rearranging the symbols of the modulated signals $z_1$, $z_2$, $z_3$, and $z_4$. In FIG. 43B, symbols #0 to #5 are disposed in carriers 4 to 9, symbols #6 to #9 are disposed in carriers 0 to 3, and symbols #10 to #19 are disposed in the similar way. In FIG. 43D, symbols #0 to #5 are disposed in carriers 4 to 9, symbols #6 to #9 are disposed in carriers 0 to 3, and symbols #10 to #19 are disposed in the similar way.

FIG. 44 illustrates another example, different from FIG. 42, of the symbol rearranging method on the horizontal axis indicating the frequency and the vertical axis indicating the time in rearrangers 2104A, 2104B, 2104C, and 2104D in FIG. 41. FIG. 44A illustrates the method for rearranging the symbol of modulated signal $z_1$, FIG. 44B illustrates the method for rearranging the symbol of modulated signal $z_2$, FIG. 44C illustrates the method for rearranging the symbol of modulated signal $z_3$, and FIG. 44D illustrates the method for rearranging the symbol of modulated signal $z_4$. The symbol rearranging method in FIG. 44 differs from the symbol rearranging method in FIG. 42 in that the symbols are not sequentially disposed in FIG. 44 while the symbols are sequentially disposed in FIG. 42. In FIG. 44, similarly to FIG. 43, the methods for rearranging the symbols of the modulated signals $z_1$, $z_2$, $z_3$, and $z_4$ may differ from one another.

Figure 45A:
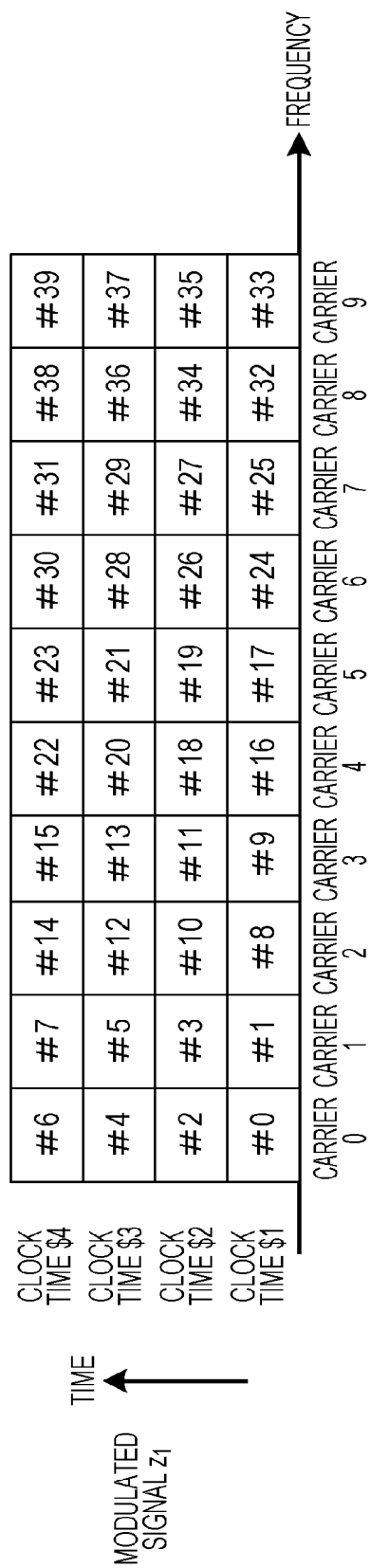
FIG. 45A illustrates an example of the symbol rearranging method.
Figure 45B:
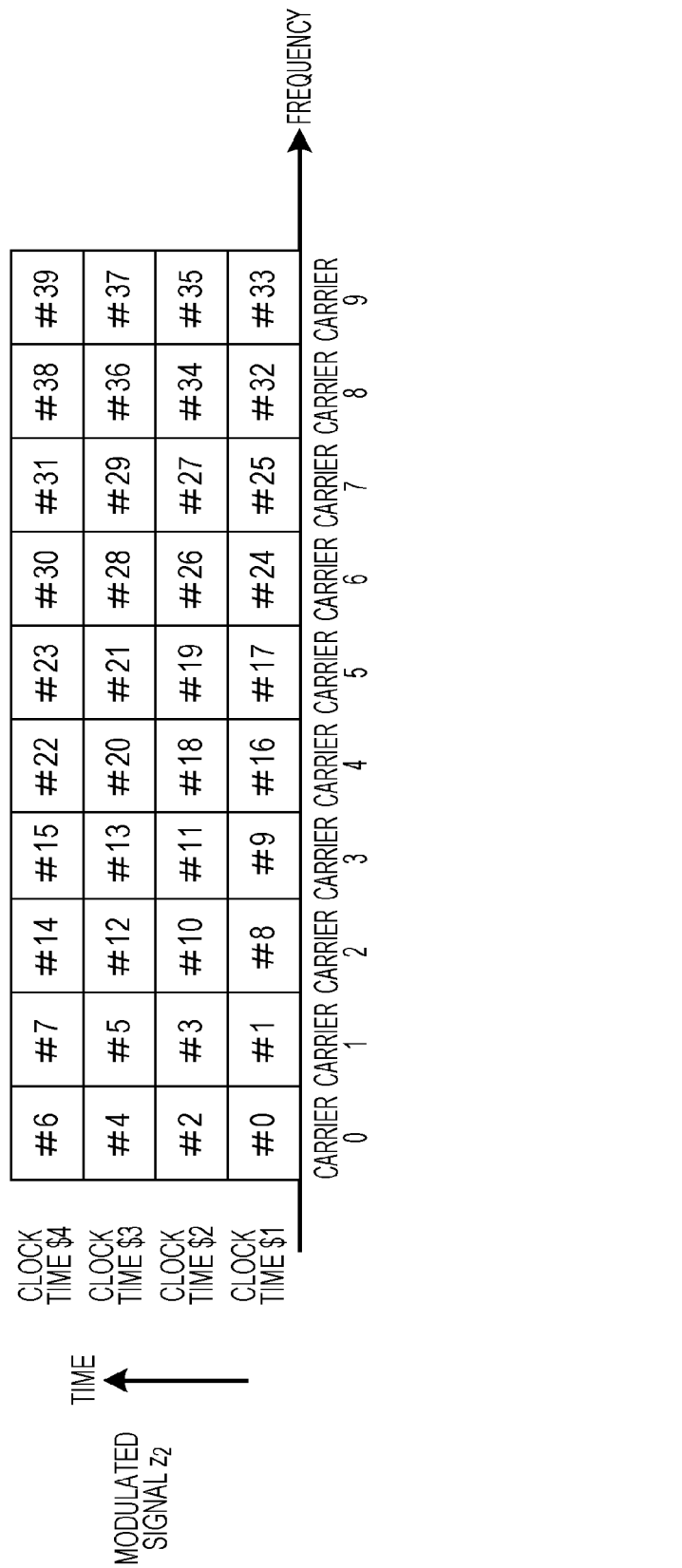
FIG. 45B illustrates an example of the symbol rearranging method.
Figure 45C:
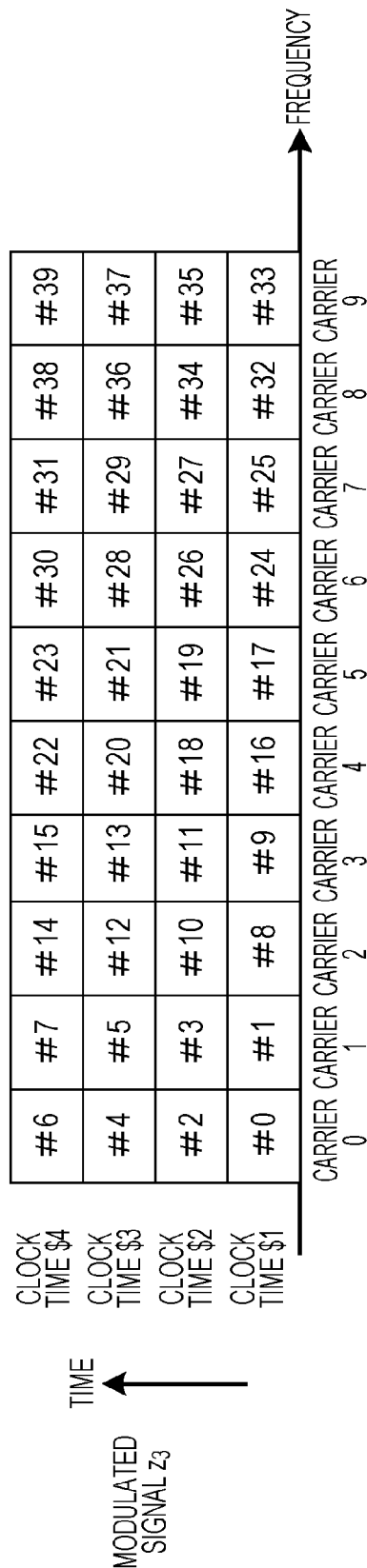
FIG. 45C illustrates an example of the symbol rearranging method.

FIG. 45 illustrates another example, different from FIGS. 42 to 44, of the symbol rearranging method on the horizontal axis indicating the frequency and the vertical axis indicating the time in rearrangers 2104A, 2104B, 2104C, and 2104D in FIG. 41. FIG. 45A illustrates the method for rearranging the symbol of modulated signal $z_1$, FIG. 45B illustrates the method for rearranging the symbol of modulated signal $z_2$, FIG. 45C illustrates the method for rearranging the symbol of modulated signal $z_3$, and FIG. 45D illustrates the method for rearranging the symbol of modulated signal $z_4$. The symbols are arranged in both the frequency axis and time axis directions in FIG. 45, while the symbols are arranged in the frequency axis direction in FIGS. 42 to 44.

Figure 46A:
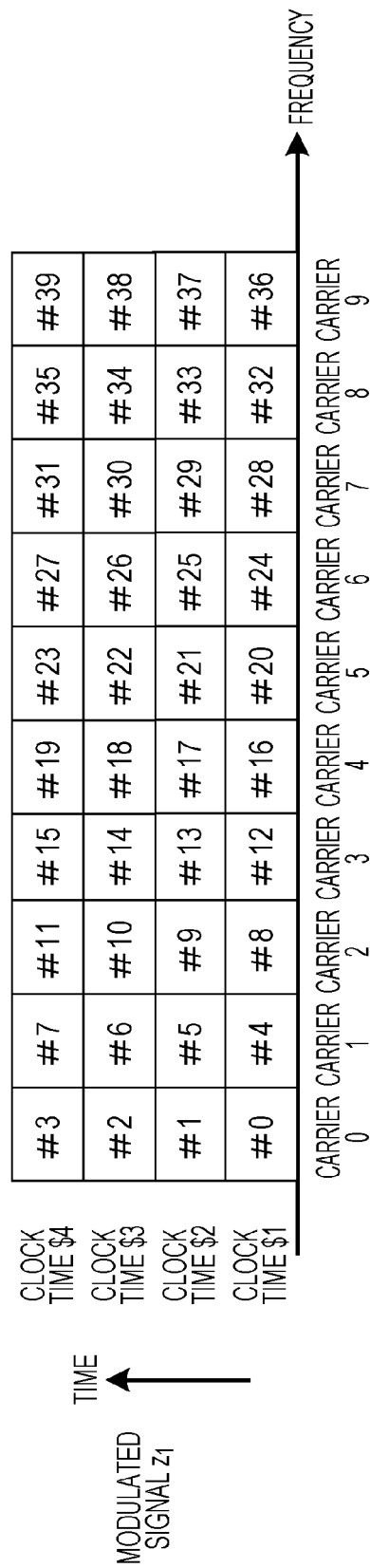
FIG. 46A illustrates an example of the symbol rearranging method.
Figure 46B:
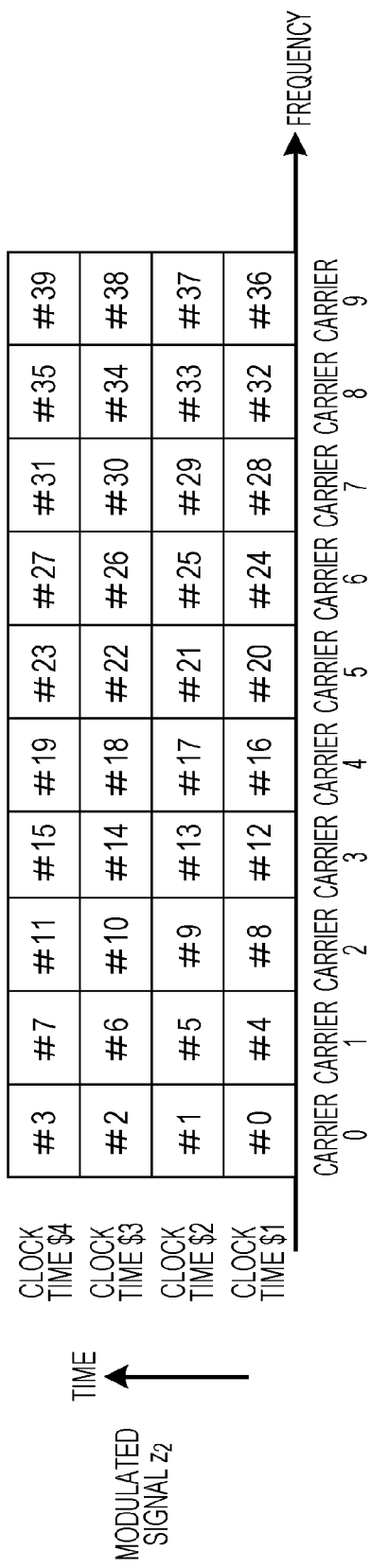
FIG. 46B illustrates an example of the symbol rearranging method.
Figure 46C:
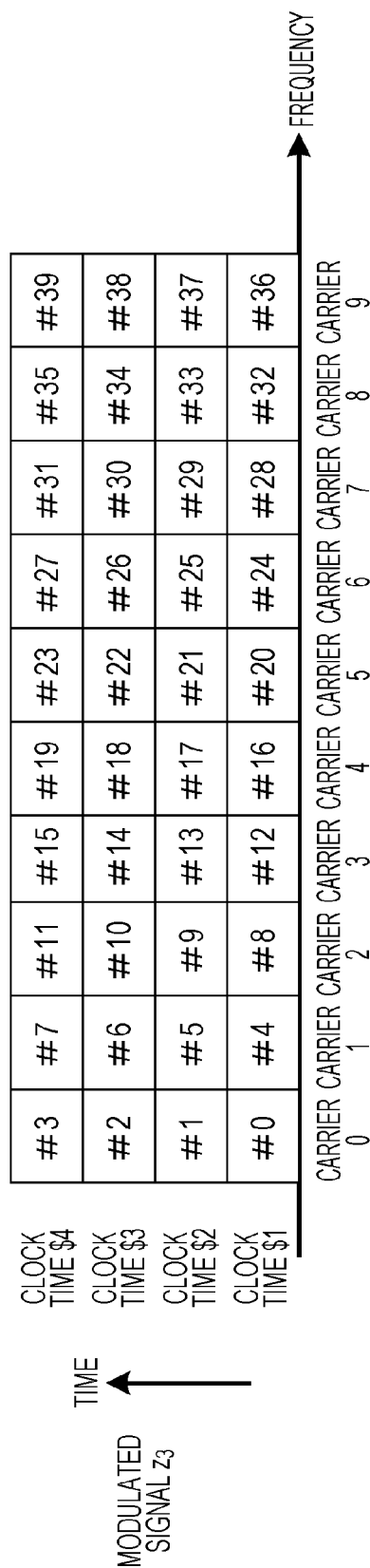
FIG. 46C illustrates an example of the symbol rearranging method.

FIG. 46 illustrates another example, different from FIG. 45, of the symbol rearranging method on the horizontal axis indicating the frequency and the vertical axis indicating the time in rearrangers 2104A, 2104B, 2104C, and 2104D in FIG. 41. FIG. 46A illustrates the method for rearranging the symbol of modulated signal $z_1$, FIG. 46B illustrates the method for rearranging the symbol of modulated signal $z_2$, FIG. 46C illustrates the method for rearranging the symbol of modulated signal $z_3$, and FIG. 46D illustrates the method for rearranging the symbol of modulated signal $z_4$. In FIG. 46, similarly to FIG. 45, the symbols are disposed on both the frequency and time axes. The symbol rearranging method in FIG. 46 differs from the symbol rearranging method in FIG. 45 in the following point. That is, in FIG. 45, high priority is given to the frequency axis direction and then the symbols are disposed on the time axis direction. On the other hand, in FIG. 46, high priority is given to the time axis direction and then the symbols are disposed on the frequency axis direction.

Although the symbol disposing methods are described in some drawings, the symbol disposing method is not limited to the above methods. The symbol may randomly be disposed on the time-frequency axis, or dispose according to a certain rule.

Accordingly, the present exemplary embodiment leads to the following advantageous effect. That is, there is a high possibility of improving the data reception quality, and particularly there is a high possibility of largely improving the data reception quality in the LOS environment in which the direct wave is dominant.

For example, the precoding matrix may be switched when the set of modulation schemes of the four streams is switched. The phase changing method may be switched when the set of modulation schemes of the four streams is switched. The precoding matrix and the phase changing method may be switched when the set of modulation schemes of the four streams is switched (the precoding matrix and the phase changing need not be switched even if the set of modulation schemes of the four streams is switched).

For the interleaver, the data need not be rearranged.

Third Exemplary Embodiment

In the first and second exemplary embodiments, as illustrated in FIGS. 5, 6, 19, 20, 27, 28, 39, and 40, the mapping, the weighting, and the phase change are sequentially performed by way of example. A modification in which a phase changing unit or a power changing unit is added to the first and second exemplary embodiments will be described in a third exemplary embodiment. The phase changing method performed at a subsequent stage of the weighting may be operated similarly to the first and second exemplary embodiments.

The case that the four streams are transmitted using the four antennas are described in the third exemplary embodiment. In FIGS. 27, 28, 39, and 40, mapping unit 506A to phase changing unit 517A, mapping unit 506B to phase changing unit 517B, mapping unit 506C to phase changing unit 517C, and mapping unit 506D to phase changing unit 517D may be replaced with those in FIGS. 47, 48, 49, 50, 51, and 52. The operation in each drawings will be described below.

Figure 47:
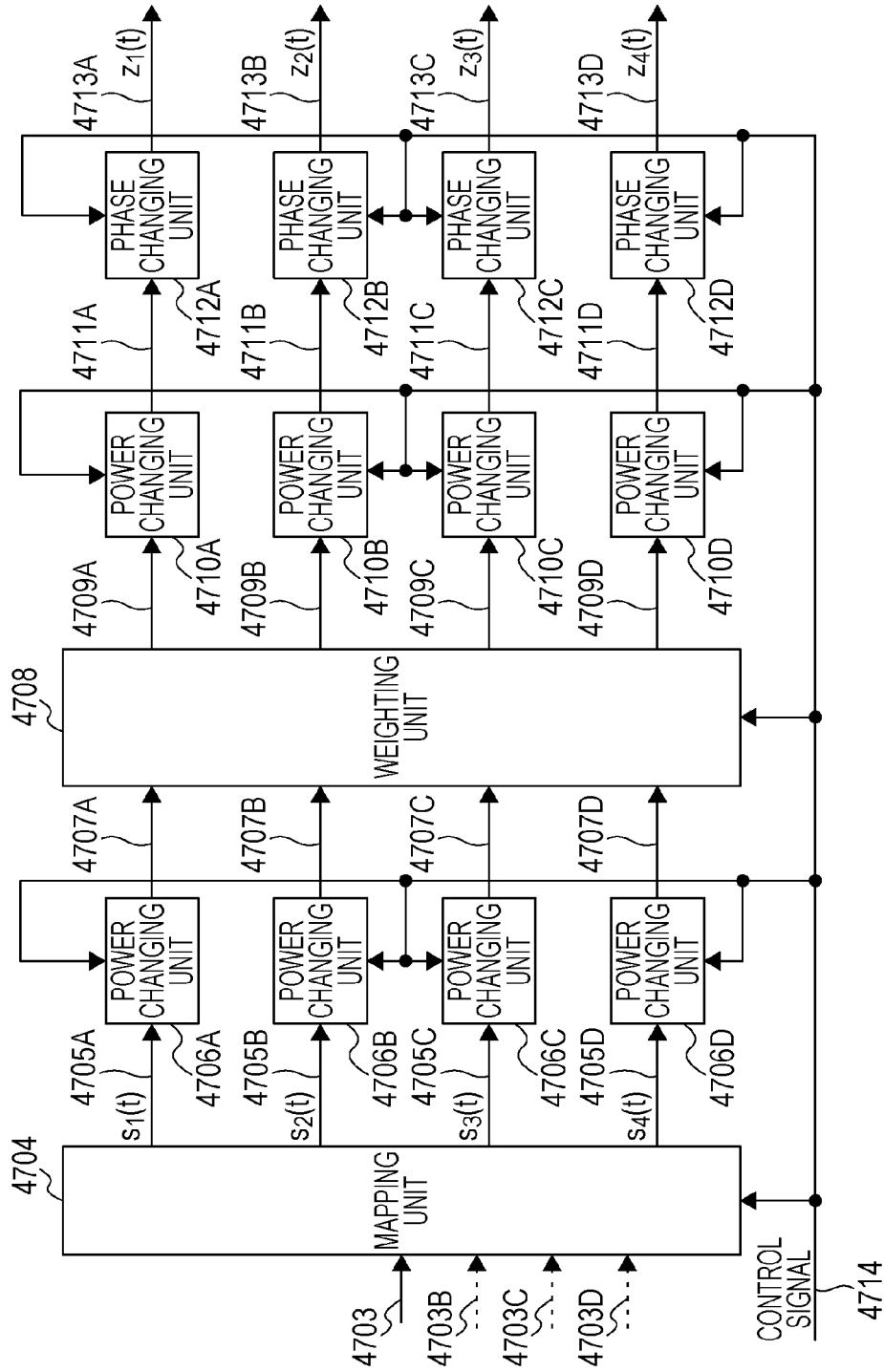
FIG. 47 illustrates an example of a configuration performing a precoding method.
Figure 48:
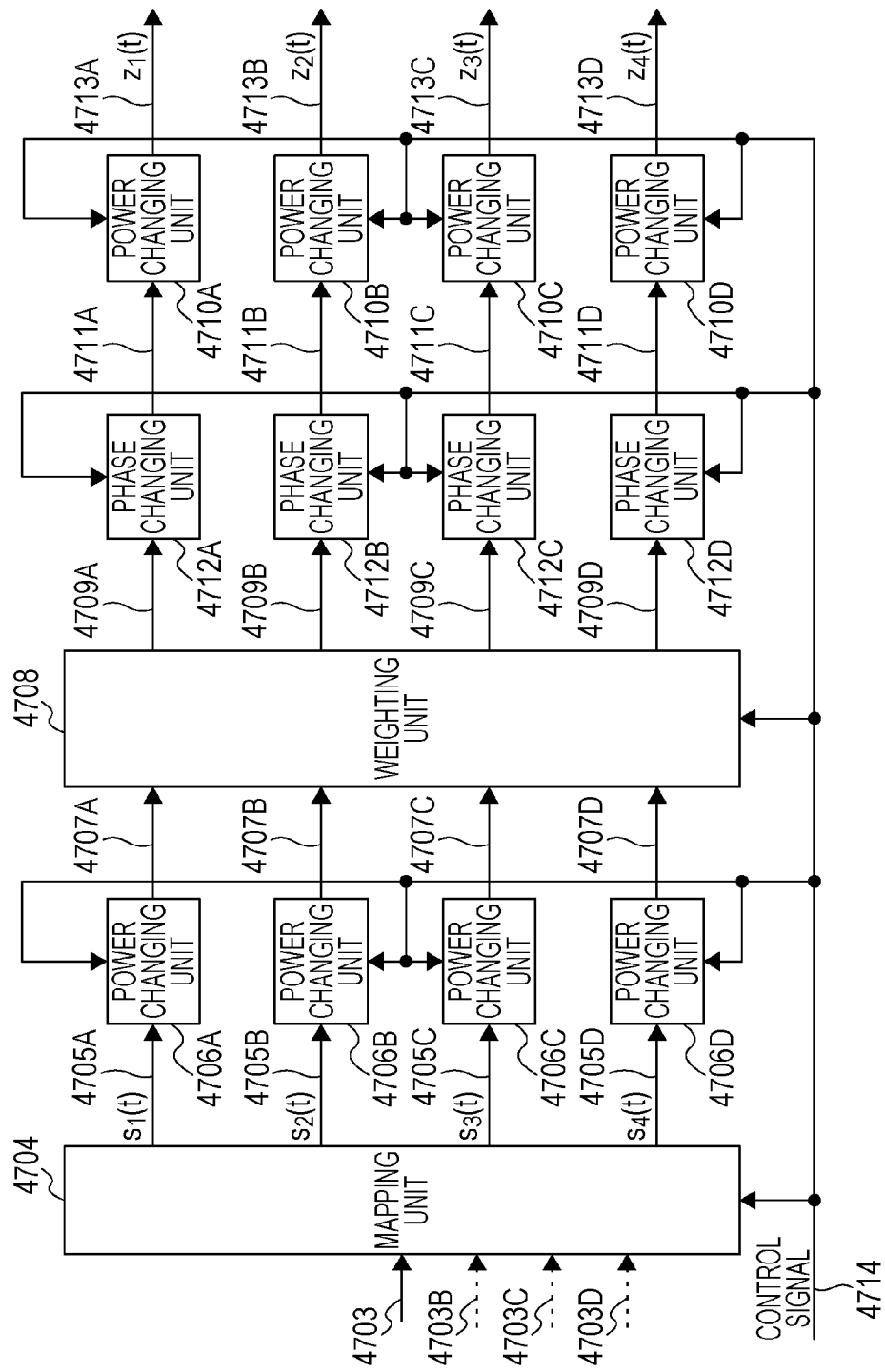
FIG. 48 illustrates an example of the configuration performing the precoding method.

FIGS. 47 and 48 are views illustrating a configuration example in which the precoding method is performed when average transmission power of the four transmission signals varies.

In FIG. 47, mapping unit 4704 receives data 4703 and control signal 4714 as input. It is assumed that control signal 4714 assigns the transmission of the four streams as the transmission method. Additionally, it is assumed that control signal 4714 assigns modulation schemes α, β, γ, and δ as the modulation schemes of the four streams. Modulation scheme α modulates p-bit data, modulation scheme β modulates q-bit data, modulation scheme γ modulates r-bit data, and modulation scheme δ modulates s-bit data. (For example, the modulation scheme modulates 4-bit data for the 16QAM, and the modulation scheme modulates 6-bit data for the 64QAM.)

Therefore, mapping unit 4704 modulates the p-bit data in (p+q+r+s)-bit data using modulation scheme α, and generates and outputs baseband signal $s_1(t)$ (4705A). Mapping unit 4704 modulates the q-bit data using modulation scheme β, and generates and outputs baseband signal $s_2(t)$ (4705B). Mapping unit 4704 modulates the r-bit data using modulation scheme γ, and generates and outputs baseband signal $s_3(t)$ (4705C). Mapping unit 4704 modulates the s-bit data using modulation scheme δ, and generates and outputs baseband signal $s_4(t)$ (4705D).

(In FIG. 47, the one mapping unit is described. Alternatively, a mapping unit generating $s_1(t)$ and a mapping unit generating $s_2(t)$ may exist separately. At this point, coded data 4703 is divided into the mapping unit generating $s_1(t)$, the mapping unit generating $s_2(t)$, the mapping unit generating $s_3(t)$, and the mapping unit generating $s_4(t)$. For example, as illustrated in FIG. 47, mapping unit 4704 receives pieces of data 4703, 4703B, 4703C, and 4703D as input, performs the mapping on data 4703, and generates and outputs baseband signal $s_1(t)$ (4705A). Mapping unit 4704 also performs the mapping on data 4703B, and generates and outputs baseband signal $s_2(t)$ (4705B). Mapping unit 4704 also performs the mapping on data 4703C, and generates and outputs baseband signal $s_3(t)$ (4705C). Mapping unit 4704 also performs the mapping on data 4703D, and generates and outputs baseband signal $s_4(t)$ (4705D)).

Baseband signals $s_1(t)$, $s_2(t)$, $s_3(t)$, and $s_4(t)$ are expressed by complex numbers (however, may be either complex numbers or real numbers), and t is a time. For the use of the transmission method in which the multi-carrier such as OFDM (Orthogonal Frequency Division Multiplexing) is used, $s_1$, $s_2$, $s_3$, and $s_4$ are functions of frequency f such as $s_1(f)$, $s_2(f)$, $s_3(f)$, and $s_4(f)$ or functions of time t and frequency f such as $s_1(t,f)$, $s_2(t,f)$, $s_3(t,f)$, and $s_4(t,f)$.

Hereinafter, the baseband signal, the precoding matrix, and the phase changing are described as the function of time t. Alternatively, the baseband signal, the precoding matrix, and the phase changing may be considered as the function of frequency f, and the function of time t and frequency f.

Sometimes the baseband signal, the precoding matrix, and the phase changing are described as the function of symbol number i. In this case, the baseband signal, the precoding matrix, and the phase changing may be considered as the function of time t, the function of frequency f, or the function of time t and frequency f. That is, the symbol and the baseband signal may be generated and disposed on the time axis direction and the frequency axis direction. The symbol and the baseband signal may also be generated and disposed on the time axis direction and the frequency axis direction.

Power changing unit 4706A (power adjuster 4706A) receives baseband signal $s_1(t)$ (4705A) and control signal 4714 as input, sets real number $P_1$ based on control signal 4714, and outputs $P_1 \times s_1(t)$ as post-power change signal 4707A. (Although $P_1$ is a real number, $P_1$ may be a complex number.)

Similarly, power changing unit 4706B (power adjuster 4706B) receives baseband signal $s_2(t)$ (4705B) and control signal 4714 as input, sets real number $P_2$, and outputs $P_2 \times s_2(t)$ as post-power change signal 4707B. (Although $P_2$ is a real number, $P_2$ may be a complex number.)

Similarly, power changing unit 4706C (power adjuster 4706C) receives baseband signal $s_3(t)$ (4705C) and control signal 4714 as input, sets real number $P_3$, and outputs $P_3 \times s_3(t)$ as post-power change signal 4707C. (Although $P_3$ is a real number, $P_3$ may be a complex number.)

Similarly, power changing unit 4706D (power adjuster 4706D) receives baseband signal $s_4(t)$ (4705D) and control signal 4714 as input, sets real number $P_4$, and outputs $P_4 \times s_4(t)$ as post-power change signal 4707D. (Although $P_4$ is a real number, $P_4$ may be a complex number.)

Weighting unit 4708 receives post-power change signals 4707A, 4707B, 4707C, and 4707D and control signal 4714 as input, and sets precoding matrix F (or F(i)) based on control signal 4714. Assuming that i is a slot number (symbol number), weighting unit 4708 calculates Equation (60).

[Mathematical formula 60]

Equation (60)

$$\begin{pmatrix} u_1^{(i)} \\ u_2^{(i)} \\ u_3^{(i)} \\ u_4^{(i)} \end{pmatrix} = F \times \begin{pmatrix} P_1 \times s_1^{(i)} \\ P_2 \times s_2^{(i)} \\ P_3 \times s_3^{(i)} \\ P_4 \times s_4^{(i)} \end{pmatrix}$$

$$= \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} P_1 \times s_1^{(i)} \\ P_2 \times s_2^{(i)} \\ P_3 \times s_3^{(i)} \\ P_4 \times s_4^{(i)} \end{pmatrix}$$

$$= \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix} \begin{pmatrix} s_1^{(i)} \\ s_2^{(i)} \\ s_3^{(i)} \\ s_4^{(i)} \end{pmatrix}$$

Precoding matrix F is already described above using Equations (48) and (49) of the second exemplary embodiment. Precoding matrix F may be a function of i, or need not be a function of i. When precoding matrix F is the function of i, precoding matrix F is switched by the slot number (symbol number).

Weighting unit 4708 outputs $u_1(i)$ in Equation (60) as weighted signal 4709A, outputs $u_2(i)$ in Equation (60) as weighted signal 4709B, outputs $u_3(i)$ in Equation (60) as weighted signal 4709C, and outputs $u_4(i)$ in Equation (60) as weighted signal 4709D.

Power changing unit 4710A receives weighted signal 4709A ($u_1(i)$) and control signal 4714 as input, sets real number $Q_1$ based on control signal 4714, and outputs $Q_1 \times u_1(i)$ as post-power change signal 4711A. (Although $Q_1$ is a real number, $Q_1$ may be a complex number.)

Similarly, power changing unit 4710B receives weighted signal 4709B ($u_2(i)$) and control signal 4714 as input, sets real number $Q_2$ based on control signal 4714, and outputs $Q_2 \times u_2(i)$ as post-power change signal 4711B. (Although $Q_2$ is a real number, $Q_2$ may be a complex number.)

Similarly, power changing unit 4710C receives weighted signal 4709C ($u_3(i)$) and control signal 4714 as input, sets real number $Q_3$ based on control signal 4714, and outputs $Q_3 \times u_3(i)$ as post-power change signal 4711C. (Although $Q_3$ is a real number, $Q_3$ may be a complex number.)

Similarly, power changing unit 4710D receives weighted signal 4709D ($u_4(i)$) and control signal 4714 as input, sets real number $Q_4$ based on control signal 4714, and outputs $Q_4 \times u_4(i)$ as post-power change signal 4711D. (Although $Q_4$ is a real number, $Q_4$ may be a complex number.)

Phase changing unit 4712A receives post-power change signal 4711A of $Q_1 \times u_1(i)$ and control signal 4714 as input, and changes the phase of post-power change signal 4711A of $Q_1 \times u_1(i)$ based on control signal 4714. Accordingly, the signal in which the phase of post-power change signal 4711A of $Q_1 \times u_1(i)$ is changed is expressed as $B_1 \times e^{j\theta 1(i)} \times Q_1 \times u_1(i)$, and phase changing unit 4712A outputs $B_1 \times e^{j\theta 1(i)} \times Q_1 \times u_1(i)$ as post-phase change signal 4713A (j may be an imaginary unit, and $B_1$ may be 1.00 or a real number of 0 or more). One of the features of the third exemplary embodiment is that the value of the changed phase is a function of i such as $\theta_1(i)$. The method for providing 80 is already described above in the second exemplary embodiment.

Phase changing unit 4712B receives post-power change signal 4711B of $Q_2 \times u_2(i)$ and control signal 4714 as input, and changes the phase of post-power change signal 4711B of $Q_2 \times u_2(i)$ based on control signal 4714. Accordingly, the signal in which the phase of post-power change signal 4711B of $Q_2 \times u_2(i)$ is changed is expressed as $B_2 \times e^{j\theta 2(i)} \times Q_2 \times u_2(i)$, and phase changing unit 4712B outputs $B_2 \times e^{j\theta 2(i)} \times Q_2 \times u_2(i)$ as post-phase change signal 4713B (j may be an imaginary unit, and $B_2$ may be 1.00 or a real number of 0 or more). One of the features of the third exemplary embodiment is that the value of the changed phase is a function of i such as $\theta_2(i)$. The method for providing $\theta_2(i)$ is already described above in the second exemplary embodiment.

Phase changing unit 4712C receives post-power change signal 4711C of $Q_3 \times u_3(i)$ and control signal 4714 as input, and changes the phase of post-power change signal 4711C of $Q_3 \times u_3(i)$ based on control signal 4714. Accordingly, the signal in which the phase of post-power change signal 4711C of $Q_3 \times u_3(i)$ is changed is expressed as $B_3 \times e^{j\theta 3(i)} \times Q_3 \times u_3(i)$, and phase changing unit 4712C outputs $B_3 \times e^{j\theta 3(i)} \times Q_3 \times u_3(i)$ as post-phase change signal 4713C (j may be an imaginary unit, and $B_3$ may be 1.00 or a real number of 0 or more). One of the features of the third exemplary embodiment is that the value of the changed phase is a function of i such as $\theta_3(i)$. The method for providing $\theta_3(i)$ is already described above in the second exemplary embodiment.

Phase changing unit 4712D receives post-power change signal 4711D of $Q_4 \times u_4(i)$ and control signal 4714 as input, and changes the phase of post-power change signal 4711D of $Q_4 \times u_4(i)$ based on control signal 4714. Accordingly, the signal in which the phase of post-power change signal

4711D of $Q_4 \times u_4(i)$ is changed is expressed as $B_4 \times e^{j\theta 4(i)} \times Q_4 \times u_4(i)$, and phase changing unit 4712D outputs $B_4 \times e^{j\theta 4(i)} \times Q_4 \times u_4(i)$ as post-phase change signal 4713D (j may be an imaginary unit, and $B_4$ may be 1.00 or a real number of 0 or more). One of the features of the third exemplary embodiment is that the value of the changed phase is a function of i such as $\theta_4(i)$. The method for providing $\theta_4(i)$ is already described above in the second exemplary embodiment.

Therefore, Equation (61) holds.

[Mathematical formula 61]

Equation (61)

$$\begin{pmatrix} z_1^{(i)} \\ z_2^{(i)} \\ z_3^{(i)} \\ z_4^{(i)} \end{pmatrix} = \begin{pmatrix} y_1^{(i)} & 0 & 0 & 0 \\ 0 & y_2^{(i)} & 0 & 0 \\ 0 & 0 & y_3^{(i)} & 0 \\ 0 & 0 & 0 & y_4^{(i)} \end{pmatrix} \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix} \times$$

$$F \times \begin{pmatrix} P_1 \times s_1^{(i)} \\ P_2 \times s_2^{(i)} \\ P_3 \times s_3^{(i)} \\ P_4 \times s_4^{(i)} \end{pmatrix}$$

$$= \begin{pmatrix} y_1^{(i)} & 0 & 0 & 0 \\ 0 & y_2^{(i)} & 0 & 0 \\ 0 & 0 & y_3^{(i)} & 0 \\ 0 & 0 & 0 & y_4^{(i)} \end{pmatrix} \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix}$$

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} P_1 \times s_1^{(i)} \\ P_2 \times s_2^{(i)} \\ P_3 \times s_3^{(i)} \\ P_4 \times s_4^{(i)} \end{pmatrix}$$

$$= \begin{pmatrix} y_1^{(i)} & 0 & 0 & 0 \\ 0 & y_2^{(i)} & 0 & 0 \\ 0 & 0 & y_3^{(i)} & 0 \\ 0 & 0 & 0 & y_4^{(i)} \end{pmatrix} \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix}$$

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix} \begin{pmatrix} s_1^{(i)} \\ s_2^{(i)} \\ s_3^{(i)} \\ s_4^{(i)} \end{pmatrix}$$

$$= \begin{pmatrix} B_1 \times e^{j\theta 1(i)} & 0 & 0 & 0 \\ 0 & B_2 \times e^{j\theta 2(i)} & 0 & 0 \\ 0 & 0 & B_3 \times e^{j\theta 3(i)} & 0 \\ 0 & 0 & 0 & B_4 \times e^{j\theta 4(i)} \end{pmatrix}$$

$$\begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix} \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix}$$

-continued $$\begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix} \begin{pmatrix} s_1^{(i)} \\ s_2^{(i)} \\ s_3^{(i)} \\ s_4^{(i)} \end{pmatrix}$$

FIG. 48 is a configuration diagram different from FIG. 47 in order to perform Equation (61). In FIG. 48, the component similar to that in FIG. 47 is designated by the identical reference mark.

FIG. 48 differs from FIG. 47 in a positional relationship between the phase changing unit and power changing unit that are located at the subsequent stage of weighting unit 4708. Accordingly, in FIG. 48, power changing unit 4710A exists at the subsequent stage of phase changing unit 4712A, power changing unit 4710B exists at the subsequent stage of phase changing unit 4712B, power changing unit 4710C exists at the subsequent stage of phase changing unit 4712C, and power changing unit 4710D exists at the subsequent stage of phase changing unit 4712D.

Equation (62) holds because each component in FIG. 48 operates similarly to each component in FIG. 47.

[Mathematical formula 62]

Equation (62)

$$\begin{pmatrix} z_1^{(i)} \\ z_2^{(i)} \\ z_3^{(i)} \\ z_4^{(i)} \end{pmatrix} = \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix} \begin{pmatrix} y_1^{(i)} & 0 & 0 & 0 \\ 0 & y_2^{(i)} & 0 & 0 \\ 0 & 0 & y_3^{(i)} & 0 \\ 0 & 0 & 0 & y_4^{(i)} \end{pmatrix} \times$$

$$F \times \begin{pmatrix} P_1 \times s_1^{(i)} \\ P_2 \times s_2^{(i)} \\ P_3 \times s_3^{(i)} \\ P_4 \times s_4^{(i)} \end{pmatrix}$$

$$= \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix} \begin{pmatrix} y_1^{(i)} & 0 & 0 & 0 \\ 0 & y_2^{(i)} & 0 & 0 \\ 0 & 0 & y_3^{(i)} & 0 \\ 0 & 0 & 0 & y_4^{(i)} \end{pmatrix}$$

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} P_1 \times s_1^{(i)} \\ P_2 \times s_2^{(i)} \\ P_3 \times s_3^{(i)} \\ P_4 \times s_4^{(i)} \end{pmatrix}$$

$$= \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix} \begin{pmatrix} y_1^{(i)} & 0 & 0 & 0 \\ 0 & y_2^{(i)} & 0 & 0 \\ 0 & 0 & y_3^{(i)} & 0 \\ 0 & 0 & 0 & y_4^{(i)} \end{pmatrix}$$

-continued $$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix} \begin{pmatrix} s_1^{(i)} \\ s_2^{(i)} \\ s_3^{(i)} \\ s_4^{(i)} \end{pmatrix}$$

$$= \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix}$$

$$\begin{pmatrix} B_1 \times e^{j\theta1(i)} & 0 & 0 & 0 \\ 0 & B_2 \times e^{j\theta2(i)} & 0 & 0 \\ 0 & 0 & B_3 \times e^{j\theta3(i)} & 0 \\ 0 & 0 & 0 & B_4 \times e^{j\theta4(i)} \end{pmatrix}$$

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix} \begin{pmatrix} s_1^{(i)} \\ s_2^{(i)} \\ s_3^{(i)} \\ s_4^{(i)} \end{pmatrix}$$

$z_1(i)$ in Equation (61) is equal to $z_1(i)$ in Equation (62), $z_2(i)$ in Equation (61) is equal to $z_2(i)$ in Equation (62), $z_3(i)$ in Equation (61) is equal to $z_3(i)$ in Equation (62), and $z_4(i)$ in Equation (61) is equal to $z_4(i)$ in Equation (62).

In FIGS. 47 and 48, post-power change values $P_1$, $P_2$, $P_3$, and $P_4$ and values $Q_1$, $Q_2$, $Q_3$, and $Q_4$ may be changed by the set of modulation schemes $s_1(i)$, $s_2(i)$, $s_3(i)$, and $s_4(i)$ (or need not be changed). Values $P_1$, $P_2$, $P_3$, and $P_4$ and/or values $Q_1$, $Q_2$, $Q_3$, and $Q_4$ may be changed by the error correction coding method (such as the code length (block length) and the coding rate) (or need not be changed).

Similarly, in FIGS. 47 and 48, the phase changing method may be changed by the set of modulation schemes $s_1(i)$, $s_2(i)$, $s_3(i)$, and $s_4(i)$ (or need not be changed). The phase changing method may be changed by the error correction coding method (such as the code length (block length) and the coding rate) (or need not be changed).

FIGS. 49, 50, 51, and 52 will be described below. FIGS. 49, 50, 51, and 52 are views illustrating a configuration example in which the precoding method is performed when average power of the four transmission signals varies and when the phase changing unit is newly added.

Figure 49:
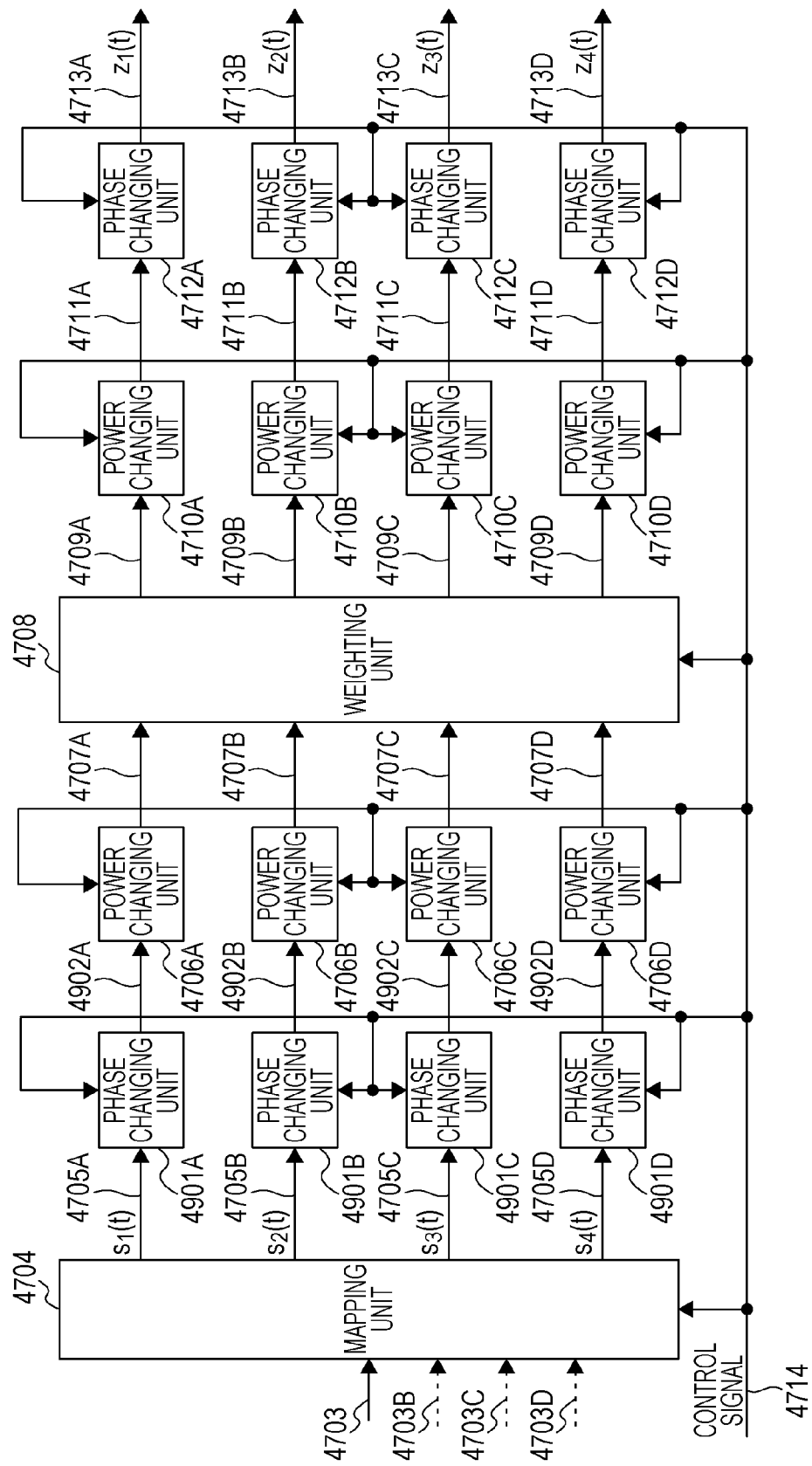
FIG. 49 illustrates an example of the configuration performing the precoding method.

In FIG. 49, the component operating similarly to FIG. 47 is designated by the identical reference mark. FIG. 49 differs from FIG. 47 in that phase changing units 4901A, 4901B, 4901C, and 4901D are added.

Phase changing unit 4901A receives baseband signal $s_1(i)$ (4705A) and control signal 4714 as input, and changes the phase of baseband signal $s_1(i)$ (4705A) based on control signal 4714. Accordingly, the post-phase change signal of baseband signal $s_1(i)$ (4705A) is expressed as $C_1 \times e^{j\omega1(i)} \times s_1(i)$, and phase changing unit 4901A outputs $C_1 \times e^{j\omega1(i)} \times s_1(i)$ as post-phase change signal 4902A (j may be an imaginary unit, and $C_1$ may be 1.00 or a real number of 0 or more). The value of the changed phase may be a function of i such as $\omega_1(i)$, or a fixed value that is not the function of i.

Similarly, phase changing unit 4901B receives baseband signal $s_2(i)$ (4705B) and control signal 4714 as input, and changes the phase of baseband signal $s_2(i)$ (4705B) based on control signal 4714. Accordingly, the post-phase change signal of baseband signal $s_2(i)$ (4705B) is expressed as $C_2 \times e^{j\omega2(i)} \times s_2(i)$, and phase changing unit 4901B outputs $C_2 \times e^{j\omega2(i)} \times s_2(i)$ as post-phase change signal 4902B (j may be an imaginary unit, and $C_2$ may be 1.00 or a real number of 0 or more). The value of the changed phase may be a function of i such as $\omega_2(i)$, or a fixed value that is not the function of i.

Similarly, phase changing unit 4901C receives baseband signal $s_3(i)$ (4705C) and control signal 4714 as input, and changes the phase of baseband signal $s_3(i)$ (4705C) based on control signal 4714. Accordingly, the post-phase change signal of baseband signal $s_3(i)$ (4705C) is expressed as $C_3 \times e^{j\omega3(i)} \times s_3(i)$, and phase changing unit 4901C outputs $C_3 \times e^{j\omega3(i)} \times s_3(i)$ as post-phase change signal 4902C (j may be an imaginary unit, and $C_3$ may be 1.00 or a real number of 0 or more). The value of the changed phase may be a function of i such as $\omega_3(i)$, or a fixed value that is not the function of i.

Similarly, phase changing unit 4901D receives baseband signal $s_4(i)$ (4705D) and control signal 4714 as input, and changes the phase of baseband signal $s_4(i)$ (4705D) based on control signal 4714. Accordingly, the post-phase change signal of baseband signal $s_4(i)$ (4705D) is expressed as $C_4 \times e^{j\omega4(i)} \times s_4(i)$, and phase changing unit 4901D outputs $C_4 \times e^{j\omega4(i)} \times s_4(i)$ as post-phase change signal 4902D (j may be an imaginary unit, and $C_4$ may be 1.00 or a real number of 0 or more). The value of the changed phase may be a function of i such as $\omega_4(i)$, or a fixed value that is not the function of i.

The components subsequent to phase changing units 4901A, 4901B, 4901C, and 4901D operate similarly to the components in FIG. 47. Accordingly, $z_1(i)$, $z_2(i)$, $z_3(i)$, and $z_4(i)$ that are of the outputs of phase changing units 4712A, 4712B, 4712C, and 4712D in FIG. 49 are expressed by Equation (63).

[Mathematical formula 63]

Equation (63)

$$\begin{pmatrix} z_1^{(i)} \\ z_2^{(i)} \\ z_3^{(i)} \\ z_4^{(i)} \end{pmatrix} = \begin{pmatrix} y_1^{(i)} & 0 & 0 & 0 \\ 0 & y_2^{(i)} & 0 & 0 \\ 0 & 0 & y_3^{(i)} & 0 \\ 0 & 0 & 0 & y_4^{(i)} \end{pmatrix} \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix}$$

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \times \begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix}$$

$$\begin{pmatrix} C_1 \times e^{j\omega1(i)} & 0 & 0 & 0 \\ 0 & C_2 \times e^{j\omega2(i)} & 0 & 0 \\ 0 & 0 & C_3 \times e^{j\omega3(i)} & 0 \\ 0 & 0 & 0 & C_4 \times e^{j\omega4(i)} \end{pmatrix}$$

$$\begin{pmatrix} s_1^{(i)} \\ s_2^{(i)} \\ s_3^{(i)} \\ s_4^{(i)} \end{pmatrix}$$

-continued $$= \begin{pmatrix} B_1 \times e^{j\theta1(i)} & 0 & 0 & 0 \\ 0 & B_2 \times e^{j\theta2(i)} & 0 & 0 \\ 0 & 0 & B_3 \times e^{j\theta3(i)} & 0 \\ 0 & 0 & 0 & B_4 \times e^{j\theta4(i)} \end{pmatrix}$$

$$\begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix} \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \times$$

$$\begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix}$$

$$\begin{pmatrix} C_1 \times e^{j\omega1(i)} & 0 & 0 & 0 \\ 0 & C_2 \times e^{j\omega2(i)} & 0 & 0 \\ 0 & 0 & C_3 \times e^{j\omega3(i)} & 0 \\ 0 & 0 & 0 & C_4 \times e^{j\omega4(i)} \end{pmatrix}$$

$$\begin{pmatrix} s_1^{(i)} \\ s_2^{(i)} \\ s_3^{(i)} \\ s_4^{(i)} \end{pmatrix}$$

Figure 50:
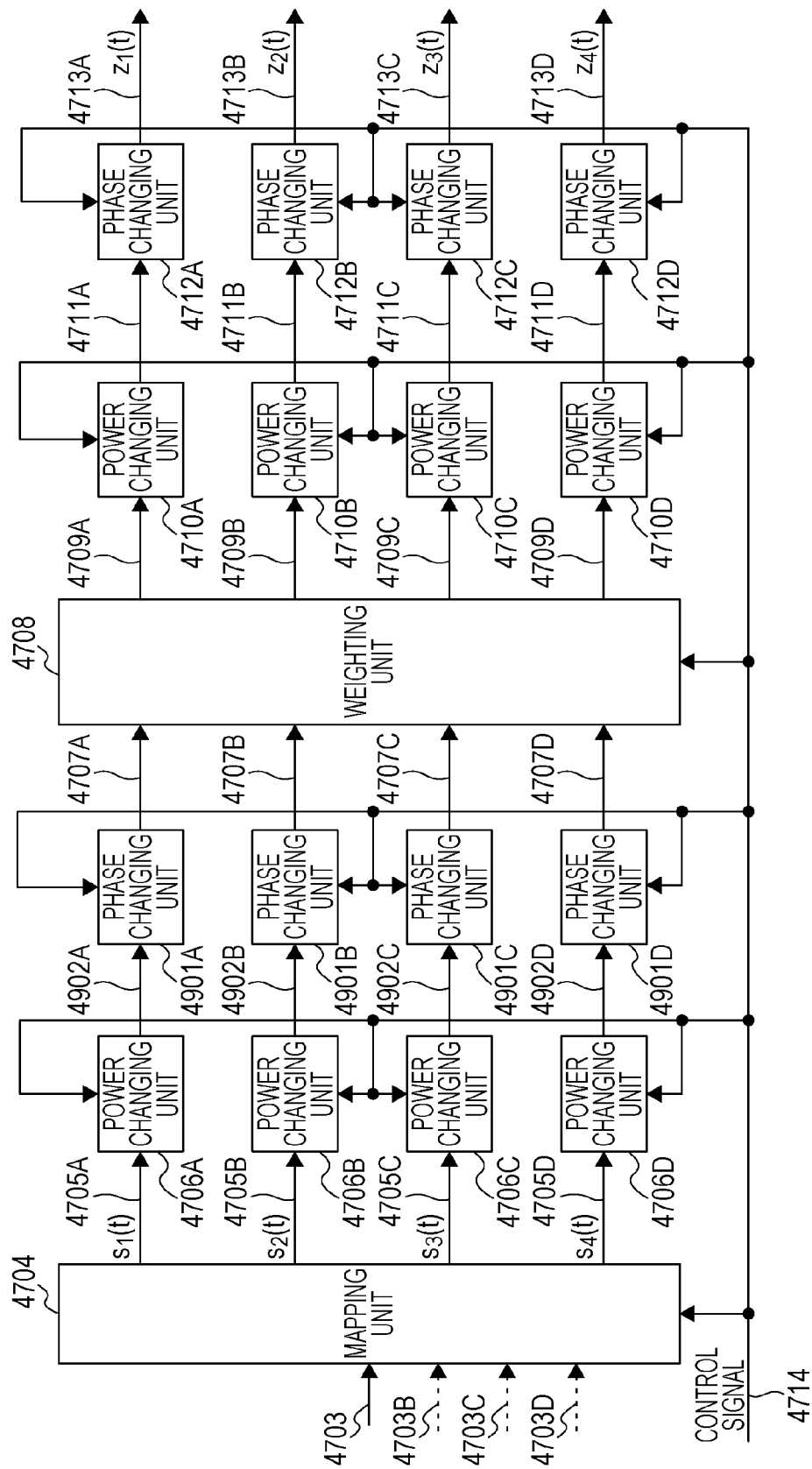
FIG. 50 illustrates an example of the configuration performing the precoding method.

FIG. 50 is a configuration diagram different from FIG. 49 in order to perform Equation (63). In FIG. 50, the component operating similarly to that in FIG. 49 is designated by the identical reference mark.

FIG. 50 differs from FIG. 49 in a positional relationship between the phase changing unit and power changing unit that are located at the preceding stage of weighting unit 4708. Accordingly, in FIG. 50, phase changing unit 4901A exists at the subsequent stage of power changing unit 4706A, phase changing unit 4901B exists at the subsequent stage of power changing unit 4706B, phase changing unit 4901C exists at the subsequent stage of power changing unit 4706C, and phase changing unit 4901D exists at the subsequent stage of power changing unit 4706D.

Equation (64) holds because each component in FIG. 50 operates similarly to each component in FIG. 49.

[Mathematical formula 64]

Equation (64)

$$\begin{pmatrix} z_1^{(i)} \\ z_2^{(i)} \\ z_3^{(i)} \\ z_4^{(i)} \end{pmatrix} = \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix} \begin{pmatrix} y_1^{(i)} & 0 & 0 & 0 \\ 0 & y_2^{(i)} & 0 & 0 \\ 0 & 0 & y_3^{(i)} & 0 \\ 0 & 0 & 0 & y_4^{(i)} \end{pmatrix}$$

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \times \begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix}$$

$$\begin{pmatrix} C_1 \times e^{j\omega1(i)} & 0 & 0 & 0 \\ 0 & C_2 \times e^{j\omega2(i)} & 0 & 0 \\ 0 & 0 & C_3 \times e^{j\omega3(i)} & 0 \\ 0 & 0 & 0 & C_4 \times e^{j\omega4(i)} \end{pmatrix}$$

$$= \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix}$$

$$\begin{pmatrix} B_1 \times e^{j\theta1(i)} & 0 & 0 & 0 \\ 0 & B_2 \times e^{j\theta2(i)} & 0 & 0 \\ 0 & 0 & B_3 \times e^{j\theta3(i)} & 0 \\ 0 & 0 & 0 & B_4 \times e^{j\theta4(i)} \end{pmatrix}$$

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \times \begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix}$$

$$\begin{pmatrix} C_1 \times e^{j\omega1(i)} & 0 & 0 & 0 \\ 0 & C_2 \times e^{j\omega2(i)} & 0 & 0 \\ 0 & 0 & C_3 \times e^{j\omega3(i)} & 0 \\ 0 & 0 & 0 & C_4 \times e^{j\omega4(i)} \end{pmatrix} \begin{pmatrix} s_1^{(i)} \\ s_2^{(i)} \\ s_3^{(i)} \\ s_4^{(i)} \end{pmatrix}$$

$z_1(i)$ in Equation (63) is equal to $z_1(i)$ in Equation (64), $z_2(i)$ in Equation (63) is equal to $z_2(i)$ in Equation (64), $z_3(i)$ in Equation (63) is equal to $z_3(i)$ in Equation (64), and $z_4(i)$ in Equation (63) is equal to $z_4(i)$ in Equation (64).

In FIGS. 49 and 50, post-power change values $P_1$, $P_2$, $P_3$, and $P_4$ and values $Q_1$, $Q_2$, $Q_3$, and $Q_4$ may be changed by the set of modulation schemes $s_1(i)$, $s_2(i)$, $s_3(i)$, and $s_4(i)$ (or need not be changed). Values $P_1$, $P_2$, $P_3$, and $P_4$ and/or values $Q_1$, $Q_2$, $Q_3$, and $Q_4$ may be changed by the error correction coding method (such as the code length (block length) and the coding rate) (or need not be changed).

Similarly, in FIGS. 49 and 50, the phase changing method for both the preceding and subsequent stages of weighting unit 4708 may be changed by the set of modulation schemes $s_1(i)$, $s_2(i)$, $s_3(i)$, and $s_4(i)$ (or need not be changed). The phase changing method may be changed by the error correction coding method (such as the code length (block length) and the coding rate) (or need not be changed).

Figure 51:
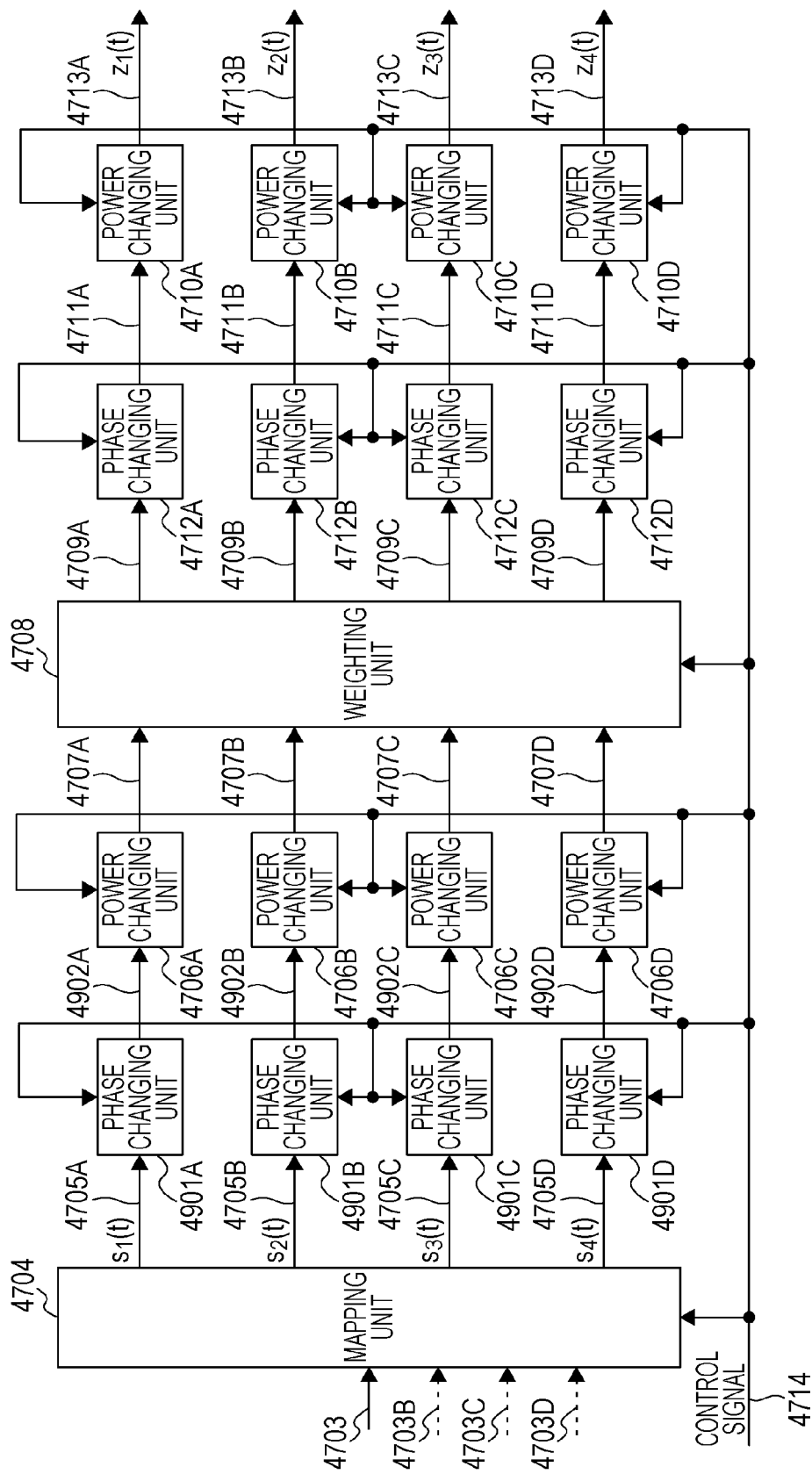
FIG. 51 illustrates an example of the configuration performing the precoding method.

In FIG. 51, the component operating similarly to that in FIG. 48 is designated by the identical reference mark. FIG. 51 differs from FIG. 48 in that phase changing units 4901A, 4901B, 4901C, and 4901D are added.

Phase changing unit 4901A receives baseband signal $s_1(i)$ (4705A) and control signal 4714 as input, and changes the phase of baseband signal $s_1(i)$ (4705A) based on control signal 4714. Accordingly, the post-phase change signal of baseband signal $s_1(i)$ (4705A) is expressed as $C_1 \times e^{j\omega1(i)} \times s_1(i)$, and phase changing unit 4901A outputs $C_1 \times e^{j\omega1(i)} \times s_1(i)$ as post-phase change signal 4902A (j may be an imaginary unit, and $C_1$ may be 1.00 or a real number of 0 or more). The value of the changed phase may be a function of i such as $\omega_1(i)$, or a fixed value that is not the function of i.

Similarly, phase changing unit 4901B receives baseband signal $s_2(i)$ (4705B) and control signal 4714 as input, and changes the phase of baseband signal $s_2(i)$ (4705B) based on control signal 4714. Accordingly, the post-phase change signal of baseband signal $s_2(i)$ (4705B) is expressed as $C_2 \times e^{j\omega 2(i)} \times s_2(i)$, and phase changing unit 4901B outputs $C_2 \times e^{j\omega 2(i)} \times s_2(i)$ as post-phase change signal 4902B (j may be an imaginary unit, and $C_2$ may be 1.00 or a real number of 0 or more). The value of the changed phase may be a function of i such as $\omega_2(i)$, or a fixed value that is not the function of i.

Similarly, phase changing unit 4901C receives baseband signal $s_3(i)$ (4705C) and control signal 4714 as input, and changes the phase of baseband signal $s_3(i)$ (4705C) based on control signal 4714. Accordingly, the post-phase change signal of baseband signal $s_3(i)$ (4705C) is expressed as $C_3 \times e^{j\omega 3(i)} \times s_3(i)$, and phase changing unit 4901C outputs $C_3 \times e^{j\omega 3(i)} \times s_3(i)$ as post-phase change signal 4902C (j may be an imaginary unit, and $C_3$ may be 1.00 or a real number of 0 or more). The value of the changed phase may be a function of i such as $\omega_3(i)$, or a fixed value that is not the function of i.

Similarly, phase changing unit 4901D receives baseband signal $s_4(i)$ (4705D) and control signal 4714 as input, and changes the phase of baseband signal $s_4(i)$ (4705D) based on control signal 4714. Accordingly, the post-phase change signal of baseband signal $s_4(i)$ (4705D) is expressed as $C_4 \times e^{j\omega 4(i)} \times s_4(i)$, and phase changing unit 4901D outputs $C_4 \times e^{j\omega 4(i)} \times s_4(i)$ as post-phase change signal 4902D (j may be an imaginary unit, and $C_4$ may be 1.00 or a real number of 0 or more). The value of the changed phase may be a function of i such as $\omega_4(i)$, or a fixed value that is not the function of i.

The components subsequent to phase changing units 4901A, 4901B, 4901C, and 4901D operate similarly to the components in FIG. 48. Accordingly, $z_1(i)$, $z_2(i)$, $z_3(i)$, and $z_4(i)$ that are of the outputs of phase changing units 4712A, 4712B, 4712C, and 4712D in FIG. 51 are expressed by Equation (65).

[Mathematical formula 65]

Equation (65)
$$\begin{pmatrix} z_1^{(i)} \\ z_2^{(i)} \\ z_3^{(i)} \\ z_4^{(i)} \end{pmatrix} = \begin{pmatrix} y_1^{(i)} & 0 & 0 & 0 \\ 0 & y_2^{(i)} & 0 & 0 \\ 0 & 0 & y_3^{(i)} & 0 \\ 0 & 0 & 0 & y_4^{(i)} \end{pmatrix} \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix}$$

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \times$$

$$\begin{pmatrix} C_1 \times e^{j\omega 1(i)} & 0 & 0 & 0 \\ 0 & C_2 \times e^{j\omega 2(i)} & 0 & 0 \\ 0 & 0 & C_3 \times e^{j\omega 3(i)} & 0 \\ 0 & 0 & 0 & C_4 \times e^{j\omega 4(i)} \end{pmatrix}$$

$$\begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix} \begin{pmatrix} s_1^{(i)} \\ s_2^{(i)} \\ s_3^{(i)} \\ s_4^{(i)} \end{pmatrix}$$

-continued
$$= \begin{pmatrix} B_1 \times e^{j\theta 1(i)} & 0 & 0 & 0 \\ 0 & B_2 \times e^{j\theta 2(i)} & 0 & 0 \\ 0 & 0 & B_3 \times e^{j\theta 3(i)} & 0 \\ 0 & 0 & 0 & B_4 \times e^{j\theta 4(i)} \end{pmatrix}$$

$$\begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix} \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \times$$

$$\begin{pmatrix} C_1 \times e^{j\omega 1(i)} & 0 & 0 & 0 \\ 0 & C_2 \times e^{j\omega 2(i)} & 0 & 0 \\ 0 & 0 & C_3 \times e^{j\omega 3(i)} & 0 \\ 0 & 0 & 0 & C_4 \times e^{j\omega 4(i)} \end{pmatrix}$$

$$\begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix} \begin{pmatrix} s_1^{(i)} \\ s_2^{(i)} \\ s_3^{(i)} \\ s_4^{(i)} \end{pmatrix}$$

Figure 52:
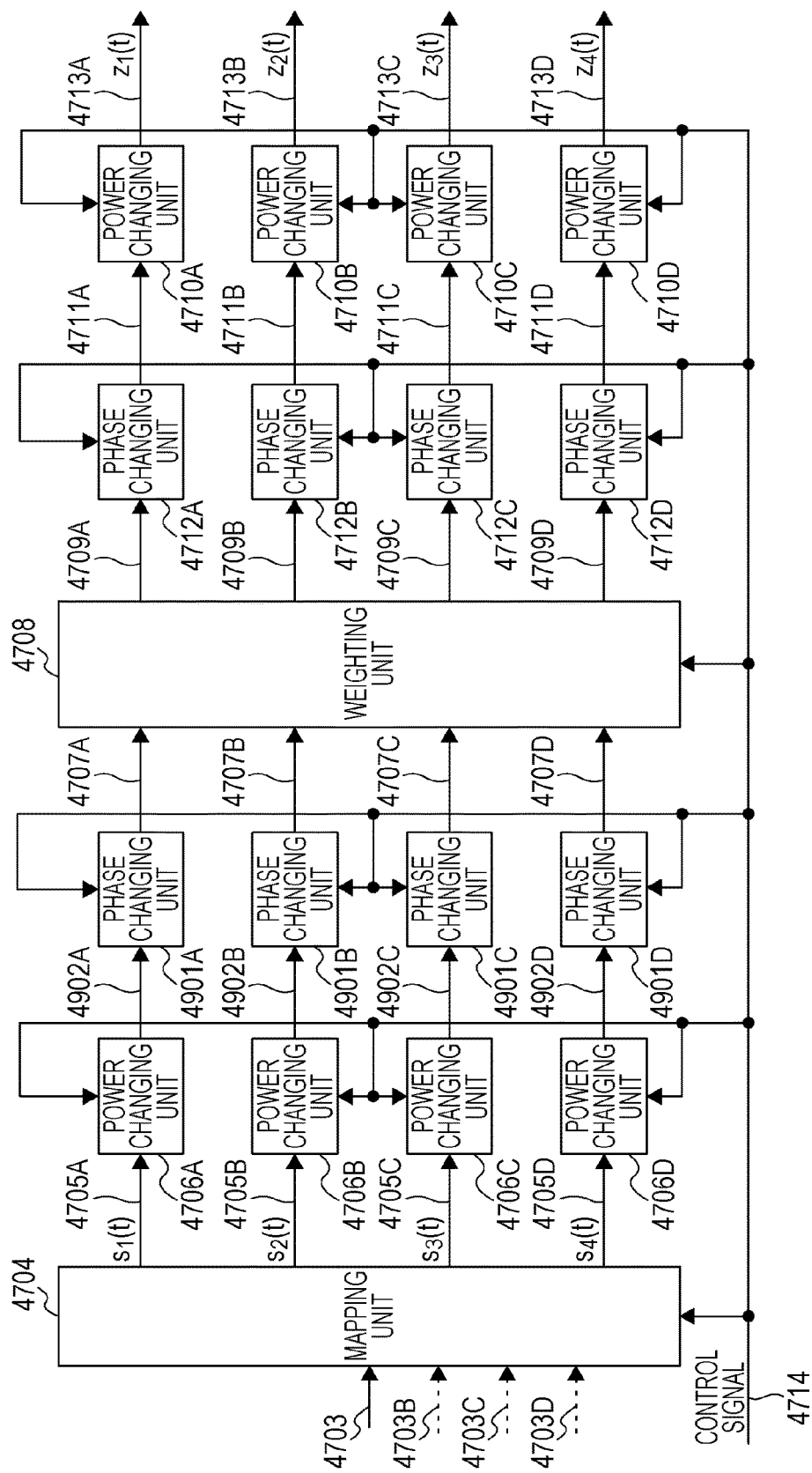
FIG. 52 illustrates an example of the configuration performing the precoding method.

FIG. 52 is a configuration diagram different from FIG. 51 in order to perform Equation (65). In FIG. 52, the component operating similarly to that in FIG. 51 is designated by the identical reference mark.

FIG. 52 differs from FIG. 51 in a positional relationship between the phase changing unit and power changing unit that are located at the preceding stage of weighting unit 4708. Accordingly, in FIG. 52, phase changing unit 4901A exists at the subsequent stage of power changing unit 4706A, phase changing unit 4901B exists at the subsequent stage of power changing unit 4706B, phase changing unit 4901C exists at the subsequent stage of power changing unit 4706C, and phase changing unit 4901D exists at the subsequent stage of power changing unit 4706D.

Equation (66) holds because each component in FIG. 52 operates similarly to each component in FIG. 51.

[Mathematical formula 66]

Equation (66)
$$\begin{pmatrix} z_1^{(i)} \\ z_2^{(i)} \\ z_3^{(i)} \\ z_4^{(i)} \end{pmatrix} = \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix} \begin{pmatrix} y_1^{(i)} & 0 & 0 & 0 \\ 0 & y_2^{(i)} & 0 & 0 \\ 0 & 0 & y_3^{(i)} & 0 \\ 0 & 0 & 0 & y_4^{(i)} \end{pmatrix}$$

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \times$$

$$\begin{pmatrix} C_1 \times e^{j\omega 1(i)} & 0 & 0 & 0 \\ 0 & C_2 \times e^{j\omega 2(i)} & 0 & 0 \\ 0 & 0 & C_3 \times e^{j\omega 3(i)} & 0 \\ 0 & 0 & 0 & C_4 \times e^{j\omega 4(i)} \end{pmatrix}$$

-continued $$\begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix} \begin{pmatrix} s_1^{(i)} \\ s_2^{(i)} \\ s_3^{(i)} \\ s_4^{(i)} \end{pmatrix}$$

$$= \begin{pmatrix} Q_1 & 0 & 0 & 0 \\ 0 & Q_2 & 0 & 0 \\ 0 & 0 & Q_3 & 0 \\ 0 & 0 & 0 & Q_4 \end{pmatrix}$$

$$\begin{pmatrix} B_1 \times e^{j\theta 1(i)} & 0 & 0 & 0 \\ 0 & B_2 \times e^{j\theta 2(i)} & 0 & 0 \\ 0 & 0 & B_3 \times e^{j\theta 3(i)} & 0 \\ 0 & 0 & 0 & B_4 \times e^{j\theta 4(i)} \end{pmatrix}$$

$$\begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \times$$

$$\begin{pmatrix} C_1 \times e^{j\omega 1(i)} & 0 & 0 & 0 \\ 0 & C_2 \times e^{j\omega 2(i)} & 0 & 0 \\ 0 & 0 & C_3 \times e^{j\omega 3(i)} & 0 \\ 0 & 0 & 0 & C_4 \times e^{j\omega 4(i)} \end{pmatrix}$$

$$\begin{pmatrix} P_1 & 0 & 0 & 0 \\ 0 & P_2 & 0 & 0 \\ 0 & 0 & P_3 & 0 \\ 0 & 0 & 0 & P_4 \end{pmatrix} \begin{pmatrix} s_1^{(i)} \\ s_2^{(i)} \\ s_3^{(i)} \\ s_4^{(i)} \end{pmatrix}$$

$z_1(i)$ in Equation (63), $z_1(i)$ in Equation (64), $z_1(i)$ in Equation (65), and $z_1(i)$ in Equation (66) are equal to one another, $z_2(i)$ in Equation (63), $z_2(i)$ in Equation (64), $z_2(i)$ in Equation (65), and $z_2(i)$ in Equation (66) are equal to one another, $z_3(i)$ in Equation (63), $z_3(i)$ in Equation (64), $z_3(i)$ in Equation (65), and $z_3(i)$ in Equation (66) are equal to one another, and $z_4(i)$ in Equation (63), $z_4(i)$ in Equation (64), $z_4(i)$ in Equation (65), and $z_4(i)$ in Equation (66) are equal to one another.

In FIGS. 51 and 52, post-power change values $P_1$, $P_2$, $P_3$, and $P_4$ and values $Q_1$, $Q_2$, $Q_3$, and $Q_4$ may be changed by the set of modulation schemes $s_1(i)$, $s_2(i)$, $s_3(i)$, and $s_4(i)$ (or need not be changed). Values $P_1$, $P_2$, $P_3$, and $P_4$ and/or values $Q_1$, $Q_2$, $Q_3$, and $Q_4$ may be changed by the error correction coding method (such as the code length (block length) and the coding rate) (or need not be changed).

Similarly, in FIGS. 51 and 52, the phase changing method may be changed by the set of modulation schemes $s_1(i)$, $s_2(i)$, $s_3(i)$, and $s_4(i)$ (or need not be changed). The phase changing method may be changed by the error correction coding method (such as the code length (block length) and the coding rate) (or need not be changed).

Accordingly, the present exemplary embodiment leads to the following advantageous effect. That is, there is a high possibility of improving the data reception quality, and particularly there is a high possibility of largely improving the data reception quality in the LOS environment in which the direct wave is dominant.

For example, the precoding matrix may be switched when the set of modulation schemes of the four streams is switched. The phase changing method may be switched when the set of modulation schemes of the four streams is switched. The precoding matrix and the phase changing method may be switched when the set of modulation schemes of the four streams is switched (the precoding matrix and the phase changing need not be switched even if the set of modulation schemes of the four streams is switched).

Fourth Exemplary Embodiment

In the first and second exemplary embodiments, as illustrated in FIGS. 5, 6, 19, 20, 27, 28, 39, and 40, the mapping, the weighting, and the phase change are sequentially performed by way of example. A modification in which a phase changing unit or a power changing unit is added to the first and second exemplary embodiments will be described in a fourth exemplary embodiment. The phase changing method performed at a subsequent stage of the weighting may be operated similarly to the first and second exemplary embodiments.

The case that the three streams are transmitted using the three antennas are described in the fourth exemplary embodiment. In FIGS. 5, 6, 19, and 20, mapping unit 506A to phase changing unit 517A, mapping unit 506B to phase changing unit 517B, and mapping unit 506C to phase changing unit 517C may be replaced with those in FIGS. 53, 54, 55, 56, 57, and 58. The operation in each drawings will be described below.

Figure 53:
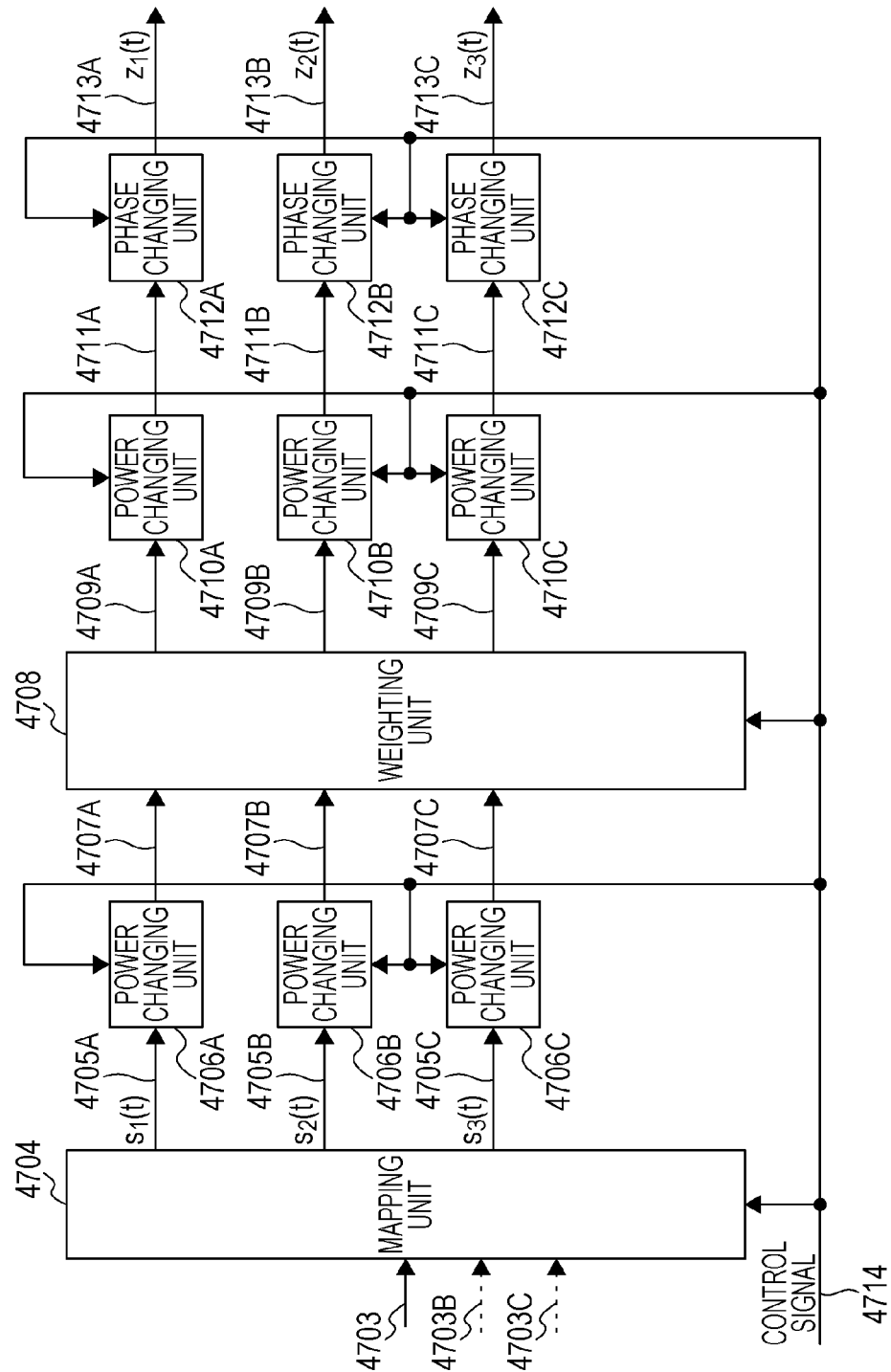
FIG. 53 illustrates an example of the configuration performing the precoding method.
Figure 54:
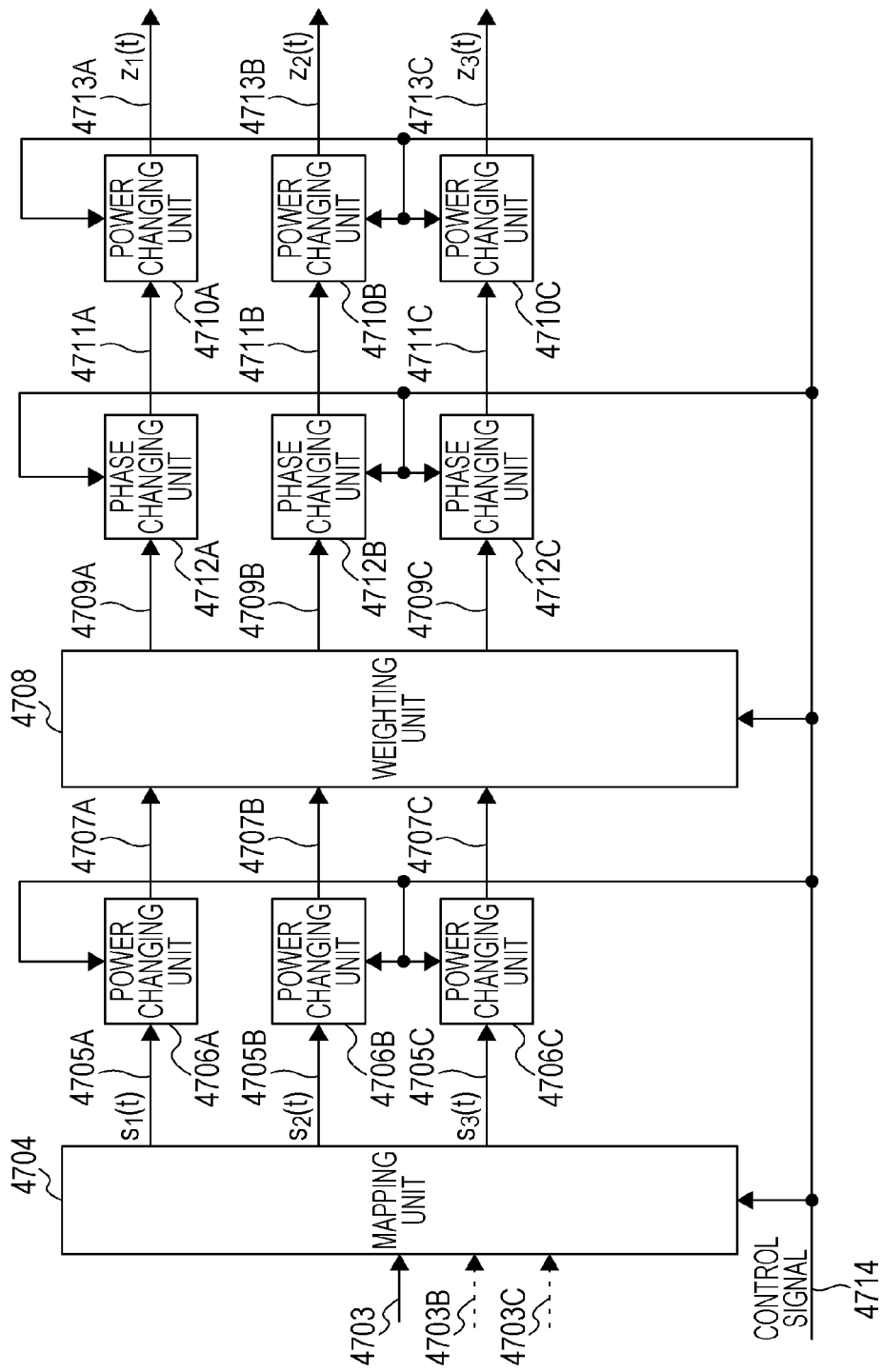
FIG. 54 illustrates an example of the configuration performing the precoding method.

FIGS. 53 and 54 are views illustrating a configuration example in which the precoding method is performed when average transmission power of the three transmission signals varies.

In FIG. 53, mapping unit 4704 receives data 4703 and control signal 4714 as input. It is assumed that control signal 4714 assigns the transmission of the three streams as the transmission method. Additionally, it is assumed that control signal 4714 assigns modulation schemes α, β, and γ as the modulation schemes of the three streams. Modulation scheme α modulates p-bit data, modulation scheme β modulates q-bit data, and modulation scheme γ modulates r-bit data. (For example, the modulation scheme modulates 4-bit data for the 16QAM, and the modulation scheme modulates 6-bit data for the 64QAM.)

Therefore, mapping unit 4704 modulates the p-bit data in (p+q+r)-bit data using modulation scheme α, and generates and outputs baseband signal $s_1(t)$ (4705A). Mapping unit 4704 modulates the q-bit data using modulation scheme β, and outputs baseband signal $s_2(t)$ (4705B). Mapping unit 4704 modulates the r-bit data using modulation scheme γ, and outputs baseband signal $s_3(t)$ (4705C).

In FIG. 53, the one mapping unit is described. Alternatively, a mapping unit generating $s_1(t)$ and a mapping unit generating $s_2(t)$ may exist separately. At this point, coded data 4703 is divided into the mapping unit generating $s_1(t)$, the mapping unit generating $s_2(t)$, and the mapping unit generating $s_3(t)$. For example, as illustrated in FIG. 53, mapping unit 4704 receives pieces of data 4703, 4703B, and 4703C as input, performs the mapping on data 4703, and generates and outputs baseband signal $s_1(t)$ (4705A). Mapping unit 4704 also performs the mapping on data 4703B, and generates and outputs baseband signal $s_2(t)$ (4705B). Mapping unit 4704 also performs the mapping on data 4703C, and generates and outputs baseband signal $s_3(t)$ (4705C).

Baseband signals $s_1(t)$, $s_2(t)$, and $s_3(t)$ are expressed by complex numbers (however, may be either complex numbers or real numbers), and t is a time. For the use of the transmission method in which the multi-carrier such as OFDM (Orthogonal Frequency Division Multiplexing) is used, $s_1$, $s_2$, and $s_3$ are functions of frequency f such as $s_1(f)$, $s_2(f)$, and $s_3(f)$ or functions of time t and frequency f such as $s_1(t, f)$, $s_2(t, f)$, and $s_3(t, f)$.

Hereinafter, the baseband signal, the precoding matrix, and the phase changing are described as the function of time t. Alternatively, the baseband signal, the precoding matrix, and the phase changing may be considered as the function of frequency f, and the function of time t and frequency f.

Sometimes the baseband signal, the precoding matrix, and the phase changing are described as the function of symbol number i. In this case, the baseband signal, the precoding matrix, and the phase changing may be considered as the function of time t, the function of frequency f, or the function of time t and frequency f. That is, the symbol and the baseband signal may be generated and disposed on the time axis direction and the frequency axis direction. The symbol and the baseband signal may also be generated and disposed on the time axis direction and the frequency axis direction.

Power changing unit 4706A (power adjuster 4706A) receives baseband signal $s_1(t)$ (4705A) and control signal 4714 as input, sets real number $P_1$ based on control signal 4714, and outputs $P_1 \times s_1(t)$ as post-power change signal 4707A. (Although $P_1$ is a real number, $P_1$ may be a complex number.)

Similarly, power changing unit 4706B (power adjuster 4706B) receives baseband signal $s_2(t)$ (4705B) and control signal 4714 as input, sets real number $P_2$, and outputs $P_2 \times s_2(t)$ as post-power change signal 4707B. (Although $P_2$ is a real number, $P_2$ may be a complex number.)

Similarly, power changing unit 4706C (power adjuster 4706C) receives baseband signal $s_3(t)$ (4705C) and control signal 4714 as input, sets real number $P_3$, and outputs $P_3 \times s_3(t)$ as post-power change signal 4707C. (Although $P_3$ is a real number, $P_3$ may be a complex number.)

Weighting unit 4708 receives post-power change signals 4707A, 4707B, and 4707C and control signal 4714 as input, and sets precoding matrix F (or F(i)) based on control signal 4714. Assuming that i is a slot number (symbol number), weighting unit 4708 calculates Equation (67).

[Mathematical formula 67]

$$\begin{pmatrix} u_1^{(i)} \\ u_2^{(i)} \\ u_3^{(i)} \end{pmatrix} = F \times \begin{pmatrix} P_1 \times s_1^{(i)} \\ P_2 \times s_2^{(i)} \\ P_3 \times s_3^{(i)} \end{pmatrix}$$

$$= \begin{pmatrix} a_{11} & a_{12} & a_{13} \\ a_{21} & a_{22} & a_{23} \\ a_{31} & a_{32} & a_{33} \end{pmatrix} \begin{pmatrix} P_1 \times s_1^{(i)} \\ P_2 \times s_2^{(i)} \\ P_3 \times s_3^{(i)} \end{pmatrix}$$

$$= \begin{pmatrix} a_{11} & a_{12} & a_{13} \\ a_{21} & a_{22} & a_{23} \\ a_{31} & a_{32} & a_{33} \end{pmatrix} \begin{pmatrix} P_1 & 0 & 0 \\ 0 & P_2 & 0 \\ 0 & 0 & P_3 \end{pmatrix} \begin{pmatrix} s_1^{(i)} \\ s_2^{(i)} \\ s_3^{(i)} \end{pmatrix}$$

Equation (67)

Precoding matrix F is already described above using Equations (37) and (38) of the first exemplary embodiment. Precoding matrix may be a function of i, or need not be a function of i. When precoding matrix is the function of i, precoding matrix F is switched by the slot number (symbol number).

Weighting unit 4708 outputs $u_1(i)$ in Equation (67) as weighted signal 4709A, outputs $u_2(i)$ in Equation (67) as weighted signal 4709B, and outputs $u_3(i)$ in Equation (67) as weighted signal 4709C.

Power changing unit 4710A receives weighted signal 4709A ($u_1(i)$) and control signal 4714 as input, sets real number $Q_1$ based on control signal 4714, and outputs $Q_1 \times u_1(i)$ as post-power change signal 4711A. (Although $Q_1$ is a real number, $Q_1$ may be a complex number.)

Similarly, power changing unit 4710B receives weighted signal 4709B ($u_2(i)$) and control signal 4714 as input, sets real number $Q_2$ based on control signal 4714, and outputs $Q_2 \times u_2(i)$ as post-power change signal 4711B. (Although $Q_2$ is a real number, $Q_2$ may be a complex number.)

Similarly, power changing unit 4710C receives weighted signal 4709C ($u_3(i)$) and control signal 4714 as input, sets real number $Q_3$ based on control signal 4714, and outputs $Q_3 \times u_3(i)$ as post-power change signal 4711C. (Although $Q_3$ is a real number, $Q_3$ may be a complex number.)

Phase changing unit 4712A receives post-power change signal 4711A of $Q_1 \times u_1(i)$ and control signal 4714 as input, and changes the phase of post-power change signal 4711A of $Q_1 \times u_1(i)$ based on control signal 4714. Accordingly, the signal in which the phase of post-power change signal 4711A of $Q_1 \times u_1(i)$ is changed is expressed as $B_1 \times e^{j\theta_1(i)} \times Q_1 \times u_1(i)$, and phase changing unit 4712A outputs $B_1 \times e^{j\theta_1(i)} \times Q_1 \times u_1(i)$ as post-phase change signal 4713A (j may be an imaginary unit, and $B_1$ may be 1.00 or a real number of 0 or more). One of the features of the third exemplary embodiment is that the value of the changed phase is a function of i such as $\theta_1(i)$. The method for providing $\theta_1(i)$ is already described above in the first exemplary embodiment.

Phase changing unit 4712B receives post-power change signal 4711B of $Q_2 \times u_2(i)$ and control signal 4714 as input, and changes the phase of post-power change signal 4711B of $Q_2 \times u_2(i)$ based on control signal 4714. Accordingly, the signal in which the phase of post-power change signal 4711B of $Q_2 \times u_2(i)$ is changed is expressed as $B_2 \times e^{j\theta_2(i)} \times Q_2 \times u_2(i)$, and phase changing unit 4712B outputs $B_2 \times e^{j\theta_2(i)} \times Q_2 \times u_2(i)$ as post-phase change signal 4713B (j may be an imaginary unit, and $B_2$ may be 1.00 or a real number of 0 or more). One of the features of the third exemplary embodiment is that the value of the changed phase is a function of i such as $\theta_2(i)$. The method for providing $\theta_2(i)$ is already described above in the first exemplary embodiment.

Phase changing unit 4712C receives post-power change signal 4711C of $Q_3 \times u_3(i)$ and control signal 4714 as input, and changes the phase of post-power change signal 4711C of $Q_3 \times u_3(i)$ based on control signal 4714. Accordingly, the signal in which the phase of post-power change signal 4711C of $Q_3 \times u_3(i)$ is changed is expressed as $B_3 \times e^{j\theta_3(i)} \times Q_3 \times u_3(i)$, and phase changing unit 4712C outputs $B_3 \times e^{j\theta_3(i)} \times Q_3 \times u_3(i)$ as post-phase change signal 4713C (j may be an imaginary unit, and $B_3$ may be 1.00 or a real number of 0 or more). One of the features of the third exemplary embodiment is that the value of the changed phase is a function of i such as $\theta_3(i)$. The method for providing $\theta_3(i)$ is already described above in the first exemplary embodiment.

Therefore, Equation (68) holds.

[Mathematical formula 68]

Equation (68)

$$\begin{pmatrix} z_1^{(i)} \\ z_2^{(i)} \\ z_3^{(i)} \end{pmatrix} = \begin{pmatrix} y_1^{(i)} & 0 & 0 \\ 0 & y_2^{(i)} & 0 \\ 0 & 0 & y_3^{(i)} \end{pmatrix} \begin{pmatrix} Q_1 & 0 & 0 \\ 0 & Q_2 & 0 \\ 0 & 0 & Q_3 \end{pmatrix} \times F \times \begin{pmatrix} P_1 \times s_1^{(i)} \\ P_2 \times s_2^{(i)} \\ P_3 \times s_3^{(i)} \end{pmatrix}$$

$$= \begin{pmatrix} y_1^{(i)} & 0 & 0 \\ 0 & y_2^{(i)} & 0 \\ 0 & 0 & y_3^{(i)} \end{pmatrix} \begin{pmatrix} Q_1 & 0 & 0 \\ 0 & Q_2 & 0 \\ 0 & 0 & Q_3 \end{pmatrix} \begin{pmatrix} a_{11} & a_{12} & a_{13} \\ a_{21} & a_{22} & a_{23} \\ a_{31} & a_{32} & a_{33} \end{pmatrix}$$

$$\begin{pmatrix} P_1 \times s_1^{(i)} \\ P_2 \times s_2^{(i)} \\ P_3 \times s_3^{(i)} \end{pmatrix}$$

$$= \begin{pmatrix} y_1^{(i)} & 0 & 0 \\ 0 & y_2^{(i)} & 0 \\ 0 & 0 & y_3^{(i)} \end{pmatrix} \begin{pmatrix} Q_1 & 0 & 0 \\ 0 & Q_2 & 0 \\ 0 & 0 & Q_3 \end{pmatrix} \begin{pmatrix} a_{11} & a_{12} & a_{13} \\ a_{21} & a_{22} & a_{23} \\ a_{31} & a_{32} & a_{33} \end{pmatrix}$$

$$\begin{pmatrix} P_1 & 0 & 0 \\ 0 & P_2 & 0 \\ 0 & 0 & P_3 \end{pmatrix} \begin{pmatrix} s_1^{(i)} \\ s_2^{(i)} \\ s_3^{(i)} \end{pmatrix}$$

$$= \begin{pmatrix} B_1 \times e^{j\theta_1(i)} & 0 & 0 \\ 0 & B_2 \times e^{j\theta_2(i)} & 0 \\ 0 & 0 & B_3 \times e^{j\theta_3(i)} \end{pmatrix} \begin{pmatrix} Q_1 & 0 & 0 \\ 0 & Q_2 & 0 \\ 0 & 0 & Q_3 \end{pmatrix}$$

$$\begin{pmatrix} a_{11} & a_{12} & a_{13} \\ a_{21} & a_{22} & a_{23} \\ a_{31} & a_{32} & a_{33} \end{pmatrix} \begin{pmatrix} P_1 & 0 & 0 \\ 0 & P_2 & 0 \\ 0 & 0 & P_3 \end{pmatrix} \begin{pmatrix} s_1^{(i)} \\ s_2^{(i)} \\ s_3^{(i)} \end{pmatrix}$$

FIG. 54 is a configuration diagram different from FIG. 53 in order to perform Equation (68). In FIG. 54, the component operating similarly to that in FIG. 53 is designated by the identical reference mark.

FIG. 54 differs from FIG. 53 in a positional relationship between the phase changing unit and power changing unit that are located at the subsequent stage of weighting unit 4708. Accordingly, in FIG. 54, power changing unit 4710A exists at the subsequent stage of phase changing unit 4712A, power changing unit 4710B exists at the subsequent stage of phase changing unit 4712B, and power changing unit 4710C exists at the subsequent stage of phase changing unit 4712C.

Equation (69) holds because each component in FIG. 54 operates similarly to each component in FIG. 53.

[Mathematical formula 69]

Equation (69)

$$\begin{pmatrix} z_1^{(i)} \\ z_2^{(i)} \\ z_3^{(i)} \end{pmatrix} = \begin{pmatrix} Q_1 & 0 & 0 \\ 0 & Q_2 & 0 \\ 0 & 0 & Q_3 \end{pmatrix} \begin{pmatrix} y_1^{(i)} & 0 & 0 \\ 0 & y_2^{(i)} & 0 \\ 0 & 0 & y_3^{(i)} \end{pmatrix} \times F \times \begin{pmatrix} P_1 \times s_1^{(i)} \\ P_2 \times s_2^{(i)} \\ P_3 \times s_3^{(i)} \end{pmatrix}$$

$$= \begin{pmatrix} Q_1 & 0 & 0 \\ 0 & Q_2 & 0 \\ 0 & 0 & Q_3 \end{pmatrix} \begin{pmatrix} y_1^{(i)} & 0 & 0 \\ 0 & y_2^{(i)} & 0 \\ 0 & 0 & y_3^{(i)} \end{pmatrix} \begin{pmatrix} a_{11} & a_{12} & a_{13} \\ a_{21} & a_{22} & a_{23} \\ a_{31} & a_{32} & a_{33} \end{pmatrix}$$

$$\begin{pmatrix} P_1 \times s_1^{(i)} \\ P_2 \times s_2^{(i)} \\ P_3 \times s_3^{(i)} \end{pmatrix}$$

$$= \begin{pmatrix} Q_1 & 0 & 0 \\ 0 & Q_2 & 0 \\ 0 & 0 & Q_3 \end{pmatrix} \begin{pmatrix} y_1^{(i)} & 0 & 0 \\ 0 & y_2^{(i)} & 0 \\ 0 & 0 & y_3^{(i)} \end{pmatrix} \begin{pmatrix} a_{11} & a_{12} & a_{13} \\ a_{21} & a_{22} & a_{23} \\ a_{31} & a_{32} & a_{33} \end{pmatrix}$$

$$\begin{pmatrix} P_1 & 0 & 0 \\ 0 & P_2 & 0 \\ 0 & 0 & P_3 \end{pmatrix} \begin{pmatrix} s_1^{(i)} \\ s_2^{(i)} \\ s_3^{(i)} \end{pmatrix}$$

$$= \begin{pmatrix} Q_1 & 0 & 0 \\ 0 & Q_2 & 0 \\ 0 & 0 & Q_3 \end{pmatrix} \begin{pmatrix} B_1 \times e^{j\theta_1(i)} & 0 & 0 \\ 0 & B_2 \times e^{j\theta_2(i)} & 0 \\ 0 & 0 & B_3 \times e^{j\theta_3(i)} \end{pmatrix}$$

$$\begin{pmatrix} a_{11} & a_{12} & a_{13} \\ a_{21} & a_{22} & a_{23} \\ a_{31} & a_{32} & a_{33} \end{pmatrix} \begin{pmatrix} P_1 & 0 & 0 \\ 0 & P_2 & 0 \\ 0 & 0 & P_3 \end{pmatrix} \begin{pmatrix} s_1^{(i)} \\ s_2^{(i)} \\ s_3^{(i)} \end{pmatrix}$$

$z_1(i)$ in Equation (68) is equal to $z_1(i)$ in Equation (69), $z_2(i)$ in Equation (68) is equal to $z_2(i)$ in Equation (69), and $z_3(i)$ in Equation (68) is equal to $z_3(i)$ in Equation (69).

In FIGS. 53 and 54, post-power change values $P_1$, $P_2$, and $P_3$ and values $Q_1$, $Q_2$, and $Q_3$ may be changed by the set of modulation schemes $s_1(i)$, $s_2(i)$, and $s_3(i)$ (or need not be changed). Values $P_1$, $P_2$, and $P_3$ and/or values $Q_1$, $Q_2$, and $Q_3$ may be changed by the error correction coding method (such as the code length (block length) and the coding rate) (or need not be changed).

Similarly, in FIGS. 53 and 54, the phase changing method may be changed by the set of modulation schemes $s_1(i)$, $s_2(i)$, and $s_3(i)$ (or need not be changed). The phase changing method may be changed by the error correction coding method (such as the code length (block length) and the coding rate) (or need not be changed).

FIGS. 55, 56, 57, and 58 will be described below. FIGS. 55, 56, 57, and 58 are views illustrating a configuration example in which the precoding method is performed when average power of the three transmission signals varies and when the phase changing unit is newly added.

Figure 55:
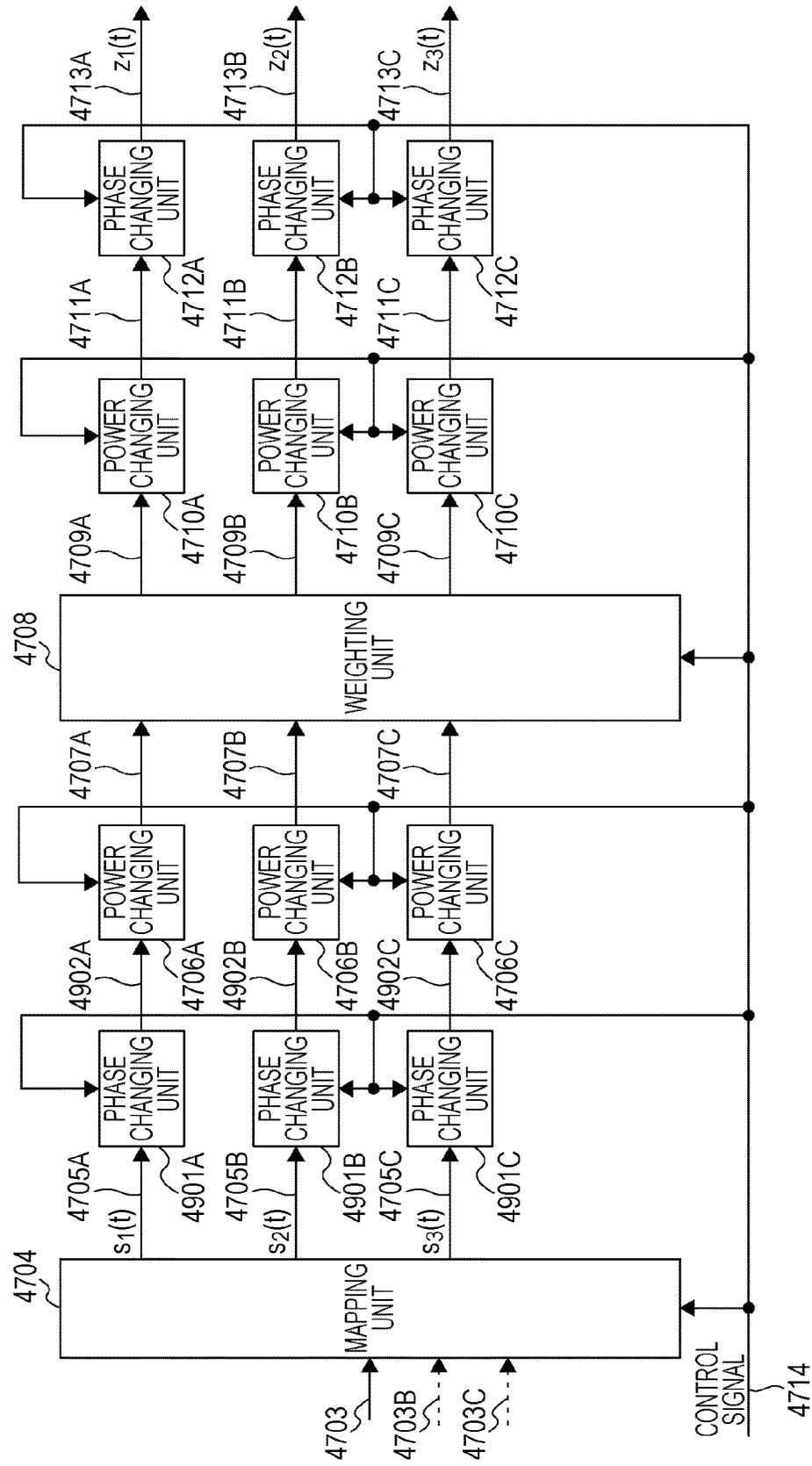
FIG. 55 illustrates an example of the configuration performing the precoding method.

In FIG. 55, the component operating similarly to FIG. 53 is designated by the identical reference mark. FIG. 55 differs from FIG. 53 in that phase changing units 4901A, 4901B, and 4901C are added.

Phase changing unit 4901A receives baseband signal $s_1(i)$ (4705A) and control signal 4714 as input, and changes the phase of baseband signal $s_1(i)$ (4705A) based on control signal 4714. Accordingly, the post-phase change signal of baseband signal $s_1(i)$ (4705A) is expressed as $C_1 \times e^{j\omega_1(i)} \times s_1(i)$, and phase changing unit 4901A outputs $C_1 \times e^{j\omega_1(i)} \times s_1(t)$ as post-phase change signal 4902A (j may be an imaginary unit, and $C_1$ may be 1.00 or a real number of 0 or more). The value of the changed phase may be a function of i such as $\omega_1(i)$, or a fixed value that is not the function of i.

Similarly, phase changing unit 4901B receives baseband signal $s_2(i)$ (4705B) and control signal 4714 as input, and changes the phase of baseband signal $s_2(i)$ (4705B) based on control signal 4714. Accordingly, the post-phase change signal of baseband signal $s_2(i)$ (4705B) is expressed as $C_2 \times e^{j\omega 2(i)} \times s_2(i)$, and phase changing unit 4901B outputs $C_2 \times e^{j\omega 2(i)} \times s_2(i)$ as post-phase change signal 4902B (j may be an imaginary unit, and $C_2$ may be 1.00 or a real number of 0 or more). The value of the changed phase may be a function of i such as $\omega_2(i)$, or a fixed value that is not the function of i.

Similarly, phase changing unit 4901C receives baseband signal $s_3(i)$ (4705C) and control signal 4714 as input, and changes the phase of baseband signal $s_3(i)$ (4705C) based on control signal 4714. Accordingly, the post-phase change signal of baseband signal $s_3(i)$ (4705C) is expressed as $C_3 \times e^{j\omega 3(i)} \times s_3(i)$, and phase changing unit 4901C outputs $C_3 \times e^{j\omega 3(i)} \times s_3(i)$ as post-phase change signal 4902C (j may be an imaginary unit, and $C_3$ may be 1.00 or a real number of 0 or more). The value of the changed phase may be a function of i such as $\omega_3(i)$, or a fixed value that is not the function of i.

The components subsequent to phase changing units 4901A, 4901B, and 4901C operate similarly to the components in FIG. 53. Accordingly, $z_1(i)$, $z_2(i)$, and $z_3(i)$ that are of the outputs of phase changing units 4712A, 4712B, and 4712C in FIG. 55 are expressed by Equation (70).

[Mathematical formula 70]

Equation (70)

$$\begin{pmatrix} z_1^{(i)} \\ z_2^{(i)} \\ z_3^{(i)} \end{pmatrix} = \begin{pmatrix} y_1^{(i)} & 0 & 0 \\ 0 & y_2^{(i)} & 0 \\ 0 & 0 & y_3^{(i)} \end{pmatrix} \begin{pmatrix} Q_1 & 0 & 0 \\ 0 & Q_2 & 0 \\ 0 & 0 & Q_3 \end{pmatrix} \begin{pmatrix} a_{11} & a_{12} & a_{13} \\ a_{21} & a_{22} & a_{23} \\ a_{31} & a_{32} & a_{33} \end{pmatrix} \times$$

$$\begin{pmatrix} P_1 & 0 & 0 \\ 0 & P_2 & 0 \\ 0 & 0 & P_3 \end{pmatrix} \begin{pmatrix} C_1 \times e^{j\omega 1(i)} & 0 & 0 \\ 0 & C_2 \times e^{j\omega 2(i)} & 0 \\ 0 & 0 & C_3 \times e^{j\omega 3(i)} \end{pmatrix}$$

$$\begin{pmatrix} s_1^{(i)} \\ s_2^{(i)} \\ s_3^{(i)} \end{pmatrix}$$

$$= \begin{pmatrix} B_1 \times e^{j\theta 1(i)} & 0 & 0 \\ 0 & B_2 \times e^{j\theta 2(i)} & 0 \\ 0 & 0 & B_3 \times e^{j\theta 3(i)} \end{pmatrix}$$

$$\begin{pmatrix} Q_1 & 0 & 0 \\ 0 & Q_2 & 0 \\ 0 & 0 & Q_3 \end{pmatrix} \begin{pmatrix} a_{11} & a_{12} & a_{13} \\ a_{21} & a_{22} & a_{23} \\ a_{31} & a_{32} & a_{33} \end{pmatrix} \times \begin{pmatrix} P_1 & 0 & 0 \\ 0 & P_2 & 0 \\ 0 & 0 & P_3 \end{pmatrix}$$

$$\begin{pmatrix} C_1 \times e^{j\omega 1(i)} & 0 & 0 \\ 0 & C_2 \times e^{j\omega 2(i)} & 0 \\ 0 & 0 & C_3 \times e^{j\omega 3(i)} \end{pmatrix} \begin{pmatrix} s_1^{(i)} \\ s_2^{(i)} \\ s_3^{(i)} \end{pmatrix}$$

Figure 56:
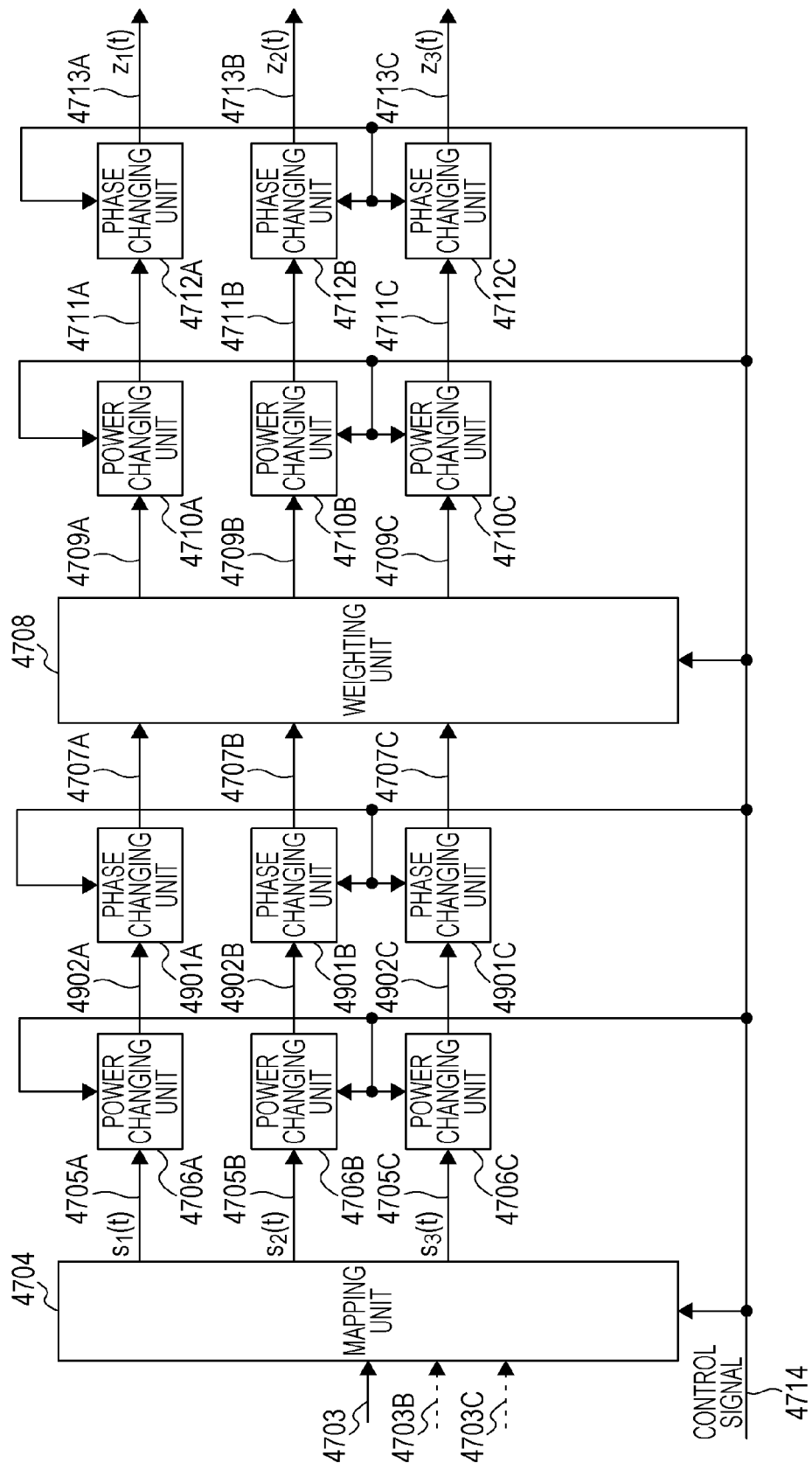
FIG. 56 illustrates an example of the configuration performing the precoding method.

FIG. 56 is a configuration diagram different from FIG. 55 in order to perform Equation (70). In FIG. 56, the component operating similarly to that in FIG. 55 is designated by the identical reference mark.

FIG. 56 differs from FIG. 55 in a positional relationship between the phase changing unit and power changing unit that are located at the preceding stage of weighting unit 4708. Accordingly, in FIG. 56, phase changing unit 4901A exists at the subsequent stage of power changing unit 4706A, phase changing unit 4901B exists at the subsequent stage of power changing unit 4706B, and phase changing unit 4901C exists at the subsequent stage of power changing unit 4706C.

Equation (71) holds because each component in FIG. 56 operates similarly to each component in FIG. 50.

[Mathematical formula 71]

Equation (71)

$$\begin{pmatrix} z_1^{(i)} \\ z_2^{(i)} \\ z_3^{(i)} \end{pmatrix} = \begin{pmatrix} Q_1 & 0 & 0 \\ 0 & Q_2 & 0 \\ 0 & 0 & Q_3 \end{pmatrix} \begin{pmatrix} y_1^{(i)} & 0 & 0 \\ 0 & y_2^{(i)} & 0 \\ 0 & 0 & y_3^{(i)} \end{pmatrix} \begin{pmatrix} a_{11} & a_{12} & a_{13} \\ a_{21} & a_{22} & a_{23} \\ a_{31} & a_{32} & a_{33} \end{pmatrix} \times$$

$$\begin{pmatrix} P_1 & 0 & 0 \\ 0 & P_2 & 0 \\ 0 & 0 & P_3 \end{pmatrix} \begin{pmatrix} C_1 \times e^{j\omega 1(i)} & 0 & 0 \\ 0 & C_2 \times e^{j\omega 2(i)} & 0 \\ 0 & 0 & C_3 \times e^{j\omega 3(i)} \end{pmatrix}$$

$$\begin{pmatrix} s_1^{(i)} \\ s_2^{(i)} \\ s_3^{(i)} \end{pmatrix}$$

$$= \begin{pmatrix} Q_1 & 0 & 0 \\ 0 & Q_2 & 0 \\ 0 & 0 & Q_3 \end{pmatrix} \begin{pmatrix} B_1 \times e^{j\theta 1(i)} & 0 & 0 \\ 0 & B_2 \times e^{j\theta 2(i)} & 0 \\ 0 & 0 & B_3 \times e^{j\theta 3(i)} \end{pmatrix}$$

$$\begin{pmatrix} a_{11} & a_{12} & a_{13} \\ a_{21} & a_{22} & a_{23} \\ a_{31} & a_{32} & a_{33} \end{pmatrix} \times \begin{pmatrix} P_1 & 0 & 0 \\ 0 & P_2 & 0 \\ 0 & 0 & P_3 \end{pmatrix}$$

$$\begin{pmatrix} C_1 \times e^{j\omega 1(i)} & 0 & 0 \\ 0 & C_2 \times e^{j\omega 2(i)} & 0 \\ 0 & 0 & C_3 \times e^{j\omega 3(i)} \end{pmatrix} \begin{pmatrix} s_1^{(i)} \\ s_2^{(i)} \\ s_3^{(i)} \end{pmatrix}$$

$z_1(i)$ in Equation (70) is equal to $z_1(i)$ in Equation (71), $z_2(i)$ in Equation (70) is equal to $z_2(i)$ in Equation (71), and $z_3(i)$ in Equation (70) is equal to $z_3(i)$ in Equation (71).

In FIGS. 55 and 56, post-power change values $P_1$, $P_2$, and $P_3$ and values $Q_1$, $Q_2$, and $Q_3$ may be changed by the set of modulation schemes $s_1(i)$, $s_2(i)$, and $s_3(i)$ (or need not be changed). Values $P_1$, $P_2$, and $P_3$ and/or values $Q_1$, $Q_2$, and $Q_3$ may be changed by the error correction coding method (such as the code length (block length) and the coding rate) (or need not be changed).

Similarly, in FIGS. 55 and 56, the phase changing method for both the preceding and subsequent stages of weighting unit 4708 may be changed by the set of modulation schemes $s_1(i)$, $s_2(i)$, and $s_3(i)$ (or need not be changed). The phase changing method may be changed by the error correction coding method (such as the code length (block length) and the coding rate) (or need not be changed).

Figure 57:
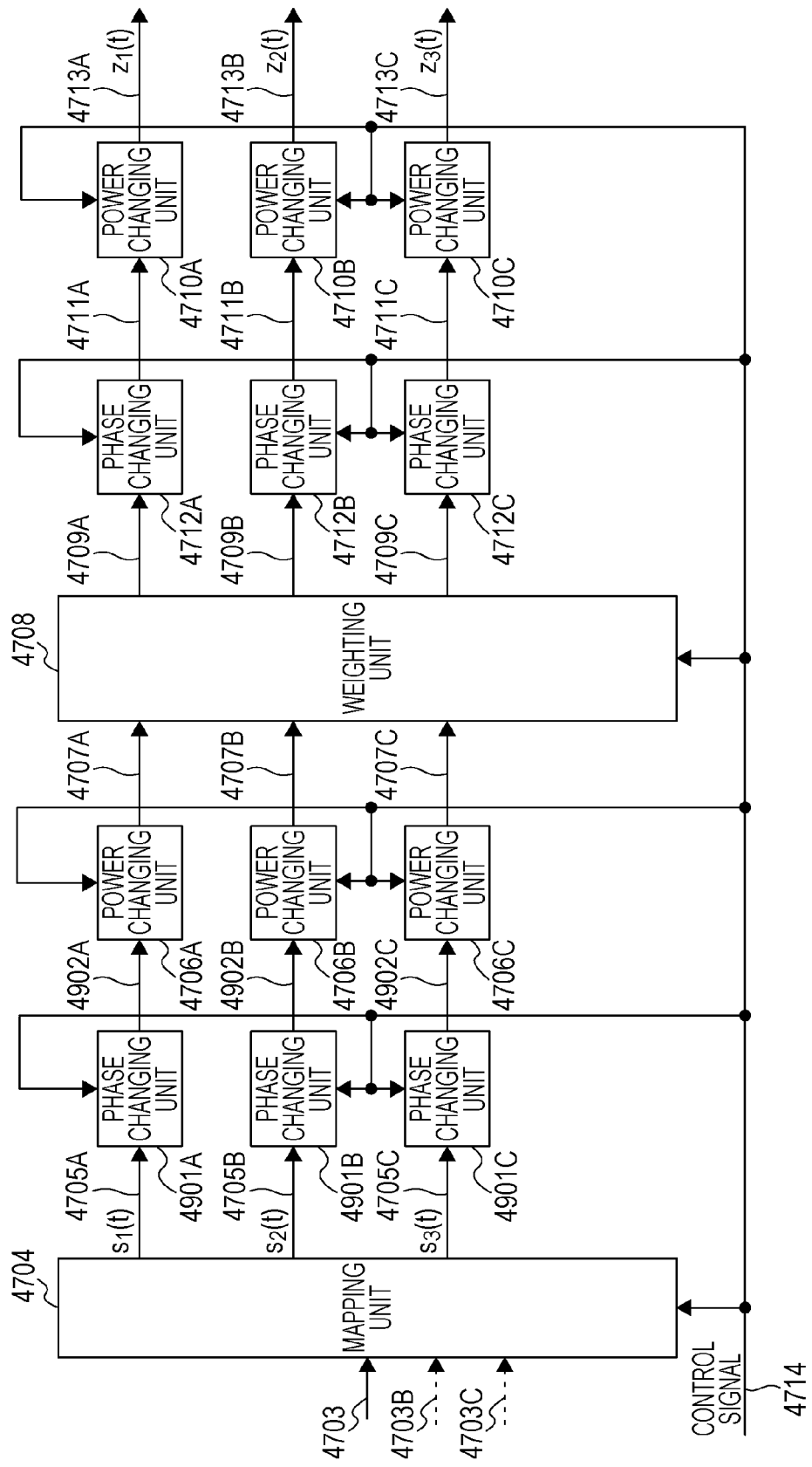
FIG. 57 illustrates an example of the configuration performing the precoding method.

In FIG. 57, the component operating similarly to FIG. 54 is designated by the identical reference mark. FIG. 57 differs from FIG. 54 in that phase changing units 4901A, 4901B, and 4901C are added.

Phase changing unit 4901A receives baseband signal $s_1(i)$ (4705A) and control signal 4714 as input, and changes the phase of baseband signal $s_1(i)$ (4705A) based on control signal 4714. Accordingly, the post-phase change signal of baseband signal $s_1(i)$ (4705A) is expressed as $C_1 \times e^{j\omega 1(i)} \times s_1(i)$, and phase changing unit 4901A outputs $C_1 \times e^{j\omega 1(i)} \times s_1(i)$ as post-phase change signal 4902A (j may be an imaginary unit, and $C_1$ may be 1.00 or a real number of 0 or more). The value of the changed phase may be a function of i such as $\omega_1(i)$, or a fixed value that is not the function of i.

Similarly, phase changing unit 4901B receives baseband signal $s_2(i)$ (4705B) and control signal 4714 as input, and changes the phase of baseband signal $s_2(i)$ (4705B) based on control signal 4714. Accordingly, the post-phase change signal of baseband signal $s_2(i)$ (4705B) is expressed as $C_2 \times e^{j\omega 2(i)} \times s_2(i)$, and phase changing unit 4901B outputs $C_2 \times e^{j\omega 2(i)} \times s_2(i)$ as post-phase change signal 4902B (j may be an imaginary unit, and $C_2$ may be 1.00 or a real number of 0 or more). The value of the changed phase may be a function of i such as $\omega_2(i)$, or a fixed value that is not the function of i.

Similarly, phase changing unit 4901C receives baseband signal $s_3(i)$ (4705C) and control signal 4714 as input, and changes the phase of baseband signal $s_3(i)$ (4705C) based on control signal 4714. Accordingly, the post-phase change signal of baseband signal $s_3(i)$ (4705C) is expressed as $C_3 \times e^{j\omega 3(i)} \times s_3(i)$, and phase changing unit 4901C outputs $C_3 \times e^{j\omega 3(i)} \times s_3(i)$ as post-phase change signal 4902C (j may be an imaginary unit, and $C_3$ may be 1.00 or a real number of 0 or more). The value of the changed phase may be a function of i such as $\omega_3(i)$, or a fixed value that is not the function of i.

The components subsequent to phase changing units 4901A, 4901B, and 4901C operate similarly to the components in FIG. 54. Accordingly, $z_1(i)$, $z_2(i)$, and $z_3(i)$ that are of the outputs of phase changing units 4712A, 4712B, and 4712C in FIG. 57 are expressed by Equation (72).

[Mathematical formula 72]

Equation (72)

$$\begin{pmatrix} z_1^{(i)} \\ z_2^{(i)} \\ z_3^{(i)} \end{pmatrix} = \begin{pmatrix} y_1^{(i)} & 0 & 0 \\ 0 & y_2^{(i)} & 0 \\ 0 & 0 & y_3^{(i)} \end{pmatrix} \begin{pmatrix} Q_1 & 0 & 0 \\ 0 & Q_2 & 0 \\ 0 & 0 & Q_3 \end{pmatrix} \begin{pmatrix} a_{11} & a_{12} & a_{13} \\ a_{21} & a_{22} & a_{23} \\ a_{31} & a_{32} & a_{33} \end{pmatrix} \times$$

$$\begin{pmatrix} C_1 \times e^{j\omega 1(i)} & 0 & 0 \\ 0 & C_2 \times e^{j\omega 2(i)} & 0 \\ 0 & 0 & C_3 \times e^{j\omega 3(i)} \end{pmatrix} \begin{pmatrix} P_1 & 0 & 0 \\ 0 & P_2 & 0 \\ 0 & 0 & P_3 \end{pmatrix}$$

$$\begin{pmatrix} s_1^{(i)} \\ s_2^{(i)} \\ s_3^{(i)} \end{pmatrix}$$

$$= \begin{pmatrix} B_1 \times e^{j\theta 1(i)} & 0 & 0 \\ 0 & B_2 \times e^{j\theta 2(i)} & 0 \\ 0 & 0 & B_3 \times e^{j\theta 3(i)} \end{pmatrix} \begin{pmatrix} Q_1 & 0 & 0 \\ 0 & Q_2 & 0 \\ 0 & 0 & Q_3 \end{pmatrix}$$

$$\begin{pmatrix} a_{11} & a_{12} & a_{13} \\ a_{21} & a_{22} & a_{23} \\ a_{31} & a_{32} & a_{33} \end{pmatrix} \times$$

$$\begin{pmatrix} C_1 \times e^{j\omega 1(i)} & 0 & 0 \\ 0 & C_2 \times e^{j\omega 2(i)} & 0 \\ 0 & 0 & C_3 \times e^{j\omega 3(i)} \end{pmatrix} \begin{pmatrix} P_1 & 0 & 0 \\ 0 & P_2 & 0 \\ 0 & 0 & P_3 \end{pmatrix}$$

$$\begin{pmatrix} s_1^{(i)} \\ s_2^{(i)} \\ s_3^{(i)} \end{pmatrix}$$

Figure 58:
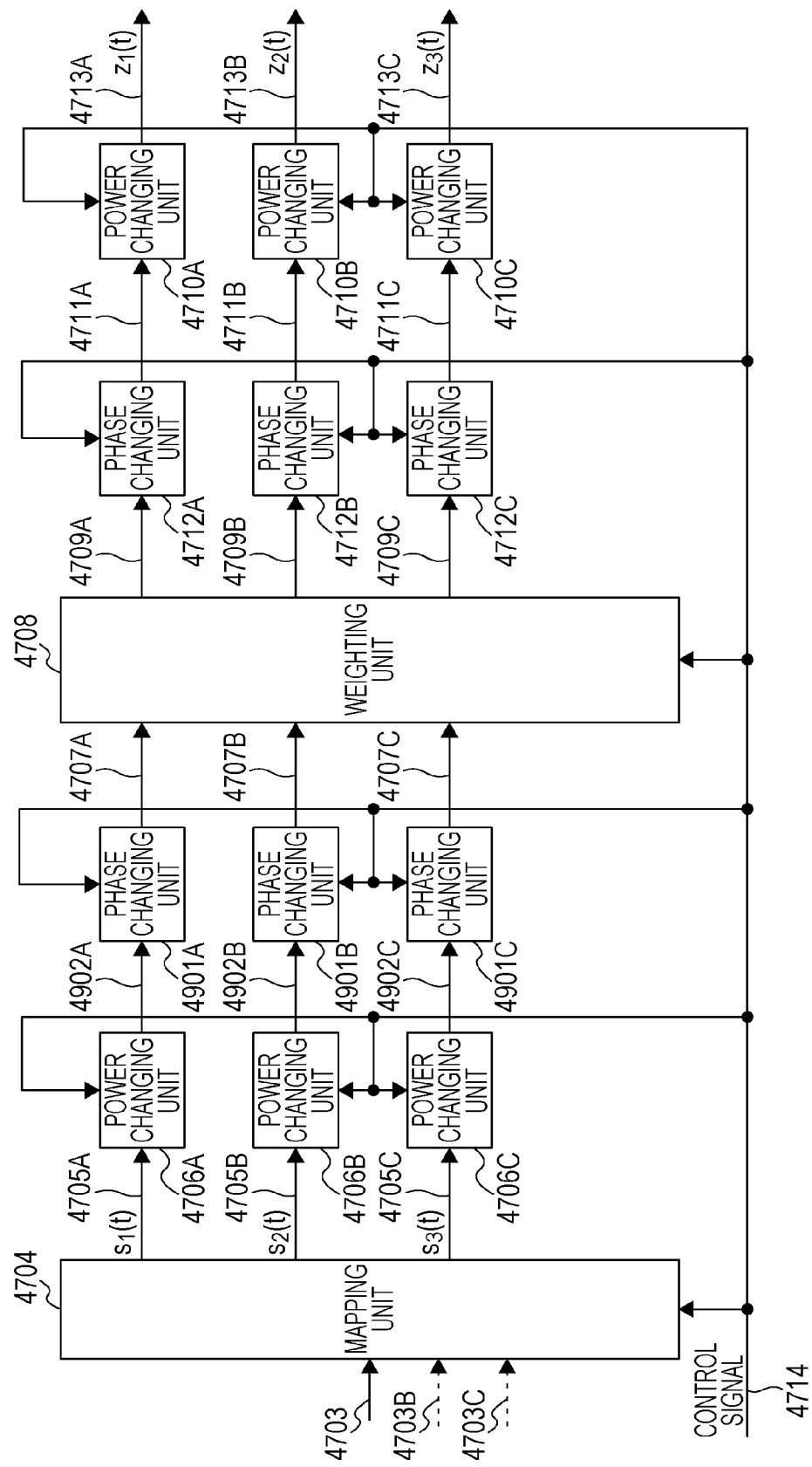
FIG. 58 illustrates an example of the configuration performing the precoding method.

FIG. 58 is a configuration diagram different from FIG. 57 in order to perform Equation (72). In FIG. 58, the component operating similarly to that in FIG. 57 is designated by the identical reference mark.

FIG. 58 differs from FIG. 57 in a positional relationship between the phase changing unit and power changing unit that are located at the preceding stage of weighting unit 4708. Accordingly, in FIG. 58, phase changing unit 4901A exists at the subsequent stage of power changing unit 4706A, phase changing unit 4901B exists at the subsequent stage of power changing unit 4706B, and phase changing unit 4901C exists at the subsequent stage of power changing unit 4706C.

Equation (73) holds because each component in FIG. 58 operates similarly to each component in FIG. 57.

[Mathematical formula 73]

Equation (73)

$$\begin{pmatrix} z_1^{(i)} \\ z_2^{(i)} \\ z_3^{(i)} \end{pmatrix} = \begin{pmatrix} Q_1 & 0 & 0 \\ 0 & Q_2 & 0 \\ 0 & 0 & Q_3 \end{pmatrix} \begin{pmatrix} y_1^{(i)} & 0 & 0 \\ 0 & y_2^{(i)} & 0 \\ 0 & 0 & y_3^{(i)} \end{pmatrix} \begin{pmatrix} a_{11} & a_{12} & a_{13} \\ a_{21} & a_{22} & a_{23} \\ a_{31} & a_{32} & a_{33} \end{pmatrix} \times$$

$$\begin{pmatrix} C_1 \times e^{j\omega 1(i)} & 0 & 0 \\ 0 & C_2 \times e^{j\omega 2(i)} & 0 \\ 0 & 0 & C_3 \times e^{j\omega 3(i)} \end{pmatrix} \begin{pmatrix} P_1 & 0 & 0 \\ 0 & P_2 & 0 \\ 0 & 0 & P_3 \end{pmatrix}$$

$$\begin{pmatrix} s_1^{(i)} \\ s_2^{(i)} \\ s_3^{(i)} \end{pmatrix}$$

$$= \begin{pmatrix} Q_1 & 0 & 0 \\ 0 & Q_2 & 0 \\ 0 & 0 & Q_3 \end{pmatrix} \begin{pmatrix} B_1 \times e^{j\theta 1(i)} & 0 & 0 \\ 0 & B_2 \times e^{j\theta 2(i)} & 0 \\ 0 & 0 & B_3 \times e^{j\theta 3(i)} \end{pmatrix}$$

$$\begin{pmatrix} a_{11} & a_{12} & a_{13} \\ a_{21} & a_{22} & a_{23} \\ a_{31} & a_{32} & a_{33} \end{pmatrix} \times$$

$$\begin{pmatrix} C_1 \times e^{j\omega 1(i)} & 0 & 0 \\ 0 & C_2 \times e^{j\omega 2(i)} & 0 \\ 0 & 0 & C_3 \times e^{j\omega 3(i)} \end{pmatrix} \begin{pmatrix} P_1 & 0 & 0 \\ 0 & P_2 & 0 \\ 0 & 0 & P_3 \end{pmatrix}$$

$$\begin{pmatrix} s_1^{(i)} \\ s_2^{(i)} \\ s_3^{(i)} \end{pmatrix}$$

$z_1(i)$ in Equation (70), $z_1(i)$ in Equation (71), $z_1(i)$ in Equation (72), and $z_1(i)$ in Equation (73) are equal to one another, $z_2(i)$ in Equation (70), $z_2(i)$ in Equation (71), $z_2(i)$ in Equation (72), and $z_2(i)$ in Equation (73) are equal to one another, $z_3(i)$ in Equation (70), $z_3(i)$ in Equation (71), $z_3(i)$ in Equation (72), and $z_3(i)$ in Equation (73) are equal to one another.

In FIGS. 57 and 58, post-power change values $P_1$, $P_2$, and $P_3$ and values $Q_1$, $Q_2$, and $Q_3$ may be changed by the set of modulation schemes $s_1(i)$, $s_2(i)$, and $s_3(i)$ (or need not be changed). Values $P_1$, $P_2$, and $P_3$ and/or values $Q_1$, $Q_2$, and $Q_3$ may be changed by the error correction coding method (such as the code length (block length) and the coding rate) (or need not be changed).

Similarly, in FIGS. 57 and 58, the phase changing method may be changed by the set of modulation schemes $s_1(i)$, $s_2(i)$, and $s_3(i)$ (or need not be changed). The phase changing method may be changed by the error correction coding method (such as the code length (block length) and the coding rate) (or need not be changed).

Accordingly, the present exemplary embodiment leads to the following advantageous effect. That is, there is a high possibility of improving the data reception quality, and particularly there is a high possibility of largely improving the data reception quality in the LOS environment in which the direct wave is dominant.

For example, the precoding matrix may be switched when the set of modulation schemes of the three streams is switched. The phase changing method may be switched when the set of modulation schemes of the three streams is switched. The precoding matrix and the phase changing method may be switched when the set of modulation schemes of the three streams is switched (the precoding matrix and the phase changing need not be switched even if the set of modulation schemes of the three streams is switched).

(Supplement 1)

The above exemplary embodiments and other contents may be combined.

The above exemplary embodiments and other contents are described only by way of example. For example, even if "the modulation scheme, the error correction coding scheme (such as the error correction code, code length, and coding rate used), and the control information" are illustrated, a similar configuration can also be embodied in the case that "another modulation scheme, another error correction coding scheme (such as the error correction code, code length, and coding rate used), and another control information" are applied.

Even if a modulation scheme other than the modulation scheme described in the exemplary embodiments is used, the exemplary embodiments and other contents can be performed. For example, APSK (Amplitude Phase Shift Keying) (such as 16APSK, 64APSK, 128APSK, 256APSK, 1024APSK, and 4096APSK), PAM (Pulse Amplitude Modulation) (such as 4PAM, 8PAM, 16PAM, 64PAM, 128PAM, 256PAM, 1024PAM, and 4096PAM), PSK (Phase Shift Keying) (such as BPSK, QPSK, 8PSK, 16PSK, 64PSK, 128PSK, 256PSK, 1024PSK, and 4096PSK), and QAM (Quadrature Amplitude Modulation) (such as 4QAM, 8QAM, 16QAM, 64QAM, 128QAM, 256QAM, 1024QAM, and 4096QAM) may be applied, or homogeneous mapping or non-homogeneous mapping may be performed in each modulation scheme.

The method for disposing the 2, 4, 8, 16, 64, 128, 256, or 1024 signal points on the l-Q plane (the modulation scheme having the 2, 4, 8, 16, 64, 128, 256, or 1024 signal points) is not limited to the signal point disposing method of the modulation scheme in the exemplary embodiments. Accordingly, the function of outputting the in-phase component and the quadrature component based on the plurality of bits becomes the function of the mapping unit, and the performance of the precoding and phase change becomes an effective function of the present disclosure.

When "∀" and "∃" exist in the specification, "∀" indicates a universal quantifier, and "∃" indicates an existential quantifier.

In the case that the complex plane exists in the specification, "radian" is used as a phase unit such as the argument.

The use of the complex plane can display a polar coordinate of the complex number in a polar form. Assuming that point (a,b) on the complex plane corresponds to complex number $z=a+jb$ (a and b are a real number, and j is an imaginary unit), $a=r\times\cos\theta$ and $b=r\times\sin\theta$ are obtained when point (a,b) is expressed by [r,θ] in terms of the polar coordinate, and Equation (74) holds.

$$r=\sqrt{a^2+b^2}$$ [Mathematical formula 74]

r is absolute value (r=|z|) of z, and θ is the argument. Therefore, $z=a+jb$ is expressed by $r\times e^{j\theta}$.

In the method of the exemplary embodiments, the transmission device does not transmit the direct information on the method for regularly switching the precoding matrix, but the reception device estimates the information on the precoding of "the method for regularly switching the precoding matrix" used by the transmission device. Therefore, an advantageous effect that the data transmission efficiency is improved can be obtained because the transmission device does not transmit the direct information on the method for regularly switching the precoding matrix.

In the method of the exemplary embodiments, the precoding weight change is performed on the time axis. As described in the first exemplary embodiment, the exemplary embodiments can similarly be performed even if the multicarrier transmission method such as the OFDM transmission is used.

Particularly, when the precoding switching method is changed by the number of transmission signals, the reception device can recognize the precoding switching method by obtaining the information on the number of transmission signals transmitted by the transmission device.

In the specification, the reception device and antenna of the terminal may separately be provided. For example, the reception device includes an interface to which the signal received by the antenna or the signal that is received by the antenna and subjected to the frequency conversion through a cable, and the reception device performs the subsequent pieces of processing. The data and information obtained by the reception device are converted into video and audio, and displayed on a monitor or output as sound from a speaker. The data and information obtained by the reception device are subjected to signal processing related to the video and audio (need not be subjected to the signal processing), and may be output from an RCA terminal (a video terminal and an audio terminal) included in the reception device, a USB (Universal Serial Bus), an HDMI (registered trademark) (High-Definition Multimedia Interface), or a digital terminal.

In the specification, for example, it is considered that the transmission device is included in communication and broadcasting devices such as a broadcasting station, a base station, an access point, a terminal, and a mobile phone. At this point, it is considered that the reception device is included in communication devices such as a television receiver, a radio set, a terminal, a personal computer, a mobile phone, an access point, and a base station. The transmission device and reception device of the present disclosure have the communication function, and it is conceivable that the transmission device and the reception device can be connected to a device, such as a television receiver, a radio set, a personal computer, and a mobile phone, which performs an application through some sort of interface.

In the exemplary embodiments, such the symbol other than the data symbol as a pilot symbol (such as a preamble, a unique word, a postamble, and a reference symbol), and the symbol for the control information may arbitrarily be disposed in the frame. In the exemplary embodiments, the terms of pilot symbol and the control information symbol are used. However, the terms may be called in any way, and the function of itself is important.

For example, in the transmitter and the receiver, the pilot symbol may be an already-known symbol modulated by the PSK modulation (or the receiver may synchronize to recognize the symbol transmitted by the transmitter), and the receiver performs frequency synchronization, time synchronization, channel estimation (of each modulated signal) (estimation of CSI (Channel State Information)), and signal detection using the symbol.

The control information symbol is used to transmit information (such as the modulation scheme, the error correction coding scheme, and the coding rate of the error correction coding scheme, which are used in the communication, and setting information on an upper layer) that needs to be transmitted to the a communication partner in order to perform the communication except for the data (for example, the application).

The present disclosure is not limited to the above exemplary embodiments, but various changes can be made. For example, the exemplary embodiments are described when performed as the communication device. Alternatively, the communication method may be performed as software.

The precoding switching method is described above in the method for transmitting the two modulated signals from the two antennas. Additionally, the precoding switching method for changing the precoding weight (matrix) can similarly be performed in a method for performing the precoding on the four post-mapping signals, generating the four modulated signals, and transmitting the four modulated signals from the four antennas, namely, a method for performing the precoding on N post-mapping signals, generating N modulated signals, and transmitting the N modulated signals from N antennas.

In the present disclosure, the terms such as "precoding" and "precoding weight" are used. However, the terms may be called in any way. In the present disclosure, the signal processing of itself is important.

The different pieces of data may be transmitted using streams $s_1(t)$ and $s_2(t)$, or the identical data may be transmitted using streams s1(t) and s2(t).

For both the transmit antenna of the transmission device and the receive antenna of the reception device, one antenna illustrated in the drawing may be constructed with a plurality of antennas.

It is necessary for the transmission device to post the transmission method (the MIMO, the SISO, the time and space block coding, and the interleaving scheme), the modulation scheme, and the error correction coding scheme to the reception device. However, this point is omitted in the exemplary embodiments. A posting signal exists in the frame transmitted by the transmission device. The reception device obtains the posting signal to change the operation.

For example, a program executing the communication method is previously stored in a ROM (Read Only Memory), and the program may be operated by a CPU (Central Processor Unit).

The program executing the communication method is stored in a computer-readable storage medium, the program stored in the storage medium is recorded in a RAM (Random Access Memory) of a computer, and the computer may be operated according to the program.

Each of the configurations of the exemplary embodiments may typically be constructed with an LSI (Large Scale Integration) of an integrated circuit including an input terminal and an output terminal. The configurations of the exemplary embodiments may individually be formed into one chip, or a whole or part of the configuration of each exemplary embodiment may be formed into one chip. At this point, the term of the LSI is used. Sometimes an IC (Integrated Circuit), a system LSI, a super LSI, and an ultra LSI are used depending on a degree of integration. An integrated circuit technique is not limited to the LSI, but the integrated circuit may be made by a dedicated circuit or a general-purpose processor. An FPGA (Field Programmable Gate Array) that can be programmed after LSI production or a reconfigurable processor in which connection and setting of a circuit cell in the LSI may be used.

When an integrated circuit technology that replaces the LSI therewith emerges with the progress of a semiconductor technology or a derivative technology, a functional block may be integrated using the integrated circuit technology. A biotechnology may be applied.

(Supplement 2)

In the first, second, third, and fourth exemplary embodiments, the phase change is mainly performed after the precoding. Modifications of the phase change will be described below.

In Equation (60) of the third exemplary embodiment, post-power change values $P_1$, $P_2$, $P_3$, and $P_4$ may be switched time to a function of "time", "frequency", or "time and frequency", namely, post-power change values $P_1$, $P_2$, $P_3$, and $P_4$ may be switched to "time", "frequency", or "time and frequency".

In the third exemplary embodiment, post-power change values $P_1$, $P_2$, $P_3$, and $P_4$ in Equation (61), post-power change values $P_1$, $P_2$, $P_3$, and $P_4$ in Equation (62), post-power change values $P_1$, $P_2$, $P_3$, and $P_4$ in Equation (63), post-power change values $P_1$, $P_2$, $P_3$, and $P_4$ in Equation (64), post-power change values $P_1$, $P_2$, $P_3$, and $P_4$ in Equation (65), and post-power change values $P_1$, $P_2$, $P_3$, and $P_4$ in Equation (66) may be switched time to a function of "time", "frequency", or "time and frequency", namely, post-power change values $P_1$, $P_2$, $P_3$, and $P_4$ in Equation (61), post-power change values $P_1$, $P_2$, $P_3$, and $P_4$ in Equation (62), post-power change values $P_1$, $P_2$, $P_3$, and $P_4$ in Equation (63), post-power change values $P_1$, $P_2$, $P_3$, and $P_4$ in Equation (64), post-power change values $P_1$, $P_2$, $P_3$, and $P_4$ in Equation (65), and post-power change values $P_1$, $P_2$, $P_3$, and $P_4$ in Equation (66) may be switched time to "time", "frequency", or "time and frequency".

In the third exemplary embodiment, post-power change values $Q_1$, $Q_2$, $Q_3$, and $Q_4$ in Equation (61), post-power change values $Q_1$, $Q_2$, $Q_3$, and $Q_4$ in Equation (62), post-power change values $Q_1$, $Q_2$, $Q_3$, and $Q_4$ in Equation (63), post-power change values $Q_1$, $Q_2$, $Q_3$, and $Q_4$ in Equation (64), post-power change values $Q_1$, $Q_2$, $Q_3$, and $Q_4$ in Equation (65), and post-power change values $Q_1$, $Q_2$, $Q_3$, and $Q_4$ in Equation (66) may be switched time to a function of "time", "frequency", or "time and frequency", namely, post-power change values $Q_1$, $Q_2$, $Q_3$, and $Q_4$ in Equation (61), post-power change values $Q_1$, $Q_2$, $Q_3$, and $Q_4$ in Equation (62), post-power change values $Q_1$, $Q_2$, $Q_3$, and $Q_4$ in Equation (63), post-power change values $Q_1$, $Q_2$, $Q_3$, and $Q_4$ in Equation (64), post-power change values $Q_1$, $Q_2$, $Q_3$, and $Q_4$ in Equation (65), and post-power change values $Q_1$, $Q_2$, $Q_3$, and $Q_4$ in Equation (66) may be switched time to "time", "frequency", or "time and frequency".

In Equation (67) of the fourth exemplary embodiment, post-power change values $P_1$, $P_2$, and $P_3$ may be switched time to a function of "time", "frequency", or "time and frequency", namely, post-power change values $P_1$, $P_2$, and $P_3$ may be switched by "time", "frequency", or "time and frequency".

In the fourth exemplary embodiment, post-power change values $P_1$, $P_2$, and $P_3$ in Equation (68), post-power change values $P_1$, $P_2$, and $P_3$ in Equation (69), post-power change values $P_1$, $P_2$, and $P_3$ in Equation (70), post-power change values $P_1$, $P_2$, and $P_3$ in Equation (71), post-power change values $P_1$, $P_2$, and $P_3$ in Equation (72), and post-power change values $P_1$, $P_2$, and $P_3$ in Equation (73) may be switched time to a function of "time", "frequency", or "time and frequency", namely, post-power change values $P_1$, $P_2$, and $P_3$ in Equation (68), post-power change values $P_1$, $P_2$, and $P_3$ in Equation (69), post-power change values $P_1$, $P_2$, and $P_3$ in Equation (70), post-power change values $P_1$, $P_2$, and $P_3$ in Equation (71), post-power change values $P_1$, $P_2$, and $P_3$ in Equation (72), and post-power change values $P_1$, $P_2$, and $P_3$ in Equation (73) may be switched time to "time", "frequency", or "time and frequency".

In the fourth exemplary embodiment, post-power change values $Q_1$, $Q_2$, and $Q_3$ in Equation (68), post-power change values $Q_1$, $Q_2$, and $Q_3$ in Equation (69), post-power change values $Q_1$, $Q_2$, and $Q_3$ in Equation (70), post-power change values $Q_1$, $Q_2$, and $Q_3$ in Equation (71), post-power change values $Q_1$, $Q_2$, and $Q_3$ in Equation (72), and post-power change values $Q_1$, $Q_2$, and $Q_3$ in Equation (73) may be switched time to a function of "time", "frequency", or "time and frequency", namely, post-power change values $Q_1$, $Q_2$, and $Q_3$ in Equation (68), post-power change values $Q_1$, $Q_2$, and $Q_3$ in Equation (69), post-power change values $Q_1$, $Q_2$, and $Q_3$ in Equation (70), post-power change values $Q_1$, $Q_2$, and $Q_3$ in Equation (71), post-power change values $Q_1$, $Q_2$, and $Q_3$ in Equation (72), and post-power change values $Q_1$, $Q_2$, and $Q_3$ in Equation (73) may be switched time to "time", "frequency", or "time and frequency".

The present disclosure can widely be applied to the wireless system that transmits different modulated signals from the plurality of antennas. The present disclosure can also be applied to the case that the MIMO transmission is performed in the wired communication system including the plurality of transmission points (such as a PLC (Power Line Communication) system, an optical communication system, and a DSL (Digital Subscriber Line) system).

The following items are included in various aspect of the exemplary embodiments of the present disclosure.

According to a first aspect of the present disclosure, a transmission device includes: a weighting circuity which, in operation, generates transmission signals of n streams (n is an integer of 3 or more) by weighting modulated signals of the n streams using a predetermined fixed precoding matrix; a phase changing circuity which, in operation, regularly changes each phase of a symbol series included in each of the transmission signals of the n streams; and a transmitter circuity which, in operation, transmits the transmission signals of the n streams from different antennas, the phases of each of the transmission signals of the n streams being changed in each symbol. At this point, the transmission signal of an i-th stream has an $m_i$ kind of phase change value $y_i(t)$ (i is an integer between 1 and n (inclusive), $0 \le y_i < 2\pi$, and $m_i$ is set in each stream, t is an integer of 0 or more, and indicates a symbol slot), and the phase changing circuity changes the phase in one or more u ($u=m_1 \times m_2 \times \ldots \times m_n$) symbol periods using all patterns of a set of phase change values $y_i(t)$ different from each other in each symbol.

According to a second aspect of the present disclosure, in the transmission device of the first aspect, at least one of the transmission signals of the n streams has one kind of phase change value $y_i(t)$.

According to a third aspect of the present disclosure, in the transmission device of the first aspect, at least one of the transmission signals of the n streams has 0 radian of phase change value $y_i(t)$.

According to a fourth aspect of the present disclosure, in the transmission device of the first aspect, the phase change value $y_1(t)$ of the transmission signal of a first stream includes at least one phase change value equal to the phase change value $y_2(t)$ of the transmission signal of a second stream.

According to a fifth aspect of the present disclosure, a transmission method includes: generating transmission signals of n streams (n is an integer of 3 or more) by weighting modulated signals of the n streams using a predetermined fixed precoding matrix; changing regularly each phase of a symbol series included in each of the transmission signals of the n streams; and transmitting the transmission signals of the n streams from different antennas, the phases of each of the transmission signals of the n streams being changed in each symbol. At this point, the transmission signal of an i-th stream has an $m_i$ kind of phase change value $y_i(t)$ (i is an integer between 1 and n (inclusive), $0 \le y_i < 2\pi$, and $m_i$ is set in each stream, t is an integer of 0 or more, and indicates a symbol slot), and the phase change is performed in one or more u ($u=m_1 \times m_2 \times \ldots \times m_n$) symbol periods using all patterns of a set of phase change values $y_i(t)$ different from each other in each symbol. According to a sixth aspect of the present disclosure, in the transmission method of the fifth aspect, at least one of the transmission signals of the n streams has one kind of phase change value $y_i(t)$.

According to a seventh aspect of the present disclosure, in the transmission method of the fifth aspect, at least one of the transmission signals of the n streams has 0 radian of the phase change value $y_i(t)$.

According to an eighth aspect of the present disclosure, in the transmission method of the fifth aspect, the phase change value $y_1(t)$ of the transmission signal of a first stream includes at least one phase change value equal to the phase change value $y_2(t)$ of the transmission signal of a second stream.

The present disclosure can widely be applied to a wireless system that transmits different modulated signals from the plurality of antennas, for example, suitably applied to the OFDM-MIMO communication system. The present disclosure can also be applied to the case that the MIMO transmission is performed in the wired communication system including the plurality of transmission points (such as a PLC (Power Line Communication) system, an optical communication system, and a DSL Digital Subscriber Line) system). At this point, the plurality of modulated signals described in the present disclosure are transmitted using the plurality of transmission points. The modulated signal may be transmitted from a plurality of transmission points.

What is claimed is:

1. A transmission device comprising:
   pre-coding circuity which, in operation, generates first to fourth pre-coded symbols zd1(t)-zd4(t) by pre-coding first to fourth modulation symbols s1(t)-s4(t) using a precoding matrix;
   phase changing circuity which, in operation, generates second to fourth phase changed symbols z2(t)-z4(t) by regularly phase changing at least one pre-coded symbol of the second to the fourth pre-coded symbols zd2(t)- zd4(t) by using M phase changing values at times other than a first time, M being an integer of 2 or more; and a transmitter which, in operation, transmits the first pre-coded symbols zd1(t) and the second to the fourth phase-changed symbols z2(t)-z4(t) from different transmission antennas.

2. The transmission device according to claim 1, wherein the phase changing circuity continuously phase changes each M×M symbols in at least two pre-coded symbols zdn(t) of the second to fourth pre-coded symbols zd2(t)-zd4(t) by using the M phase change values to be changed each M symbols, the at least two pre-coded symbols zdn(t) being at least any two of zd2(t) to zd4(t).

3. The transmission device according to claim 1, wherein at least two pre-coded symbols of the second to fourth pre-coded symbols zd2(t)-zd4(t) are phase changed using the same phase change value at least once in the same time.

4. A transmission method comprising:

generating first to fourth pre-coded symbols zd1(t)-zd4(t) by pre-coding first to fourth modulation symbols s1(t)-s4(t) using a precoding matrix;

generating second to fourth phase changed symbols z2(t)-z4(t) by regularly phase changing at least one pre-coded symbol of the second to the fourth pre-coded symbols zd2(t)-zd4(t) by using M phase changing values at times other than a first time, M being an integer of 2 or more; and transmitting the first pre-coded symbols zd1(t) and the second to the fourth phase-changed symbols z2(t)-z4(t) from different transmission antennas.

5. The transmission method according to claim 4, wherein at least two pre-coded symbols zdn(t) of the second to fourth pre-coded symbols zd2(t)-zd4(t) are continuously phase changed each M×M symbols by using the M phase change values to be changed each M symbols, the at least two pre-coded symbols zdn(t) being at least any two of zd2(t) to zd4(t).

6. The transmission method according to claim 4, wherein at least two pre-coded symbols of the second to fourth pre-coded symbols zd2(t)-zd4(t) are phase changed using the same phase change value at least once in the same time.

7. A reception device comprising:

reception circuitry which, in operation, receives four multiplexed symbols rm(t) by the four reception antennas respectively; and signal processing circuitry which, in operation, separates the four multiplexed symbols rm(t) into first to fourth symbols rs1(t)-rs4(t), wherein the first to the fourth symbols rs1(t)-rs4(t) are generated by:

pre-coding first to fourth modulation symbols s1(t)-s4(t) using a precoding matrix to generate first to fourth pre-coded symbols zd1(t)-zd4(t), regularly phase changing, by using M phase change values at times other than a first time, at least one pre-coded symbol of the second to the fourth pre-coded symbols zd2(t)-zd4(t) to generate second to fourth phase changed symbols z2(t)-z4(t), M being an integer of 2 or more, and transmitting, from different transmission antennas, the first pre-coded symbols zd1(t) and the second to the fourth phase-changed symbols z2(t)-z4(t).

8. The reception device according to claim 7, wherein at least two pre-coded symbols zdn(t) of the second to fourth pre-coded symbols zd2(t)-zd4(t) are continuously phase changed each M×M symbols by using the M phase change values to be changed each M symbols, the at least two pre-coded symbols zdn(t) being at least any two of zd2(t) to zd4(t).

9. The reception device according to claim 7, wherein at least two pre-coded symbols of the second to fourth pre-coded symbols zd2(t)-zd4(t) are phase changed using the same phase change value at least once in the same time.

10. A reception method comprising:

receiving four multiplexed symbols rm(t) by the four reception antennas respectively; and separating the four multiplexed symbols rm(t) into first to fourth symbols rs1(t)-rs4(t), wherein the first to the fourth symbols rs(t)-rs(t) are generated by:

pre-coding first to fourth modulation symbols s1(t)-s4(t) using a precoding matrix to generate first to fourth pre-coded symbols zd1(t)-zd4(t), regularly phase changing, by using M phase change values at times other than a first time, at least one pre-coded symbol of the second to fourth pre-coded symbols zd2(t)-zd4(t) to generate second to fourth phase changed symbols z2(t)-z4(t), M being an integer of 2 or more, and transmitting, from different transmission antennas, the first pre-coded symbols zd1(t) and the second to the fourth phase-changed symbols z2(t)-z4(t).

11. The reception method according to claim 10, wherein at least two pre-coded symbols zdn(t) of the second to fourth pre-coded symbols zd2(t)-zd4(t) are continuously phase changed each M×M symbols by using the M phase change values to be changed each M symbols, the at least two pre-coded symbols zdn(t) being at least any two of zd2(t) to zd4(t).

12. The reception method according to claim 10, wherein at least two pre-coded symbols of the second to fourth pre-coded symbols zd2(t)-d4(t) are phase changed using the same phase change value at least once in the same time.

* * * * *